United States Patent
Yokota

(10) Patent No.: US 9,804,436 B2
(45) Date of Patent: Oct. 31, 2017

(54) DISPLAY DEVICE AND TELEVISION RECEPTION DEVICE

(71) Applicant: Sharp Kabushiki Kaisha, Sakai, Osaka (JP)

(72) Inventor: Masashi Yokota, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/300,417

(22) PCT Filed: Mar. 27, 2015

(86) PCT No.: PCT/JP2015/059639
§ 371 (c)(1),
(2) Date: Sep. 29, 2016

(87) PCT Pub. No.: WO2015/152054
PCT Pub. Date: Oct. 8, 2015

(65) Prior Publication Data
US 2017/0146856 A1    May 25, 2017

(30) Foreign Application Priority Data

Mar. 31, 2014    (JP) ................................ 2014-073085

(51) Int. Cl.
*H04N 9/31* (2006.01)
*H04N 9/12* (2006.01)
(Continued)

(52) U.S. Cl.
CPC ..... *G02F 1/133514* (2013.01); *G02B 6/0068* (2013.01); *G02F 1/1336* (2013.01);
(Continued)

(58) Field of Classification Search
CPC .......... H04N 5/44; H04N 9/12; H04N 9/3197; H04N 9/31; G02F 1/133514;
(Continued)

(56) References Cited

U.S. PATENT DOCUMENTS 7,808,585 B2 * 10/2010 Haga ..................... G02B 5/201
349/106
9,110,204 B2 * 8/2015 Nakamura ........... G02B 6/0026
(Continued)

FOREIGN PATENT DOCUMENTS

JP    2010-93132 A    4/2010
JP    2012-27298 A    2/2012
(Continued)

OTHER PUBLICATIONS

Official Communication issued in International Application PCT/JP2015/059639, dated Jun. 16, 2015.

*Primary Examiner* — Sherrie Hsia
(74) *Attorney, Agent, or Firm* — Keating & Bennett, LLP

(57) ABSTRACT

A liquid crystal display device includes an LED that emits blue light having a light emission spectrum with a half value width less than 25 nm, green light having a light emission spectrum with a half value width less than 52 nm, and red light having a light emission spectrum with a half value width less than 40 nm, and a color filter including a blue coloring unit having a transmission spectrum with a peak wavelength from 440 nm to 461.5 nm and a half value width less than 100 nm, a green coloring unit having a transmission spectrum with a peak wavelength from 510 nm to 533.5 nm and a half value width less than 90 nm, and a red coloring unit having a transmission spectrum with a wavelength greater than or equal to 580 nm for the half value of a peak.

14 Claims, 50 Drawing Sheets

(51) Int. Cl.
  *H04N 5/44* (2011.01)
  *G02F 1/1335* (2006.01)
  *F21V 8/00* (2006.01)
  *G02B 5/20* (2006.01)
  *H04N 5/66* (2006.01)

(52) U.S. Cl.
  CPC .. *G02F 1/133617* (2013.01); *G02F 1/133621* (2013.01); *H04N 5/44* (2013.01); *H04N 9/12* (2013.01); *G02B 5/201* (2013.01); *G02B 6/0003* (2013.01); *G02F 1/133615* (2013.01); *G02F 2001/133614* (2013.01); *G02F 2001/133624* (2013.01); *G02F 2202/36* (2013.01); *G02F 2203/055* (2013.01); *H04N 5/66* (2013.01)

(58) Field of Classification Search
  CPC ......... G02F 1/133617; G02F 1/133621; G02F 2001/133614; G02F 2203/055; G02B 6/0068
  USPC ....... 348/728, 739, 742–744, 798, 799, 790, 348/791, 800–803; 362/293, 611–613; 345/65, 72, 82–84, 87, 88
  See application file for complete search history.

(56) References Cited

U.S. PATENT DOCUMENTS

| | | |
|---|---|---|
| 2008/0186433 A1 | 8/2008 | Haga et al. |
| 2010/0091215 A1 | 4/2010 | Fukunaga et al. |
| 2013/0271700 A1 | 10/2013 | Nakamura et al. |
| 2015/0323726 A1 | 11/2015 | Nakamura et al. |
| 2016/0312118 A1* | 10/2016 | Fiedler .................. H01L 27/322 |

FOREIGN PATENT DOCUMENTS

| | | |
|---|---|---|
| JP | 2013-218953 A | 10/2013 |
| WO | 2006/009009 A1 | 1/2006 |

* cited by examiner

FIG. 13

| | | | COMPARATIVE EXAMPLE 1 | COMPARATIVE EXAMPLE 2 | EXAMPLE 1 | EXAMPLE 2 |
|---|---|---|---|---|---|---|
| LUMINANCE RATIO OF EMITTED LIGHT | | | 100% | 17% | 58% | 66% |
| BT.2020 PERCENTAGE: CIE 1976 CHROMATICITY DIAGRAM | | | 64% | 100% | 101% | 100% |
| LED | RED PHOSPHOR (PEAK WAVELENGTH, HALF VALUE WIDTH) | | CaAlSiN (650nm) | CaAlSiN (650nm) | CdSe (645nm, 36nm) | CdSe (635nm, 30nm) |
| | GREEN PHOSPHOR (PEAK WAVELENGTH, HALF VALUE WIDTH) | FIRST GREEN PHOSPHOR | β-SiAlON (540nm) | β-SiAlON (540nm) | CdSe (530nm, 36nm) | CdSe (530nm, 30nm) |
| | | SECOND GREEN PHOSPHOR | β-SiAlON (522nm) | β-SiAlON (522nm) | | |
| | PEAK WAVELENGTH (HALF VALUE WIDTH) OF BLUE LED ELEMENT | | 444nm (18nm) | 444nm (18nm) | 444nm (18nm) | 444nm (18nm) |
| | BLEND PROPORTION | RED PHOSPHOR | 25.76% | 6.96% | 32.52% | 28.28% |
| | | GREEN PHOSPHOR | 74.24% | 93.04% | 67.48% | 71.72% |
| CF | R THICKNESS RATIO | | 1 | 11.9 | 1 | 1 |
| | G THICKNESS RATIO | | 1 | 11.9 | 1 | 1 |
| | B THICKNESS RATIO | | 1 | 11.9 | 1 | 1 |
| NTSC PERCENTAGE | CIE 1931 CHROMATICITY DIAGRAM | | 83% | 120% | 119% | 121% |
| | CIE 1976 CHROMATICITY DIAGRAM | | 96% | 150% | 151% | 150% |
| BT.709 PERCENTAGE | CIE 1931 CHROMATICITY DIAGRAM | | 116% | 170% | 168% | 171% |
| | CIE 1976 CHROMATICITY DIAGRAM | | 110% | 172% | 174% | 172% |
| DCI PERCENTAGE | CIE 1931 CHROMATICITY DIAGRAM | | 86% | 125% | 124% | 126% |
| | CIE 1976 CHROMATICITY DIAGRAM | | 87% | 137% | 138% | 137% |
| BT.2020 PERCENTAGE | CIE 1931 CHROMATICITY DIAGRAM | | 62% | 90% | 89% | 90% |
| | CIE 1976 CHROMATICITY DIAGRAM | | 64% | 100% | 101% | 100% |
| CHROMATICITY OF LED | | x= | 0.2407 | 0.2132 | 0.2273 | 0.2278 |
| | | y= | 0.1833 | 0.1891 | 0.1845 | 0.1829 |
| | | u'= | 0.2041 | 0.1761 | 0.1910 | 0.1923 |
| | | v'= | 0.3496 | 0.3514 | 0.3489 | 0.3473 |
| | | X= | 188.0600 | 185.3368 | 127.3945 | 145.3254 |
| | | Y= | 143.1827 | 164.3889 | 103.4008 | 116.6907 |
| | | Z= | 449.9246 | 519.6258 | 329.5904 | 375.9269 |
| LIQUID CRYSTAL PANEL | CHROMATICITY OF EMITTED LIGHT WHEN WHITE IS DISPLAYED | x= | 0.2841 | 0.2859 | 0.2841 | 0.2857 |
| | | y= | 0.2909 | 0.2891 | 0.2909 | 0.2909 |
| | | u'= | 0.1919 | 0.1939 | 0.1919 | 0.1931 |
| | | v'= | 0.4421 | 0.4412 | 0.4421 | 0.4423 |
| | | X= | 4.958131 | 0.831061 | 2.862576 | 3.286709 |
| | | Y= | 5.078288 | 0.840087 | 2.931901 | 3.346626 |
| | | Z= | 7.417833 | 1.235175 | 4.283216 | 4.870106 |
| | CHROMATICITY OF EMITTED LIGHT WHEN RED IS DISPLAYED | x= | 0.6574 | 0.6864 | 0.7028 | 0.6975 |
| | | y= | 0.3263 | 0.3053 | 0.2927 | 0.2981 |
| | | u'= | 0.4695 | 0.5189 | 0.5505 | 0.5384 |
| | | v'= | 0.5243 | 0.5193 | 0.5158 | 0.5177 |
| | | X= | 2.045699 | 0.447117 | 1.512695 | 1.791669 |
| | | Y= | 1.015453 | 0.198900 | 0.629919 | 0.765815 |
| | | Z= | 0.050482 | 0.005380 | 0.009824 | 0.011269 |
| | CHROMATICITY OF EMITTED LIGHT WHEN GREEN IS DISPLAYED | x= | 0.2836 | 0.1916 | 0.1912 | 0.1831 |
| | | y= | 0.6512 | 0.7574 | 0.7403 | 0.7523 |
| | | u'= | 0.1107 | 0.0655 | 0.0665 | 0.0628 |
| | | v'= | 0.5719 | 0.5823 | 0.5793 | 0.5806 |
| | | X= | 1.521973 | 0.159933 | 0.568615 | 0.602799 |
| | | Y= | 3.494340 | 0.632153 | 2.201214 | 2.477010 |
| | | Z= | 0.349372 | 0.042531 | 0.203483 | 0.212712 |
| | CHROMATICITY OF EMITTED LIGHT WHEN BLUE IS DISPLAYED | x= | 0.1558 | 0.1545 | 0.1563 | 0.1565 |
| | | y= | 0.0639 | 0.0226 | 0.0329 | 0.0315 |
| | | u'= | 0.1804 | 0.2086 | 0.2028 | 0.2042 |
| | | v'= | 0.1664 | 0.0687 | 0.0961 | 0.0925 |
| | | X= | 1.411263 | 0.226766 | 0.792360 | 0.904119 |
| | | Y= | 0.578695 | 0.033142 | 0.166892 | 0.182151 |
| | | Z= | 7.067909 | 1.207563 | 4.108855 | 4.689295 |

——·—— BT.709 CHROMATICITY REGION
——·— NTSC CHROMATICITY REGION
——— DCI CHROMATICITY REGION
———— BT.2020 CHROMATICITY REGION
——◆—— CHROMATICITY REGION OF COMPARATIVE EXAMPLE 1
——✕—— CHROMATICITY REGION OF COMPARATIVE EXAMPLE 2
--●-- CHROMATICITY REGION OF EXAMPLE 1
---■--- CHROMATICITY REGION OF EXAMPLE 2

FIG. 18

| | | | COMPARATIVE EXAMPLE 1 | COMPARATIVE EXAMPLE 2 | EXAMPLE 3 | EXAMPLE 4 |
|---|---|---|---|---|---|---|
| LUMINANCE RATIO OF EMITTED LIGHT | | | 100% | 17% | 51% | 62% |
| BT.2020 PERCENTAGE: CIE 1976 CHROMATICITY DIAGRAM | | | 64% | 100% | 100% | 100% |
| LED | RED PHOSPHOR (PEAK WAVELENGTH, HALF VALUE WIDTH) | | CaAlSiN (650nm) | CaAlSiN (650nm) | $K_2SiF_6$ (631nm, 7nm) | $K_2SiF_6$ (631nm, 7nm) |
| | GREEN PHOSPHOR (PEAK WAVELENGTH, HALF VALUE WIDTH) | FIRST GREEN PHOSPHOR | β-SiAlON (540nm) | β-SiAlON (540nm) | β-SiAlON (528nm, 49nm) | β-SiAlON (533nm, 52nm) |
| | | SECOND GREEN PHOSPHOR | β-SiAlON (522nm) | β-SiAlON (522nm) | | |
| | PEAK WAVELENGTH (HALF VALUE WIDTH) OF BLUE LED ELEMENT | | 444nm (18nm) | 444nm (18nm) | 444nm (18nm) | 444nm (18nm) |
| | BLEND PROPORTION | RED PHOSPHOR | 25.76% | 6.96% | 8.57% | 11.07% |
| | | GREEN PHOSPHOR | 74.24% | 93.04% | 91.43% | 88.93% |
| CF | R THICKNESS RATIO | | 1 | 11.9 | 1.5 | 1.6 |
| | G THICKNESS RATIO | | 1 | 11.9 | 1.5 | 1.6 |
| | B THICKNESS RATIO | | 1 | 11.9 | 1.5 | 1.6 |
| NTSC PERCENTAGE | CIE 1931 CHROMATICITY DIAGRAM | | 83% | 120% | 115% | 115% |
| | CIE 1976 CHROMATICITY DIAGRAM | | 96% | 150% | 150% | 150% |
| BT.709 PERCENTAGE | CIE 1931 CHROMATICITY DIAGRAM | | 116% | 170% | 162% | 162% |
| | CIE 1976 CHROMATICITY DIAGRAM | | 110% | 172% | 172% | 172% |
| DCI PERCENTAGE | CIE 1931 CHROMATICITY DIAGRAM | | 86% | 125% | 119% | 119% |
| | CIE 1976 CHROMATICITY DIAGRAM | | 87% | 137% | 137% | 137% |
| BT.2020 PERCENTAGE | CIE 1931 CHROMATICITY DIAGRAM | | 62% | 90% | 86% | 86% |
| | CIE 1976 CHROMATICITY DIAGRAM | | 64% | 100% | 100% | 100% |
| CHROMATICITY OF LED | | x= | 0.2407 | 0.2132 | 0.2342 | 0.2339 |
| | | y= | 0.1833 | 0.1891 | 0.1936 | 0.1962 |
| | | u'= | 0.2041 | 0.1761 | 0.1930 | 0.1915 |
| | | v'= | 0.3496 | 0.3514 | 0.3589 | 0.3614 |
| | | X= | 188.0600 | 185.3368 | 149.0013 | 189.8919 |
| | | Y= | 143.1827 | 164.3889 | 123.1868 | 159.3057 |
| | | Z= | 449.9246 | 519.6258 | 364.0690 | 462.6707 |
| LIQUID CRYSTAL PANEL | CHROMATICITY OF EMITTED LIGHT WHEN WHITE IS DISPLAYED | x= | 0.2841 | 0.2859 | 0.2859 | 0.2841 |
| | | y= | 0.2909 | 0.2891 | 0.2891 | 0.2909 |
| | | u'= | 0.1919 | 0.1939 | 0.1939 | 0.1919 |
| | | v'= | 0.4421 | 0.4412 | 0.4412 | 0.4421 |
| | | X= | 4.958131 | 0.831061 | 2.542007 | 3.090140 |
| | | Y= | 5.078288 | 0.840087 | 2.569676 | 3.163823 |
| | | Z= | 7.417833 | 1.235175 | 3.778296 | 4.621397 |
| | CHROMATICITY OF EMITTED LIGHT WHEN RED IS DISPLAYED | x= | 0.6574 | 0.6864 | 0.6937 | 0.6934 |
| | | y= | 0.3263 | 0.3053 | 0.3040 | 0.3042 |
| | | u'= | 0.4695 | 0.5189 | 0.5275 | 0.5269 |
| | | v'= | 0.5243 | 0.5193 | 0.5201 | 0.5201 |
| | | X= | 2.045699 | 0.447117 | 1.243843 | 1.501214 |
| | | Y= | 1.015453 | 0.198900 | 0.545077 | 0.658640 |
| | | Z= | 0.050482 | 0.005380 | 0.004216 | 0.005155 |
| | CHROMATICITY OF EMITTED LIGHT WHEN GREEN IS DISPLAYED | x= | 0.2836 | 0.1916 | 0.2208 | 0.2184 |
| | | y= | 0.6512 | 0.7574 | 0.7313 | 0.7309 |
| | | u'= | 0.1107 | 0.0655 | 0.0779 | 0.0771 |
| | | v'= | 0.5719 | 0.5823 | 0.5807 | 0.5804 |
| | | X= | 1.521973 | 0.159933 | 0.597806 | 0.734119 |
| | | Y= | 3.494340 | 0.632153 | 1.979462 | 2.456729 |
| | | Z= | 0.349372 | 0.042531 | 0.129640 | 0.170522 |
| | CHROMATICITY OF EMITTED LIGHT WHEN BLUE IS DISPLAYED | x= | 0.1558 | 0.1545 | 0.1568 | 0.1568 |
| | | y= | 0.0639 | 0.0226 | 0.0218 | 0.0215 |
| | | u'= | 0.1804 | 0.2086 | 0.2128 | 0.2130 |
| | | v'= | 0.1664 | 0.0687 | 0.0666 | 0.0657 |
| | | X= | 1.411263 | 0.226766 | 0.701657 | 0.856561 |
| | | Y= | 0.578695 | 0.033142 | 0.097639 | 0.117640 |
| | | Z= | 7.067909 | 1.207563 | 3.676822 | 4.487515 |

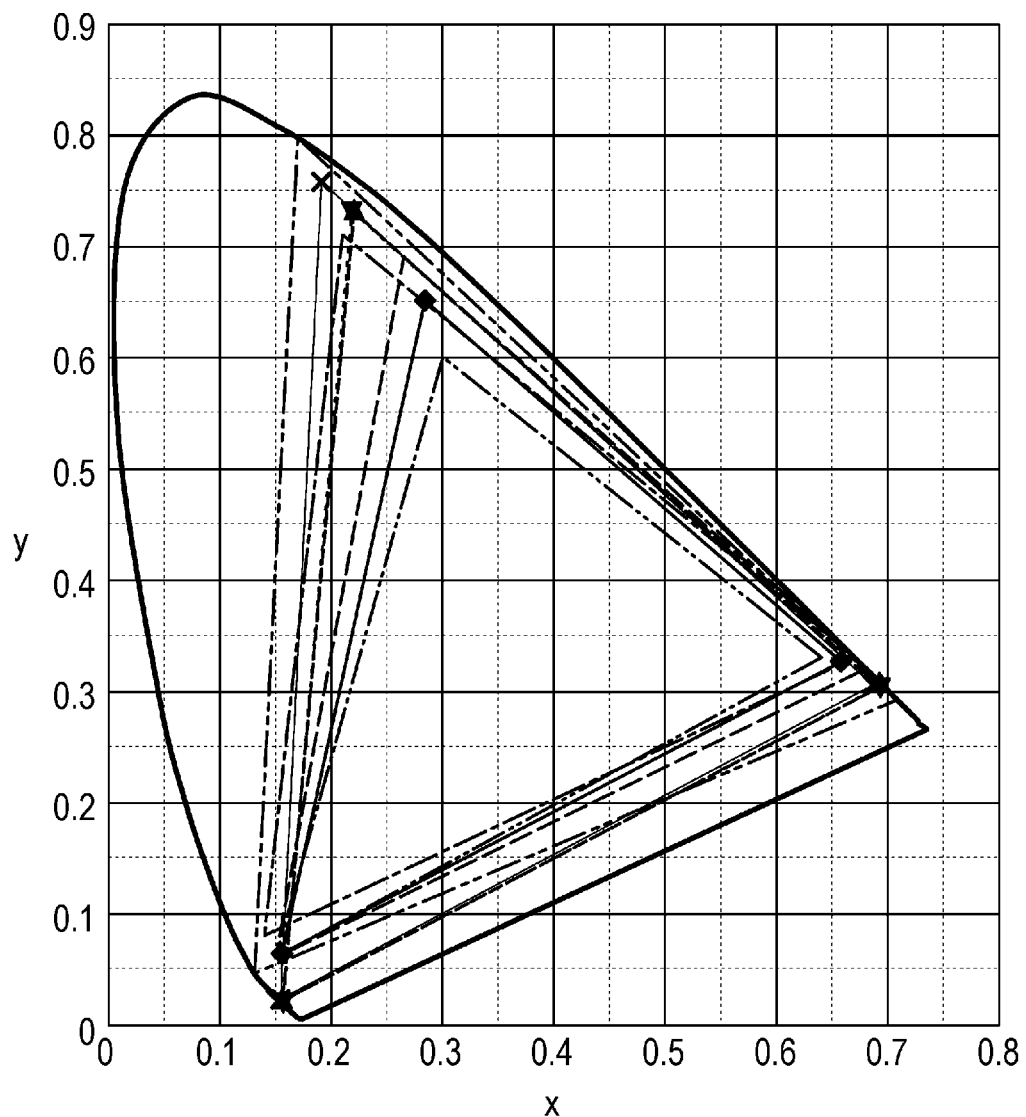

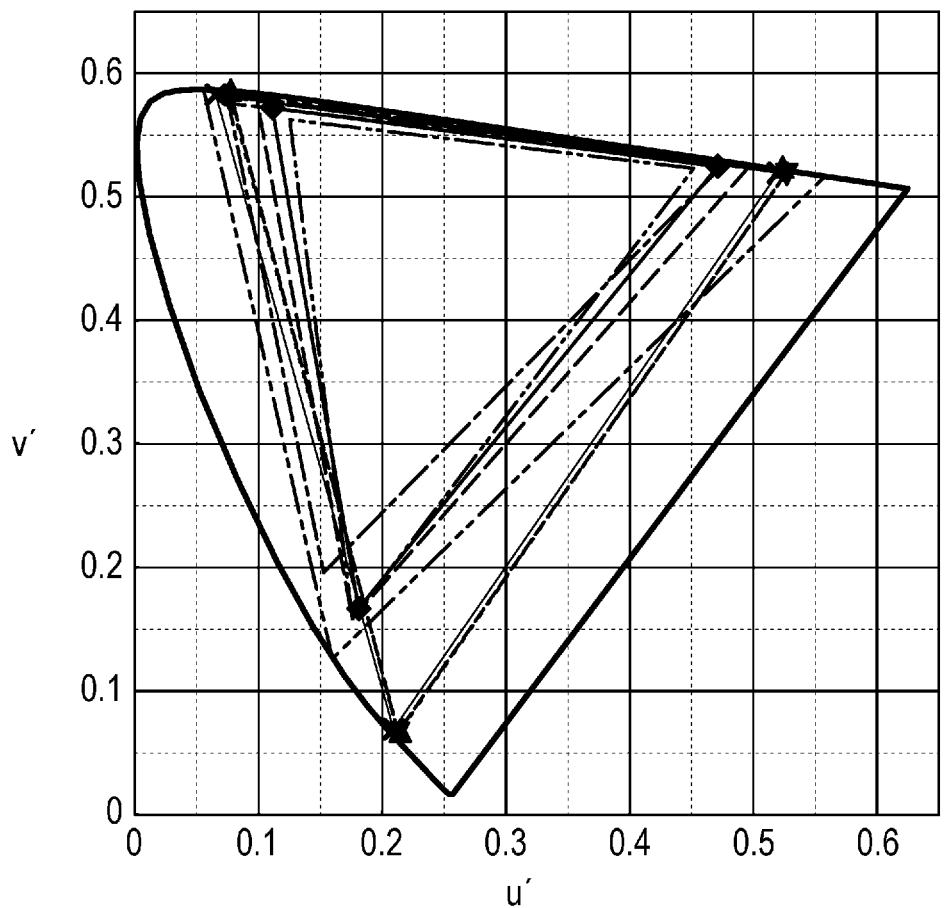

FIG. 21

| | | | COMPARATIVE EXAMPLE 1 | COMPARATIVE EXAMPLE 2 | COMPARATIVE EXAMPLE 3 | EXAMPLE 5 |
|---|---|---|---|---|---|---|
| LUMINANCE RATIO OF EMITTED LIGHT | | WHITE LIGHT | 100% | 16% | 49% | 58% |
| | | RED LIGHT | 100% | 19% | 51% | 63% |
| | | GREEN LIGHT | 100% | 18% | 53% | 62% |
| | | BLUE LIGHT | 100% | 6% | 30% | 29% |
| LED | RED PHOSPHOR (PEAK WAVELENGTH, HALF VALUE WIDTH) | | CaAlSiN (650nm) | CaAlSiN (650nm) | CdSe (655nm, 40nm) | CdSe (642nm, 40nm) |
| | GREEN PHOSPHOR (PEAK WAVELENGTH, HALF VALUE WIDTH) | FIRST GREEN PHOSPHOR | β-SiAlON (540nm) | β-SiAlON (540nm) | CdSe (530nm, 40nm) | CdSe (530nm, 40nm) |
| | | SECOND GREEN PHOSPHOR | β-SiAlON (522nm) | β-SiAlON (522nm) | | |
| | PEAK WAVELENGTH (HALF VALUE WIDTH) OF BLUE LED ELEMENT | | 444nm (18nm) | 444nm (18nm) | 444nm (18nm) | 444nm (18nm) |
| | BLEND PROPORTION | RED PHOSPHOR | 26.19% | 6.86% | 40.63% | 29.63% |
| | | GREEN PHOSPHOR | 73.81% | 93.14% | 59.37% | 70.37% |
| CF | R THICKNESS RATIO | | 100% | 1200% | 200% | 250% |
| | G THICKNESS RATIO | | 100% | 1200% | 200% | 250% |
| | B THICKNESS RATIO | | 100% | 1200% | 200% | 250% |
| NTSC PERCENTAGE | CIE 1931 CHROMATICITY DIAGRAM | | 83% | 120% | 121% | 120% |
| | CIE 1976 CHROMATICITY DIAGRAM | | 96% | 150% | 151% | 150% |
| BT.709 PERCENTAGE | CIE 1931 CHROMATICITY DIAGRAM | | 117% | 170% | 170% | 170% |
| | CIE 1976 CHROMATICITY DIAGRAM | | 110% | 173% | 173% | 172% |
| DCI PERCENTAGE | CIE 1931 CHROMATICITY DIAGRAM | | 86% | 125% | 126% | 125% |
| | CIE 1976 CHROMATICITY DIAGRAM | | 87% | 137% | 138% | 137% |
| BT.2020 PERCENTAGE | CIE 1931 CHROMATICITY DIAGRAM | | 62% | 90% | 90% | 90% |
| | CIE 1976 CHROMATICITY DIAGRAM | | 64% | 100% | 100% | 100% |
| CHROMATICITY OF LED | | x= | 0.2416 | 0.2130 | 0.2287 | 0.2265 |
| | | y= | 0.1835 | 0.1889 | 0.1811 | 0.1818 |
| | | u'= | 0.2048 | 0.1760 | 0.1940 | 0.1916 |
| | | v'= | 0.3500 | 0.3512 | 0.3456 | 0.3460 |
| | | X= | 187.9653 | 185.3380 | 106.4945 | 135.4253 |
| | | Y= | 142.7787 | 164.4192 | 84.3161 | 108.6498 |
| | | Z= | 447.3656 | 520.5214 | 274.7820 | 353.6975 |
| LIQUID CRYSTAL PANEL | CHROMATICITY OF EMITTED LIGHT WHEN WHITE IS DISPLAYED | x= | 0.2853 | 0.2859 | 0.2841 | 0.2843 |
| | | y= | 0.2909 | 0.2891 | 0.2891 | 0.2891 |
| | | u'= | 0.1928 | 0.1939 | 0.1926 | 0.1927 |
| | | v'= | 0.4422 | 0.4412 | 0.4409 | 0.4410 |
| | | X= | 4.964988 | 0.819129 | 2.451910 | 2.875776 |
| | | Y= | 5.063601 | 0.828268 | 2.495014 | 2.923421 |
| | | Z= | 7.375473 | 1.217982 | 3.684474 | 4.314667 |
| | CHROMATICITY OF EMITTED LIGHT WHEN RED IS DISPLAYED | x= | 0.6579 | 0.6863 | 0.7102 | 0.7013 |
| | | y= | 0.3262 | 0.3053 | 0.2880 | 0.2969 |
| | | u'= | 0.4700 | 0.5188 | 0.5641 | 0.5436 |
| | | v'= | 0.5244 | 0.5193 | 0.5147 | 0.5178 |
| | | X= | 2.066260 | 0.440819 | 1.281477 | 1.517478 |
| | | Y= | 1.024412 | 0.196083 | 0.519705 | 0.642495 |
| | | Z= | 0.050201 | 0.005387 | 0.003116 | 0.003818 |
| | CHROMATICITY OF EMITTED LIGHT WHEN GREEN IS DISPLAYED | x= | 0.2840 | 0.1914 | 0.1964 | 0.1944 |
| | | y= | 0.6509 | 0.7576 | 0.7447 | 0.7483 |
| | | u'= | 0.1109 | 0.0654 | 0.0681 | 0.0671 |
| | | v'= | 0.5719 | 0.5824 | 0.5806 | 0.5810 |
| | | X= | 1.516107 | 0.157501 | 0.483794 | 0.561903 |
| | | Y= | 3.474324 | 0.623386 | 1.834101 | 2.163320 |
| | | Z= | 0.347113 | 0.041996 | 0.144977 | 0.165741 |
| | CHROMATICITY OF EMITTED LIGHT WHEN BLUE IS DISPLAYED | x= | 0.1558 | 0.1545 | 0.1538 | 0.1542 |
| | | y= | 0.0639 | 0.0226 | 0.0393 | 0.0329 |
| | | u'= | 0.1804 | 0.2086 | 0.1944 | 0.1998 |
| | | v'= | 0.1664 | 0.0687 | 0.1118 | 0.0959 |
| | | X= | 1.403458 | 0.223624 | 0.678412 | 0.792148 |
| | | Y= | 0.575079 | 0.032699 | 0.173316 | 0.168966 |
| | | Z= | 7.027805 | 1.190854 | 3.560095 | 4.174824 |

FIG. 22

| | | | EXAMPLE 6 | EXAMPLE 7 | COMPARATIVE EXAMPLE 4 |
|---|---|---|---|---|---|
| LUMINANCE RATIO OF EMITTED LIGHT | | WHITE LIGHT | 57% | 54% | 48% |
| | | RED LIGHT | 63% | 62% | 56% |
| | | GREEN LIGHT | 62% | 59% | 52% |
| | | BLUE LIGHT | 25% | 22% | 18% |
| LED | RED PHOSPHOR (PEAK WAVELENGTH, HALF VALUE WIDTH) | | CdSe (637nm,40nm) | CdSe (633nm,40nm) | CdSe (630nm,40nm) |
| | GREEN PHOSPHOR (PEAK WAVELENGTH, HALF VALUE WIDTH) | | CdSe (530nm,40nm) | CdSe (530nm,40nm) | CdSe (530nm,40nm) |
| | PEAK WAVELENGTH (HALF VALUE WIDTH) OF BLUE LED ELEMENT | | 444nm (18nm) | 444nm (18nm) | 444nm (18nm) |
| | BLEND PROPORTION | RED PHOSPHOR | 25.83% | 23.37% | 21.07% |
| | | GREEN PHOSPHOR | 74.17% | 76.63% | 78.93% |
| CF | R THICKNESS RATIO | | 300% | 350% | 450% |
| | G THICKNESS RATIO | | 300% | 350% | 450% |
| | B THICKNESS RATIO | | 300% | 350% | 450% |
| NTSC PERCENTAGE | CIE 1931 CHROMATICITY DIAGRAM | | 121% | 121% | 121% |
| | CIE 1976 CHROMATICITY DIAGRAM | | 150% | 150% | 151% |
| BT.709 PERCENTAGE | CIE 1931 CHROMATICITY DIAGRAM | | 170% | 170% | 172% |
| | CIE 1976 CHROMATICITY DIAGRAM | | 172% | 172% | 173% |
| DCI PERCENTAGE | CIE 1931 CHROMATICITY DIAGRAM | | 126% | 126% | 126% |
| | CIE 1976 CHROMATICITY DIAGRAM | | 137% | 137% | 138% |
| BT.2020 PERCENTAGE | CIE 1931 CHROMATICITY DIAGRAM | | 90% | 90% | 91% |
| | CIE 1976 CHROMATICITY DIAGRAM | | 100% | 100% | 100% |
| CHROMATICITY OF LED | | x= | 0.2239 | 0.2219 | 0.2180 |
| | | y= | 0.1815 | 0.1808 | 0.1787 |
| | | u'= | 0.1893 | 0.1878 | 0.1852 |
| | | v'= | 0.3453 | 0.3443 | 0.3416 |
| | | X= | 143.6015 | 148.9427 | 152.2954 |
| | | Y= | 116.3851 | 121.3665 | 124.8451 |
| | | Z= | 381.3129 | 400.8093 | 421.3410 |
| LIQUID CRYSTAL PANEL | CHROMATICITY OF EMITTED LIGHT WHEN WHITE IS DISPLAYED | x= | 0.2841 | 0.2843 | 0.2859 |
| | | y= | 0.2891 | 0.2891 | 0.2891 |
| | | u'= | 0.1926 | 0.1927 | 0.1939 |
| | | v'= | 0.4409 | 0.4410 | 0.4412 |
| | | X= | 2.821300 | 2.709160 | 2.399036 |
| | | Y= | 2.870661 | 2.754280 | 2.425517 |
| | | Z= | 4.238936 | 4.064856 | 3.566591 |
| | CHROMATICITY OF EMITTED LIGHT WHEN RED IS DISPLAYED | x= | 0.6971 | 0.6934 | 0.6911 |
| | | y= | 0.3010 | 0.3045 | 0.3065 |
| | | u'= | 0.5344 | 0.5266 | 0.5220 |
| | | v'= | 0.5192 | 0.5203 | 0.5209 |
| | | X= | 1.494344 | 1.443557 | 1.298081 |
| | | Y= | 0.645258 | 0.633861 | 0.575570 |
| | | Z= | 0.004106 | 0.004324 | 0.004521 |
| | CHROMATICITY OF EMITTED LIGHT WHEN GREEN IS DISPLAYED | x= | 0.1923 | 0.1906 | 0.1874 |
| | | y= | 0.7514 | 0.7539 | 0.7581 |
| | | u'= | 0.0661 | 0.0654 | 0.0639 |
| | | v'= | 0.5814 | 0.5816 | 0.5820 |
| | | X= | 0.547268 | 0.519219 | 0.447251 |
| | | Y= | 2.138025 | 2.053983 | 1.809332 |
| | | Z= | 0.160197 | 0.151299 | 0.130040 |
| | CHROMATICITY OF EMITTED LIGHT WHEN BLUE IS DISPLAYED | x= | 0.1546 | 0.1548 | 0.1551 |
| | | y= | 0.0291 | 0.0266 | 0.0239 |
| | | u'= | 0.2034 | 0.2057 | 0.2084 |
| | | v'= | 0.0862 | 0.0795 | 0.0723 |
| | | X= | 0.777400 | 0.745306 | 0.653980 |
| | | Y= | 0.146267 | 0.128224 | 0.100888 |
| | | Z= | 4.105437 | 3.940142 | 3.461414 |

FIG. 23

| | | | COMPARATIVE EXAMPLE 5 | EXAMPLE 8 | EXAMPLE 9 |
|---|---|---|---|---|---|
| LUMINANCE RATIO OF EMITTED LIGHT | | WHITE LIGHT | 49% | 65% | 65% |
| | | RED LIGHT | 51% | 72% | 75% |
| | | GREEN LIGHT | 50% | 69% | 70% |
| | | BLUE LIGHT | 37% | 37% | 30% |
| LED | RED PHOSPHOR (PEAK WAVELENGTH, HALF VALUE WIDTH) | | CdSe (655nm,30nm) | CdSe (639nm,30nm) | CdSe (632nm,30nm) |
| | GREEN PHOSPHOR (PEAK WAVELENGTH, HALF VALUE WIDTH) | | CdSe (530nm,30nm) | CdSe (530nm,30nm) | CdSe (530nm,30nm) |
| | PEAK WAVELENGTH (HALF VALUE WIDTH) OF BLUE LED ELEMENT | | 444nm (18nm) | 444nm (18nm) | 444nm (18nm) |
| | BLEND PROPORTION | RED PHOSPHOR | 47.89% | 32.02% | 26.89% |
| | | GREEN PHOSPHOR | 52.11% | 67.98% | 73.11% |
| CF | R THICKNESS RATIO | | 150% | 200% | 250% |
| | G THICKNESS RATIO | | 150% | 200% | 250% |
| | B THICKNESS RATIO | | 150% | 200% | 250% |
| NTSC PERCENTAGE | CIE 1931 CHROMATICITY DIAGRAM | | 124% | 124% | 124% |
| | CIE 1976 CHROMATICITY DIAGRAM | | 150% | 150% | 151% |
| BT.709 PERCENTAGE | CIE 1931 CHROMATICITY DIAGRAM | | 175% | 175% | 175% |
| | CIE 1976 CHROMATICITY DIAGRAM | | 172% | 173% | 173% |
| DCI PERCENTAGE | CIE 1931 CHROMATICITY DIAGRAM | | 129% | 129% | 129% |
| | CIE 1976 CHROMATICITY DIAGRAM | | 137% | 137% | 137% |
| BT.2020 PERCENTAGE | CIE 1931 CHROMATICITY DIAGRAM | | 93% | 93% | 92% |
| | CIE 1976 CHROMATICITY DIAGRAM | | 100% | 100% | 100% |
| CHROMATICITY OF LED | | $x=$ | 0.2322 | 0.2294 | 0.2266 |
| | | $y=$ | 0.1768 | 0.1798 | 0.1799 |
| | | $u'=$ | 0.1994 | 0.1953 | 0.1926 |
| | | $v'=$ | 0.3417 | 0.3444 | 0.3441 |
| | | $X=$ | 96.9364 | 138.9331 | 151.1202 |
| | | $Y=$ | 73.7912 | 108.9110 | 119.9595 |
| | | $Z=$ | 246.7012 | 357.7377 | 395.9138 |
| LIQUID CRYSTAL PANEL | CHROMATICITY OF EMITTED LIGHT WHEN WHITE IS DISPLAYED | $x=$ | 0.2859 | 0.2859 | 0.2857 |
| | | $y=$ | 0.2891 | 0.2909 | 0.2909 |
| | | $u'=$ | 0.1939 | 0.1932 | 0.1931 |
| | | $v'=$ | 0.4412 | 0.4423 | 0.4423 |
| | | $X=$ | 2.439247 | 3.225844 | 3.247459 |
| | | $Y=$ | 2.465967 | 3.281699 | 3.306565 |
| | | $Z=$ | 3.625325 | 4.774522 | 4.811471 |
| | CHROMATICITY OF EMITTED LIGHT WHEN RED IS DISPLAYED | $x=$ | 0.7162 | 0.7048 | 0.6972 |
| | | $y=$ | 0.2812 | 0.2936 | 0.3012 |
| | | $u'=$ | 0.5797 | 0.5513 | 0.5343 |
| | | $v'=$ | 0.5121 | 0.5167 | 0.5193 |
| | | $X=$ | 1.326584 | 1.766711 | 1.784064 |
| | | $Y=$ | 0.520904 | 0.736049 | 0.770664 |
| | | $Z=$ | 0.004702 | 0.004094 | 0.004304 |
| | CHROMATICITY OF EMITTED LIGHT WHEN GREEN IS DISPLAYED | $x=$ | 0.1834 | 0.1824 | 0.1812 |
| | | $y=$ | 0.7591 | 0.7632 | 0.7656 |
| | | $u'=$ | 0.0625 | 0.0619 | 0.0613 |
| | | $v'=$ | 0.5818 | 0.5824 | 0.5827 |
| | | $X=$ | 0.422970 | 0.570230 | 0.575094 |
| | | $Y=$ | 1.750730 | 2.386453 | 2.429420 |
| | | $Z=$ | 0.132722 | 0.170354 | 0.168813 |
| | CHROMATICITY OF EMITTED LIGHT WHEN BLUE IS DISPLAYED | $x=$ | 0.1545 | 0.1548 | 0.1551 |
| | | $y=$ | 0.0488 | 0.0371 | 0.0306 |
| | | $u'=$ | 0.1886 | 0.1975 | 0.2029 |
| | | $v'=$ | 0.1340 | 0.1065 | 0.0901 |
| | | $X=$ | 0.680659 | 0.886917 | 0.889872 |
| | | $Y=$ | 0.215107 | 0.212625 | 0.175319 |
| | | $Z=$ | 3.509783 | 4.631261 | 4.671787 |

FIG. 24

| | | | EXAMPLE 10 | EXAMPLE 11 | COMPARATIVE EXAMPLE 6 |
|---|---|---|---|---|---|
| LUMINANCE RATIO OF EMITTED LIGHT | | WHITE LIGHT | 63% | 59% | 49% |
| | | RED LIGHT | 74% | 71% | 60% |
| | | GREEN LIGHT | 67% | 64% | 53% |
| | | BLUE LIGHT | 26% | 22% | 16% |
| LED | RED PHOSPHOR (PEAK WAVELENGTH, HALF VALUE WIDTH) | | CdSe (628nm,30nm) | CdSe (626nm,30nm) | CdSe (622nm,30nm) |
| | GREEN PHOSPHOR (PEAK WAVELENGTH, HALF VALUE WIDTH) | | CdSe (530nm,30nm) | CdSe (530nm,30nm) | CdSe (530nm,30nm) |
| | PEAK WAVELENGTH (HALF VALUE WIDTH) OF BLUE LED ELEMENT | | 444nm (18nm) | 444nm (18nm) | 444nm (18nm) |
| | BLEND PROPORTION | RED PHOSPHOR | 24.36% | 22.93% | 20.01% |
| | | GREEN PHOSPHOR | 75.64% | 77.07% | 79.99% |
| CF | R THICKNESS RATIO | | 300% | 350% | 500% |
| | G THICKNESS RATIO | | 300% | 350% | 500% |
| | B THICKNESS RATIO | | 300% | 350% | 500% |
| NTSC PERCENTAGE | CIE 1931 CHROMATICITY DIAGRAM | | 123% | 124% | 124% |
| | CIE 1976 CHROMATICITY DIAGRAM | | 150% | 151% | 150% |
| BT.709 PERCENTAGE | CIE 1931 CHROMATICITY DIAGRAM | | 174% | 175% | 175% |
| | CIE 1976 CHROMATICITY DIAGRAM | | 172% | 173% | 172% |
| DCI PERCENTAGE | CIE 1931 CHROMATICITY DIAGRAM | | 129% | 129% | 129% |
| | CIE 1976 CHROMATICITY DIAGRAM | | 137% | 138% | 137% |
| BT.2020 PERCENTAGE | CIE 1931 CHROMATICITY DIAGRAM | | 92% | 92% | 92% |
| | CIE 1976 CHROMATICITY DIAGRAM | | 100% | 100% | 100% |
| CHROMATICITY OF LED | | x= | 0.2241 | 0.2215 | 0.2146 |
| | | y= | 0.1790 | 0.1776 | 0.1723 |
| | | u'= | 0.1907 | 0.1890 | 0.1851 |
| | | v'= | 0.3428 | 0.3409 | 0.3343 |
| | | X= | 156.5016 | 158.7260 | 162.3464 |
| | | Y= | 125.0134 | 127.2354 | 130.3455 |
| | | Z= | 416.9934 | 430.5457 | 463.7413 |
| LIQUID CRYSTAL PANEL | CHROMATICITY OF EMITTED LIGHT WHEN WHITE IS DISPLAYED | x= | 0.2857 | 0.2857 | 0.2851 |
| | | y= | 0.2909 | 0.2909 | 0.2909 |
| | | u'= | 0.1931 | 0.1931 | 0.1926 |
| | | v'= | 0.4423 | 0.4423 | 0.4422 |
| | | X= | 3.118312 | 2.939883 | 2.410713 |
| | | Y= | 3.175533 | 2.993319 | 2.460349 |
| | | Z= | 4.620959 | 4.355350 | 3.585639 |
| | CHROMATICITY OF EMITTED LIGHT WHEN RED IS DISPLAYED | x= | 0.6922 | 0.6898 | 0.6849 |
| | | y= | 0.3059 | 0.3082 | 0.3125 |
| | | u'= | 0.5238 | 0.5188 | 0.5092 |
| | | v'= | 0.5208 | 0.5215 | 0.5228 |
| | | X= | 1.718377 | 1.624637 | 1.337855 |
| | | Y= | 0.759453 | 0.726001 | 0.610495 |
| | | Z= | 0.004530 | 0.004671 | 0.004985 |
| | CHROMATICITY OF EMITTED LIGHT WHEN GREEN IS DISPLAYED | x= | 0.1801 | 0.1790 | 0.1763 |
| | | y= | 0.7675 | 0.7691 | 0.7726 |
| | | u'= | 0.0608 | 0.0603 | 0.0592 |
| | | v'= | 0.5829 | 0.5831 | 0.5834 |
| | | X= | 0.549955 | 0.515719 | 0.416824 |
| | | Y= | 2.343656 | 2.216237 | 1.826881 |
| | | Z= | 0.160138 | 0.149660 | 0.120879 |
| | CHROMATICITY OF EMITTED LIGHT WHEN BLUE IS DISPLAYED | x= | 0.1554 | 0.1555 | 0.1557 |
| | | y= | 0.0268 | 0.0246 | 0.0217 |
| | | u'= | 0.2065 | 0.2084 | 0.2112 |
| | | v'= | 0.0801 | 0.0742 | 0.0662 |
| | | X= | 0.852993 | 0.803188 | 0.660541 |
| | | Y= | 0.147204 | 0.126915 | 0.092114 |
| | | Z= | 4.490003 | 4.234146 | 3.490203 |

FIG. 25

| | | | COMPARATIVE EXAMPLE 7 | EXAMPLE 12 | EXAMPLE 13 |
|---|---|---|---|---|---|
| LUMINANCE RATIO OF EMITTED LIGHT | WHITE LIGHT | | 47% | 68% | 73% |
| | RED LIGHT | | 48% | 74% | 87% |
| | GREEN LIGHT | | 48% | 70% | 77% |
| | BLUE LIGHT | | 41% | 50% | 39% |
| LED | RED PHOSPHOR (PEAK WAVELENGTH, HALF VALUE WIDTH) | | CdSe (655nm, 20nm) | CdSe (640nm, 20nm) | CdSe (629nm, 20nm) |
| | GREEN PHOSPHOR (PEAK WAVELENGTH, HALF VALUE WIDTH) | | CdSe (530nm, 20nm) | CdSe (530nm, 20nm) | CdSe (530nm, 20nm) |
| | PEAK WAVELENGTH (HALF VALUE WIDTH) OF BLUE LED ELEMENT | | 444nm (18nm) | 444nm (18nm) | 444nm (18nm) |
| | BLEND PROPORTION | RED PHOSPHOR | 52.49% | 37.38% | 28.38% |
| | | GREEN PHOSPHOR | 47.51% | 62.62% | 71.62% |
| CF | R THICKNESS RATIO | | 130% | 150% | 200% |
| | G THICKNESS RATIO | | 130% | 150% | 200% |
| | B THICKNESS RATIO | | 130% | 150% | 200% |
| NTSC PERCENTAGE | CIE 1931 CHROMATICITY DIAGRAM | | 128% | 128% | 127% |
| | CIE 1976 CHROMATICITY DIAGRAM | | 150% | 150% | 150% |
| BT.709 PERCENTAGE | CIE 1931 CHROMATICITY DIAGRAM | | 180% | 180% | 180% |
| | CIE 1976 CHROMATICITY DIAGRAM | | 173% | 172% | 172% |
| DCI PERCENTAGE | CIE 1931 CHROMATICITY DIAGRAM | | 133% | 133% | 132% |
| | CIE 1976 CHROMATICITY DIAGRAM | | 137% | 137% | 137% |
| BT.2020 PERCENTAGE | CIE 1931 CHROMATICITY DIAGRAM | | 95% | 95% | 95% |
| | CIE 1976 CHROMATICITY DIAGRAM | | 100% | 100% | 100% |
| CHROMATICITY OF LED | | x= | 0.2319 | 0.2325 | 0.2293 |
| | | y= | 0.1739 | 0.1764 | 0.1777 |
| | | u'= | 0.2006 | 0.1999 | 0.1962 |
| | | v'= | 0.3385 | 0.3413 | 0.3422 |
| | | X= | 89.2652 | 133.9467 | 157.1558 |
| | | Y= | 66.9477 | 101.6530 | 121.7785 |
| | | Z= | 228.7247 | 340.6280 | 406.4849 |
| LIQUID CRYSTAL PANEL | CHROMATICITY OF EMITTED LIGHT WHEN WHITE IS DISPLAYED | x= | 0.2845 | 0.2859 | 0.2858 |
| | | y= | 0.2898 | 0.2908 | 0.2909 |
| | | u'= | 0.1926 | 0.1932 | 0.1931 |
| | | v'= | 0.4414 | 0.4423 | 0.4423 |
| | | X= | 2.326869 | 3.364200 | 3.647283 |
| | | Y= | 2.370520 | 3.421770 | 3.712384 |
| | | Z= | 3.482832 | 4.980240 | 5.400710 |
| | CHROMATICITY OF EMITTED LIGHT WHEN RED IS DISPLAYED | x= | 0.7205 | 0.7115 | 0.6986 |
| | | y= | 0.2753 | 0.2860 | 0.2998 |
| | | u'= | 0.5927 | 0.5682 | 0.5373 |
| | | v'= | 0.5095 | 0.5139 | 0.5188 |
| | | X= | 1.291678 | 1.895132 | 2.065371 |
| | | Y= | 0.493611 | 0.761910 | 0.886185 |
| | | Z= | 0.007578 | 0.006524 | 0.004707 |
| | CHROMATICITY OF EMITTED LIGHT WHEN GREEN IS DISPLAYED | x= | 0.1686 | 0.1686 | 0.1684 |
| | | y= | 0.7763 | 0.7793 | 0.7823 |
| | | u'= | 0.0563 | 0.0561 | 0.0559 |
| | | v'= | 0.5833 | 0.5838 | 0.5843 |
| | | X= | 0.359972 | 0.522645 | 0.576778 |
| | | Y= | 1.657485 | 2.416099 | 2.678825 |
| | | Z= | 0.117686 | 0.161410 | 0.168809 |
| | CHROMATICITY OF EMITTED LIGHT WHEN BLUE IS DISPLAYED | x= | 0.1558 | 0.1556 | 0.1558 |
| | | y= | 0.0551 | 0.0470 | 0.0343 |
| | | u'= | 0.1861 | 0.1913 | 0.2010 |
| | | v'= | 0.1480 | 0.1300 | 0.0996 |
| | | X= | 0.667126 | 0.944925 | 1.012081 |
| | | Y= | 0.235805 | 0.285494 | 0.222806 |
| | | Z= | 3.378342 | 4.842525 | 5.262165 |

FIG. 26

| | | | EXAMPLE 14 | EXAMPLE 15 | EXAMPLE 16 | COMPARATIVE EXAMPLE 8 |
|---|---|---|---|---|---|---|
| LUMINANCE RATIO OF EMITTED LIGHT | WHITE LIGHT | | 71% | 67% | 63% | 48% |
| | RED LIGHT | | 87% | 84% | 80% | 62% |
| | GREEN LIGHT | | 75% | 72% | 67% | 52% |
| | BLUE LIGHT | | 30% | 25% | 22% | 15% |
| LED | RED PHOSPHOR (PEAK WAVELENGTH, HALF VALUE WIDTH) | | CdSe (624nm,20nm) | CdSe (622nm,20nm) | CdSe (620nm,20nm) | CdSe (618nm,20nm) |
| | GREEN PHOSPHOR (PEAK WAVELENGTH, HALF VALUE WIDTH) | | CdSe (530nm,20nm) | CdSe (530nm,20nm) | CdSe (530nm,20nm) | CdSe (530nm,20nm) |
| | PEAK WAVELENGTH (HALF VALUE WIDTH) OF BLUE LED ELEMENT | | 444nm (18nm) | 444nm (18nm) | 444nm (18nm) | 444nm (18nm) |
| | BLEND PROPORTION | RED PHOSPHOR | 25.29% | 23.84% | 22.77% | 20.27% |
| | | GREEN PHOSPHOR | 74.71% | 76.16% | 77.23% | 79.73% |
| CF | R THICKNESS RATIO | | 250% | 300% | 350% | 550% |
| | G THICKNESS RATIO | | 250% | 300% | 350% | 550% |
| | B THICKNESS RATIO | | 250% | 300% | 350% | 550% |
| NTSC PERCENTAGE | CIE 1931 CHROMATICITY DIAGRAM | | 127% | 127% | 126% | 126% |
| | CIE 1976 CHROMATICITY DIAGRAM | | 150% | 151% | 150% | 150% |
| BT.709 PERCENTAGE | CIE 1931 CHROMATICITY DIAGRAM | | 179% | 179% | 178% | 178% |
| | CIE 1976 CHROMATICITY DIAGRAM | | 172% | 173% | 172% | 172% |
| DCI PERCENTAGE | CIE 1931 CHROMATICITY DIAGRAM | | 132% | 132% | 132% | 132% |
| | CIE 1976 CHROMATICITY DIAGRAM | | 137% | 138% | 137% | 137% |
| BT.2020 PERCENTAGE | CIE 1931 CHROMATICITY DIAGRAM | | 95% | 95% | 94% | 94% |
| | CIE 1976 CHROMATICITY DIAGRAM | | 100% | 100% | 100% | 100% |
| CHROMATICITY OF LED | | $x=$ | 0.2264 | 0.2235 | 0.2211 | 0.2115 |
| | | $y=$ | 0.1769 | 0.1752 | 0.1732 | 0.1635 |
| | | $u'=$ | 0.1939 | 0.1920 | 0.1908 | 0.1864 |
| | | $v'=$ | 0.3409 | 0.3387 | 0.3362 | 0.3242 |
| | | $X=$ | 164.0252 | 166.1221 | 168.2373 | 169.7343 |
| | | $Y=$ | 128.2020 | 130.2769 | 131.7503 | 131.2033 |
| | | $Z=$ | 432.2901 | 447.0422 | 460.8831 | 501.6485 |
| LIQUID CRYSTAL PANEL | CHROMATICITY OF EMITTED LIGHT WHEN WHITE IS DISPLAYED | $x=$ | 0.2859 | 0.2858 | 0.2858 | 0.2858 |
| | | $y=$ | 0.2909 | 0.2909 | 0.2909 | 0.2909 |
| | | $u'=$ | 0.1932 | 0.1931 | 0.1931 | 0.1931 |
| | | $v'=$ | 0.4423 | 0.4423 | 0.4423 | 0.4423 |
| | | $X=$ | 3.535957 | 3.334704 | 3.140298 | 2.395549 |
| | | $Y=$ | 3.598375 | 3.394843 | 3.196335 | 2.438193 |
| | | $Z=$ | 5.233725 | 4.938617 | 4.649980 | 3.546952 |
| | CHROMATICITY OF EMITTED LIGHT WHEN RED IS DISPLAYED | $x=$ | 0.6910 | 0.6877 | 0.6842 | 0.6810 |
| | | $y=$ | 0.3074 | 0.3106 | 0.3139 | 0.3164 |
| | | $u'=$ | 0.5208 | 0.5140 | 0.5070 | 0.5012 |
| | | $v'=$ | 0.5213 | 0.5223 | 0.5233 | 0.5240 |
| | | $X=$ | 2.008848 | 1.896789 | 1.789943 | 1.372190 |
| | | $Y=$ | 0.893661 | 0.856658 | 0.821296 | 0.637497 |
| | | $Z=$ | 0.004764 | 0.004899 | 0.005053 | 0.005384 |
| | CHROMATICITY OF EMITTED LIGHT WHEN GREEN IS DISPLAYED | $x=$ | 0.1680 | 0.1675 | 0.1670 | 0.1656 |
| | | $y=$ | 0.7837 | 0.7847 | 0.7855 | 0.7872 |
| | | $u'=$ | 0.0557 | 0.0555 | 0.0552 | 0.0547 |
| | | $v'=$ | 0.5844 | 0.5846 | 0.5846 | 0.5848 |
| | | $X=$ | 0.561709 | 0.530885 | 0.498195 | 0.376782 |
| | | $Y=$ | 2.620068 | 2.487766 | 2.342722 | 1.791278 |
| | | $Z=$ | 0.161475 | 0.151531 | 0.141731 | 0.107572 |
| | CHROMATICITY OF EMITTED LIGHT WHEN BLUE IS DISPLAYED | $x=$ | 0.1560 | 0.1561 | 0.1561 | 0.1560 |
| | | $y=$ | 0.0278 | 0.0243 | 0.0224 | 0.0203 |
| | | $u'=$ | 0.2065 | 0.2096 | 0.2112 | 0.2129 |
| | | $v'=$ | 0.0828 | 0.0734 | 0.0682 | 0.0623 |
| | | $X=$ | 0.975072 | 0.917378 | 0.862441 | 0.656012 |
| | | $Y=$ | 0.173537 | 0.142922 | 0.123872 | 0.085278 |
| | | $Z=$ | 5.103178 | 4.817292 | 4.537446 | 3.464004 |

FIG. 35

| | | | COMPARATIVE EXAMPLE 9 | EXAMPLE 17 | EXAMPLE 18 |
|---|---|---|---|---|---|
| LUMINANCE RATIO OF EMITTED LIGHT | | WHITE LIGHT | 38% | 45% | 43% |
| | | RED LIGHT | 42% | 50% | 46% |
| | | GREEN LIGHT | 43% | 50% | 48% |
| | | BLUE LIGHT | 13% | 15% | 14% |
| LED | RED PHOSPHOR (PEAK WAVELENGTH, HALF VALUE WIDTH) | | $K_2SiF_6$ (631nm, 7nm) | $K_2SiF_6$ (631nm, 7nm) | $K_2SiF_6$ (631nm, 7nm) |
| | GREEN PHOSPHOR (PEAK WAVELENGTH, HALF VALUE WIDTH) | | $\beta$-SiAlON (528nm, 25nm) | $\beta$-SiAlON (533nm, 25nm) | $\beta$-SiAlON (540nm, 25nm) |
| | PEAK WAVELENGTH (HALF VALUE WIDTH) OF BLUE LED ELEMENT | | 444nm (18nm) | 444nm (18nm) | 444nm (18nm) |
| | BLEND PROPORTION | RED PHOSPHOR | 6.86% | 8.77% | 8.46% |
| | | GREEN PHOSPHOR | 93.14% | 91.23% | 91.54% |
| CF | R THICKNESS RATIO | | 524% | 571% | 619% |
| | G THICKNESS RATIO | | 524% | 571% | 619% |
| | B THICKNESS RATIO | | 524% | 571% | 619% |
| NTSC PERCENTAGE | CIE 1931 CHROMATICITY DIAGRAM | | 118% | 118% | 116% |
| | CIE 1976 CHROMATICITY DIAGRAM | | 150% | 150% | 150% |
| BT.709 PERCENTAGE | CIE 1931 CHROMATICITY DIAGRAM | | 166% | 166% | 164% |
| | CIE 1976 CHROMATICITY DIAGRAM | | 172% | 172% | 171% |
| DCI PERCENTAGE | CIE 1931 CHROMATICITY DIAGRAM | | 122% | 123% | 121% |
| | CIE 1976 CHROMATICITY DIAGRAM | | 137% | 137% | 137% |
| BT.2020 PERCENTAGE | CIE 1931 CHROMATICITY DIAGRAM | | 88% | 88% | 87% |
| | CIE 1976 CHROMATICITY DIAGRAM | | 100% | 100% | 100% |
| CHROMATICITY OF LED | | x= | 0.2238 | 0.2234 | 0.2237 |
| | | y= | 0.1870 | 0.1893 | 0.1880 |
| | | u'= | 0.1866 | 0.1852 | 0.1861 |
| | | v'= | 0.3509 | 0.3531 | 0.3519 |
| | | X= | 146.3174 | 186.1406 | 194.3560 |
| | | Y= | 122.2401 | 157.7704 | 163.3422 |
| | | Z= | 385.2825 | 489.3562 | 511.2967 |
| LIQUID CRYSTAL PANEL | CHROMATICITY OF EMITTED LIGHT WHEN WHITE IS DISPLAYED | x= | 0.2858 | 0.2858 | 0.2858 |
| | | y= | 0.2892 | 0.2909 | 0.2891 |
| | | u'= | 0.1938 | 0.1931 | 0.1938 |
| | | v'= | 0.4412 | 0.4423 | 0.4412 |
| | | X= | 1.921051 | 2.250174 | 2.149681 |
| | | Y= | 1.944057 | 2.290410 | 2.174186 |
| | | Z= | 2.856950 | 3.332241 | 3.196783 |
| | CHROMATICITY OF EMITTED LIGHT WHEN RED IS DISPLAYED | x= | 0.6908 | 0.6902 | 0.6899 |
| | | y= | 0.3063 | 0.3067 | 0.3067 |
| | | u'= | 0.5219 | 0.5209 | 0.5206 |
| | | v'= | 0.5207 | 0.5208 | 0.5208 |
| | | X= | 0.973685 | 1.147780 | 1.071302 |
| | | Y= | 0.431703 | 0.510140 | 0.476229 |
| | | Z= | 0.004056 | 0.005145 | 0.005339 |
| | CHROMATICITY OF EMITTED LIGHT WHEN GREEN IS DISPLAYED | x= | 0.2111 | 0.2083 | 0.2176 |
| | | y= | 0.7459 | 0.7464 | 0.7439 |
| | | u'= | 0.0732 | 0.0722 | 0.0757 |
| | | v'= | 0.5823 | 0.5821 | 0.5826 |
| | | X= | 0.418884 | 0.487228 | 0.485260 |
| | | Y= | 1.479964 | 1.746251 | 1.659157 |
| | | Z= | 0.085348 | 0.106114 | 0.085839 |
| | CHROMATICITY OF EMITTED LIGHT WHEN BLUE IS DISPLAYED | x= | 0.1557 | 0.1557 | 0.1558 |
| | | y= | 0.0214 | 0.0213 | 0.0207 |
| | | u'= | 0.2114 | 0.2115 | 0.2122 |
| | | v'= | 0.0654 | 0.0651 | 0.0634 |
| | | X= | 0.528139 | 0.615090 | 0.592785 |
| | | Y= | 0.072621 | 0.084195 | 0.078573 |
| | | Z= | 2.791409 | 3.250812 | 3.133565 |

FIG. 44
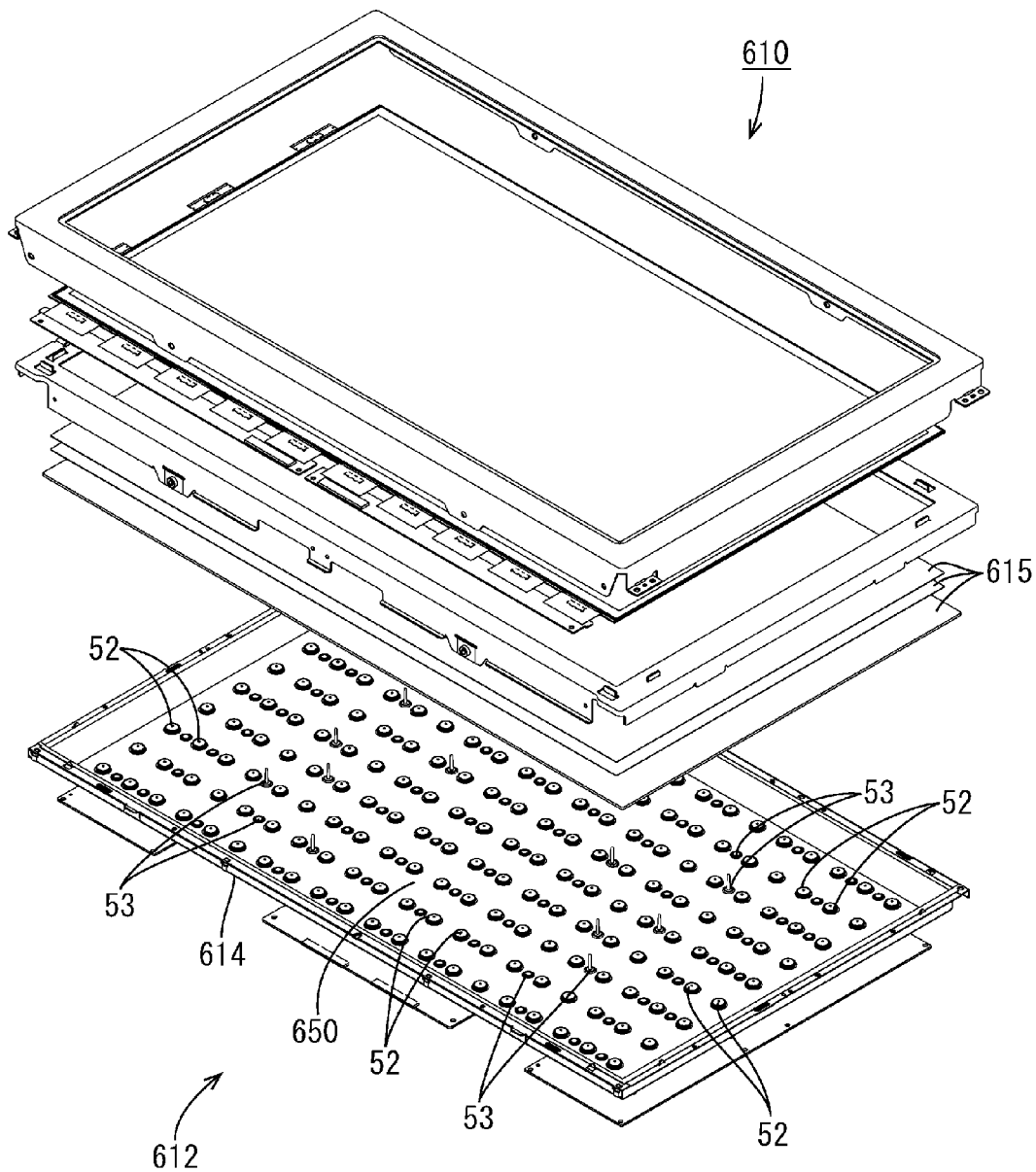
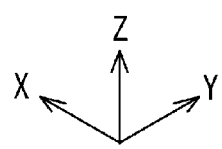

DISPLAY DEVICE AND TELEVISION RECEPTION DEVICE

TECHNICAL FIELD

The present invention relates to a display device and a television reception device.

BACKGROUND ART

A liquid crystal panel that is a main component of a liquid crystal display device is generally formed by sealing a liquid crystal between a pair of glass substrates, and one of the glass substrates is an array substrate in which an active element such as a TFT is disposed, and the other is a CF substrate in which a color filter and the like are disposed. A large number of coloring units that correspond to colors of red, green, and blue are arranged parallel to each other corresponding to pixels of the array substrate and thereby form the color filter on the inner surface of the CF substrate facing the array substrate. Light radiated from backlight and transmitted through the liquid crystal is selectively transmitted in wavelengths corresponding to respective coloring units of red, green, and blue which form the color filter, and thereby an image is displayed on the liquid crystal panel. An example of such a liquid crystal display device is described in PTL 1.

PTL 1 describes a liquid crystal display device that uses, as an illuminant, dual wavelength white LED backlight formed of an LED emitting blue light and a phosphor emitting yellow light. In the liquid crystal display device, color reproducibility is improved by efficiently separating green from red with use of a color correction film that is formed by stacking, on one surface of a light transmitting member, a binder resin layer or an adhesive layer including a visible light absorbing coloring matter which has the maximum absorption value in a wavelength range between 580 nm and 600 nm.

CITATION LIST

Patent Literature

PTL 1: Japanese Unexamined Patent Application Publication No. 2012-27298

Technical Problem

The color correction film described in PTL 1 absorbs light (for example, blue light) of a wavelength other than a wavelength of the maximum absorption value and absorbs light in the entire visible light region. Thus, the efficiency in the use of light is degraded, and a decrease in luminance or an increase in power consumption may be caused. When, for example, the thickness of the color filter is increased to improve the color reproducibility, the light transmittance of the color filter is decreased, and consequently the efficiency in the use of light is degraded. Particularly, the BT.2020 standard that defines a video format related to ultra-high definition television such as 4K television has been issued in recent years, and providing a liquid crystal display device that has very high color reproducibility to the extent satisfying the BT.2020 standard may significantly degrade the efficiency in the use of light due to the above reasons.

SUMMARY OF INVENTION

The present invention is conceived on the basis of the above matter, and an object thereof is to improve color reproducibility with reduction of a decrease in luminance.

Solution to Problem

A display device of the present invention includes an illumination device that includes an illuminant emitting blue light having a light emission spectrum which includes a peak having a peak wavelength in a range of 440 nm±2 nm to 450 nm±2 nm and has a half value width of less than 25 nm for the peak, green light having a light emission spectrum which includes a peak having a peak wavelength in a range of 525 nm±2 nm to 540 nm±2 nm and has a half value width of less than 52 nm for the peak, and red light having a light emission spectrum which includes a peak having a peak wavelength in a range of 620 nm±2 nm to 645 nm±2 nm and has a half value width of less than 40 nm for the peak; and a display panel that includes a color filter and performs display by using light from the illumination device, the color filter including at least a blue coloring unit that exhibits blue and has a transmission spectrum which includes a peak having a peak wavelength in a range of 440 nm to 461.5 nm and has a half value width of less than 100 nm for the peak, a green coloring unit that exhibits green and has a transmission spectrum which includes a peak having a peak wavelength in a range of 510 nm to 533.5 nm and has a half value width of less than 90 nm for the peak, and a red coloring unit that exhibits red and has a transmission spectrum which has a wavelength of greater than or equal to 580 nm for the half value of a peak.

Accordingly, when light emitted from the illuminant included in the illumination device is supplied to the display panel, the light is transmitted through the color filter formed of coloring units that are included in the display panel and exhibit at least blue, green, and red, and is emitted from the display panel, and thereby an image is displayed on the display panel. The illuminant included in the illumination device emits each of blue light, green light, and red light, and thereby emitted light as a whole exhibits approximate white.

The blue light emitted from the illuminant has a light emission spectrum that includes a peak having a peak wavelength in a range of 440 nm±2 nm to 450 nm±2 nm and has a half value width of less than 25 nm for the peak. The green light emitted from the illuminant has a light emission spectrum that includes a peak having a peak wavelength in a range of 525 nm±2 nm to 540 nm±2 nm and has a half value width of less than 52 nm for the peak. The red light emitted from the illuminant has a light emission spectrum that includes a peak having a peak wavelength in a range of 620 nm±2 nm to 645 nm±2 nm and has a half value width of less than 40 nm for the peak. Thus, the color purity of each color light is sufficiently high. Particularly, the peak wavelength of the light emission spectrum of the blue light is set to be greater than or equal to the lower limit value of the above numerical value range (440 nm±2 nm), and thus the peak wavelength is closer to the peak visibility of 555 nm compared with a case where the peak wavelength is on the shorter wavelength side, and sufficient brightness is obtained for the blue light. In addition, the peak wavelength of the light emission spectrum of the blue light is set to be less than or equal to the upper limit value of the above numerical value range (450 nm±2 nm), and thus avoided is hue shifting to green compared with a case where the peak wavelength is on the longer wavelength side. The peak wavelength of the light emission spectrum of the green light is set to be greater than or equal to the lower limit value of the above numerical value range (525 nm±2 nm), and thus avoided is hue shifting to blue compared with a case where the peak wavelength is on the shorter wavelength side, and the peak wavelength is closer to the peak visibility of 555 nm. Thus, sufficient brightness is obtained for the green light. In addition, the peak wavelength of the light emission spectrum of the green light is set to be less than or equal to the upper limit value of the above numerical value range (540 nm±2 nm), and thus avoided is hue shifting to yellow compared with a case where the peak wavelength is on the longer wavelength side. Furthermore, the peak wavelength of the light emission spectrum of the red light is set to be greater than or equal to the lower limit value of the above numerical value range (620 nm±2 nm), and thus avoided is hue shifting to yellow compared with a case where the peak wavelength is on the shorter wavelength side. Furthermore, the peak wavelength of the light emission spectrum of the red light is set to be less than or equal to the upper limit value of the above numerical value range (645 nm±2 nm), and thus the peak wavelength is closer to the peak visibility of 555 nm compared with a case where the peak wavelength is on the longer wavelength side, and sufficient brightness is obtained for the red light.

The blue coloring unit included in the color filter included in the display panel has a transmission spectrum that includes a peak having a peak wavelength in a range of 440 nm to 461.5 nm and has a half value width of less than 100 nm for the peak. The green coloring unit has a transmission spectrum that includes a peak having a peak wavelength in a range of 510 nm to 533.5 nm and has a half value width of less than 90 nm for the peak. The red coloring unit has a transmission spectrum that has a wavelength of greater than or equal to 580 nm for the half value of a peak. Thus, each color light emitted from the illuminant is efficiently transmitted by each coloring unit. Accordingly, each of the blue, green, and red gamuts is favorably expanded in the chromaticity region related to the emitted light of the display panel that is obtained by transmitting each color light from the illuminant through the coloring units of each color constituting the color filter. Thus, the color reproducibility related to an image displayed on the display panel is improved. Therefore, color reproducibility can be improved with reduction of a decrease in luminance compared with improving color reproducibility by using a color correction film as in the related art or by increasing the thickness of the color filter. According to the description heretofore, the chromaticity region of the emitted light of the display panel can have at least the same or greater area (100% or greater than 100% in the area ratio) than the BT.2020 chromaticity region according to the BT.2020 standard in the CIE 1976 chromaticity diagram, and high color reproducibility can be achieved.

The following configurations are preferable as an embodiment of the present invention.

(1) The illuminant emits the green light having a light emission spectrum that includes a peak having a peak wavelength of 530 nm±2 nm and has a half value width of less than 40 nm for the peak, and the blue coloring unit has a transmission spectrum that includes a peak having a peak wavelength in a range of 451 nm to 461.5 nm and has a half value width in a range of 61 nm to 99 nm for the peak, the green coloring unit has a transmission spectrum that includes a peak having a peak wavelength in a range of 521 nm to 533.5 nm and has a half value width in a range of 63 nm to 87 nm for the peak, and the red coloring unit has a transmission spectrum that has a wavelength in a range of 588 nm to 604 nm for the half value of a peak. First, as the half value width of the peak is narrowed in the transmission spectrum of each coloring unit, the color purity of the emitted light is easily increased, but the transmittance of each coloring unit is decreased. Thus, the luminance of the emitted light tends to be easily decreased. From this point, the half value width of the peak in the transmission spectrum of each coloring unit and the wavelength for the half value of the peak are set to values not residing below the lower limit value of each of the above numerical value ranges, and thereby luminance can be maintained to a certain level or higher with sufficient color reproducibility achieved. Particularly, setting the light emission spectra of the green light and the red light emitted from the illuminant as described above can set the lower limit value of the numerical value range related to the half value width of the peak in the transmission spectrum of each coloring unit to be sufficiently high as described above and can set the half value width to be sufficiently wide, and thus high luminance can be obtained. In a case where the half value width of the peak of the transmission spectrum of the green coloring unit is narrowed, the transmission spectrum is shifted away from the light emission spectrum of the red light, and thus the light emission spectrum of the red light can be changed without a deterioration in color reproducibility in such a manner that the peak wavelength of the peak thereof is shifted to the short wavelength side. Then, the peak wavelength related to the red light approaches the peak visibility of 555 nm, and thus the luminance of the red light emitted from the illuminant is improved, and the luminance of the entirety of the emitted light of the illuminant is improved. Consequently, the emitted light obtained after being transmitted through each coloring unit has higher luminance.

As the half value width of the peak is widened in the transmission spectrum of each coloring unit, the transmittance of each coloring unit is improved, and thus the luminance of the emitted light is easily increased, but the color purity of the emitted light tends to be easily decreased. Particularly, setting the light emission spectra of the green light and the red light emitted from the illuminant as described above can set the upper limit value of the numerical value range related to the half value width of the peak in the transmission spectrum of each coloring unit to be sufficiently high as described above and can set the half value width to be sufficiently wide, and thus high luminance can be obtained. In a case where the half value width of the peak of the transmission spectrum of the green coloring unit is widened, the light emission spectrum of the red light of the illuminant is prevented from overlapping with the transmission spectrum, and thus it is preferable that the light emission spectrum of the red light is changed in such a manner that the peak wavelength of the peak thereof is shifted to the long wavelength side. However, the peak wavelength related to the red light is then moved away from the peak visibility of 555 nm, and thus the luminance of the red light emitted from the illuminant tends to be decreased. When the luminance of the red light is decreased, the luminance of the entirety of the emitted light of the illuminant is decreased, and consequently the luminance of the emitted light obtained after being transmitted through each coloring unit is decreased. From this point, the half value width of the peak in the transmission spectrum of each coloring unit and the wavelength for the half value of the peak are set to values not residing above the upper limit value of each of the above numerical value ranges, and thereby the luminance of the emitted light can be maintained at a certain level or higher with sufficient color reproducibility secured, by reducing a decrease in the luminance of the red light of the illuminant.

(2) The illuminant emits the green light having a light emission spectrum that has a half value width of less than 20 nm for a peak, and the red light having a light emission spectrum that includes a peak having a peak wavelength in a range of 620 nm±2 nm to 640 nm±2 nm and has a half value width of less than 20 nm for the peak, and the blue coloring unit has a transmission spectrum that includes a peak having a peak wavelength in a range of 456.5 nm to 461.5 nm, the green coloring unit has a transmission spectrum that includes a peak having a peak wavelength in a range of 531.5 nm to 533.5 nm, and the red coloring unit has a transmission spectrum that has a wavelength in a range of 589 nm to 596 nm for the half value of a peak. Accordingly, since the half value widths of the peaks of the light emission spectra of the green light and the red light emitted from the illuminant are less than 20 nm and very narrow, sufficient color reproducibility can be secured even if the half value width of the peak of the transmission spectrum of each coloring unit is widened, and luminance can be further increased. As described above, the half value widths related to the peaks of the light emission spectra of the green light and the red light are set to be less than 20 nm. Thus, when the half value width of the peak of the transmission spectrum of the green coloring unit is widened, the transmission spectrum of the green coloring unit overlapping with the light emission spectrum of the red light can be easily avoided without shifting the peak wavelength of the peak of the light emission spectrum of the red light of the illuminant to the long wavelength side too much. Accordingly, the visibility of the red light emitted from the illuminant is unlikely to be decreased, and thus the luminance related to the emitted light is more easily maintained at a certain level or higher.

(3) The illuminant emits the green light having a light emission spectrum that has a half value width in a range of 21 nm to 30 nm for a peak, and the red light having a light emission spectrum that includes a peak having a peak wavelength in a range of 626 nm±2 nm to 639 nm±2 nm and has a half value width in a range of 21 nm to 30 nm for the peak, and the blue coloring unit has a transmission spectrum that includes a peak having a peak wavelength in a range of 458.5 nm to 461.5 nm and has a half value width in a range of 61 nm to 85 nm for the peak, the green coloring unit has a transmission spectrum that includes a peak having a peak wavelength in a range of 531.5 nm to 532.5 nm and has a half value width in a range of 63 nm to 79 nm for the peak, and the red coloring unit has a transmission spectrum that has a wavelength in a range of 591 nm to 596 nm for the half value of a peak. Accordingly, since the half value widths of the peaks of the light emission spectra of the green light and the red light emitted from the illuminant are in a range of 21 nm to 30 nm and sufficiently narrow, sufficient color reproducibility can be secured even if the half value width of the peak of the transmission spectrum of each coloring unit is widened, and luminance can be further increased. In addition, since members related to the illuminant can be easily supplied and the manufacturing cost related to the illuminant can be decreased, this is favorable compared with a case where the half value widths of the peaks of the light emission spectra of the green light and the red light emitted from the illuminant are set to be less than 20 nm.

(4) The illuminant emits the green light having a light emission spectrum that has a half value width in a range of 31 nm to 40 nm for a peak, and the red light having a light emission spectrum that includes a peak having a peak wavelength in a range of 633 nm±2 nm to 642 nm±2 nm and has a half value width in a range of 31 nm to 40 nm for the peak, and the blue coloring unit has a transmission spectrum that includes a peak having a peak wavelength in a range of 460 nm to 461.5 nm and has a half value width in a range of 61 nm to 74 nm for the peak, the green coloring unit has a transmission spectrum that includes a peak having a peak wavelength in a range of 531.5 nm to 532 nm and has a half value width in a range of 63 nm to 72 nm for the peak, and the red coloring unit has a transmission spectrum that has a wavelength in a range of 593 nm to 596 nm for the half value of a peak. Accordingly, members related to the illuminant can be more easily supplied, and the manufacturing cost related to the illuminant can be further decreased, compared with a case where the half value widths of the peaks of the light emission spectra of the green light and the red light emitted from the illuminant are set to be less than 30 nm.

(5) The illuminant emits the green light having a light emission spectrum that has a half value width in a range of 30 nm to 36 nm for a peak, and the red light having a light emission spectrum that includes a peak having a peak wavelength in a range of 635 nm±2 nm to 645 nm±2 nm and has a half value width in a range of 30 nm to 36 nm for the peak, and the blue coloring unit has a transmission spectrum that includes a peak having a peak wavelength of 451 nm and has a half value width in a range of 91 nm to 92 nm for the peak, the green coloring unit has a transmission spectrum that includes a peak having a peak wavelength of 521 nm and has a half value width of 85 nm for the peak, and the red coloring unit has a transmission spectrum that has a wavelength of 588 nm for the half value of a peak. Accordingly, since each lower limit value of the half value width of the peak in the transmission spectrum of each coloring unit and the wavelength for the half value of the peak is set to be sufficiently great, luminance can be set to be higher with sufficient color reproducibility secured. In addition, members related to the illuminant can be more easily supplied, and the manufacturing cost related to the illuminant can be further decreased, compared with a case where the half value widths of the peaks of the light emission spectra of the green light and the red light emitted from the illuminant are set to be less than 30 nm.

(6) The illuminant includes at least a blue light emitting element that emits blue light, a green phosphor that is excited by the blue light from the blue light emitting element and emits green light, and a red phosphor that is excited by the blue light from the blue light emitting element and emits red light, and the green phosphor and the red phosphor are formed of quantum dot phosphors. Accordingly, the illuminant emits light that includes the blue light emitted from the blue light emitting element, the green light excited by the blue light and emitted from the green phosphor, and the red light excited by the blue light and emitted from the red phosphor and as a whole exhibits approximate white. The green phosphor and the red phosphor are formed of quantum dot phosphors, and thus green light and red light having high color purity can be emitted, and in addition the fluorescence quantum yield (the ratio of the number of radiated photons to the number of absorbed photons) is high. Since the color purity of the emitted light of the quantum dot phosphor is high, sufficient color reproducibility can be secured even if the half value width of the peak of the transmission spectrum of each coloring unit of the color filter is widened, and thus luminance is favorably improved. In addition, since the fluorescence quantum yield of the quantum dot phosphor is high, luminance can be further improved.

(7) The illuminant includes at least a blue light emitting element that emits the blue light, a green light emitting element that emits the green light, and a red light emitting element that emits the red light. Accordingly, the illuminant emits light that includes the blue light emitted from the blue light emitting element, the green light emitted from the green light emitting element, and the red light emitted from the red light emitting element and as a whole exhibits approximate white. Since each color light of blue, green, and red is emitted from the light emitting elements that are individually prepared for each color, the color purity related to each color light is high, and accordingly sufficient color reproducibility can be secured even if the half value width of the peak of the transmission spectrum of each coloring unit of the color filter is widened, and this is favorable for improving luminance.

(8) The illuminant emits the green light having a light emission spectrum that includes a peak having a peak wavelength in a range of 528 nm±2 nm to 540 nm±2 nm and has a half value width of less than 52 nm for the peak, and the red light having a light emission spectrum that includes a main peak having a peak wavelength of 631 nm±2 nm and has a half value width of less than 7 nm for the main peak and, furthermore, includes a first subpeak having a peak wavelength in a range of 607 nm to 614 nm and includes a second subpeak having a peak wavelength in a range of 645 nm to 648 nm, and the blue coloring unit has a transmission spectrum that includes a peak having a peak wavelength in a range of 451 nm to 461 nm and has a half value width in a range of 46 nm to 78 nm for the peak, the green coloring unit has a transmission spectrum that includes a peak having a peak wavelength of 521 nm to 531 nm and has a half value width in a range of 50 nm to 74 nm for the peak, and the red coloring unit has a transmission spectrum that has a wavelength in a range of 601 nm to 604 nm for the half value of a peak. First, as the half value width of the peak is narrowed in the transmission spectrum of each coloring unit, the color purity of the emitted light is easily increased, but the transmittance of each coloring unit is decreased. Thus, the luminance of the emitted light tends to be easily decreased. From this point, the half value width of the peak in the transmission spectrum of each coloring unit and the wavelength for the half value of the peak are set to values not residing below the lower limit value of each of the above numerical value ranges, and thereby luminance can be maintained to a certain level or higher with sufficient color reproducibility achieved. In addition, the light emission spectra of the green light and the red light emitted from the illuminant are set as described above, and particularly the color purity of the red light is high. Thus, sufficient color reproducibility can be easily secured. In a case where the half value width of the peak of the transmission spectrum of the green coloring unit is narrowed, it is preferable that the light emission spectrum of the green light of the illuminant is changed in such a manner that the peak wavelength of the peak thereof is shifted to the long wavelength side, in order to reduce an accompanying decrease in luminance. That is, if the light emission spectrum of the green light is shifted to the long wavelength side, the peak wavelength thereof approaches the peak visibility 555 nm. Thus, the luminance of the green light emitted from the illuminant is improved, and the luminance of the entirety of the emitted light of the illuminant is improved. Accordingly, reduced is a decrease in luminance that is accompanied by narrowing the half value width of the peak of the transmission spectrum of the green coloring unit.

As the half value width of the peak is widened in the transmission spectrum of each coloring unit, the transmittance of each coloring unit is improved, and thus the luminance of the emitted light is easily increased, but the color purity of the emitted light tends to be easily decreased. In a case where the half value width of the peak of the transmission spectrum of the green coloring unit is widened, it is preferable that the amount of overlap of the light emission spectrum of the green light of the illuminant with the transmission spectrum is set to be greater than or equal to a certain amount and that the light emission spectrum of the green light is changed in such a manner that the peak wavelength of the peak thereof is shifted to the short wavelength side, in order to secure sufficient color reproducibility. However, the peak wavelength related to the green light is then moved away from the peak visibility of 555 nm, and thus the luminance of the green light emitted from the illuminant tends to be decreased. When the luminance of the green light is decreased, the luminance of the entirety of the emitted light of the illuminant is decreased, and consequently the luminance of the emitted light obtained after being transmitted through each coloring unit is decreased. From this point, the half value width of the peak in the transmission spectrum of each coloring unit and the wavelength for the half value of the peak are set to values not residing above the upper limit value of each of the above numerical value ranges, and thereby the luminance of the emitted light can be maintained at a certain level or higher with sufficient color reproducibility secured, by reducing a decrease in the luminance of the green light of the illuminant.

(9) The illuminant emits the green light having a light emission spectrum that includes a peak having a peak wavelength of 533 nm±2 nm to 540 nm±2 nm and has a half value width of less than 25 nm for the peak, and the blue coloring unit has a transmission spectrum that includes a peak having a peak wavelength of 461 nm and has a half value width in a range of 46 nm to 48 nm for the peak, the green coloring unit has a transmission spectrum that includes a peak having a peak wavelength of 531 nm and has a half value width in a range of 50 nm to 52 nm for the peak, and the red coloring unit has a transmission spectrum that has a wavelength in a range of 601 nm to 602 nm for the half value of a peak. Accordingly, since the half value width of the peak of the light emission spectrum of the green light emitted from the illuminant is less than 25 nm and sufficiently narrow, sufficient color reproducibility can be secured even if the half value width of the peak of the transmission spectrum of each coloring unit is widened, and sufficiently high luminance is obtained. As described above, the half value width related to the peak of the light emission spectrum of the green light is set to be less than 25 nm. Thus, when the half value width of the peak of the transmission spectrum of the green coloring unit is widened, the amount of overlap of the transmission spectrum of the green coloring unit with the light emission spectrum of the green light can be easily secured to a certain amount or larger without shifting the peak wavelength of the peak of the light emission spectrum of the green light of the illuminant to the short wavelength side too much. Accordingly, the visibility of the green light emitted from the illuminant is unlikely to be decreased, and thus the luminance related to the emitted light is more easily maintained at a certain level or higher.

(10) The illuminant emits the green light having a light emission spectrum that includes a peak having a peak wavelength of 528 nm±2 nm to 533 nm±2 nm, and the blue coloring unit has a transmission spectrum that includes a peak having a peak wavelength in a range of 451 nm to 453 nm and has a half value width in a range of 74 nm to 78 nm for the peak, the green coloring unit has a transmission spectrum that includes a peak having a peak wavelength of 521 nm to 524 nm and has a half value width in a range of 71 nm to 74 nm for the peak, and the red coloring unit has a transmission spectrum that has a wavelength of 604 nm for the half value of a peak. Accordingly, since each lower limit value of the half value width of the peak in the transmission spectrum of each coloring unit and the wavelength for the half value of the peak is set to be sufficiently great, luminance can be set to be higher with sufficient color reproducibility secured.

(11) The illuminant includes at least a blue light emitting element that emits blue light, a green phosphor that is excited by the blue light from the blue light emitting element and emits green light, and a red phosphor that is excited by the blue light from the blue light emitting element and emits red light, and the green phosphor is formed of a sialon-based phosphor, and the red phosphor is formed of a complex fluoride phosphor. Accordingly, the illuminant emits light that includes the blue light emitted from the blue light emitting element, the green light excited by the blue light and emitted from the green phosphor, and the red light excited by the blue light and emitted from the red phosphor and as a whole exhibits approximate white. Since there exist many types of materials for the sialon-based phosphor constituting the green phosphor regarding the peak wavelength and the half value width of the peak included in the light emission spectrum thereof, the sialon-based phosphor may be selected from the types of materials, and a green phosphor having an appropriate light emission spectrum can be supplied at a low cost. Furthermore, the complex fluoride phosphor constituting the red phosphor has a sufficiently narrow half value width for a main peak included in the light emission spectrum thereof and thus can emit red light having high color purity. In addition, the green light emitted from the green phosphor is unlikely to be absorbed, and thus the efficiency in use of the green light is maintained higher.

(12) The illuminant includes at least a blue light emitting element that emits blue light, a green phosphor that is excited by the blue light from the blue light emitting element and emits green light, and a red phosphor that is excited by the blue light from the blue light emitting element and emits red light, and the display device includes an optical member that is arranged to be separated from a light emission side of the blue light emitting element and includes the green phosphor and the red phosphor. Accordingly, when the optical member that is arranged to be separated from the light emission side of the blue light emitting element is irradiated with the blue light emitted from the blue light emitting element, the green phosphor and the red phosphor included in the optical member are excited by the blue light and thereby emit green light and red light respectively. Accordingly, light that exhibits approximate white as a whole is obtained. The green phosphor and the red phosphor are included in the optical member that is arranged to be separated from the blue light emitting element, and thus the green phosphor and the red phosphor are prevented from being degraded by heat emitted from the blue light emitting element, and unevenness is unlikely to occur in the tone and the like of green light and red light that are supplied to the display panel through the optical member.

(13) The illumination device includes a light guide plate that includes a light incident surface on an end surface thereof and includes a light emitting surface on a plate surface thereof, the light incident surface being arranged to face the illuminant and on which light from the illuminant is incident, and the light emitting surface being arranged to face a plate surface of the display panel and emitting light to the display panel. Accordingly, light emitted from the illuminant is incident on the light incident surface included in the end surface of the light guide plate and is propagated and diffused in the light guide plate and then is emitted as light in a planar shape from the light emitting surface included in the plate surface of the light guide plate, and the display panel is irradiated with the light. According to the illumination device of an edge light type, the uniformity of luminance related to the emitted light can be sufficiently high with the number of installed illuminants reduced in a case of using a plurality of the illuminants, compared with a downlight type.

(14) The illuminant includes a light emitting surface that emits light, and the light emitting surface thereof is arranged to face the plate surface of the display panel. Accordingly, the plate surface of the display panel that is arranged to face the light emitting surface is irradiated with light that is emitted from the light emitting surface of the illuminant. According to the illumination device of a downlight type, light from the illuminant is supplied to the display panel without passing through a member such as a light guide plate used in an edge light type, and thus the efficiency in use of light becomes further excellent.

Next, in order to solve the above problem, a television reception device of the present invention includes the display device described above and a reception unit by which a television signal is receivable. According to the television reception device, a television image that has high luminance and is excellent in color reproducibility can be displayed.

Advantageous Effects of Invention

According to the present invention, color reproducibility can be improved with reduction of a decrease in luminance.

BRIEF DESCRIPTION OF DRAWINGS

FIG. 13 is a table illustrating a list of characteristics of LEDs and color filters and experiment results in Examples 1 and 2 and Comparative examples 1 and 2 of Comparative experiment 1.

FIG. 18 is a table illustrating a list of characteristics of LEDs and color filters and experiment results in Examples 3 and 4 and Comparative examples 1 and 2 of Comparative experiment 2.

FIG. 19 is a CIE 1931 chromaticity diagram illustrating chromaticity regions in Examples 3 and 4 and Comparative examples 1 and 2 of Comparative experiment 2 and chromaticity regions of each standard (each chromaticity coordinate in the table of FIG. 18).

FIG. 20 is a CIE 1976 chromaticity diagram illustrating chromaticity regions in Examples 3 and 4 and Comparative examples 1 and 2 of Comparative experiment 2 and chromaticity regions of each standard (each chromaticity coordinate in the table of FIG. 18).

FIG. 21 is a table illustrating a list of characteristics of LEDs and color filters and experiment results in Example 5 and Comparative examples 1 to 3 of Comparative experiment 3 according to Embodiment 3 of the present invention.

FIG. 22 is a table illustrating a list of characteristics of LEDs and color filters and experiment results in Examples 6 and 7 and Comparative example 4 of Comparative experiment 3.

FIG. 23 is a table illustrating a list of characteristics of LEDs and color filters and experiment results in Examples 8 and 9 and Comparative example 5 of Comparative experiment 3.

FIG. 24 is a table illustrating a list of characteristics of LEDs and color filters and experiment results in Examples 10 and 11 and Comparative example 6 of Comparative experiment 3.

FIG. 25 is a table illustrating a list of characteristics of LEDs and color filters and experiment results in Examples 12 to 14 and Comparative example 7 of Comparative experiment 3.

FIG. 26 is a table illustrating a list of characteristics of LEDs and color filters and experiment results in Examples 15 and 16 and Comparative example 8 of Comparative experiment 3.

FIG. 35 is a table illustrating a list of characteristics of LEDs and color filters and experiment results in Examples 17 and 18 and Comparative example 9 of Comparative experiment 4 according to Embodiment 4 of the present invention.

FIG. 44 is an exploded perspective view illustrating a schematic configuration of a liquid crystal display device according to Embodiment 7 of the present invention.

DESCRIPTION OF EMBODIMENTS

Embodiment 1

Figure 1:
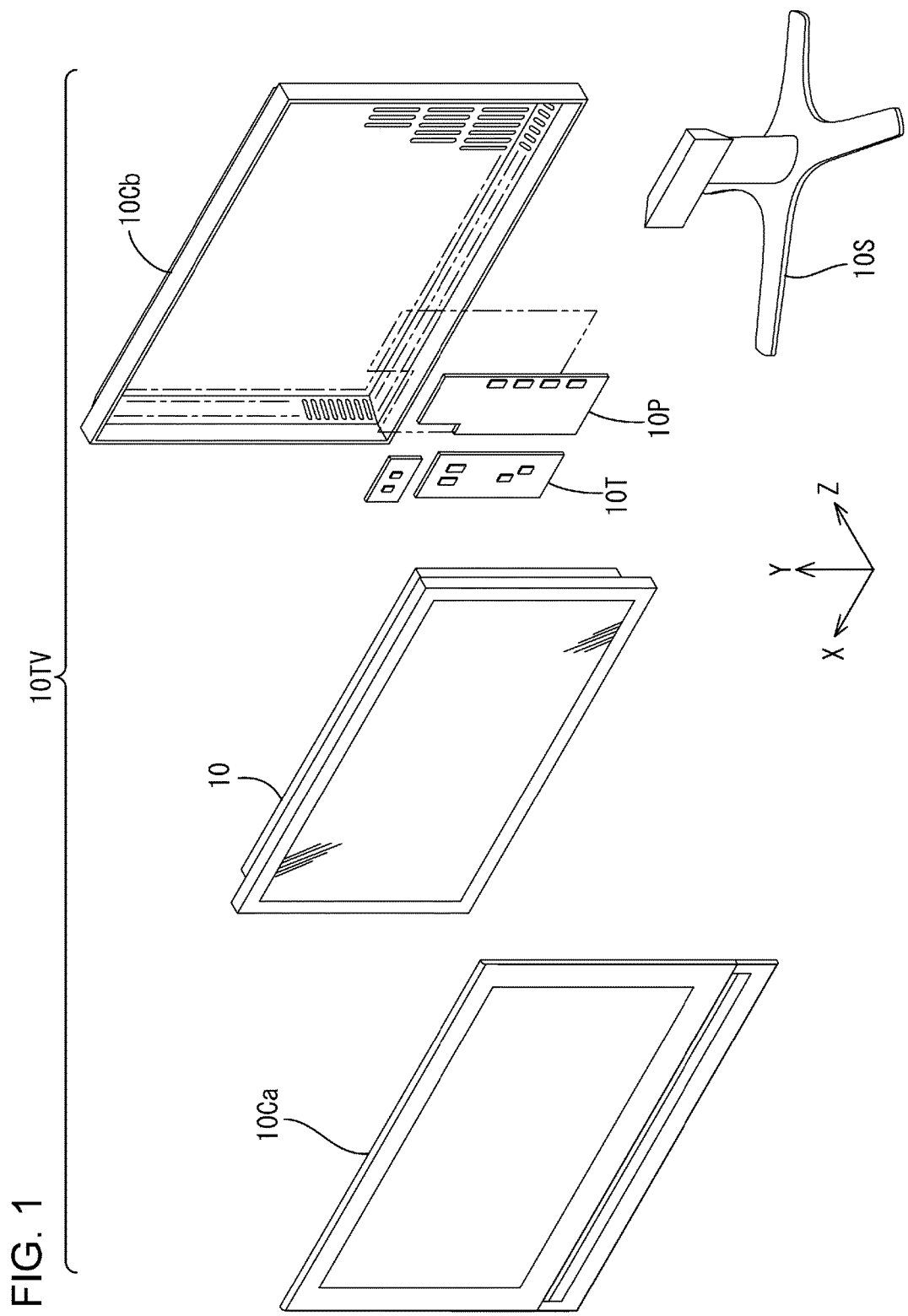
FIG. 1 is an exploded perspective view illustrating a schematic configuration of a television reception device according to Embodiment 1 of the present invention.

Embodiment 1 of the present invention will be described with reference to FIG. 1 to FIG. 15. A liquid crystal display device 10 will be illustrated in the present embodiment. A part of each drawing illustrates an X axis, a Y axis, and a Z axis, and the direction of each axis is drawn to be the direction illustrated in each drawing. The upper side illustrated in FIG. 3 and FIG. 7 corresponds to a front side, and the lower side in the drawings corresponds to a rear side.

Figure 2:
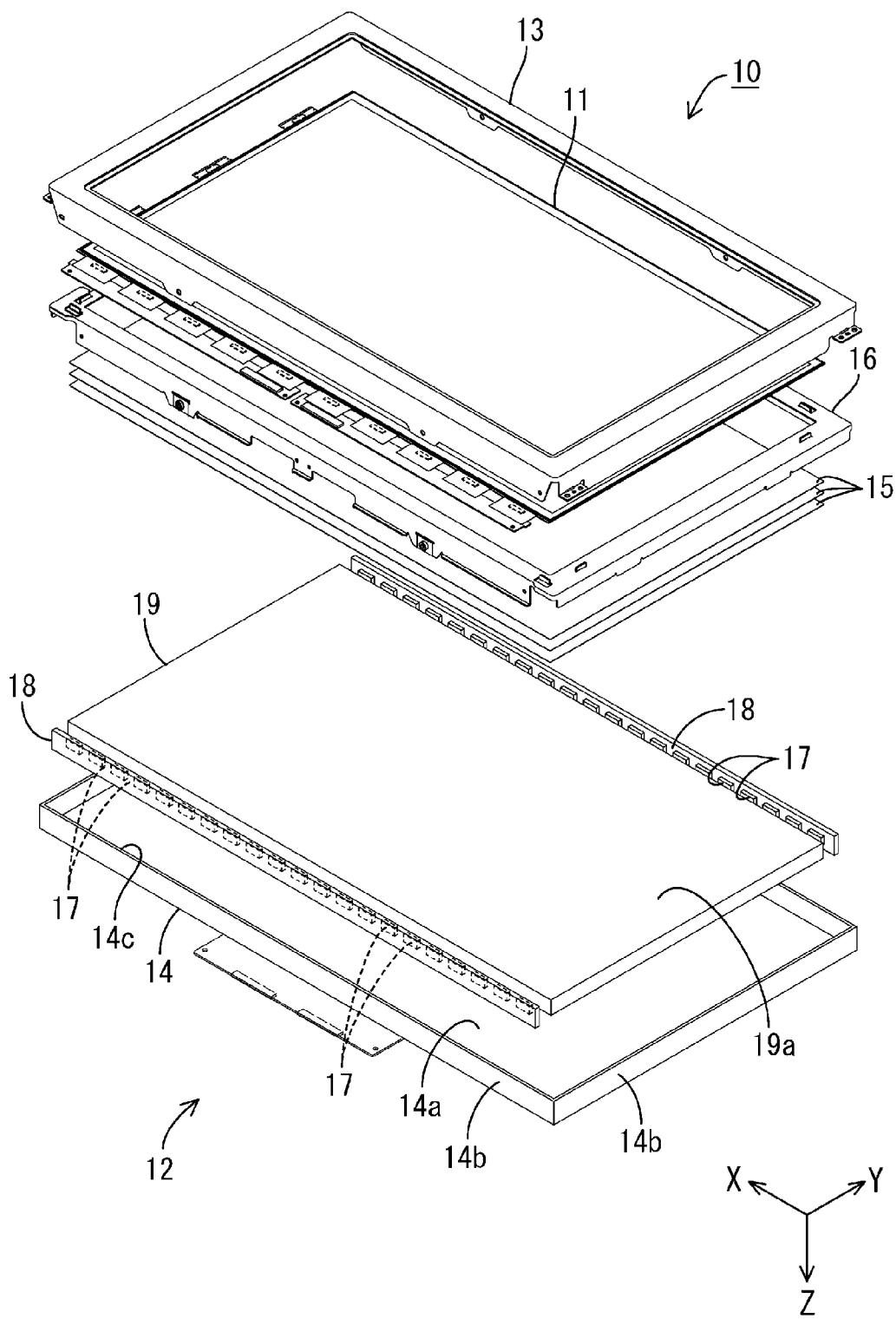
FIG. 2 is an exploded perspective view illustrating a schematic configuration of a liquid crystal display device included in the television reception device.

A television reception device 10TV according to the present embodiment is formed so as to include, as illustrated in FIG. 1, the liquid crystal display device 10, front and rear cabinets 10Ca and 10Cb between which the liquid crystal display device 10 is accommodated in an interposed manner, a power source 10P, a tuner (reception unit) 10T that receives a television signal, and a stand 10S. The liquid crystal display device (display device) 10 on the whole has a horizontally long (longitudinal) square-like shape (rectangular shape) and is accommodated in a vertically placed state. The liquid crystal display device 10 includes, as illustrated in FIG. 2, a liquid crystal panel 11 that is a display panel, and a backlight device (illumination device) 12 that is an external illuminant. The liquid crystal panel 11 and the backlight device 12 are integrally held by a bezel 13 having a frame shape or the like.

Figure 3:
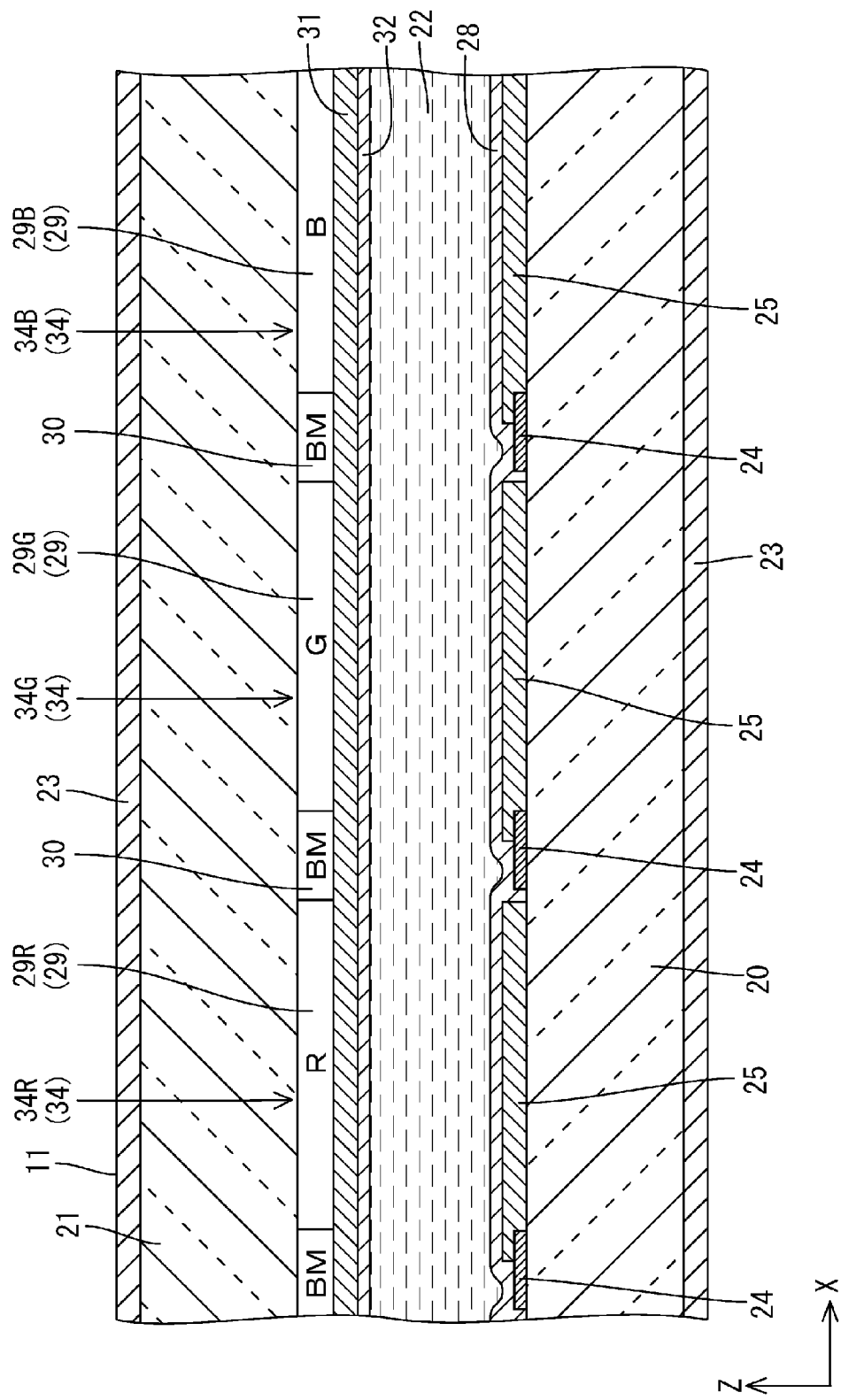
FIG. 3 is a sectional view illustrating a sectional configuration in the direction of a long edge of a liquid crystal panel.

The liquid crystal panel 11 will be described first. The liquid crystal panel 11 is formed by, as illustrated in FIG. 3, sealing, between a pair of transparent (having light transmissivity) substrates 20 and 21 made of glass, a liquid crystal layer 22 that includes a liquid crystal material which is a substance having an optical characteristic changed by applying an electric field One of both of the substrates 20 and 21 constituting the liquid crystal panel 11 that is arranged on the rear side (backlight device 12 side) is an array substrate (TFT substrate or active matrix substrate) 20, and the other arranged on the front side (light emission side) is a CF substrate (counterpart substrate) 21. The array substrate 20 and the CF substrate 21 have a horizontally long square-like shape in plan view, and the direction of a long edge thereof matches the direction of the X axis, and the direction of a short edge thereof matches the direction of the Y axis. A pair of front and rear polarizers 23 is respectively bonded to the outer surface sides of both of the substrates 20 and 21.

Figure 4:
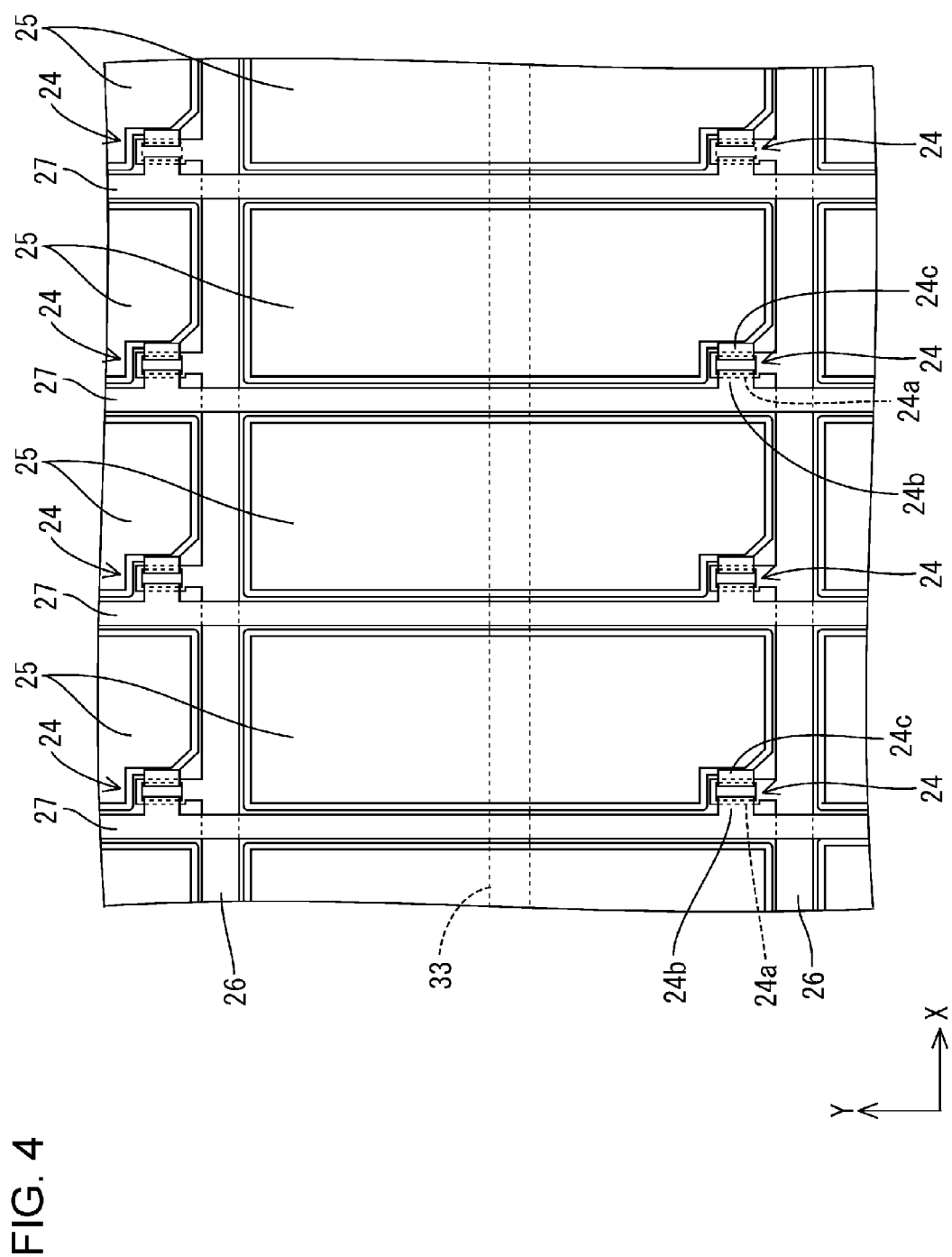
FIG. 4 is an enlarged plan view illustrating a planar configuration of an array substrate.

As illustrated in FIG. 4, a thin film transistor (TFT) 24 that is a switching element and includes three electrodes 24a to 24c and a pixel electrode 25 are linearly disposed in multiple numbers in an array shape (matrix shape) along the plate surface of the array substrate 20 on the inner surface side (the liquid crystal layer 22 side or the opposite surface side from the CF substrate 21) of the array substrate 20, and a gate interconnect 26 and a source interconnect 27 having a grid shape are arranged so as to surround the TFT 24 and the pixel electrode 25. The pixel electrode 25 is formed of a transparent conductive film made of indium tin oxide (ITO) or the like. Both of the gate interconnect 26 and the source interconnect 27 are formed of a metal film. The gate interconnect 26 and the source interconnect 27 are respectively connected to a gate electrode 24a and a source electrode 24b of the TFT 24, and the pixel electrode 25 is connected to a drain electrode 24c of the TFT 24 through a drain interconnect (not illustrated). A capacitor interconnect (an auxiliary capacitor interconnect, a storage capacitor interconnect, or a Cs interconnect) 33 is disposed in the array substrate 20 to be parallel to the gate interconnect 26 and overlie the pixel electrode 25 in plan view. The capacitor interconnect 33 and the gate interconnect 26 are alternately arranged in the direction of the Y axis. While the gate interconnect 26 is arranged between the pixel electrodes 25 that are adjacent to each other in the direction of the Y axis, the capacitor interconnect 33 is arranged in a position that horizontally passes through an almost central portion of each of the pixel electrodes 25 in the direction of the Y axis. A terminal unit that extends from the gate interconnect 26 and the capacitor interconnect 33 and a terminal unit that extends from the source interconnect 27 are disposed in an end portion of the array substrate 20. Each signal or reference potential from a control substrate not illustrated is input into each of the terminal units, and thereby driving of each TFT 24 parallelly arranged in an array shape is individually controlled. An alignment film 28 for aligning liquid crystal molecules included in the liquid crystal layer 22 is formed on the inner surface side of the array substrate 20 (FIG. 3).

Figure 5:
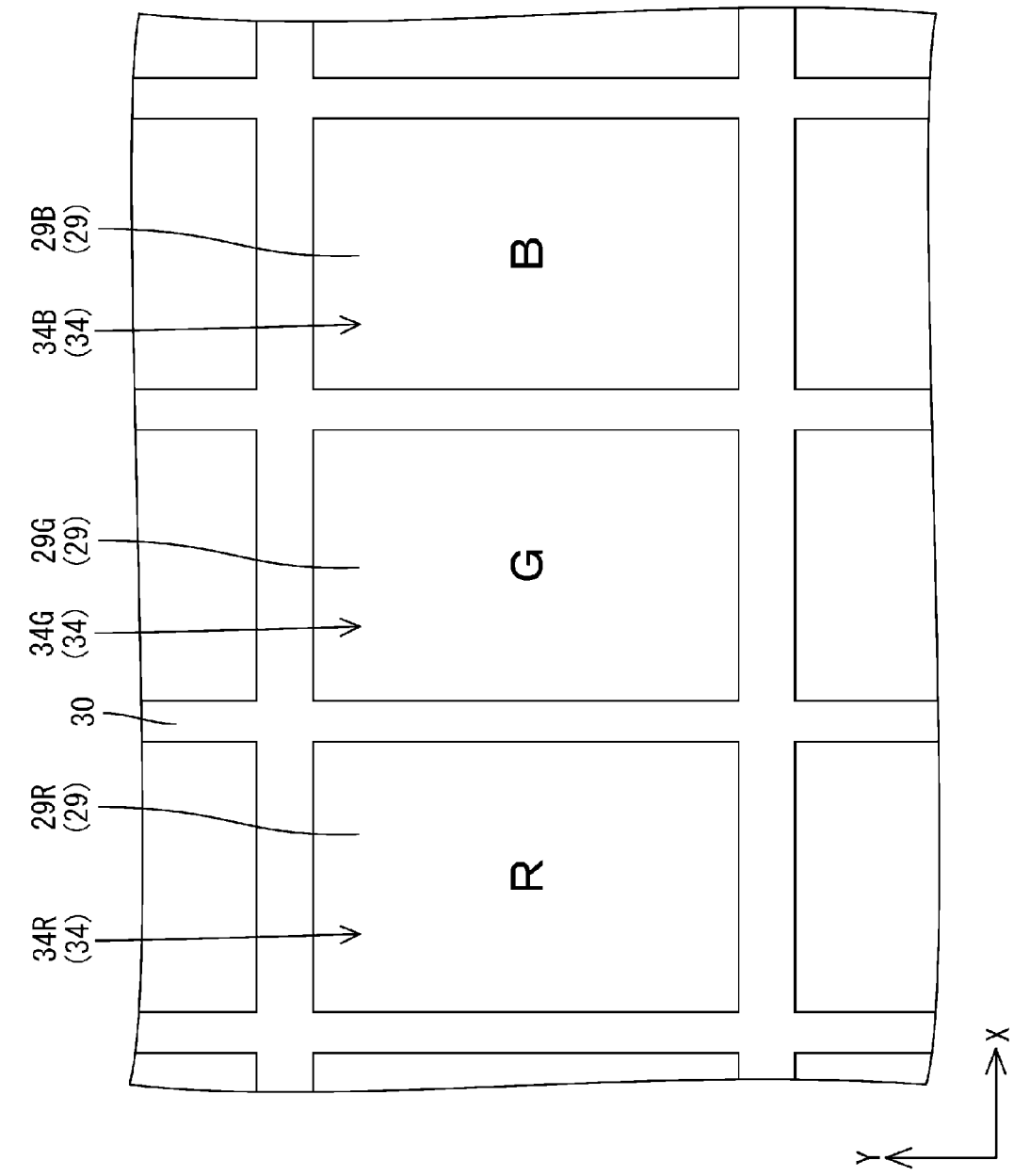
FIG. 5 is an enlarged plan view illustrating a planar configuration of a CF substrate.

As illustrated in FIG. 3 and FIG. 5, a color filter 29 is linearly disposed in multiple numbers in an array shape along the plate surface of the CF substrate 21 on the inner surface side (the liquid crystal layer 22 side or the opposite surface side from the array substrate 20) of the CF substrate 21 in a position that overlies each pixel electrode 25 on the array substrate 20 side in plan view. The color filter 29 is such that each of coloring units 29R, 29G, and 29B respectively exhibiting red, green, and blue are alternately and linearly repeated in the direction of a row (the direction of the X axis or the direction of the long edge of the liquid crystal panel 11) to constitute a coloring unit group and that the coloring unit group is linearly arranged in multiple numbers in the direction of a column (the direction of the Y axis or the direction of the short edge of the liquid crystal panel 11). The coloring units 29R, 29G, and 29B constituting the color filter 29, though described in detail later, selectively transmit light of corresponding colors (wavelengths). Each of the coloring units 29R, 29G, and 29B is manufactured by, for example, including a prescribed pigment or a dye in a base material and thereby exhibits a specific color according to the pigment or the dye. The exterior shape of each of the coloring units 29R, 29G, and 29B is a vertically long square-like shape following the exterior shape of the pixel electrode 25 when viewed in plan. A light-shielding portion (black matrix) 30 having a grid shape in order to prevent mixing of colors is formed between each of the coloring units 29R, 29G, and 29B constituting the color filter 29. The light-shielding portion 30 is arranged so as to overlie the gate interconnect 26, the source interconnect 27, and the capacitor interconnect 33 on the array substrate 20 side in plan view. A counterpart electrode 31 that is a counterpart of the pixel electrode 25 on the array substrate 20 side is disposed on the front surfaces of the color filter 29 and the light-shielding portion 30 as illustrated in FIG. 3. An alignment film 32 for aligning liquid crystal molecules included in the liquid crystal layer 22 is formed on the inner surface side of the CF substrate 21.

As illustrated in FIG. 3 to FIG. 5, one display pixel 34 that is a unit of display is formed of a set of the coloring units 29R, 29G, and 29B of three colors of red, green, and blue and the counterpart three pixel electrodes 25 in the liquid crystal panel 11, and the display pixel 34 is parallelly arranged in multiple numbers in a matrix shape along the plate surfaces of both of the substrates 20 and 21, that is, along a display surface (in the direction of the X axis and the direction of the Y axis). The display pixel 34 is formed of a red pixel 34R that is formed of a set of the red coloring unit 29R and the counterpart pixel electrode 25, a green pixel 34G that is formed of a set of the green coloring unit 29G and the counterpart pixel electrode 25, and a blue pixel 34B that is formed of a set of the blue coloring unit 29B and the counterpart pixel electrode 25. The red pixel 34R, the green pixel 34G, and the blue pixel 34B constituting the display pixel 34 are linearly and repeatedly arranged in the direction of the row (the direction of the X axis or the direction of the long edge of the liquid crystal panel 11) and thereby constitute a pixel group, and the pixel group is linearly arranged in multiple numbers in the direction of the column (the direction of the Y axis or the direction of the short edge of the liquid crystal panel 11). The control substrate not illustrated controls driving of each TFT 24 included in each of the pixels 34R, 34G, and 34B, and thereby when a voltage of a prescribed value is applied between each pixel electrode 25 and the counterpart electrode 31 connected to each TFT 24, the aligned state of the liquid crystal layer 22 arranged therebetween is changed according to the voltage, and the transmitted intensity of light transmitted through the coloring units 29R, 29G, and 29B of each color is individually controlled.

Next, the backlight device 12 will be described in detail. The backlight device 12 includes, as illustrated in FIG. 2, a chassis 14 that has an approximate box shape opened on the front side, that is, the light emission side (liquid crystal panel 11 side), and includes a light emission unit 14c; an optical member 15 that is arranged to cover the light emission unit 14c of the chassis 14; and a frame 16 that pushes a light guide plate 19 described later from the front side. Furthermore, an LED substrate (illuminant substrate) 18 on which a light emitting diode (LED) 17 that is an illuminant is mounted, and the light guide plate 19 that guides light from the LED 17 to the optical member 15 (to the liquid crystal panel 11 or the light emission side) are accommodated in the chassis 14. The LED substrate 18 that includes the LED 17 is arranged in both of the long edge side end portions of the backlight device 12 as a pair, and the light guide plate 19 is interposed between the pair of the LED substrates 18 on both sides thereof in the direction of the short edge thereof (the direction of the Y axis or the direction of the column). The LED 17 mounted on each LED substrate 18 unevenly exists in the liquid crystal panel 11 near each long edge side end portion of the liquid crystal panel 11 and is linearly arranged in a plurality of numbers at intervals (intermittently) in the direction along the end portions, that is, in the direction of the long edge (the direction of the X axis or the direction of the row). In this manner, the backlight device 12 according to the present embodiment is formed to be a so-called edge light type (side light type). Hereinafter, each constituent component of the backlight device 12 will be described in detail.

Figure 6:
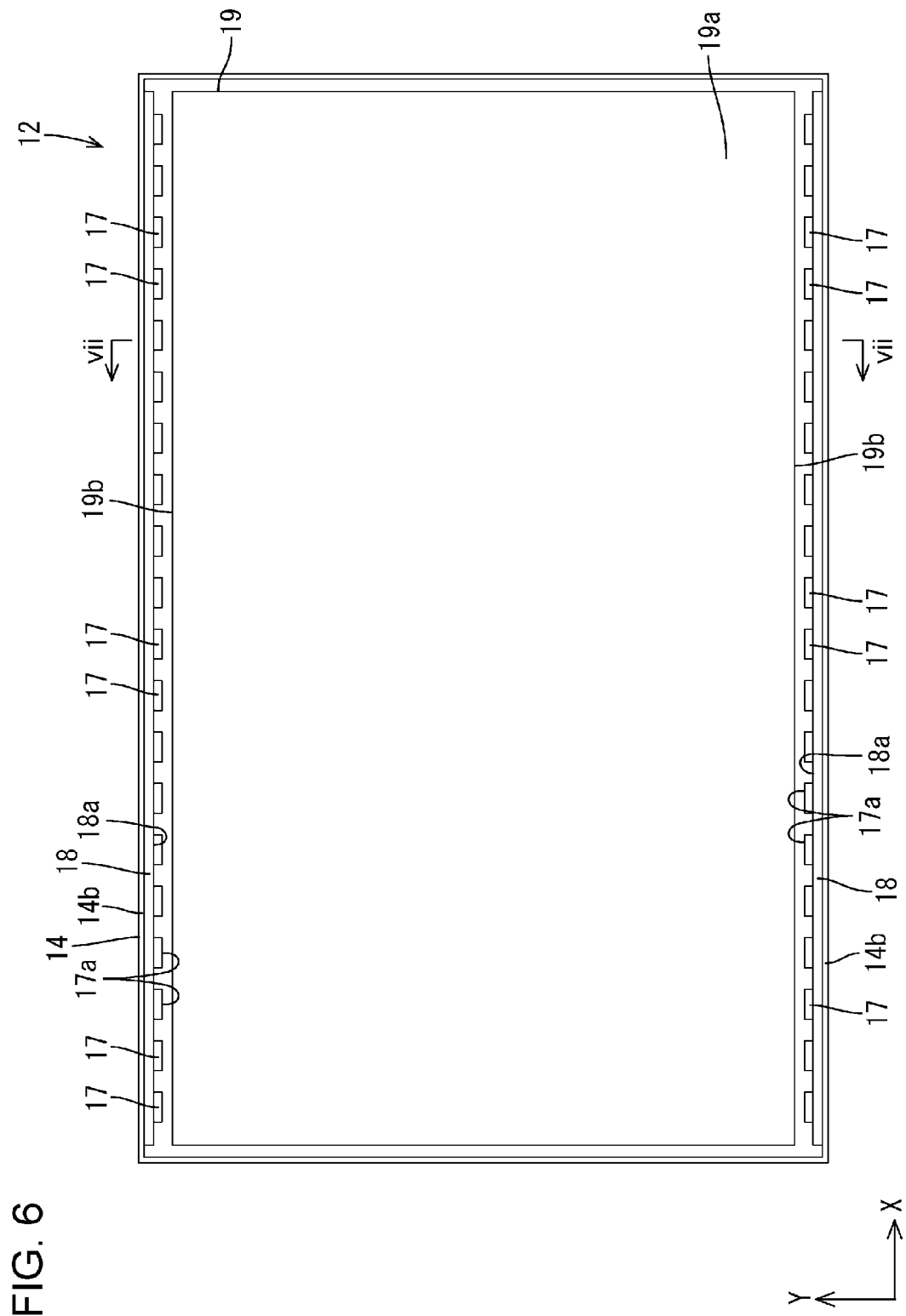
FIG. 6 is a plan view illustrating a configuration in which a chassis, a light guide plate, and an LED substrate are arranged in a backlight device included in the liquid crystal display device.
Figure 7:
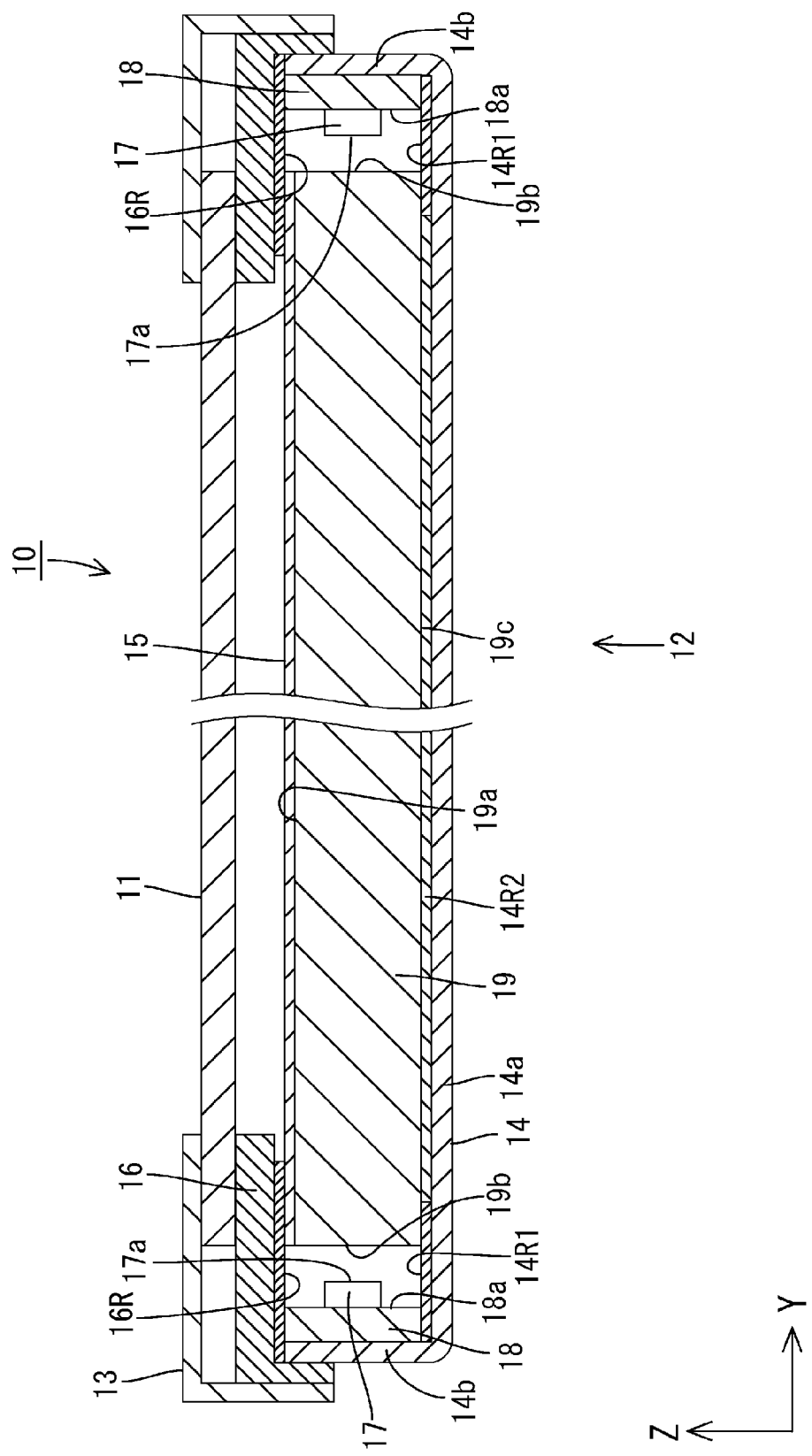
FIG. 7 is a sectional view taken along a line vii-vii in FIG. 6.

The chassis 14 is formed of a metal plate such as an aluminum plate or an electrogalvanized steel plate (SECC) and, as illustrated in FIG. 2, FIG. 6, and FIG. 7, is formed of a bottom plate 14a having a horizontally long square-like shape like the liquid crystal panel 11 and a side plate 14b standing from the outer end of each edge (a pair of long edges and a pair of short edges) of the bottom plate 14a to the front side. The direction of the long edge of the chassis 14 (bottom plate 14a) matches the direction of the X axis, and the direction of the short edge thereof matches the direction of the Y axis. Substrates such as the control substrate not illustrated and an LED driving circuit substrate are attached to the rear side of the bottom plate 14a. The frame 16 and the bezel 13 can be screwed to the side plate 14b.

The optical member 15, as illustrated in FIG. 2, has a horizontally long square-like shape like the liquid crystal panel 11 and the chassis 14 when viewed in plan. The optical member 15 is disposed on the front side (light emission side) of the light guide plate 19 and is interposed between the liquid crystal panel 11 and the light guide plate 19 and thereby transmits emitted light from the light guide plate 19, imparts a prescribed optical effect to transmitted light, and emits the transmitted light to the liquid crystal panel 11. The optical member 15 is formed of a plurality (three in the present embodiment) of alternately stacked sheet-shaped members. Specific types of the optical member (optical sheet) 15 include, for example, a diffusion sheet, a lens sheet, and a reflective polarizing sheet, and one of these can be appropriately selected and used. For convenience, the three sheets of the optical members 15 are illustrated in a simplified manner as one sheet in FIG. 7.

The frame 16, as illustrated in FIG. 2, is formed in a frame shape (surround shape) that extends along the peripheral portion of the light guide plate 19 and can push the peripheral portion of the light guide plate 19 on almost the whole periphery from the front side. The frame 16 is made of a synthetic resin and has a front surface formed to be, for example, black and thereby has a light blocking ability. A frame side reflective sheet 16R that reflects light is attached to the rear side surface of the frame 16, that is, the surface of the frame 16 that faces the light guide plate 19 and the LED substrate 18 (LED 17), in both long edge parts of the frame 16 as illustrated in FIG. 7. The frame side reflective sheet 16R has a size that extends over almost the full length of the long edge part of the frame 16. The frame side reflective sheet 16R directly abuts an end portion of the light guide plate 19 that faces the LED 17, and covers the end portion of the light guide plate 19 and the LED substrate 18 at the same time from the front side. The frame 16 can receive the peripheral end portion of the liquid crystal panel 11 from the rear side.

Figure 8:
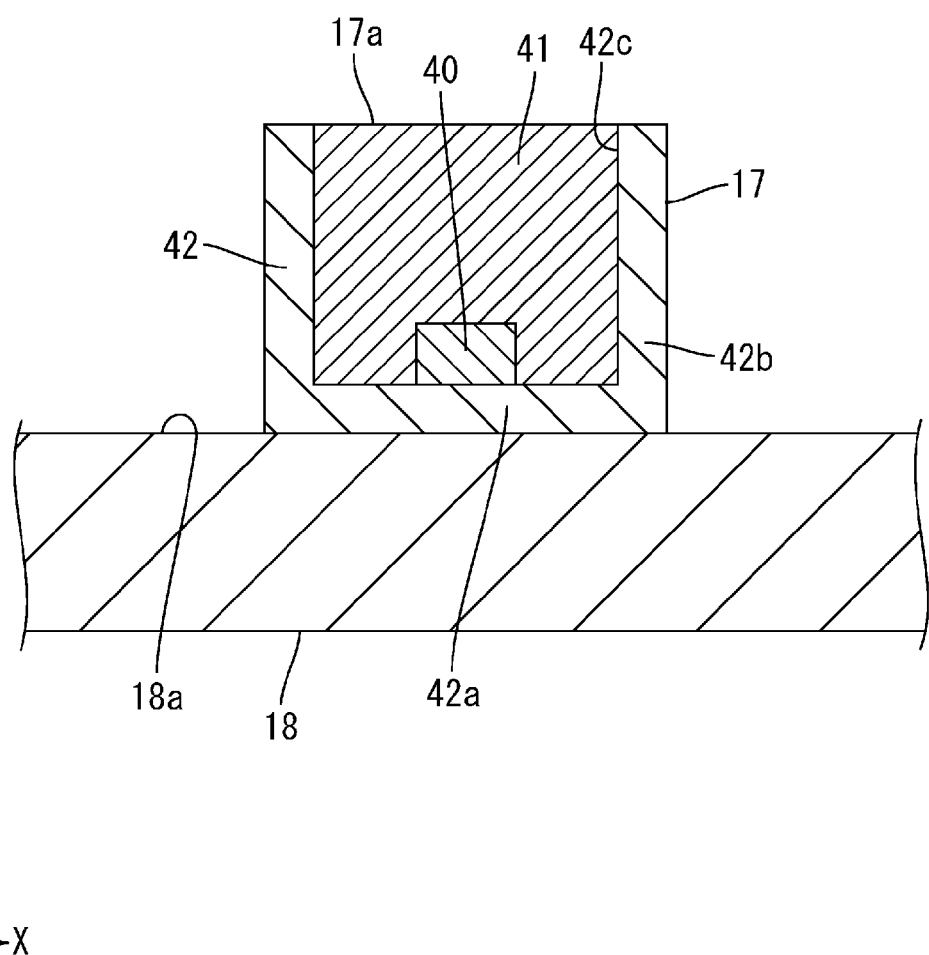
FIG. 8 is a sectional view of an LED and the LED substrate.

The LED 17, as illustrated in FIG. 2 and FIG. 7, is surface-mounted on the LED substrate 18 and is a so-called top surface light emission type LED of which a light emitting surface 17a is directed to the opposite side from the LED substrate 18. Specifically, the LED 17 includes, as illustrated in FIG. 8, a blue LED element (a blue light emitting element or a blue LED chip) 40 that is a light emission source, a sealant (light transmitting resin material) 41 that seals the blue LED element 40, and a case (an accommodator or a casing) 42 that accommodates the blue LED element 40 and is filled with the sealant 41. Hereinafter, constituent components of the LED 17 will be described in order in detail with reference to FIG. 8.

The blue LED element 40 is, for example, a semiconductor formed of a semiconductor material such as InGaN and emits blue light having a wavelength included in a blue wavelength range (approximately 420 nm to approximately 500 nm) when a voltage is applied thereto in the forward direction. The blue LED element 40 is connected by a lead frame not illustrated to an interconnect pattern in the LED substrate 18 that is arranged outside of the case 42. The internal space of the case 42 in which the blue LED element 40 is accommodated is filled with the sealant 41 in manufacturing processes for the LED 17, and thereby the sealant 41 is intended to seal and protect the blue LED element 40 and the lead frame. The sealant 41 is formed by blending prescribed proportions of a green phosphor and a red phosphor, both not illustrated, by dispersion in an almost transparent thermosetting resin material (for example, an epoxy resin material or a silicone resin material). The green phosphor is excited by blue light emitted from the blue LED element 40 and thereby emits green light of a wavelength included in a green wavelength range (approximately 500 nm to approximately 570 nm). The red phosphor is excited by blue light emitted from the blue LED element 40 and thereby emits red light of a wavelength included in a red wavelength range (approximately 600 nm to approximately 780 nm). Therefore, the emitted light of the LED 17 is formed of blue light (blue component light) emitted from the blue LED element 40, green light (green component light) emitted from the green phosphor, and red light (red component light) emitted from the red phosphor and as a whole exhibits approximate white. That is, the LED 17 emits white light. Yellow light is obtained by combination of the green light emitted from the green phosphor with the red light emitted from the red phosphor. Thus, the LED 17 is said to have blue component light from the LED chip and yellow component light. The chromaticity of the LED 17 is changed according to, for example, the absolute values or the relative values of the contents of the green phosphor and the red phosphor, and thus appropriately adjusting the contents of the green phosphor and the red phosphor allows the chromaticity of the LED 17 to be adjusted. Details and the like of the light emission spectrum of each of the blue LED element 40, the green phosphor, and the red phosphor will be described in detail later.

The case 42 is formed of a synthetic resin material (for example, a polyamide-based resin material) or a ceramic material of which the front surface exhibits white which is excellent for light reflectivity. The case 42 as a whole has an approximate box shape that includes an opening portion 42c on the light emission side (the light emitting surface 17a side or the opposite side from the LED substrate 18) and generally includes a bottom wall portion 42a extending along a mount surface of the LED substrate 18 and a side wall portion 42b standing from the periphery of the bottom wall portion 42a. While the bottom wall portion 42a has a square shape when viewed from the front (light emission side), the side wall portion 42b has a substantially square tubular shape along the periphery of the bottom wall portion 42a and has a square frame shape when viewed from the front. The blue LED element 40 is arranged on the inner surface (bottom surface) of the bottom wall portion 42a constituting the case 42. The lead frame passes through the side wall portion 42b. While an end portion of the lead frame arranged in the case 42 is connected to the blue LED element 40, an end portion thereof that extends outside of the case 42 is connected to the interconnect pattern of the LED substrate 18.

As illustrated in FIG. 2, FIG. 6, and FIG. 7, the LED substrate 18 on which the LED 17 is mounted in a plurality of numbers has a longitudinal plate shape extending in the longitudinal direction of the chassis 14 (in the end portions of the liquid crystal panel 11 and the light guide plate 19 on the LED 17 side or in the direction of the X axis) and is accommodated in the chassis 14 at an orientation in which the plate surface of the LED substrate 18 is parallel to the direction of the X axis and the direction of the Z axis, that is, at an orientation in which the plate surface thereof is orthogonal with respect to the plate surfaces of the liquid crystal panel 11 and the light guide plate 19 (optical member 15). That is, the LED substrate 18 is at an orientation in which the direction of the long edge thereof and the direction of the short edge thereof in the plate surface thereof respectively match the direction of the X axis and the direction of the Z axis and in which, furthermore, the direction of the plate thickness thereof that is orthogonal with respect to the plate surface matches the direction of the Y axis. A pair of LED substrates 18 are arranged at positions between which the light guide plate 19 is interposed in the direction of the Y axis. Specifically, the LED substrates 18 are arranged to be interposed between the light guide plate 19 and each side plate 14b on the long edge side of the chassis 14 and are accommodated in the chassis 14 in the direction of the Z axis from the front side. Each of the LED substrates 18 is attached in such a manner that the plate surface thereof on the opposite side from the mount surface 18a on which the LED 17 is mounted is in contact with the inner surface of each side plate 14b on the long edge side of the chassis 14. Therefore, the light emitting surfaces 17a of each LED 17 mounted on each LED substrate 18 face each other, and the optical axis of each LED 17 almost matches the direction of the Y axis (a direction parallel to the plate surface of the liquid crystal panel 11).

The plate surface, among the plate surfaces of the LED substrate 18, that is directed toward the inner side faces a long edge side end surface of the light guide plate 19 (a light incident surface 19b described later) as illustrated in FIG. 2, FIG. 6, and FIG. 7, and a plurality (20 in FIG. 6) of the LEDs 17 are linearly arranged on the plate surface at intervals in the direction of the long edge of the LED substrate 18 (the direction of the long edges of the liquid crystal panel 11 and the light guide plate 19 or the direction of the X axis). Each of the LEDs 17 is surface-mounted on the plate surface of the LED substrate 18 that is directed toward the light guide plate 19 side (the surface of the LED substrate 18 that faces the light guide plate 19), and this plate surface is the mount surface 18a. An interconnect pattern (not illustrated) that extends in the direction of the X axis, connects the LEDs 17 that are adjacent horizontally across the group of the LEDs 17, and is formed of a metal film (copper foil or the like) that is formed on the mount surface 18a of the LED substrate 18, and an LED driving circuit substrate not illustrated is electrically connected through an interconnect member or the like (not illustrated) to a terminal unit that is formed in an end portion of the interconnect pattern, and thereby driving power can be supplied to each LED 17. The LED substrate 18 is a single-sided mount type of which only a single surface of the plate surfaces thereof is the mount surface 18a. The intervals between the adjacent LEDs 17 in the direction of the X axis, that is, the arrangement intervals (arrangement pitches) between the LEDs 17, are approximately equal to each other. The base material of the LED substrate 18 is made of metal such as aluminum, and the interconnect pattern (not illustrated) described above is formed on the front surface of the base material with an insulating layer interposed therebetween. An insulating material such as a synthetic resin or ceramic can be used as a material used in the base material of the LED substrate 18.

The light guide plate 19 is formed of a synthetic resin material (for example, an acrylic resin such as PMMA) that has a refractive index sufficiently higher than air and is almost transparent (excellent in light transmissivity). The light guide plate 19, as illustrated in FIG. 2 and FIG. 6, has a flat plate shape that is a horizontally long square-like shape like the liquid crystal panel 11 and the bottom plate 14a of the chassis 14 when viewed in plan, and thereby includes four end surfaces in the direction of the X axis and the direction of the Y axis and has a plate surface that faces and is parallel to the liquid crystal panel 11 and each plate surface of the optical member 15. The direction of the long edge of the light guide plate 19 in the plate surface thereof and the direction of the short edge thereof respectively match the direction of the X axis and the direction of the Y axis, and the direction of the plate thickness thereof that is orthogonal with respect to the plate surface (the normal direction of the plate surface) matches the direction of the Z axis. The light guide plate 19, as illustrated in FIG. 7, is arranged in a position immediately below the liquid crystal panel 11 and the optical member 15 in the chassis 14, and a pair of long edge side end surfaces of the peripheral end surfaces thereof face the LED substrates 18 arranged as a pair in both long edge side end portions of the chassis 14 and face each of the LEDs 17 mounted on the LED substrates 18. Therefore, while the direction in which the LED 17 (LED substrate 18) and the light guide plate 19 are lined up matches the direction of the Y axis, the direction in which the optical member 15 (liquid crystal panel 11) and the light guide plate 19 are lined up matches the direction of the Z axis, and both directions are orthogonal with respect to each other. The light guide plate 19 has a function of causing light that is emitted from the LED 17 in the direction of the Y axis to be introduced from the long edge side end surface thereof and causing the light to propagate in the light guide plate 19 and to be emitted from the plate surface thereof to the optical member 15 side (the front side or the light emission side).

The plate surface, of the plate surfaces of the light guide plate 19 having a flat plate shape, that is directed to the front side (the surface thereof facing the liquid crystal panel 11 and the optical member 15) is a light emitting surface 19a that emits light inside of the light guide plate 19 to the front side, that is, the optical member 15 side and the liquid crystal panel 11 side, as illustrated in FIG. 6 and FIG. 7. The pair of long edge side end surfaces, of the peripheral end surfaces adjacent to the plate surface of the light guide plate 19, that is longitudinal in the direction of the X axis (the direction in which the plurality of LEDs 17 is lined up or the direction of the long edge of the LED substrate 18) faces the LED 17 (LED substrate 18) with a prescribed space therebetween and is a pair of the light incident surfaces 19b on which light emitted from the LED 17 is incident. While the frame side reflective sheet 16R described above is arranged on the front side of the space retained between the LED 17 and the light incident surface 19b, a first chassis side reflective sheet 14R1 is arranged on the rear side of the space with the space interposed between the frame side reflective sheet 16R and the first chassis side reflective sheet 14R1. Both of the reflective sheets 14R1 and 16R are arranged in such a manner that the LED 17 side end portion of the light guide plate 19 and the LED 17 in addition to the space are interposed therebetween. Accordingly, repeatedly reflecting light from the LED 17 between both of the reflective sheets 14R1 and 16R allows efficient incidence of light on the light incident surface 19b. The light incident surface 19b is a surface parallel to the direction of the X axis and the direction of the Z axis and is a surface approximately orthogonal with respect to the light emitting surface 19a. The direction in which the LED 17 and the light incident surface 19b are lined up matches the direction of the Y axis and is parallel to the light emitting surface 19a.

As illustrated in FIG. 7, a second chassis side reflective sheet 14R2 that can reflect and direct light in the light guide plate 19 to the front side is disposed to cover the entirety of a plate surface 19c, of the plate surfaces of the light guide plate 19, that is on the opposite side from the light emitting surface 19a. In other words, the second chassis side reflective sheet 14R2 is arranged to be interposed between the bottom plate 14a of the chassis 14 and the light guide plate 19. A light reflecting unit (not illustrated) or the like that scatters and reflects light in the light guide plate 19 is patterned to have a prescribed in-plane distribution on at least one of the plate surface 19c on the opposite side of the light guide plate 19 from the light emitting surface 19a and the front surface of the second chassis side reflective sheet 14R2, and accordingly emitted light from the light emitting surface 19a is controlled to have a uniform in-plane distribution.

In the related art, yellow light from an illuminant is separated into green and red by a color correction film in order to improve color reproducibility related to an image displayed on a liquid crystal panel. However, the color correction film has a property of absorbing light from the illuminant in the entire visible light region, and thus the efficiency in use of light is degraded, and a decrease in luminance or an increase in power consumption may be caused. When, for example, the thickness of a color filter is increased to improve the color reproducibility, the light transmittance of the color filter is decreased, and consequently the efficiency in use of light is degraded. Particularly, the BT.2020 standard that defines a video format related to ultra-high definition television such as 4K television has been issued in recent years, and providing a liquid crystal display device that has very high color reproducibility to the extent satisfying the BT.2020 standard may significantly degrade the efficiency in use of light due to the above reasons.

Figure 9:
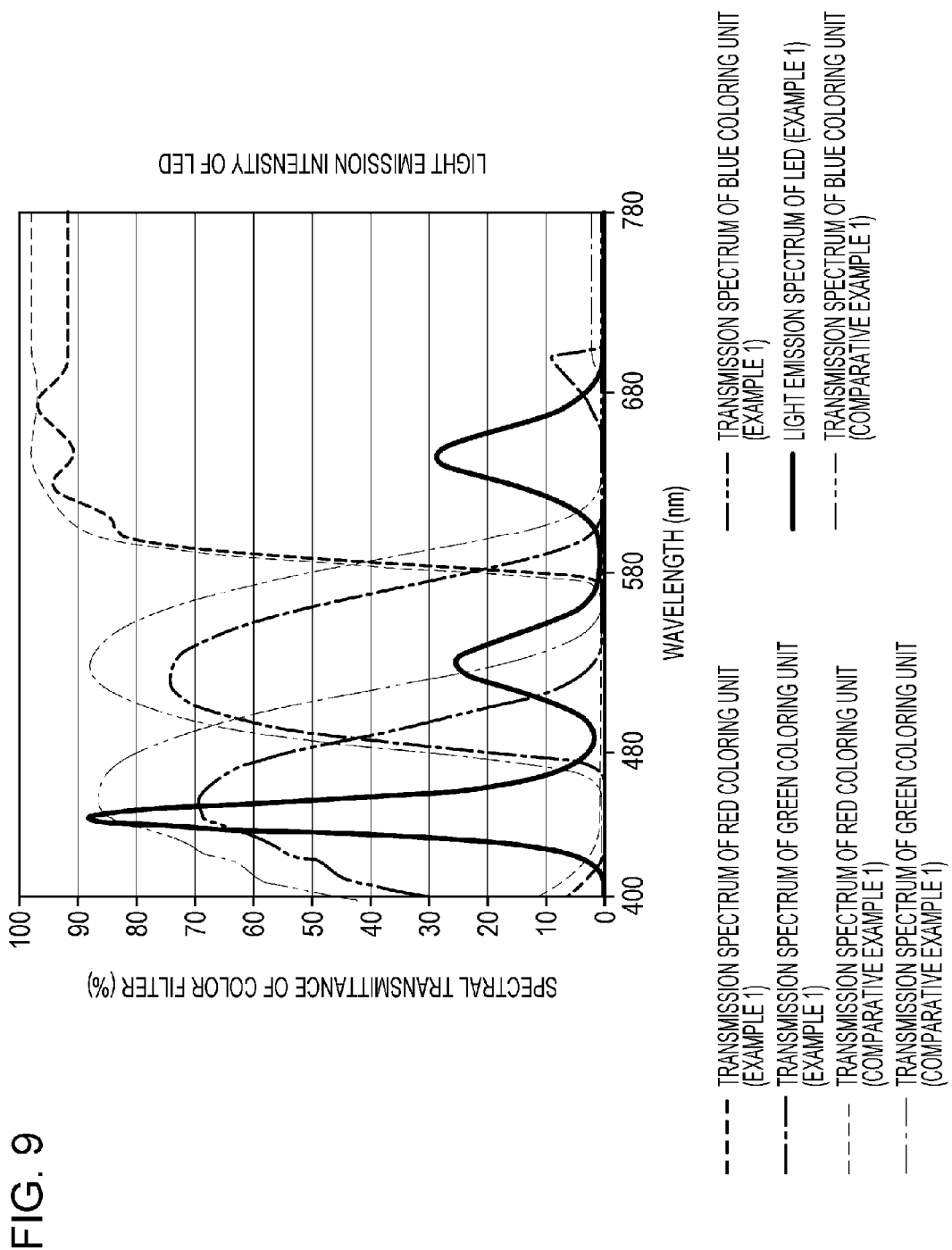
FIG. 9 is a graph illustrating a light emission spectrum of an LED according to Example 1 of Comparative experiment 1 and a transmission spectrum of each coloring unit of a color filter according to Example 1.
Figure 10:
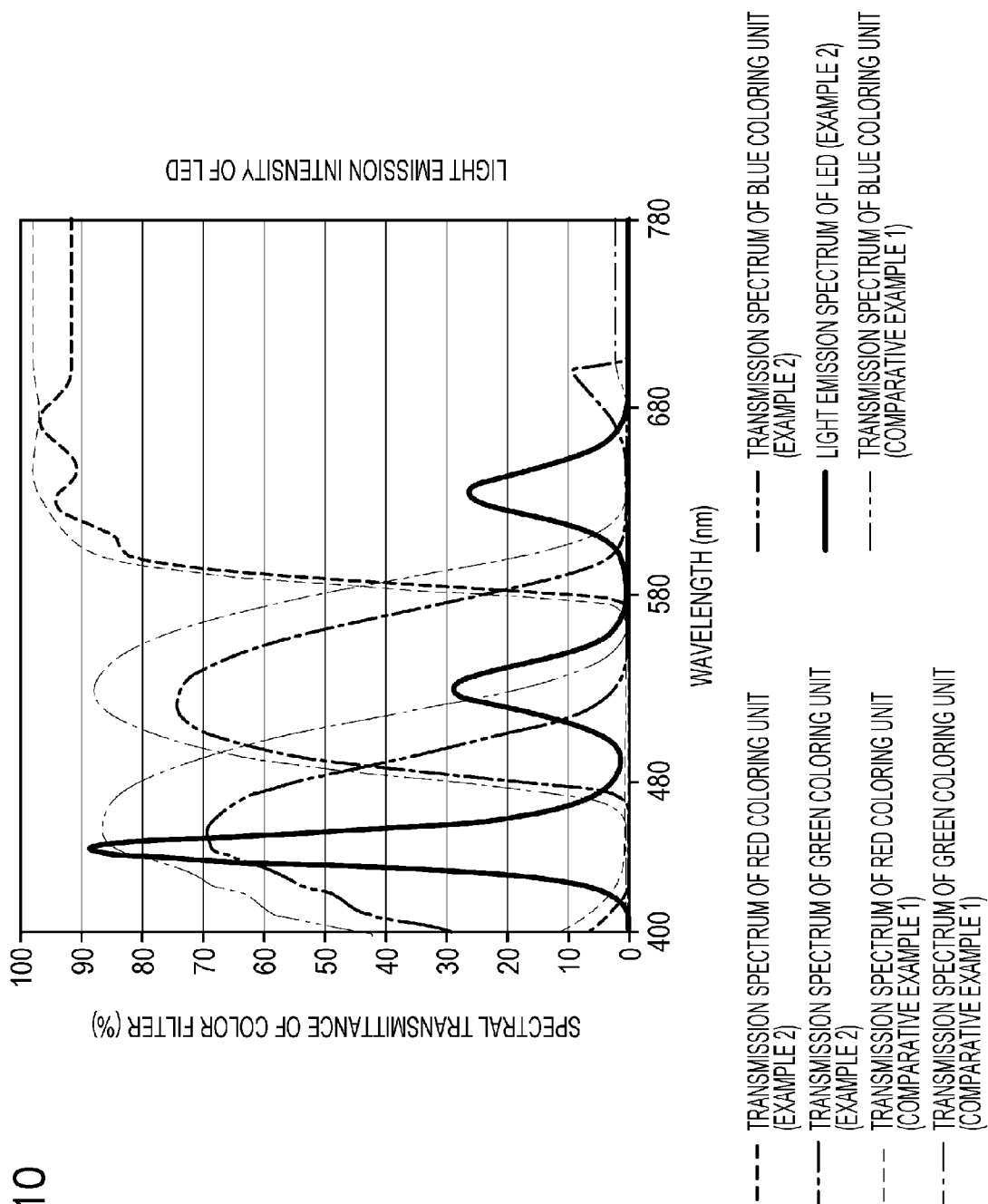
FIG. 10 is a graph illustrating a light emission spectrum of an LED according to Example 2 of Comparative experiment 1 and a transmission spectrum of each coloring unit of a color filter according to Example 2.

Therefore, the present embodiment sets each light emission spectrum of the blue LED element 40, the green phosphor, and the red phosphor included in the LED 17 and each transmission spectrum of the coloring units 29R, 29G, and 29B constituting the color filter 29 included in the liquid crystal panel 11 as follows. The LED 17 will be described first. The blue LED element 40 included in the LED 17 emits blue light of a light emission spectrum that includes a peak having a peak wavelength in a range of 440 nm±2 nm to 450 nm±2 nm and has a half value width (full width at half maximum) less than 25 nm as illustrated in FIG. 9 and FIG. 10. The green phosphor emits green light of a light emission spectrum that includes a peak having a peak wavelength in a range of 525 nm±2 nm to 540 nm±2 nm and has a half value width of less than 52 nm for the peak. The red phosphor emits red light of a light emission spectrum that includes a peak having a peak wavelength in a range of 620 nm±2 nm to 645 nm±2 nm and has a half value width of less than 40 nm for the peak. The expression "±2 nm" in above each peak wavelength represents the range of a shift in the peak wavelength caused by manufacturing error and the like, that is, a tolerance range. Numerical values of the half value width and the peak wavelength related to each light emission spectrum of the blue LED element 40, the green phosphor, and the red phosphor are measured by using, for example, "spectroradiometer SR-3 manufactured by Topcon" in the present embodiment.

Specifically, it is preferable that the blue LED element 40 included in the LED 17 has a peak wavelength of 444 nm±2 nm in the above wavelength range for a peak included in the light emission spectrum of the blue light and has a half value width of approximately 18 nm for the peak in the present embodiment. The blue light emitted from the blue LED element 40 has a sufficiently narrow half value width of the peak of the light emission spectrum, high color purity, and sufficiently high luminance, and thus the green phosphor and the red phosphor can be efficiently excited to emit green light and red light, and the color purity related to the blue light from the LED 17 is high. It is preferable that the green phosphor has a peak wavelength of 530 nm±2 nm in the above wavelength range for a peak included in the light emission spectrum of the green light and has a half value width of less than 40 nm for the peak. Particularly, the half value width of the peak included in the light emission spectrum of the green light is preferably in a range of 30 nm to 36 nm in the present embodiment, and the half value width of the peak is further preferably 30 nm. It is preferable that the red phosphor has a peak wavelength of 635 nm±2 nm to 645 nm±2 nm in the above wavelength range for a peak included in the light emission spectrum of the red light and has a half value width in a range of 30 nm to 36 nm for the peak. Particularly, it is more preferable that the peak wavelength of the peak included in the light emission spectrum of the red light is 635 nm±2 nm and that the half value width of the peak is 30 nm in the present embodiment. The half value width of a main peak included in the light emission spectrum of the red light of the red phosphor has approximately the same value as the half value width of the peak included in the light emission spectrum of the red light of the green phosphor. Such a configuration allows the green light emitted from the green phosphor to have sufficiently high color purity and allows the red light emitted from the red phosphor to have sufficiently high color purity.

The "peak" of the light emission spectrum referred hereto is a mountain-shaped part of the light emission spectrum, and the "peak wavelength" is the wavelength at the vertex of the mountain-shaped part. FIG. 9 and FIG. 10 represent the light emission spectrum of the LED 17 and the spectral transmittance of the color filter 29. The spectral transmittance of the color filter 29 is obtained by transmitting white light from a prescribed standard illuminant (for example, illuminant D65 (0.3157, 0.3290), illuminant A (0.4476, 0.4074), illuminant B (0.3484, 0.3516), or illuminant C (0.3101, 0.3161)) through the color filter 29. The horizontal axes in FIG. 9 and FIG. 10 denote wavelengths (unit: nm). The vertical axes in FIG. 9 and FIG. 10 has two types of units. The left side of the drawings illustrates "spectral transmittance (unit: %)" as a unit corresponding to the transmission spectrum of each of the coloring units 29R, 29G, and 29B constituting the color filter 29, and the right side of the drawings illustrate "light emission intensity (unitless)" as a unit corresponding to the light emission spectrum of the LED 17 described later.

Next, the green phosphor and the red phosphor will be described in order in detail. Each of the green phosphor and the red phosphor is formed of a quantum dot phosphor. A quantum dot phosphor has electrons and electron holes or excitons confined omnidirectionally in a three-dimensional space in a nanosize (for example, a diameter of approximately 2 to 10 nm) semiconductor crystal and thereby has discrete energy levels. The peak wavelength of emitted light (color of emitted light) and the like can be freely selected by changing the size of a dot of the quantum dot phosphor. The quantum dot phosphor has an excellent quantum efficiency. The green phosphor and the red phosphor formed of the quantum dot phosphor have steep peaks and narrow half value widths in the light emission spectra of the green light and the red light which are emitted light, and thus the green light and the red light have very high color purity and wide gamuts. Materials for the quantum dot phosphor include a material obtained by combining Zn, Cd, Hg, Pb, or the like that becomes a divalent cation with O, S, Se, Te, or the like that becomes a divalent anion (cadmium selenide (CdSe), zinc sulphide (ZnS), or the like), a material obtained by combining Ga, In, or the like that becomes a trivalent cation with P, As, Sb, or the like that becomes a trivalent anion (indium phosphide (InP), gallium arsenide (GaAs), or the like), and furthermore a chalcopyrite compound (CuInSe2 or the like) and the like. CdSe of the above materials is used as the material of the quantum dot phosphor in the present embodiment.

Next, each transmission spectrum of the coloring units 29R, 29G, and 29B of each color constituting the color filter 29 included in the liquid crystal panel 11 that displays an image by using light from the LED 17 having the above configuration will be described. Numerical values such as the half value width, the peak wavelength, and the half value of the peak related to each transmission spectrum of the coloring units 29R, 29G, and 29B are measured by using, for example, "spectroradiometer SR-3 manufactured by Topcon" in the present embodiment. The blue coloring unit 29B that exhibits blue selectively transmits light in the blue wavelength range (approximately 420 nm to approximately 500 nm), that is, blue light, as illustrated in FIG. 9 and FIG. 10 and is formed to have a peak wavelength in a range of 440 nm to 461.5 nm for a peak included in the transmission spectrum thereof and a half value width of less than 100 nm for the peak. Specifically, it is preferable that the blue coloring unit 29B is formed to have a transmission spectrum that includes a peak having a peak wavelength in a range of 451 nm to 461.5 nm and has a half value width in a range of 61 nm to 99 nm for the peak. Particularly, it is preferable that the transmission spectrum of the blue coloring unit 29B has a peak wavelength of approximately 451 nm for a peak and a half value width in a range of 91 nm to 92 nm for the peak in the present embodiment. That is, since the peak of the light emission spectrum of the blue LED element 40 is included in almost the entirety of the transmission spectrum related to the blue coloring unit 29B, blue light of high color purity in the light emitted from the LED 17 is efficiently transmitted through the blue coloring unit 29B. Accordingly, the efficiency in use related to the blue light from the LED 17 can be maintained higher, and the blue gamut in the chromaticity region related to the emitted light of the liquid crystal panel 11 is widened, and thus more excellent color reproducibility is achieved. The "peak" of the transmission spectrum referred hereto is a mountain-shaped part of the transmission spectrum, and the "peak wavelength" is the wavelength at the vertex of the mountain-shaped part.

The green coloring unit 29G that exhibits green selectively transmits light in the green wavelength range (approximately 500 nm to approximately 570 nm), that is, green light, as illustrated in FIG. 9 and FIG. 10 and is formed to have a peak wavelength in a range of 510 nm to 533.5 nm for a peak included in the transmission spectrum thereof and a half value width of less than 90 nm for the peak. Specifically, it is preferable that the green coloring unit 29G is formed to have a transmission spectrum that includes a peak having a peak wavelength in a range of 521 nm to 533.5 nm and has a half value width in a range of 63 nm to 87 nm for the peak. Particularly, it is preferable that the transmission spectrum of the green coloring unit 29G has a peak wavelength of approximately 521 nm for a peak and a half value width of approximately 85 nm for the peak in the present embodiment. That is, since the peak of the light emission spectrum of the green phosphor is included in almost the entirety of the transmission spectrum related to the green coloring unit 29G, green light of high color purity in the light emitted from the LED 17 is efficiently transmitted through the green coloring unit 29G. Accordingly, the efficiency in use related to the green light from the LED 17 can be maintained higher, and the green gamut in the chromaticity region related to the emitted light of the liquid crystal panel 11 is widened, and thus more excellent color reproducibility is achieved.

The red coloring unit 29R that exhibits red selectively transmits light in the red wavelength range (approximately 600 nm to approximately 780 nm), that is, red light, as illustrated in FIG. 9 and FIG. 10 and is formed to have a wavelength of greater than or equal to 580 nm for the half value of a peak included in the transmission spectrum thereof. The "wavelength for the half value of a peak" is a wavelength for the half value of the value (maximum value) of the spectral transmittance in the peak wavelength of the transmission spectrum. Specifically, it is preferable that the red coloring unit 29R is formed to have a transmission spectrum that has a wavelength in a range of 588 nm to 604 nm for the half value of the peak. Particularly, it is preferable that the transmission spectrum of the red coloring unit 29R has a peak wavelength in a range of 672 nm to 674 nm for a peak and a wavelength of approximately 588 nm for the half value of the peak in the present embodiment. That is, since the peak of the light emission spectrum of the red phosphor is included in almost the entirety of the transmission spectrum related to the red coloring unit 29R, red light of high color purity in the light emitted from the LED 17 is efficiently transmitted through the red coloring unit 29R. Accordingly, the efficiency in use related to the red light from the LED 17 can be maintained higher, and the red gamut in the chromaticity region related to the emitted light of the liquid crystal panel 11 is widened, and thus more excellent color reproducibility is achieved.

According to the description heretofore, each of the green and red gamuts is expanded in the chromaticity region related to the emitted light of the liquid crystal panel 11 that is obtained by transmitting the light from the LED 17 through the coloring units 29R, 29G, and 29B of each color constituting the color filter 29 of the liquid crystal panel 11. Thus, the color reproducibility related to an image displayed on the liquid crystal panel 11 is improved. Therefore, according to the present embodiment, color reproducibility can be improved without a deterioration in the efficiency in use of light, compared with improving color reproducibility by using a color correction film as in the related art or by increasing the thickness of a color filter.

Comparative experiment 1 below is performed in order to obtain information related to the luminance of emitted light and color reproducibility resulting from the above configurations of the LED 17 and the color filter 29. In Comparative experiment 1, the liquid crystal display device 10 that includes the backlight device 12 including the LED 17 described before the present paragraph and includes the liquid crystal panel 11 including the color filter 29 corresponds to Examples 1 and 2, and a liquid crystal display device in which each phosphor included in an LED of a backlight device and a color filter of a liquid crystal panel are changed from Examples 1 and 2 corresponds to Comparative example 1, and a liquid crystal display device in which a color filter of a liquid crystal panel is changed while the same backlight device as Comparative example 1 is used corresponds to Comparative example 2. Numerical values such as the half value width and the peak wavelength related to each light emission spectrum of the blue LED element, the green phosphor, and the red phosphor and numerical values such as the half value width, the peak wavelength, and the wavelength for the half value of a peak related to each transmission spectrum of the coloring units are measured by using, for example, "spectroradiometer SR-3 manufactured by Topcon" in Comparative experiment 1. Specifically, the liquid crystal display device 10 according to Example 1 is the same as described before the present paragraph. As illustrated in FIG. 9 and FIG. 13, the blue LED element 40 included in the LED 17 of the backlight device 12 has a peak wavelength of 444 nm±2 nm for a peak included in the light emission spectrum thereof and a half value width of approximately 18 nm for the peak. While the green phosphor (CdSe) that is a quantum dot phosphor has a peak wavelength of 530 nm±2 nm for a peak included in the light emission spectrum thereof and a half value width of approximately 36 nm for the peak, the red phosphor (CdSe) that is a quantum dot phosphor has a peak wavelength of 645 nm±2 nm for a peak included in the light emission spectrum thereof and a half value width of approximately 36 nm for the peak. The color filter 29 of the liquid crystal panel 11 included in the liquid crystal display device 10 according to Example 1 has a peak wavelength of approximately 451 nm for a peak included in the transmission spectrum of the blue coloring unit 29B and a half value width of approximately 92 nm for the peak, has a peak wavelength of approximately 521 nm for a peak included in the transmission spectrum of the green coloring unit 29G and a half value width of approximately 85 nm for the peak, and has a peak wavelength of approximately 672 nm for a peak included in the transmission spectrum of the red coloring unit 29R and a wavelength of approximately 588 nm for the half value of the peak.

The liquid crystal display device 10 according to Example 2 is the same as described before the present paragraph as illustrated in FIG. 10 and FIG. 13. The blue LED element 40 included in the LED 17 has a peak wavelength of 444 nm±2 nm for a peak included in the light emission spectrum thereof and a half value width of approximately 18 nm for the peak. While the green phosphor (CdSe) that is a quantum dot phosphor has a peak wavelength of 530 nm±2 nm for a peak included in the light emission spectrum thereof and a half value width of approximately 30 nm for the peak, the red phosphor (CdSe) that is a quantum dot phosphor has a peak wavelength of 635 nm±2 nm for a peak included in the light emission spectrum thereof and a half value width of approximately 30 nm for the peak. That is, in Example 2, the half value width of the peak of each light emission spectrum of the green phosphor and the red phosphor is narrower than the half value width of Example 1 by 6 nm, and the peak wavelength of the light emission spectrum of the red phosphor is shifted to the short wavelength side by approximately 10 nm compared with Example 1. The color filter 29 of the liquid crystal panel 11 included in the liquid crystal display device 10 according to Example 2 has a peak wavelength of approximately 451 nm for a peak included in the transmission spectrum of the blue coloring unit 29B and a half value width of approximately 91 nm for the peak, has a peak wavelength of approximately 521 nm for a peak included in the transmission spectrum of the green coloring unit 29G and a half value width of approximately 85 nm for the peak, and has a peak wavelength of approximately 674 nm for a peak included in the transmission spectrum of the red coloring unit 29R and a wavelength of approximately 588 nm for the half value of the peak. Each of the coloring units 29R, 29G and 29B constituting the color filter 29 according to Example 2 is formed of the same material as described in Example 1.

Figure 11:
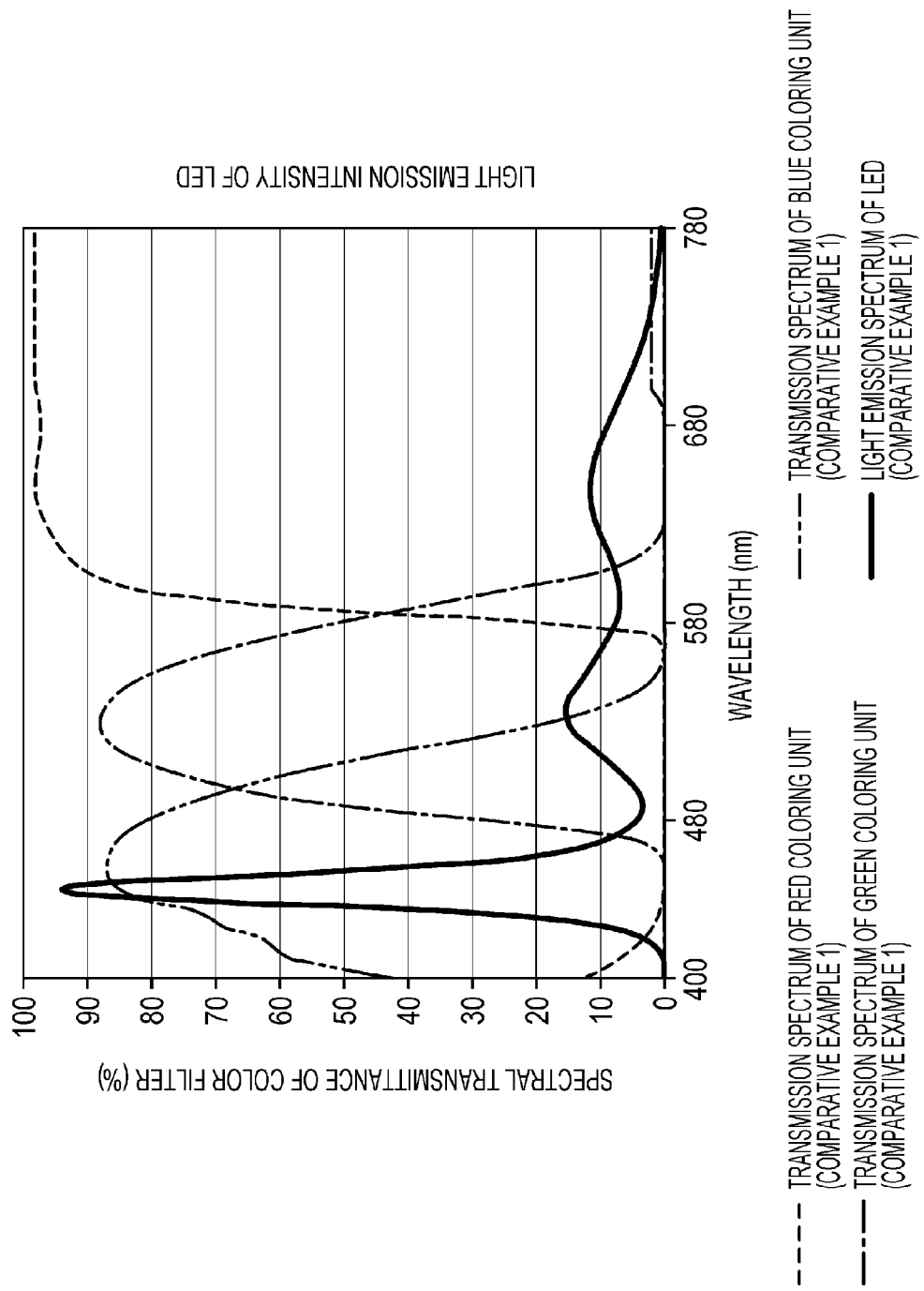
FIG. 11 is a graph illustrating a light emission spectrum of an LED according to Comparative example 1 of Comparative experiment 1 and a transmission spectrum of each coloring unit of a color filter according to Comparative example 1.

The liquid crystal display device according to Comparative example 1 is such that, as illustrated in FIG. 11 and FIG. 13, the blue LED element included in the LED of the backlight device has a peak wavelength of 444 nm±2 nm for a peak included in the light emission spectrum thereof and a half value width of approximately 18 nm for the peak, the green phosphor is formed of two types of β-SiAlON (first green phosphor) having a light emission spectrum with a peak wavelength of 540 nm±2 nm and β-SiAlON (second green phosphor) having a light emission spectrum with a peak wavelength of 522 nm±2 nm, and the red phosphor is formed of $CaAlSiN_3$:Eu that is one type of CASN-based phosphor having a light emission spectrum with a peak wavelength of 650 nm±2 nm. The color filter of the liquid crystal panel included in the liquid crystal display device according to Comparative example 1 has a peak wavelength of approximately 455 nm for a peak included in the transmission spectrum of the blue coloring unit and a half value width of approximately 113 nm for the peak, has a peak wavelength of approximately 530 nm for a peak included in the transmission spectrum of the green coloring unit and a half value width of approximately 100 nm for the peak, and has a peak wavelength of approximately 646 nm for a peak included in the transmission spectrum of the red coloring unit and a wavelength of approximately 586 nm for the half value of the peak. Each coloring unit constituting the color filter according to Comparative example 1 is formed of a different material (the blend proportion of a pigment or a dye, the material of a pigment or a dye, the material of a binder, or the like) from the materials described in Examples 1 and 2. Other configurations included in the liquid crystal display device according to Comparative example 1 except for the LED and the color filter are the same as those of the liquid crystal display device 10 according to Examples 1 and 2.

Figure 12:
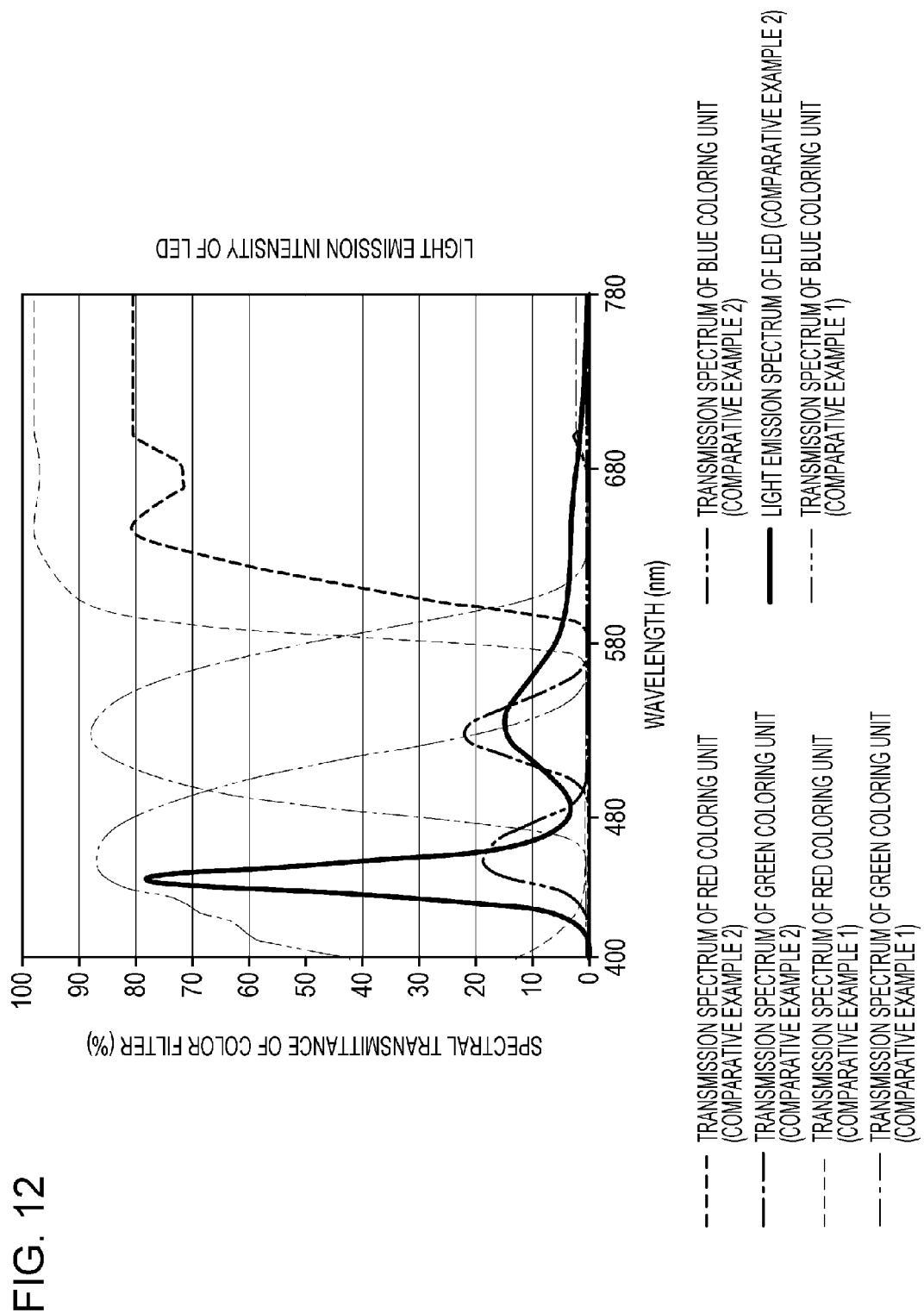
FIG. 12 is a graph illustrating a light emission spectrum of an LED according to Comparative example 2 of Comparative experiment 1 and a transmission spectrum of each coloring unit of a color filter according to Comparative example 2.

The liquid crystal display device according to Comparative example 2 includes the same LED as Comparative example 1 as illustrated in FIG. 12 and FIG. 13. The color filter of the liquid crystal panel has a peak wavelength of approximately 455 nm for a peak included in the transmission spectrum of the blue coloring unit and a half value width of approximately 36 nm for the peak, has a peak wavelength of approximately 530 nm for a peak included in the transmission spectrum of the green coloring unit and a half value width of approximately 36 nm for the peak, and has a peak wavelength of approximately 645 nm for a peak included in the transmission spectrum of the red coloring unit and a wavelength of approximately 612 nm for the half value of the peak. The color filter according to Comparative example 2 has a greater thickness for each coloring unit of three colors than Examples 1 and 2 and Comparative example 1, and specifically the thickness is approximately 11.9 (a relative value when the thickness of each coloring unit of the color filter of the liquid crystal display device according to Examples 1 and 2 and Comparative example 1 is set to one) (refer to the fields of "R thickness ratio", "G thickness ratio", and "B thickness ratio" in FIG. 13). Thus, the transmission spectrum of each coloring unit of the color filter according to Comparative example 2 has a narrower half value width for each peak than Examples 1 and 2 and Comparative example 1 as described above. Each coloring unit constituting the color filter according to Comparative example 2 is formed of the same material as described in Comparative example 1. Other configurations included in the liquid crystal display device according to Comparative example 2 except for the color filter are the same as those of the liquid crystal display device according to Comparative example 1. FIG. 11 represents the light emission spectrum of the LED of Comparative example 1 and the spectral transmittance of the color filter of Comparative example 1, and FIG. 12 represents the light emission spectrum of the LED of Comparative example 2 and the spectral transmittance of the color filter of Comparative example 2. The horizontal axes and the horizontal axes in FIG. 11 and FIG. 12 are the same as those in FIG. 9 and FIG. 10. The spectral transmittance of the color filter of Comparative example 1 is illustrated by a thin line (dot-dashed line) in FIG. 9, FIG. 10, and FIG. 12 for reference.

Figure 14:
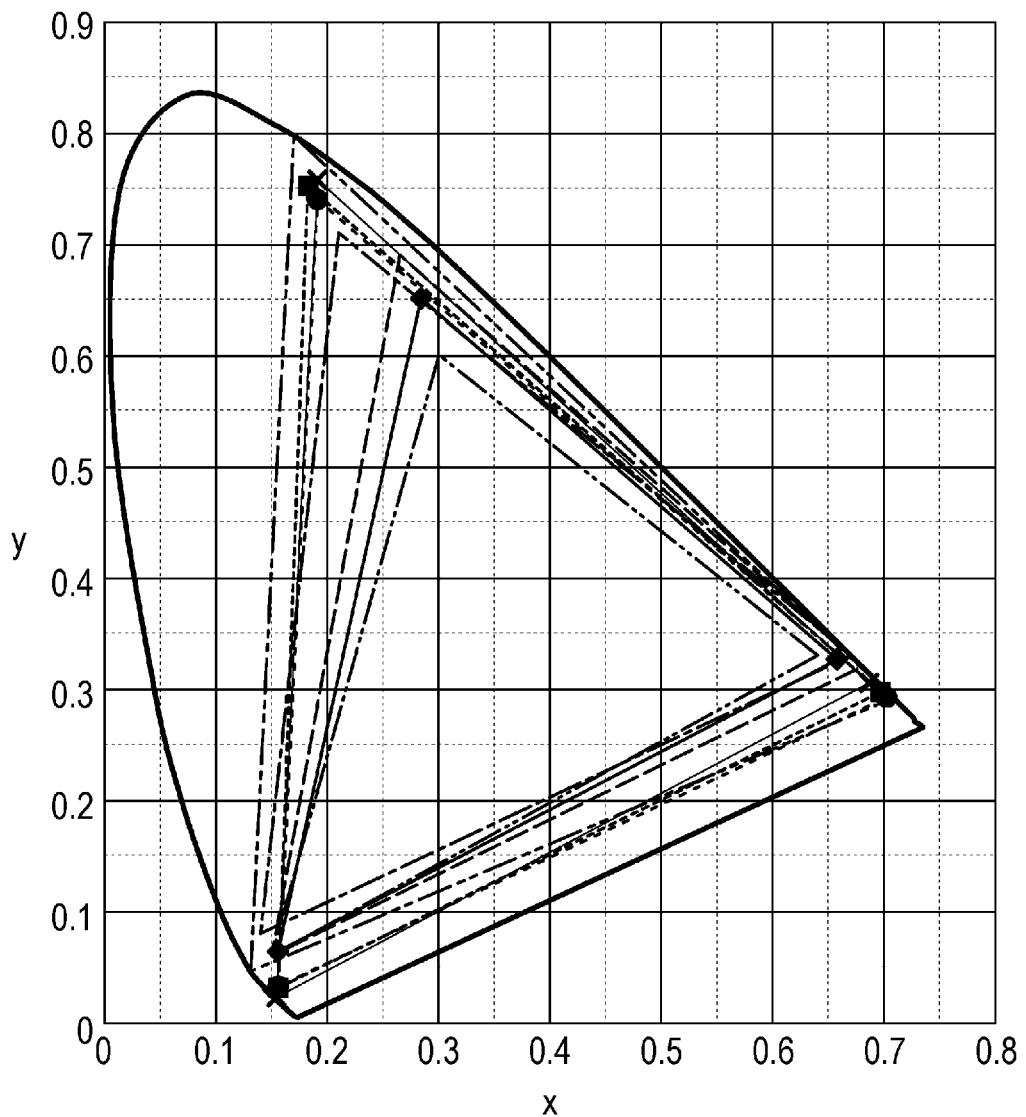
FIG. 14 is a CIE 1931 chromaticity diagram illustrating chromaticity regions in Examples 1 and 2 and Comparative examples 1 and 2 of Comparative experiment 1 and chromaticity regions of each standard (each chromaticity coordinate in the table of FIG. 13).
Figure 15:
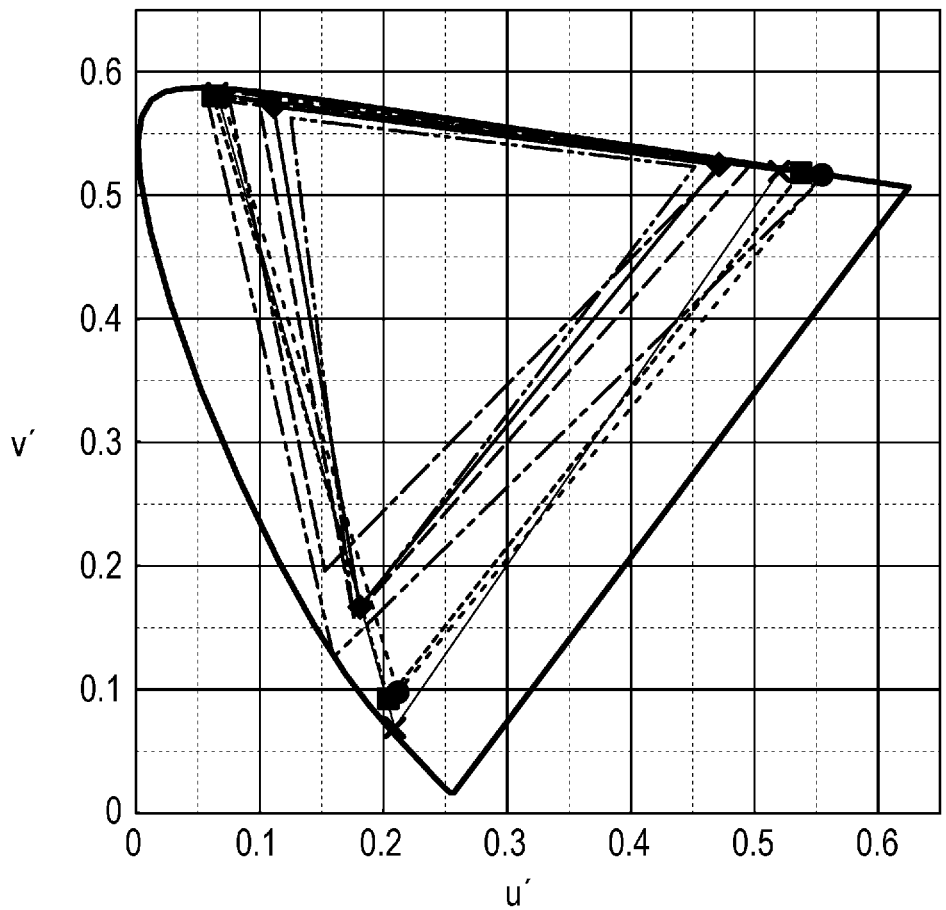
FIG. 15 is a CIE 1976 chromaticity diagram illustrating chromaticity regions in Examples 1 and 2 and Comparative examples 1 and 2 of Comparative experiment 1 and chromaticity regions of each standard (each chromaticity coordinate in the table of FIG. 13).

In Comparative experiment 1, the chromaticity of the LED, the luminance ratio of emitted light (white light) from the liquid crystal panel, and each chromaticity of the emitted light are measured for each liquid crystal display device according to Examples 1 and 2 and Comparative examples 1 and 2 having the above configurations, and the NTSC percentage, the BT.709 percentage, the DCI percentage, and the BT.2020 percentage of the chromaticity region related to the emitted light are calculated. The results are illustrated in FIG. 13 to FIG. 15. FIG. 14 and FIG. 15 represent chromaticity regions according to each standard described in detail later and the chromaticity region of emitted light from the liquid crystal panel of the liquid crystal display device according to Examples 1 and 2 and Comparative examples 1 and 2.

The chromaticity of the LED is obtained by measuring the light emitted from the LED with, for example, a spectrocolorimeter. The luminance ratio of the emitted light from the liquid crystal panel is a relative value that is obtained by measuring the luminance value of each liquid crystal display device according to Examples 1 and 2 and Comparative examples 1 and 2 in a state where white is displayed for the highest luminance of the liquid crystal panel, and by using the luminance value in Comparative example 1 as a reference (100%). The chromaticity of the emitted light from the liquid crystal panel is obtained by measuring, with a spectrocolorimeter or the like, light that is transmitted through the color filter in each of a state where white is displayed on the liquid crystal panel, a state where primary red is displayed on the liquid crystal panel, a state where primary green is displayed, and a state where primary blue is displayed. The NTSC percentage, the BT.709 percentage, the DCI percentage, and the BT.2020 percentage in the chromaticity region related to the emitted light from the liquid crystal panel are the ratio of the area of the chromaticity region related to the emitted light of the liquid crystal panel to each standard for each liquid crystal display device according to Examples 1 and 2 and Comparative examples 1 and 2. The chromaticity region related to the emitted light of the liquid crystal panel is a triangular region with each chromaticity as a vertex that is represented by measuring the chromaticity when primary red is displayed on the liquid crystal panel (red chromaticity or the point of primary red), the chromaticity when primary green is displayed (green chromaticity or the point of primary green), and the chromaticity when primary blue is displayed (blue chromaticity or the point of primary blue) and plotting each chromaticity on each chromaticity diagram.

FIG. 14 is a Commission Internationale de l'Eclairage (CIE; International Commission on Illumination) 1931 chromaticity diagram of which the horizontal axis denotes x values and the vertical axis denotes y values. FIG. 15 is a CIE 1976 chromaticity diagram of which the horizontal axis denotes u' values and the vertical axis denotes v' values. The x values and the y values in FIG. 13 and FIG. 14 are the values of chromaticity coordinates in the CIE 1931 chromaticity diagram illustrated in FIG. 14. The u' values and the v' values in FIG. 13 and FIG. 15 are the values of chromaticity coordinates in the CIE 1976 chromaticity diagram illustrated in FIG. 15. X values, Y values, and Z values in FIG. 13 are tristimulus values in the XYZ color model, and particularly the Y values are used as an index of brightness, that is, luminance. The luminance ratio of the emitted light in the present embodiment is calculated on the basis of the Y value of the "chromaticity of the emitted light when white is displayed". The x value and the y value can be represented by using the X value, the Y value, and the Z value as in Equation (1) and Equation (2) below. Similarly, the u' value and the v' value can be represented by using the X value, the Y value, and the Z value as in Equation (3) and Equation (4) below.

[Math. 1]

$$x = X/(X+Y+Z) \quad (1)$$

[Math. 2]

$$y = Y/(X+Y+Z) \quad (2)$$

[Math. 3]

$$u' = 4X/(X+15Y+3Z) \quad (3)$$

[Math. 4]

$$v' = 9Y/(X+15Y+3Z) \quad (4)$$

The NTSC percentage is the ratio of the area of the chromaticity region when the area of the NTSC chromaticity region according to the National Television System Committee (NTSC) standard is used as a reference (100%). The BT.709 percentage is the ratio of the area of the chromaticity region when the area of the BT.709 chromaticity region according to the BT.709 standard established by International Telecommunication Union Radiocommunications Sector (ITU-R) is used as a reference (100%). The DCI percentage is the ratio of the area of the chromaticity region when the area of the DCI chromaticity region according to the Digital Cinema Initiative (DCI) standard is used as a reference (100%). The BT.2020 percentage is the ratio of the area of the chromaticity region when the area of the BT.2020 chromaticity region according to the BT.2020 standard established by International Telecommunication Union Radiocommunications Sector (ITU-R) is used as a reference (100%). The BT.2020 standard defines a video format related to ultra-high definition television such as 4K television, has the widest reproducible color range of the other standards, and is issued most recently (issued in August 2012). FIG. 14 and FIG. 15 illustrate the BT.709 chromaticity region with a thin double-dot chain line, the NTSC chromaticity region with a dot-dashed line, the DCI chromaticity region with a broken line, and the BT.2020 chromaticity region with a bold double-dot chain line. In addition, each chromaticity according to Example 1 is illustrated as a plotted circle, and the chromaticity region according to Example 1 is illustrated by a broken line having a wide interval between line segments. Each chromaticity according to Example 2 is illustrated as a plotted quadrangle, and the chromaticity region according to Example 2 is illustrated by a broken line having a narrow interval between line segments. Each chromaticity according to Comparative example 1 is illustrated as a plotted rhombus, and the chromaticity region according to Comparative example 1 is illustrated by a bold solid line. Each chromaticity according to Comparative example 2 is illustrated as a plotted "x", and the chromaticity region according to Comparative example 2 is illustrated by a thin solid line.

Next, the experiment result of Comparative experiment 1 will be described. First, the NTSC percentage, the BT.709 percentage, the DCI percentage, and the BT.2020 percentage related to the chromaticity region of the emitted light of the liquid crystal panel have the lowest values in Comparative example 1 as illustrated in FIG. 13 to FIG. 15, have approximately the same values in Comparative example 2 and Examples 1 and 2, and have higher values in Comparative example 2 and Examples 1 and 2 than in Comparative example 1. Particularly, the BT.2020 percentage of the CIE 1976 chromaticity diagram is "100%" in both of Comparative example 2 and Example 2 and is "101%" in Example 1. That is, Comparative example 2, Example 2, and Example 1 are said to have the same reproducible color range as the BT.2020 chromaticity region according to the BT.2020 standard (refer to the second field "BT.2020 percentage: CIE 1976 chromaticity diagram" from the top of FIG. 13 for details). The reason considered is that the color purity of light transmitted through each coloring unit is improved in Comparative example 2 by significantly increasing the thickness of each coloring unit of the color filter from that of Comparative example 1 and Example 1 and thereby absorbing, with each coloring unit, a larger amount of light causing a decrease in the color purity of each color. Meanwhile, Examples 1 and 2 are the same as Comparative example 1 with respect to the thickness of each of the coloring units 29R, 29G, and 29B of the color filter 29 but are different from Comparative example 1 in that both the green phosphor and the red phosphor included in the LED 17 are formed of quantum dot phosphors and that the color purity of the light emitted from each phosphor is higher. In addition, the transmission spectrum related to each of the coloring units 29R, 29G, and 29B of the color filter 29 is optimized for the LED 17. Specifically, while almost the entirety of the light emission spectrum of the green phosphor of the LED 17 according to Examples 1 and 2 is included in the transmission spectrum of the green coloring unit 29G as illustrated in FIG. 9, the overlapping area between the light emission spectrum of the green phosphor and the transmission spectrum of the red coloring unit 29R is smaller than that in Comparative example 1 (refer to FIG. 11). Accordingly, the green light of high color purity emitted from the green phosphor is efficiently transmitted through the green coloring unit 29G but is barely transmitted through the red coloring unit 29R and is efficiently absorbed by the red coloring unit 29R. Thus, the green chromaticity of the emitted light of the liquid crystal panel 11 has very high color purity, and the green gamut is expanded. In addition, while almost the entirety of the light emission spectrum of the red phosphor of the LED 17 according to Examples 1 and 2 is included in the transmission spectrum of the red coloring unit 29R, the overlapping area between the light emission spectrum of the red phosphor and the transmission spectrum of the green coloring unit 29G is smaller than that in Comparative example 1 (refer to FIG. 11). Accordingly, the red light of high color purity emitted from the red phosphor is efficiently transmitted through the red coloring unit 29R but is barely transmitted through the green coloring unit 29G and is efficiently absorbed by the green coloring unit 29G. Thus, the red chromaticity of the emitted light of the liquid crystal panel 11 has very high color purity, and the red gamut is expanded. In addition, the transmission spectra of the coloring units 29R, 29G, and 29B of the color filter 29 respectively include the light emission spectra related to blue light, green light, and red light from the LED 17, and the half value width of the peak of each transmission spectrum is narrower than that of Comparative example 1. Accordingly, each color light of high color purity emitted from the LED 17 is transmitted through each of the coloring units 29R, 29G, and 29B, and thus further high color purity and a wide reproducible color range of the emitted light are achieved. As described heretofore, the emitted light of the liquid crystal panel 11 according to Examples 1 and 2 has high color reproducibility since the green and red gamuts are expanded as illustrated in FIG. 14 and FIG. 15, and has the same chromaticity region as Comparative example 2 and thus can achieve 100% of the BT.2020 percentage of the CIE 1976 chromaticity diagram.

The luminance of the emitted light of the liquid crystal panel is significantly decreased to "17%" in Comparative example 2 from the reference "100%" of Comparative example 1 but is, though decreased, "58%" in Example 1 and "66%" in Example 2 as illustrated in FIG. 13, and a decrease in the luminance is reduced in Examples 1 and 2 compared with Comparative example 2 (refer to the uppermost field "luminance ratio of emitted light" in FIG. 13 for details). The reason considered is that since the thickness of each coloring unit of the color filter is increased 11.9 times in Comparative example 2 compared with Comparative example 1 and Example 1, a very large amount of light is absorbed when light is transmitted through each coloring unit, and thus the efficiency in use of light is significantly decreased, and consequently the luminance of the emitted light of the liquid crystal panel is significantly decreased. This is also apparent from FIG. 12 in that the light emission spectrum related to each color light of the LED protrudes outside of the transmission spectrum related to each coloring unit of the color filter and that light in the protruding part is not used as the emitted light. The thickness of each of the coloring units 29R, 29G, and 29B of the color filter 29 is sufficiently small in Examples 1 and 2 compared with Comparative example 2, and the half value width of each transmission spectrum related to the coloring units 29R, 29G, and 29B is sufficiently wide in Examples 1 and 2 compared with Comparative example 2. This is also apparent from FIG. 9 and FIG. 10 in that almost the entirety of the light emission spectrum related to each color light of the LED 17 falls inside of the transmission spectrum related to each of the coloring units 29R, 29G, and 29B of the color filter 29 and that a very small amount of light has a wavelength that is not used as the emitted light. As described heretofore, according to the liquid crystal display device 10 according to Examples 1 and 2, color reproducibility can be improved with reduction of a decrease in the luminance of emitted light. When Example 1 and Example 2 are compared, the luminance ratio of Example 2 (66%) is relatively higher than the luminance ratio of Example 1 (58%). The reason is that the peak wavelength of the red phosphor of the LED 17 according to Example 2 (635 nm±2 nm) is shifted to the short wavelength side compared with the peak wavelength of the red phosphor of the LED 17 according to Example 1 (645 nm±2 nm) and is a wavelength closer to the peak visibility of 555 nm. That is, even if the intensity of light (radiant flux) in which visibility is not considered is the same, luminance in which visibility is considered is high if the wavelength of the light is close to the peak visibility. Therefore, Example 2 has higher luminance than Example 1. As described heretofore, Example 2 can achieve the same high color reproducibility as Comparative example 2 and Example 1 and, in addition, has a decrease in luminance that is more favorably reduced than Example 1. The reason why the blend proportion of the red phosphor in Example 1 is greater than the blend proportion of the red phosphor in Example 2 is to compensate for the insufficient luminance of red light. However, the magnitude of the blend proportion is restricted due to reasons such as restricting the total content of phosphor and maintaining the white balance, and the insufficient luminance of red light in Example 1 is not resolved.

The liquid crystal display device (display device) 10 of the present embodiment described heretofore includes the backlight device (illumination device) 12 and the liquid crystal panel (display panel) 11. The backlight device 12 includes the LED (illuminant) 17, and the LED 17 emits blue light of a light emission spectrum that includes a peak having a peak wavelength in a range of 440 nm±2 nm to 450 nm±2 nm and has a half value width of less than 25 nm for the peak, green light of a light emission spectrum that includes a peak having a peak wavelength in a range of 525 nm±2 nm to 540 nm±2 nm and has a half value width of less than 52 nm for the peak, and red light of a light emission spectrum that includes a peak having a peak wavelength in a range of 620 nm±2 nm to 645 nm±2 nm and has a half value width of less than 40 nm for the peak. The liquid crystal panel 11 includes the color filter 29 and performs display by using light from the backlight device 12. The color filter 29 includes at least the blue coloring unit 29B, the green coloring unit 29G, and the red coloring unit 29R. The blue coloring unit 29B exhibits blue and has a transmission spectrum that includes a peak having a peak wavelength in a range of 440 nm to 461.5 nm and has a half value width of less than 100 nm for the peak. The green coloring unit 29G exhibits green and has a transmission spectrum that includes a peak having a peak wavelength in a range of 510 nm to 533.5 nm and has a half value width of less than 90 nm for the peak. The red coloring unit 29R exhibits red and has a transmission spectrum that has a wavelength of greater than or equal to 580 nm for the half value of a peak.

Accordingly, if light emitted from the LED 17 included in the backlight device 12 is supplied to the liquid crystal panel 11, the light is transmitted through the color filter 29, which is included in the liquid crystal panel 11 and is formed of each of the coloring units 29R, 29G, and 29B exhibiting at least blue, green, and red, and is emitted from the liquid crystal panel 11, and thereby an image is displayed on the liquid crystal panel 11. The LED 17 included in the backlight device 12 emits each of blue light, green light, and red light, and thereby emitted light as a whole exhibits approximate white.

The blue light emitted from the LED 17 has a light emission spectrum that includes a peak having a peak wavelength in a range of 440 nm±2 nm to 450 nm±2 nm and has a half value width of less than 25 nm for the peak. The green light emitted from the LED 17 has a light emission spectrum that includes a peak having a peak wavelength in a range of 525 nm±2 nm to 540 nm±2 nm and has a half value width of less than 52 nm for the peak. The red light emitted from the LED 17 has a light emission spectrum that includes a peak having a peak wavelength in a range of 620 nm±2 nm to 645 nm±2 nm and has a half value width of less than 40 nm for the peak. Thus, the color purity of each color light is sufficiently high. Particularly, the peak wavelength of the light emission spectrum of the blue light is set to be greater than or equal to the lower limit value of the above numerical value range (440 nm±2 nm), and thus the peak wavelength is closer to the peak visibility of 555 nm compared with a case where the peak wavelength is on the shorter wavelength side, and sufficient brightness is obtained for the blue light. In addition, the peak wavelength of the light emission spectrum of the blue light is set to be less than or equal to the upper limit value of the above numerical value range (450 nm±2 nm), and thus avoided is hue shifting to green compared with a case where the peak wavelength is on the longer wavelength side. The peak wavelength of the light emission spectrum of the green light is set to be greater than or equal to the lower limit value of the above numerical value range (525 nm±2 nm), and thus avoided is hue shifting to blue compared with a case where the peak wavelength is on the shorter wavelength side, and the peak wavelength is closer to the peak visibility of 555 nm. Thus, sufficient brightness is obtained for the green light. In addition, the peak wavelength of the light emission spectrum of the green light is set to be less than or equal to the upper limit value of the above numerical value range (540 nm±2 nm), and thus avoided is hue shifting to yellow compared with a case where the peak wavelength is on the longer wavelength side. Furthermore, the peak wavelength of the light emission spectrum of the red light is set to be greater than or equal to the lower limit value of the above numerical value range (620 nm±2 nm), and thus avoided is hue shifting to yellow compared with a case where the peak wavelength is on the shorter wavelength side. Furthermore, the peak wavelength of the light emission spectrum of the red light is set to be less than or equal to the upper limit value of the above numerical value range (645 nm±2 nm), and thus the peak wavelength is closer to the peak visibility of 555 nm compared with a case where the peak wavelength is on the longer wavelength side, and sufficient brightness is obtained for the red light.

The blue coloring unit 29B included in the color filter 29 included in the liquid crystal panel 11 has a transmission spectrum that includes a peak having a peak wavelength in a range of 440 nm to 461.5 nm and has a half value width of less than 100 nm for the peak. The green coloring unit 29G has a transmission spectrum that includes a peak having a peak wavelength in a range of 510 nm to 533.5 nm and has a half value width of less than 90 nm for the peak. The red coloring unit 29R has a transmission spectrum that has a wavelength of greater than or equal to 580 nm for the half value of a peak. Thus, each color light emitted from the LED 17 is efficiently transmitted by each of the coloring units 29R, 29G, and 29B. Accordingly, each of the blue, green, and red gamuts is favorably expanded in the chromaticity region related to the emitted light of the liquid crystal panel 11 that is obtained by transmitting each color light from the LED 17 through the coloring units 29R, 29G, and 29B of each color constituting the color filter 29. Thus, the color reproducibility related to an image displayed on the liquid crystal panel 11 is improved. Therefore, color reproducibility can be improved with reduction of a decrease in luminance compared with improving color reproducibility by using a color correction film as in the related art or by increasing the thickness of the color filter 29. According to the description heretofore, the chromaticity region of the emitted light of the liquid crystal panel 11 can have at least the same or greater area (100% or greater than 100% in the area ratio) than the BT.2020 chromaticity region according to the BT.2020 standard in the CIE 1976 chromaticity diagram, and high color reproducibility can be achieved.

The LED 17 emits green light having a light emission spectrum that includes a peak having a peak wavelength of 530 nm±2 nm and has a half value width of less than 40 nm for the peak. The blue coloring unit 29B has a transmission spectrum that includes a peak having a peak wavelength in a range of 451 nm to 461.5 nm and has a half value width in a range of 61 nm to 99 nm for the peak. The green coloring unit 29G has a transmission spectrum that includes a peak having a peak wavelength in a range of 521 nm to 533.5 nm and has a half value width in a range of 63 nm to 87 nm for the peak. The red coloring unit 29R has a transmission spectrum that has a wavelength in a range of 588 nm to 604 nm for the half value of a peak. First, as the half value width of the peak is narrowed in the transmission spectrum of each of the coloring units 29R, 29G, and 29B, the color purity of the emitted light is easily increased, but the transmittance of each of the coloring units 29R, 29G, and 29B is decreased. Thus, the luminance of the emitted light tends to be easily decreased. From this point, the half value width of the peak in the transmission spectrum of each of the coloring units 29R, 29G, and 29B and the wavelength for the half value of the peak are set to values not residing below the lower limit value of each of the above numerical value ranges, and thereby luminance can be maintained to a certain level or higher with sufficient color reproducibility achieved. Particularly, setting the light emission spectra of the green light and the red light emitted from the LED 17 as described above can set the lower limit value of the numerical value range related to the half value width of the peak in the transmission spectrum of each of the coloring units 29R, 29G, and 29B to be sufficiently high as described above and can set the half value width to be sufficiently wide, and thus high luminance can be obtained. In a case where the half value width of the peak of the transmission spectrum of the green coloring unit 29G is narrowed, the transmission spectrum is shifted away from the light emission spectrum of the red light, and thus the light emission spectrum of the red light can be changed without a deterioration in color reproducibility in such a manner that the peak wavelength of the peak thereof is shifted to the short wavelength side. Then, the peak wavelength related to the red light approaches the peak visibility of 555 nm, and thus the luminance of the red light emitted from the LED 17 is improved, and the luminance of the entirety of the emitted light of the LED 17 is improved. Consequently, the emitted light obtained after being transmitted through each of the coloring units 29R, 29G, and 29B has higher luminance.

As the half value width of the peak is widened in the transmission spectrum of each of the coloring units 29R, 29G, and 29B, the transmittance of each of the coloring units 29R, 29G, and 29B is improved, and the luminance of the emitted light is easily increased, but the color purity of the emitted light tends to be easily decreased. Particularly, setting the light emission spectra of the green light and the red light emitted from the LED 17 as described above can set the upper limit value of the numerical value range related to the half value width of the peak in the transmission spectrum of each of the coloring units 29R, 29G, and 29B to be sufficiently high as described above and can set the half value width to be sufficiently wide, and thus high luminance can be obtained. In a case where the half value width of the peak of the transmission spectrum of the green coloring unit 29G is widened, the light emission spectrum of the red light of the LED 17 is prevented from overlapping with the transmission spectrum, and thus it is preferable that the light emission spectrum of the red light is changed in such a manner that the peak wavelength of the peak thereof is shifted to the long wavelength side. However, the peak wavelength related to the red light is then moved away from the peak visibility of 555 nm, and thus the luminance of the red light emitted from the LED 17 tends to be decreased. When the luminance of the red light is decreased, the luminance of the entirety of the emitted light of the LED 17 is decreased, and consequently the luminance of the emitted light obtained after being transmitted through each of the coloring units 29R, 29G, and 29B is decreased. From this point, the half value width of the peak in the transmission spectrum of each of the coloring units 29R, 29G, and 29B and the wavelength for the half value of the peak are set to values not residing above the upper limit value of each of the above numerical value ranges, and thereby the luminance of the emitted light can be maintained at a certain level or higher with sufficient color reproducibility secured, by reducing a decrease in the luminance of the red light of the LED 17.

The LED 17 emits green light having a light emission spectrum that has a half value width in a range of 30 nm to 36 nm for a peak, and red light having a light emission spectrum that includes a peak having a peak wavelength in a range of 635 nm±2 nm to 645 nm±2 nm and has a half value width in a range of 30 nm to 36 nm for the peak. The blue coloring unit 29B has a transmission spectrum that includes a peak having a peak wavelength of 451 nm and has a half value width in a range of 91 nm to 92 nm for the peak. The green coloring unit 29G has a transmission spectrum that includes a peak having a peak wavelength of 521 nm and has a half value width of 85 nm for the peak. The red coloring unit 29R has a transmission spectrum that has a wavelength of 588 nm for the half value of a peak. Accordingly, since each lower limit value of the half value width of the peak in the transmission spectrum of each of the coloring units 29R, 29G, and 29B and the wavelength for the half value of the peak is set to be sufficiently great, luminance can be set to be higher with sufficient color reproducibility secured. In addition, members related to the LED 17 can be more easily supplied, and the manufacturing cost related to the LED 17 can be further decreased, compared with a case where the half value widths of the peaks of the light emission spectra of the green light and the red light emitted from the LED 17 are set to be less than 30 nm.

The LED 17 includes at least the blue LED element (blue light emitting element) 40 that emits blue light, the green phosphor that is excited by the blue light from the blue LED element 40 and emits green light, and the red phosphor that is excited by the blue light from the blue LED element 40 and emits red light. Both of the green phosphor and the red phosphor are formed of quantum dot phosphors. Accordingly, the LED 17 emits light that includes the blue light emitted from the blue LED element 40, the green light excited by the blue light and emitted from the green phosphor, and the red light excited by the blue light and emitted from the red phosphor and as a whole exhibits approximate white. The green phosphor and the red phosphor are formed of quantum dot phosphors, and thus green light and red light having high color purity can be emitted, and in addition the fluorescence quantum yield (the ratio of the number of radiated photons to the number of absorbed photons) is high. Since the color purity of the emitted light of the quantum dot phosphor is high, sufficient color reproducibility can be secured even if the half value width of the peak of the transmission spectrum of each of the coloring units 29R, 29G, and 29B of the color filter 29 is widened, and thus luminance is favorably improved. In addition, since the fluorescence quantum yield of the quantum dot phosphor is high, luminance can be further improved.

The backlight device 12 includes the light guide plate 19 that includes the light incident surface 19b on an end surface thereof and the light emitting surface 19a on a plate surface thereof. The light incident surface 19b is arranged to face the LED 17, and light from the LED 17 is incident thereon. The light emitting surface 19a is arranged to face the plate surface of the liquid crystal panel 11 and emits light to the liquid crystal panel 11. Accordingly, light emitted from the LED 17 is incident on the light incident surface 19b included in the end surface of the light guide plate 19 and is propagated and diffused in the light guide plate 19 and then is emitted as light in a planar shape from the light emitting surface 19a included in the plate surface of the light guide plate 19, and the liquid crystal panel 11 is irradiated with the light. According to the backlight device 12 of an edge light type, the uniformity of luminance related to the emitted light can be sufficiently high with the number of installed LEDs 17 reduced in a case of using a plurality of the LEDs 17, compared with a downlight type.

The television reception device 10TV according to the present embodiment includes the liquid crystal display device 10 and the tuner (reception unit) 10T that can receive a television signal. According to the television reception device 10TV, a television image that has high luminance and is excellent in color reproducibility can be displayed.

Embodiment 2

Embodiment 2 of the present invention will be described with FIG. 16 to FIG. 20. A green phosphor and a red phosphor included in an LED that are changed are illustrated in Embodiment 2. Duplicate descriptions of the same structures, actions, and effects as Embodiment 1 will not be provided.

An LED according to the present embodiment is formed to include an oxynitride phosphor as a green phosphor and a complex fluoride phosphor as a red phosphor. The oxynitride phosphor constituting the green phosphor is formed of a sialon-based phosphor. The sialon-based phosphor is a substance obtained by replacing a part of silicon atoms of silicon nitride by aluminum atoms and replacing a part of nitrogen atoms by oxygen atoms, that is, oxynitride. The sialon-based phosphor that is oxynitride is excellent in the efficiency of light emission and is excellent in durability compared with other phosphors formed of, for example, sulphide and oxide. The expression "excellent in durability" referred hereto specifically means that, for example, a temporal decrease in luminance is unlikely to occur even in a case of exposure to excitation light having a high energy from an LED chip. In addition, the half value width of a peak included in the light emission spectrum thereof is sufficiently narrow, and thus green light having high color purity can be emitted. Rare earth elements (for example, Tb, Yg, and Ag) are used as an activator in the sialon-based phosphor. The sialon-based phosphor constituting the green phosphor according to the present embodiment is formed of β-SiAlON. β-SiAlON is one type of sialon-based phosphor and is a substance represented by the general formula $Si_{6-z}Al_zO_zN_{8-z}$ (z indicates the amount of a solid solution) or $(Si, Al)_6(O, N)_8$ in which aluminum and oxygen are included as a solute in a β type silicon nitride crystal. Europium (Eu), for example, that is one type of rare earth element is used as an activator in β-SiAlON according to the present embodiment. Accordingly, the half value width of a peak included in the light emission spectrum is further narrowed, and thus green light having high color purity can be emitted.

The complex fluoride phosphor constituting the red phosphor is represented by the general formula $A_2MF_6$ (M is one or more types selected from Si, Ti, Zr, Hf, Ge, and Sn, and A is one or more types selected from Li, Na, K, Rb, and Cs). The complex fluoride phosphor has a sufficiently narrow half value width for a main peak included in the light emission spectrum thereof and thus can emit red light having high color purity. In addition, the green light emitted from the green phosphor is unlikely to be absorbed, and thus the efficiency in use of the green light is maintained higher. The complex fluoride phosphor is formed of potassium silicofluoride ($K_2SiF_6$:Mn) in which manganese is used as an activator. Since expensive rare earth elements are not used in the potassium silicofluoride, the manufacturing cost related to the red phosphor and the LED is low. The potassium silicofluoride that is the complex fluoride phosphor has a characteristic light emission spectrum and has one main peak and one subpeak on each of the long wavelength side and the short wavelength side (a first subpeak and a second subpeak) as illustrated in FIG. 16 and FIG. 17.

Figure 16:
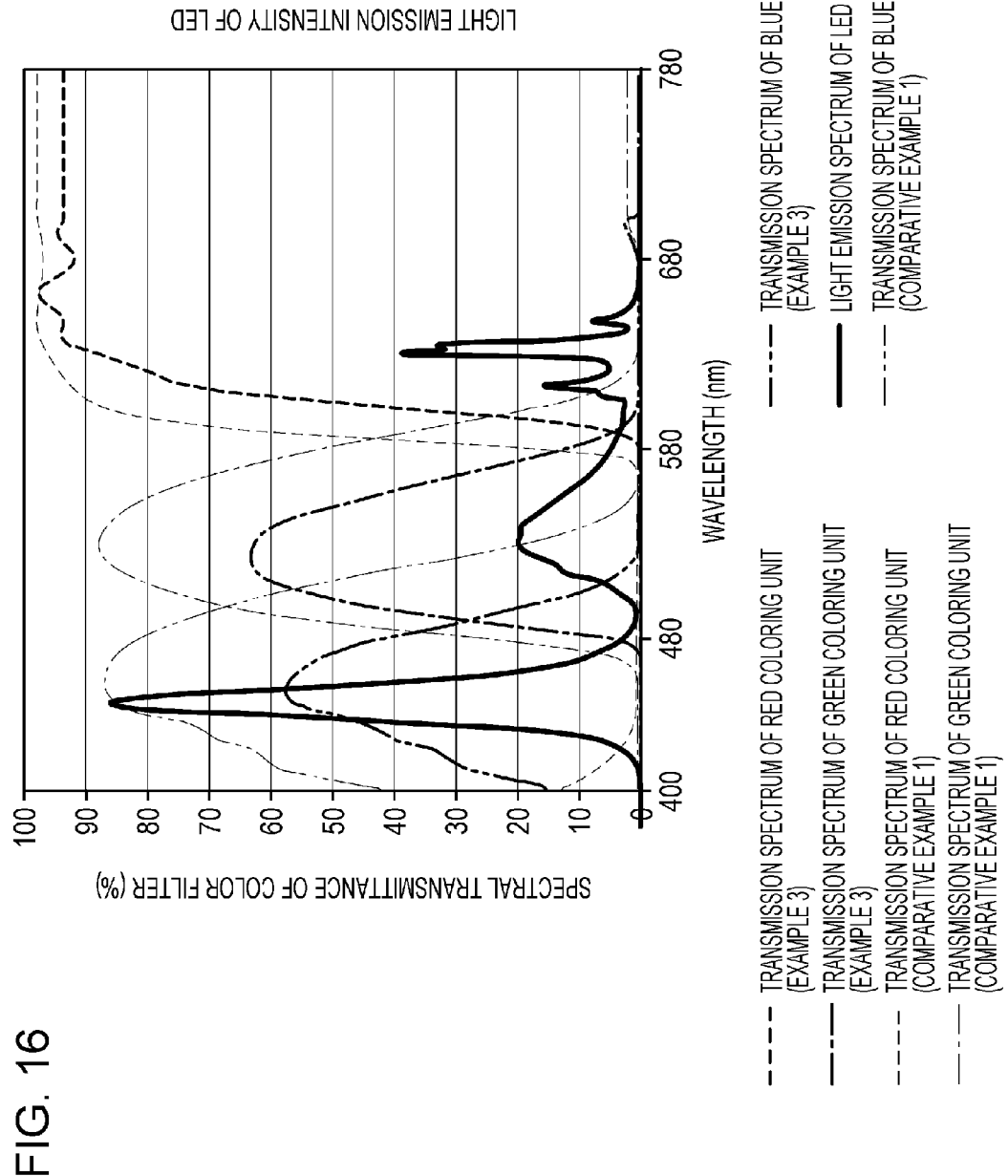
FIG. 16 is a graph illustrating a light emission spectrum of an LED according to Example 3 of Comparative experiment 2 according to Embodiment 2 of the present invention and a transmission spectrum of each coloring unit of a color filter according to Example 3.
Figure 17:
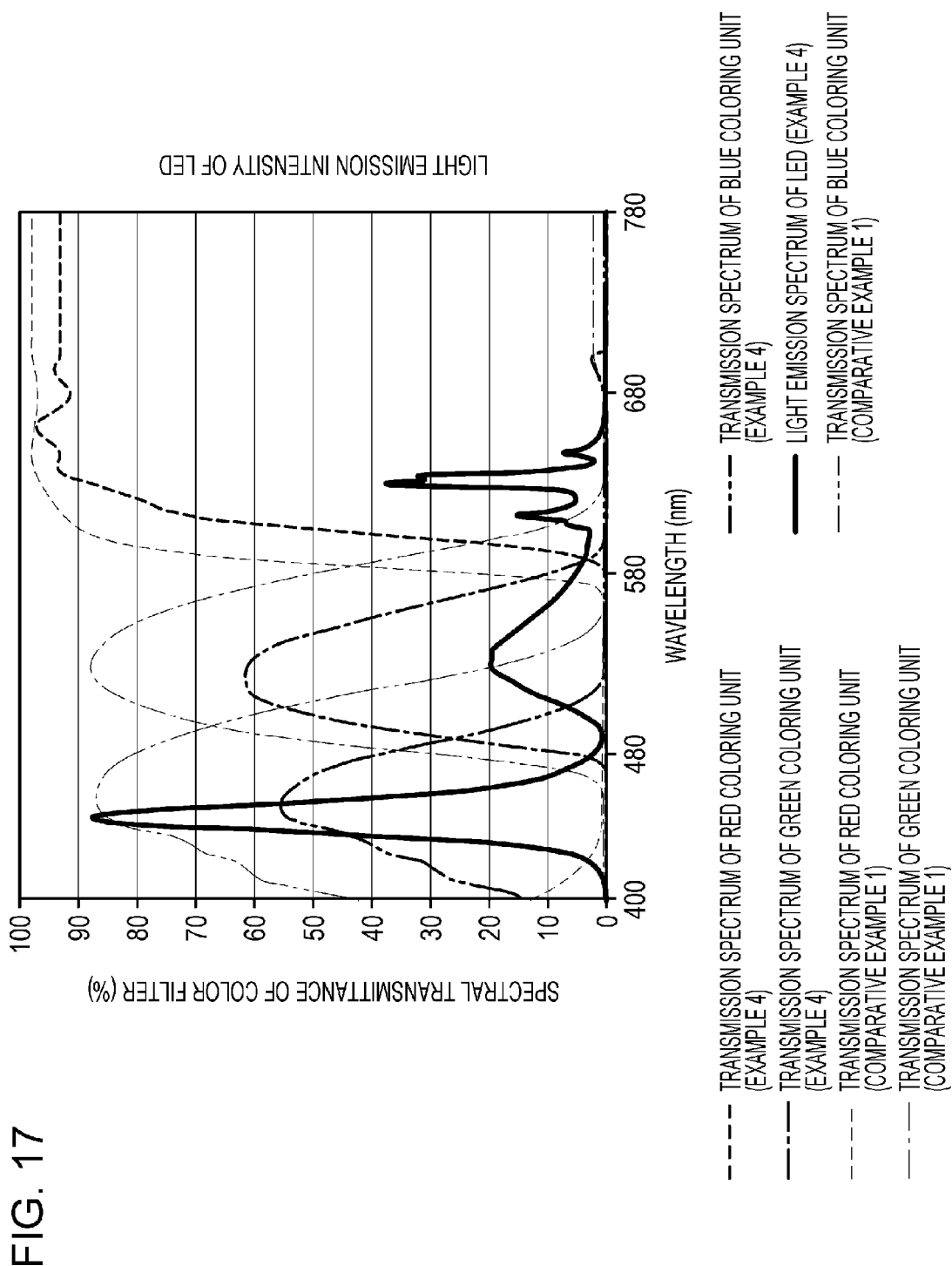
FIG. 17 is a graph illustrating a light emission spectrum of an LED according to Example 4 of Comparative experiment 2 and a transmission spectrum of each coloring unit of a color filter according to Example 4.
Figure 27:
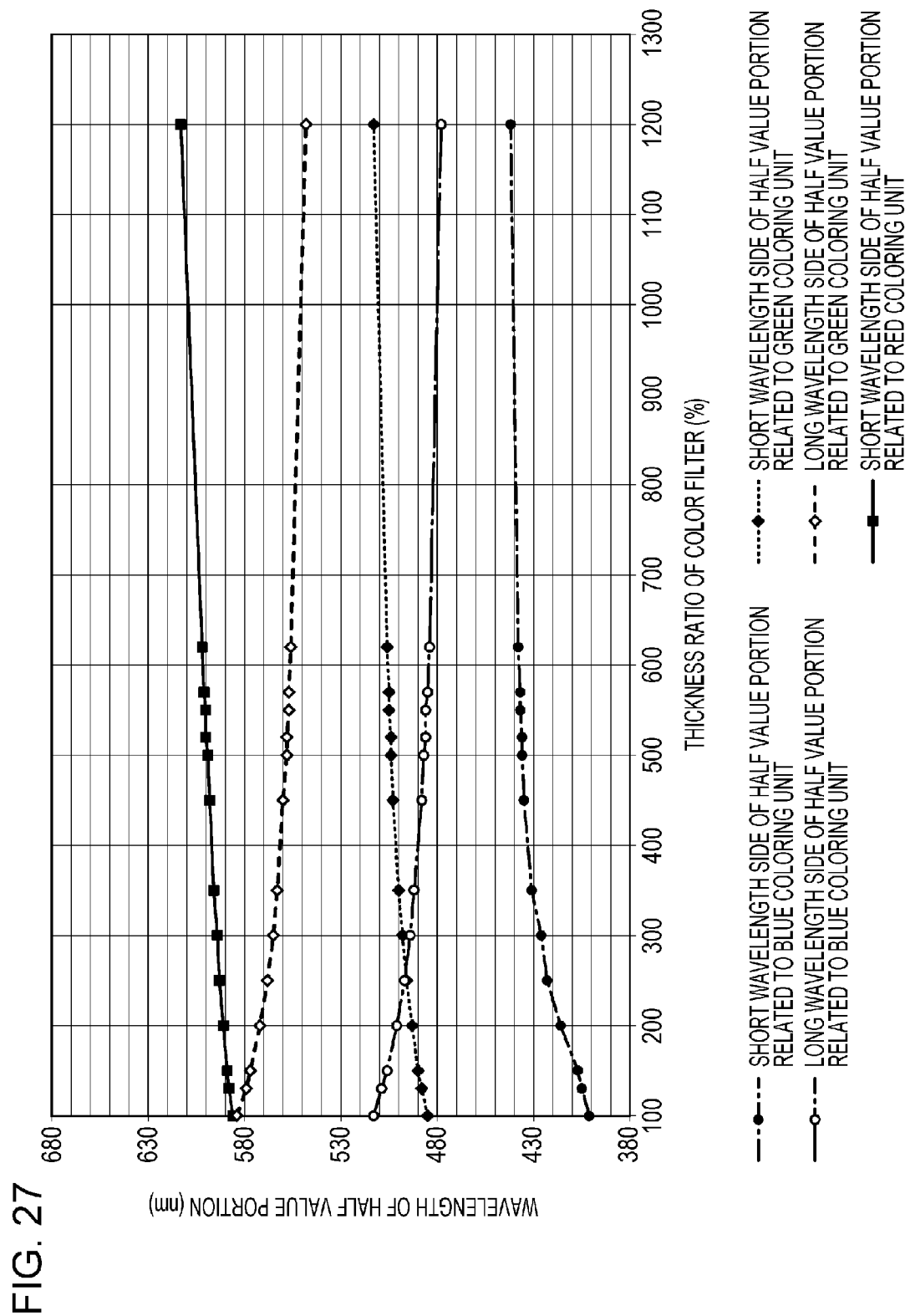
FIG. 27 is a graph representing a relationship between the thickness ratio of each coloring unit of a color filter of Comparative experiment 3 and the wavelength of a half value portion.

The green phosphor included in the LED according to the present embodiment has a light emission spectrum that includes a peak having a peak wavelength in a range of 528 nm±2 nm to 540 nm±2 nm and has a half value width of less than 52 nm for the peak as illustrated in FIG. 16 and FIG. 17. Specifically, it is preferable that the green phosphor has a light emission spectrum that includes a peak having a peak wavelength in a range of 528 nm±2 nm to 533 nm±2 nm and has a half value width in a range of 49 nm to 52 nm for the peak. Particularly, it is preferable that the green phosphor has a light emission spectrum that includes a peak having a peak wavelength of 533 nm±2 nm and has a half value width of 52 nm for the peak. The red phosphor has a light emission spectrum that includes a peak having a peak wavelength in a range of 620 nm±2 nm to 645 nm±2 nm and has a half value width of less than 40 nm for the peak. Specifically, it is preferable that the red phosphor has a light emission spectrum that includes a main peak having a peak wavelength of approximately 631 nm±2 nm and has a half value width of less than 7 nm for the main peak and, furthermore, includes a first subpeak having a peak wavelength in a range of 607 nm±2 nm to 614 nm±2 nm and includes a second subpeak having a peak wavelength in a range of 645 nm±2 nm to 648 nm±2 nm. Particularly, it is preferable that the light emission spectrum of the red phosphor has a peak wavelength of approximately 631 nm±2 nm for a main peak and a half value width of approximately 7 nm for the main peak, has a peak wavelength of approximately 612 nm±2 nm for a first subpeak, and has a peak wavelength of approximately 646 nm±2 nm for a second subpeak in the present embodiment. The half value width of the main peak included in the light emission spectrum of the red phosphor is relatively narrow compared with the half value width of the peak included in the light emission spectrum of the green phosphor. Numerical values such as the half value width and the peak wavelength related to each light emission spectrum of the green phosphor and the red phosphor are measured by using, for example, "spectroradiometer SR-3 manufactured by Topcon" in the present embodiment.

Next, each transmission spectrum of coloring units of each color constituting a color filter included in a liquid crystal panel that displays an image by using light from the LED having the above configuration will be described. Numerical values such as the half value width, the peak wavelength, and the half value of the peak related to each transmission spectrum of the coloring units are measured by using, for example, "spectroradiometer SR-3 manufactured by Topcon" in the present embodiment. The blue coloring unit is formed to have a peak wavelength in a range of 451 nm to 461 nm for a peak included in the transmission spectrum thereof and have a half value width in a range of 46 nm to 78 nm for the peak as illustrated in FIG. 16 and FIG. 17. Specifically, it is preferable that the blue coloring unit is formed to have a transmission spectrum that includes a peak having a peak wavelength in a range of 451 nm to 453 nm and has a half value width in a range of 74 nm to 78 nm for the peak. The green coloring unit is formed to have a peak wavelength in a range of 521 nm to 531 nm for a peak included in the transmission spectrum thereof and have a half value width in a range of 50 nm to 74 nm for the peak. Specifically, it is preferable that the transmission spectrum of the green coloring unit has a peak wavelength in a range of 521 nm to 524 nm for a peak and has a half value width of 71 nm to 74 nm for the peak. The red coloring unit is formed to have a wavelength in a range of 601 nm to 604 nm for the half value of a peak included in the transmission spectrum thereof. Specifically, it is preferable that the transmission spectrum of the red coloring unit has a peak wavelength in a range of 659 nm to 660 nm for a peak and has a wavelength of approximately 604 nm for the half value of the peak.

Comparative experiment 2 below is performed in order to obtain information related to the luminance of emitted light and color reproducibility resulting from the above configurations of the LED and the color filter. In Comparative experiment 2, a liquid crystal display device that includes a backlight device including the LED described before the present paragraph and includes the liquid crystal panel including the color filter corresponds to Examples 3 and 4. Comparative examples 1 and 2 described in Comparative experiment 1 of Embodiment 1 will be used as comparison targets for Examples 3 and 4. The configurations and the like of Comparative examples 1 and 2 are the same as described previously. Numerical values such as the half value width and the peak wavelength related to each light emission spectrum of the blue LED element, the green phosphor, and the red phosphor and numerical values such as the half value width, the peak wavelength, and the wavelength for the half value of a peak related to each transmission spectrum of the coloring units are measured by using, for example, "spectroradiometer SR-3 manufactured by Topcon" in Comparative experiment 2. Specifically, the liquid crystal display device according to Example 3 is the same as that described before the present paragraph, and the blue LED element included in the backlight device has a peak wavelength of 444 nm±2 nm for a peak included in the light emission spectrum thereof and has a half value width of approximately 18 nm for the peak as illustrated in FIG. 16 and FIG. 18. The green phosphor formed of β-SiAlON that is one type of sialon-based phosphor has a peak wavelength of 528 nm±2 nm for a peak included in the light emission spectrum thereof and has a half value width of approximately 49 nm for the peak. The red phosphor formed of potassium silicofluoride that is one type of complex fluoride phosphor has a peak wavelength of approximately 631 nm±2 nm for a main peak included in the light emission spectrum thereof and has a half value width of approximately 7 nm for the main peak, has a peak wavelength of approximately 612 nm±2 nm for a first subpeak, and has a peak wavelength of approximately 646 nm±2 nm for a second subpeak. The color filter of the liquid crystal panel included in the liquid crystal display device according to Example 3 has a peak wavelength of approximately 453 nm for a peak included in the transmission spectrum of the blue coloring unit and a half value width of approximately 78 nm for the peak, has a peak wavelength of approximately 524 nm for a peak included in the transmission spectrum of the green coloring unit and a half value width of approximately 74 nm for the peak, and has a peak wavelength of approximately 659 nm for a peak included in the transmission spectrum of the red coloring unit and a wavelength of approximately 604 nm for the half value of the peak. The color filter according to Example 3 has a greater thickness for each coloring unit of three colors than Comparative example 1, and specifically the thickness is approximately 1.5 (refer to the fields of "R thickness ratio", "G thickness ratio", and "B thickness ratio" in FIG. 18).

The liquid crystal display device according to Example 4 is the same as that described before the present paragraph, and the blue LED element included in the backlight device has a peak wavelength of 444 nm±2 nm for a peak included in the light emission spectrum thereof and has a half value width of approximately 18 nm for the peak as illustrated in FIG. 17 and FIG. 18. The green phosphor formed of β-SiAlON that is one type of sialon-based phosphor has a peak wavelength of 533 nm±2 nm for a peak included in the light emission spectrum thereof and has a half value width of approximately 52 nm for the peak. The red phosphor formed of potassium silicofluoride that is one type of complex fluoride phosphor has a peak wavelength of 631 nm±2 nm for a main peak included in the light emission spectrum thereof and has a half value width of approximately 7 nm for the main peak, has a peak wavelength of 612 nm±2 nm for a first subpeak, and has a peak wavelength of 646 nm±2 nm for a second subpeak. The color filter of the liquid crystal panel included in the liquid crystal display device according to Example 3 has a peak wavelength of approximately 451 nm for a peak included in the transmission spectrum of the blue coloring unit and a half value width of approximately 74 nm for the peak, has a peak wavelength of approximately 521 nm for a peak included in the transmission spectrum of the green coloring unit and a half value width of approximately 71 nm for the peak, and has a peak wavelength of approximately 660 nm for a peak included in the transmission spectrum of the red coloring unit and a wavelength of approximately 604 nm for the half value of the peak. The color filter according to Example 4 has a greater thickness for each coloring unit of three colors than Comparative example 1, and specifically the thickness is approximately 1.6 (refer to the fields of "R thickness ratio", "G thickness ratio", and "B thickness ratio" in FIG. 18). Each coloring unit constituting the color filter according to Example 4 is formed of the same material as described in Example 3.

In Comparative experiment 2, the chromaticity of the LED, the luminance ratio of emitted light (white light) from the liquid crystal panel, and each chromaticity of the emitted light are measured for each liquid crystal display device according to Examples 3 and 4 and Comparative examples 1 and 2 having the above configurations, and the NTSC percentage, the BT.709 percentage, the DCI percentage, and the BT.2020 percentage of the chromaticity region related to the emitted light are calculated. The results are illustrated in FIG. 18 to FIG. 20. FIG. 19 and FIG. 20 represent chromaticity regions according to each standard and the chromaticity region of emitted light from the liquid crystal panel of the liquid crystal display device according to Examples 3 and 4 and Comparative examples 1 and 2.

Next, the experiment result of Comparative experiment 2 will be described. First, the NTSC percentage, the BT.709 percentage, the DCI percentage, and the BT.2020 percentage related to the chromaticity region of the emitted light of the liquid crystal panel have the lowest values in Comparative example 1 as illustrated in FIG. 18 to FIG. 20, have approximately the same values in Comparative example 2 and Examples 3 and 4, and have higher values in Comparative example 2 and Examples 3 and 4 than in Comparative example 1. Particularly, the BT.2020 percentage of the CIE 1976 chromaticity diagram is "100%" in all of Comparative example 2 and Examples 3 and 4. That is, all of Comparative example 2 and Examples 3 and 4 are said to have the same reproducible color range as the BT.2020 chromaticity region according to the BT.2020 standard (refer to the second field "BT.2020 percentage: CIE 1976 chromaticity diagram" from the top of FIG. 18 for details). Examples 3 and 4 have a greater thickness for each coloring unit of the color filter than Comparative example 1 and, in addition, have a different green phosphor and a different red phosphor included in the LED from Comparative examples 1 and 2. Particularly, the red phosphor emits red light having very high color purity. Specifically, the color filter according to Examples 3 and 4 has the above thickness, and thus the half value width of the peak of the transmission spectrum of each coloring unit of three colors is narrower than the half value width of the color filter according to Comparative examples 1 and 2. Therefore, each color light emitted from the LED is transmitted through each coloring unit of the color filter in Examples 3 and 4, and thus higher color purity and a wide reproducible color range of the emitted light are achieved. As described heretofore, the emitted light of the liquid crystal panel according to Examples 3 and 4 has high color reproducibility since the green and red gamuts are expanded as illustrated in FIG. 19 and FIG. 20, and has the same chromaticity region as Examples 1 and 2 and Comparative example 2 and thus can achieve 100% of the BT.2020 percentage of the CIE 1976 chromaticity diagram. The color purity of each color light emitted from the LED according to Examples 3 and 4 is relatively low compared with the LED according to Examples 1 and 2 of Comparative experiment 1 of Embodiment 1. Thus, the thickness of each coloring unit of the color filter according to Examples 3 and 4 is increased compared with Examples 1 and 2, and the half value width of the peak of the transmission spectrum is relatively narrowed.

The luminance of the emitted light of the liquid crystal panel is significantly decreased to "17%" in Comparative example 2 from the reference "100%" of Comparative example 1 but is, though decreased, "51%" in Example 3 and "62%" in Example 4 as illustrated in FIG. 18, and a decrease in the luminance is reduced in Examples 3 and 4 compared with Comparative example 2 (refer to the uppermost field "luminance ratio of emitted light" in FIG. 18 for details). The thickness of each coloring unit of the color filter in Examples 3 and 4 is greater than that of Comparative example 1 but is sufficiently small compared with Comparative example 2, and the half value width of each transmission spectrum related to the coloring units is sufficiently wide compared with Comparative example 2. This is also apparent from FIG. 16 and FIG. 17 in that almost the entirety of the light emission spectrum related to each color light of the LED falls inside of the transmission spectrum related to each coloring unit of the color filter and that a very small amount of light has a wavelength that is not used as the emitted light. As described heretofore, according to the liquid crystal display device according to Examples 3 and 4, color reproducibility can be improved with reduction of a decrease in the luminance of emitted light. When Example 3 and Example 4 are compared, the luminance ratio of Example 4 (62%) is relatively higher than the luminance ratio of Example 3 (51%). The reason is that the peak wavelength of the green phosphor of the LED according to Example 4 (533 nm±2 nm) is shifted to the long wavelength side compared with the peak wavelength of the green phosphor of the LED according to Example 3 (528 nm±2 nm) and is a wavelength closer to the peak visibility of 555 nm. That is, even if the intensity of light (radiant flux) in which visibility is not considered is the same, luminance in which visibility is considered is high if the wavelength of the light is close to the peak visibility. Therefore, Example 4 has higher luminance than Example 3. As described heretofore, Example 4 can achieve the same high color reproducibility as Comparative example 2 and Example 3 and, in addition, has a decrease in luminance that is more favorably reduced than Example 3. The reason why the blend proportion of the green phosphor in Example 3 is greater than the blend proportion of the green phosphor in Example 4 is to compensate for the insufficient luminance of green light. However, the magnitude of the blend proportion is restricted due to reasons such as restricting the total content of phosphor and maintaining the white balance, and the insufficient luminance of green light in Example 3 is not resolved.

According to the present embodiment described heretofore, the LED emits green light having a light emission spectrum that includes a peak having a peak wavelength in a range of 528 nm±2 nm to 540 nm±2 nm and has a half value width of less than 52 nm for the peak, and emits red light having a light emission spectrum that includes a main peak having a peak wavelength of 631 nm±2 nm and has a half value width of less than 7 nm for the main peak and, furthermore, includes a first subpeak having a peak wavelength in a range of 607 nm to 614 nm and includes a second subpeak in a range of 645 nm to 648 nm. The blue coloring unit has a transmission spectrum that includes a peak having a peak wavelength in a range of 451 nm to 461 nm and has a half value width in a range of 46 nm to 78 nm for the peak. The green coloring unit has a transmission spectrum that includes a peak having a peak wavelength of 521 nm to 531 nm and has a half value width in a range of 50 nm to 74 nm for the peak. The red coloring unit has a transmission spectrum that has a wavelength in a range of 601 nm to 604 nm for the half value of a peak. First, as the half value width of the peak is narrowed in the transmission spectrum of each coloring unit, the color purity of the emitted light is easily increased, but the transmittance of each coloring unit is decreased. Thus, the luminance of the emitted light tends to be easily decreased. From this point, the half value width of the peak in the transmission spectrum of each coloring unit and the wavelength for the half value of the peak are set to values not residing below the lower limit value of each of the above numerical value ranges, and thereby luminance can be maintained to a certain level or higher with sufficient color reproducibility achieved. In addition, the light emission spectra of the green light and the red light emitted from the LED are set as described above, and particularly the color purity of the red light is high. Thus, sufficient color reproducibility can be easily secured. In a case where the half value width of the peak of the transmission spectrum of the green coloring unit is narrowed, it is preferable that the light emission spectrum of the green light of the LED is changed in such a manner that the peak wavelength of the peak thereof is shifted to the long wavelength side, in order to reduce an accompanying decrease in luminance. That is, if the light emission spectrum of the green light is shifted to the long wavelength side, the peak wavelength thereof approaches the peak visibility 555 nm. Thus, the luminance of the green light emitted from the LED is improved, and the luminance of the entirety of the emitted light of the LED is improved. Accordingly, reduced is a decrease in luminance that is accompanied by narrowing the half value width of the peak of the transmission spectrum of the green coloring unit.

As the half value width of the peak is widened in the transmission spectrum of each coloring unit, the transmittance of each coloring unit is improved, and thus the luminance of the emitted light is easily increased, but the color purity of the emitted light tends to be easily decreased. In a case where the half value width of the peak of the transmission spectrum of the green coloring unit is widened, it is preferable that the amount of overlap of the light emission spectrum of the green light of the LED with the transmission spectrum is set to be greater than or equal to a certain amount and that the light emission spectrum of the green light is changed in such a manner that the peak wavelength of the peak thereof is shifted to the short wavelength side, in order to secure sufficient color reproducibility. However, the peak wavelength related to the green light is then moved away from the peak visibility of 555 nm, and thus the luminance of the green light emitted from the LED tends to be decreased. When the luminance of the green light is decreased, the luminance of the entirety of the emitted light of the LED is decreased, and consequently the luminance of the emitted light obtained after being transmitted through each coloring unit is decreased. From this point, the half value width of the peak in the transmission spectrum of each coloring unit and the wavelength for the half value of the peak are set to values not residing above the upper limit value of each of the above numerical value ranges, and thereby the luminance of the emitted light can be maintained at a certain level or higher with sufficient color reproducibility secured, by reducing a decrease in the luminance of the green light of the LED.

The LED emits green light having a light emission spectrum that includes a peak having a peak wavelength of 528 nm±2 nm to 533 nm±2 nm. The blue coloring unit has a transmission spectrum that includes a peak having a peak wavelength in a range of 451 nm to 453 nm and has a half value width in a range of 74 nm to 78 nm for the peak. The green coloring unit has a transmission spectrum that includes a peak having a peak wavelength of 521 nm to 524 nm and has a half value width in a range of 71 nm to 74 nm for the peak. The red coloring unit has a transmission spectrum that has a wavelength of 604 nm for the half value of a peak. Accordingly, since each lower limit value of the half value width of the peak in the transmission spectrum of each coloring unit and the wavelength for the half value of the peak is set to be sufficiently great, luminance can be set to be higher with sufficient color reproducibility secured.

The LED includes at least the blue light emitting element that emits blue light, the green phosphor that is excited by the blue light from the blue light emitting element and emits green light, and the red phosphor that is excited by the blue light from the blue light emitting element and emits red light. The green phosphor is formed of a sialon-based phosphor, and the red phosphor is formed of a complex fluoride phosphor. Accordingly, the LED emits light that includes the blue light emitted from the blue light emitting element, the green light excited by the blue light and emitted from the green phosphor, and the red light excited by the blue light and emitted from the red phosphor and as a whole exhibits approximate white. Since there exist many types of materials for the sialon-based phosphor constituting the green phosphor regarding the peak wavelength and the half value width of the peak included in the light emission spectrum thereof, the sialon-based phosphor may be selected from the types of materials, and a green phosphor having an appropriate light emission spectrum can be supplied at a low cost. Furthermore, the complex fluoride phosphor constituting the red phosphor has a sufficiently narrow half value width for a main peak included in the light emission spectrum thereof and thus can emit red light having high color purity. In addition, the green light emitted from the green phosphor is unlikely to be absorbed, and thus the efficiency in use of the green light is maintained higher.

Embodiment 3

Embodiment 3 of the present invention will be described with FIG. 21 to FIG. 34. The light emission spectrum of each phosphor of an LED and the transmission spectrum of each coloring unit of a color filter that are changed from Embodiment 1 are illustrated in Embodiment 3. Duplicate descriptions of the same structures, actions, and effects as Embodiment 1 will not be provided.

An LED included in a backlight device according to the present embodiment has a peak wavelength of approximately 530 nm±2 nm for a peak of the light emission spectrum of a green phosphor formed of a quantum dot phosphor and a half value width of less than 40 nm for the peak, and has a peak wavelength in a range of 620 nm±2 nm to 642 nm±2 nm for a peak of the light emission spectrum of a red phosphor formed of a quantum dot phosphor and a half value width of less than 40 nm for the peak. A color filter included in a liquid crystal panel has a peak wavelength in a range of 456.5 nm to 461.5 nm for a peak of the transmission spectrum of a blue coloring unit and a half value width in a range of 61 nm to 99 nm for the peak, has a peak wavelength in a range of 531.5 nm to 533.5 nm for a peak of the transmission spectrum of a green coloring unit and a half value width in a range of 63 nm to 87 nm for the peak, and has a wavelength in a range of 589 nm to 596 nm for the half value of a peak of the transmission spectrum of a red coloring unit. A blue LED element included in the LED is the same as that of Embodiment 1. Numerical values such as the half value width and the peak wavelength related to each light emission spectrum of the green phosphor and the red phosphor and numerical values such as the half value width, the peak wavelength, and the wavelength for the half value of a peak related to each transmission spectrum of the coloring units are measured by using, for example, "spectroradiometer SR-3 manufactured by Topcon" in the present embodiment.

Specifically, in a case where the LED has a peak wavelength of approximately 530 nm±2 nm for a peak of the light emission spectrum of the green phosphor and a half value width in a range of 31 nm to 40 nm for the peak and has a peak wavelength in a range of 633 nm±2 nm to 642 nm±2 nm for a peak of the light emission spectrum of the red phosphor and a half value width in a range of 31 nm to 40 nm for the peak, the color filter has a peak wavelength in a range of 460 nm to 461.5 nm for a peak of the transmission spectrum of the blue coloring unit and a half value width in a range of 61 nm to 74 nm for the peak, has a peak wavelength in a range of 531.5 nm to 532 nm for a peak of the transmission spectrum of the green coloring unit and a half value width in a range of 63 nm to 72 nm for the peak, and has a wavelength in a range of 593 nm to 596 nm for the half value of a peak of the transmission spectrum of the red coloring unit. Particularly, it is preferable that the LED has a peak wavelength of approximately 530 nm±2 nm for a peak of the light emission spectrum of the green phosphor and a half value width of approximately 40 nm for the peak and has a peak wavelength of approximately 642 nm±2 nm for a peak of the light emission spectrum of the red phosphor and a half value width of approximately 40 nm for the peak, and that the color filter has a peak wavelength of approximately 460 nm for a peak of the transmission spectrum of the blue coloring unit and a half value width of approximately 74 nm for the peak, has a peak wavelength of approximately 532 nm for a peak of the transmission spectrum of the green coloring unit and a half value width of approximately 72 nm for the peak, and has a wavelength of approximately 593 nm for the half value of a peak of the transmission spectrum of the red coloring unit.

Next, in a case where the LED has a peak wavelength of approximately 530 nm±2 nm for a peak of the light emission spectrum of the green phosphor and a half value width in a range of 21 nm to 30 nm for the peak and has a peak wavelength in a range of 626 nm±2 nm to 639 nm±2 nm for a peak of the light emission spectrum of the red phosphor and a half value width in a range of 21 nm to 30 nm for the peak, the color filter has a peak wavelength in a range of 458.5 nm to 461.5 nm for a peak of the transmission spectrum of the blue coloring unit and a half value width in a range of 61 nm to 85 nm for the peak, has a peak wavelength in a range of 531.5 nm to 532.5 nm for a peak of the transmission spectrum of the green coloring unit and a half value width in a range of 63 nm to 79 nm for the peak, and has a wavelength in a range of 591 nm to 596 nm for the half value of a peak of the transmission spectrum of the red coloring unit. Particularly, in a case where the LED has a peak wavelength of approximately 530 nm±2 nm for a peak of the light emission spectrum of the green phosphor and a half value width of approximately 30 nm for the peak and has a peak wavelength in a range of 632 nm±2 nm to 639 nm±2 nm for a peak of the light emission spectrum of the red phosphor and a half value width of approximately 30 nm for the peak, it is preferable that the color filter has a peak wavelength in a range of 458.5 nm to 460 nm for a peak of the transmission spectrum of the blue coloring unit and a half value width in a range of 74 nm to 85 nm for the peak, has a peak wavelength in a range of 532 nm to 532.5 nm for a peak of the transmission spectrum of the green coloring unit and a half value width in a range of 72 nm to 79 nm for the peak, and has a wavelength in a range of 591 nm to 593 nm for the half value of a peak of the transmission spectrum of the red coloring unit.

Furthermore, in a case where the LED has a peak wavelength of approximately 530 nm±2 nm for a peak of the light emission spectrum of the green phosphor and a half value width of less than 20 nm for the peak and has a peak wavelength in a range of 620 nm±2 nm to 640 nm±2 nm for a peak of the light emission spectrum of the red phosphor and a half value width of less than 20 nm for the peak, the color filter has a peak wavelength in a range of 456.5 nm to 461.5 nm for a peak of the transmission spectrum of the blue coloring unit and a half value width in a range of 61 nm to 99 nm for the peak, has a peak wavelength in a range of 531.5 nm to 533.5 nm for a peak of the transmission spectrum of the green coloring unit and a half value width in a range of 63 nm to 87 nm for the peak, and has a wavelength in a range of 589 nm to 596 nm for the half value of a peak of the transmission spectrum of the red coloring unit. Particularly, it is preferable that the LED has a peak wavelength of approximately 530 nm±2 nm for a peak of the light emission spectrum of the green phosphor and a half value width of approximately 20 nm for the peak and has a peak wavelength of approximately 629 nm±2 nm for a peak of the light emission spectrum of the red phosphor and a half value width of approximately 20 nm for the peak, and that the color filter has a peak wavelength of approximately 458.5 nm for a peak of the transmission spectrum of the blue coloring unit and a half value width of approximately 85 nm for the peak, has a peak wavelength of approximately 532.5 nm for a peak of the transmission spectrum of the green coloring unit and a half value width of approximately 79 nm for the peak, and has a wavelength of approximately 591 nm for the half value of a peak of the transmission spectrum of the red coloring unit.

Next, Comparative experiment 3 below is performed in order to obtain information related to the luminance of emitted light and color reproducibility resulting from the above configurations of the LED and the color filter. In Comparative experiment 3, a liquid crystal display device that includes the backlight device including the LED described before the present paragraph and includes the liquid crystal panel including the color filter corresponds to Examples 5 to 16, and a liquid crystal display device in which the light emission spectrum related to the LED of the backlight device and the transmission spectrum related to the color filter of the liquid crystal panel of Examples 5 to 16 are changed corresponds to Comparative examples 3 to 8. In addition, Comparative examples 1 and 2 described in Comparative experiment 1 of Embodiment 1 will be described together, and the configuration and the like thereof are the same as described previously. Numerical values such as the half value width and the peak wavelength related to each light emission spectrum of the blue LED element, the green phosphor, and the red phosphor and numerical values such as the half value width, the peak wavelength, and the wavelength for the half value of a peak related to each transmission spectrum of the coloring units are measured by using, for example, "spectroradiometer SR-3 manufactured by Topcon" in Comparative experiment 3. First, common points will be described. Examples 5 to 16 and Comparative examples 3 to 8 use a quantum dot phosphor (CdSe) as the green phosphor and the red phosphor of the LED, and the peak wavelengths of all of the green phosphors are equally set to approximately 530 nm±2 nm, and only the half value widths of the peaks thereof are set to be different from each other. When the transmission spectrum related to the color filter is adjusted in Examples 5 to 16 and Comparative examples 3 to 8, the material of each coloring unit is set to be the same as those of Comparative examples 1 and 2 (refer to FIG. 15 and FIG. 21), and the thickness thereof is changed. Relative values (in units of "%") with the thickness of each coloring unit of the color filter of Comparative example 1 used as 100% are described in each field of "R thickness ratio", "G thickness ratio", and "B thickness ratio" in FIG. 21 to FIG. 26. Therefore, in a case where the thickness ratio of the coloring units of each color of the color filter is the same in Examples 5 to 16 and Comparative examples 3 to 8, the transmission spectrum thereof is the same. The blue LED element of the LED according to Examples 5 to 16 and Comparative examples 3 to 8 has a peak wavelength of 444 nm±2 nm for a peak and has a half value width of approximately 18 nm for the peak. Hereinafter, Examples 5 to 16 and Comparative examples 3 to 8 will be described except for the common points.

Examples 5 to 7 and Comparative examples 3 and 4 have a common point in that the half value width of a peak included in the transmission spectra of the green phosphor and the red phosphor is set to 40 nm. The LED of the liquid crystal display device according to Comparative example 3 has a peak wavelength of 655 nm±2 nm for a peak of the light emission spectrum of the red phosphor, and the color filter thereof has a thickness ratio of 200% for the coloring units of each color, has a peak wavelength of 458.5 nm for a peak of the transmission spectrum of the blue coloring unit and a half value width of 85 nm for the peak, has a peak wavelength of 532.5 nm for a peak of the transmission spectrum of the green coloring unit and a half value width of 79 nm for the peak, and has a wavelength of 591 nm for the half value of a peak of the transmission spectrum of the red coloring unit. The LED of the liquid crystal display device according to Example 5 has a peak wavelength of 642 nm±2 nm for a peak of the light emission spectrum of the red phosphor, and the color filter thereof has a thickness ratio of 250% for the coloring units of each color, has a peak wavelength of 460 nm for a peak of the transmission spectrum of the blue coloring unit and a half value width of 74 nm for the peak, has a peak wavelength of 532 nm for a peak of the transmission spectrum of the green coloring unit and a half value width of 72 nm for the peak, and has a wavelength of 593 nm for the half value of a peak of the transmission spectrum of the red coloring unit. The LED of the liquid crystal display device according to Example 6 has a peak wavelength of 637 nm±2 nm for a peak of the light emission spectrum of the red phosphor, and the color filter thereof has a thickness ratio of 300% for the coloring units of each color, has a peak wavelength of 460 nm for a peak of the transmission spectrum of the blue coloring unit and a half value width of 68 nm for the peak, has a peak wavelength of 531.5 nm for a peak of the transmission spectrum of the green coloring unit and a half value width of 67 nm for the peak, and has a wavelength of 594 nm for the half value of a peak of the transmission spectrum of the red coloring unit. The LED of the liquid crystal display device according to Example 7 has a peak wavelength of 633 nm±2 nm for a peak of the light emission spectrum of the red phosphor, and the color filter thereof has a thickness ratio of 350% for the coloring units of each color, has a peak wavelength of 461.5 nm for a peak of the transmission spectrum of the blue coloring unit and a half value width of 61 nm for the peak, has a peak wavelength of 531.5 nm for a peak of the transmission spectrum of the green coloring unit and a half value width of 63 nm for the peak, and has a wavelength of 596 nm for the half value of a peak of the transmission spectrum of the red coloring unit. The LED of the liquid crystal display device according to Comparative example 4 has a peak wavelength of 630 nm±2 nm for a peak of the light emission spectrum of the red phosphor, and the color filter thereof has a thickness ratio of 450% for the coloring units of each color, has a peak wavelength of 461.5 nm for a peak of the transmission spectrum of the blue coloring unit and a half value width of 53 nm for the peak, has a peak wavelength of 531.5 nm for a peak of the transmission spectrum of the green coloring unit and a half value width of 57 nm for the peak, and has a wavelength of 598 nm for the half value of a peak of the transmission spectrum of the red coloring unit.

Examples 8 to 11 and Comparative examples 5 and 6 have a common point in that the half value width of a peak included in the transmission spectra of the green phosphor and the red phosphor is set to 30 nm. The LED of the liquid crystal display device according to Comparative example 5 has a peak wavelength of 655 nm±2 nm for a peak of the light emission spectrum of the red phosphor, and the color filter thereof has a thickness ratio of 150% for the coloring units of each color, has a peak wavelength of 456.5 nm for a peak of the transmission spectrum of the blue coloring unit and a half value width of 99 nm for the peak, has a peak wavelength of 533.5 nm for a peak of the transmission spectrum of the green coloring unit and a half value width of 87 nm for the peak, and has a wavelength of 589 nm for the half value of a peak of the transmission spectrum of the red coloring unit. The LED of the liquid crystal display device according to Example 8 has a peak wavelength of 639 nm±2 nm for a peak of the light emission spectrum of the red phosphor, and the color filter thereof has a thickness ratio of 200% for the coloring units of each color. Thus, the transmission spectrum of the color filter according to Example 8 is the same as that of Comparative example 3 described previously. The LED of the liquid crystal display device according to Example 9 has a peak wavelength of 632 nm±2 nm for a peak of the light emission spectrum of the red phosphor, and the color filter thereof has a thickness ratio of 250% for the coloring units of each color. Thus, the transmission spectrum of the color filter according to Example 9 is the same as that of Example 5 described previously. The LED of the liquid crystal display device according to Example 10 has a peak wavelength of 628 nm±2 nm for a peak of the light emission spectrum of the red phosphor, and the color filter thereof has a thickness ratio of 300% for the coloring units of each color. Thus, the transmission spectrum of the color filter according to Example 10 is the same as that of Example 6 described previously. The LED of the liquid crystal display device according to Example 11 has a peak wavelength of 626 nm±2 nm for a peak of the light emission spectrum of the red phosphor, and the color filter thereof has a thickness ratio of 350% for the coloring units of each color. Thus, the transmission spectrum of the color filter according to Example 11 is the same as that of Example 7 described previously. The LED of the liquid crystal display device according to Comparative example 6 has a peak wavelength of 622 nm±2 nm for a peak of the light emission spectrum of the red phosphor, and the color filter thereof has a peak wavelength of 461.5 nm for a peak of the transmission spectrum of the blue coloring unit and a half value width of 51 nm for the peak, has a peak wavelength of 531 nm for a peak of the transmission spectrum of the green coloring unit and a half value width of 54 nm for the peak, and has a wavelength of 599 nm for the half value of a peak of the transmission spectrum of the red coloring unit.

Examples 12 to 16 and Comparative examples 7 and 8 have a common point in that the half value width of a peak included in the transmission spectra of the green phosphor and the red phosphor is set to 20 nm. The LED of the liquid crystal display device according to Comparative example 7 has a peak wavelength of 655 nm±2 nm for a peak of the light emission spectrum of the red phosphor, and the color filter thereof has a thickness ratio of 130% for the coloring units of each color, has a peak wavelength of 457 nm for a peak of the transmission spectrum of the blue coloring unit and a half value width of 104 nm for the peak, has a peak wavelength of 533.5 nm for a peak of the transmission spectrum of the green coloring unit and a half value width of 91 nm for the peak, and has a wavelength of 588 nm for the half value of a peak of the transmission spectrum of the red coloring unit. The LED of the liquid crystal display device according to Example 12 has a peak wavelength of 640 nm±2 nm for a peak of the light emission spectrum of the red phosphor, and the color filter thereof has a thickness ratio of 150% for the coloring units of each color. Thus, the transmission spectrum of the color filter according to Example 12 is the same as that of Comparative example 5 described previously. The LED of the liquid crystal display device according to Example 13 has a peak wavelength of 629 nm±2 nm for a peak of the light emission spectrum of the red phosphor, and the color filter thereof has a thickness ratio of 200% for the coloring units of each color. Thus, the transmission spectrum of the color filter according to Example 13 is the same as that of Comparative example 3 described previously. The LED of the liquid crystal display device according to Example 14 has a peak wavelength of 624 nm±2 nm for a peak of the light emission spectrum of the red phosphor, and the color filter thereof has a thickness ratio of 250% for the coloring units of each color. Thus, the transmission spectrum of the color filter according to Example 14 is the same as that of Example 5 described previously. The LED of the liquid crystal display device according to Example 15 has a peak wavelength of 622 nm±2 nm for a peak of the light emission spectrum of the red phosphor, and the color filter thereof has a thickness ratio of 300% for the coloring units of each color. Thus, the transmission spectrum of the color filter according to Example 15 is the same as that of Example 6 described previously. The LED of the liquid crystal display device according to Example 16 has a peak wavelength of 620 nm±2 nm for a peak of the light emission spectrum of the red phosphor, and the color filter thereof has a thickness ratio of 350% for the coloring units of each color. Thus, the transmission spectrum of the color filter according to Example 16 is the same as that of Example 7 described previously. The LED of the liquid crystal display device according to Comparative example 8 has a peak wavelength of 618 nm±2 nm for a peak of the light emission spectrum of the red phosphor, and the color filter thereof has a peak wavelength of 461.5 nm for a peak of the transmission spectrum of the blue coloring unit and a half value width of 49 nm for the peak, has a peak wavelength of 531 nm for a peak of the transmission spectrum of the green coloring unit and a half value width of 52 nm for the peak, and has a wavelength of 600 nm for the half value of a peak of the transmission spectrum of the red coloring unit.

In Comparative experiment 3, the chromaticity of the LED, the luminance ratio of emitted light from the liquid crystal panel, and each chromaticity of the emitted light are measured for each liquid crystal display device according to Examples 5 to 16 and Comparative examples 3 to 8 having the above configurations, and the NTSC percentage, the BT.709 percentage, the DCI percentage, and the BT.2020 percentage of the chromaticity region related to the emitted light are calculated. The results are illustrated in FIG. 21 to FIG. 34. A list of experiment results of Comparative experiment 3 is described in FIG. 21 to FIG. 26, and the content thereof is the same as FIG. 15 according to Embodiment 1 except that blue light, green light, and red light in addition to white light are described regarding the luminance ratio of emitted light. The luminance ratio of emitted light is a relative value (in units of "%") with the luminance of the emitted light of each color according to Comparative example 1 used as 100%. Comparative examples 1 and 2 are described in only FIG. 21. A graph representing a relationship between the thickness ratio of the color filter and the wavelength in a half value portion (a part having a half value of the maximum value of the spectral transmittance) of the transmission spectrum of each coloring unit of the color filter is described in FIG. 27. Wavelengths on the short wavelength side of the half value portion and wavelengths on the long wavelength side of the half value portion in the transmission spectrum of each coloring unit are described in the graph of FIG. 27. Wavelengths do not exist on the long wavelength side of the half value portion in the transmission spectrum of the red coloring unit and thus are not described. A graph representing a relationship between the thickness ratio of the color filter and the luminance ratio of white light in the emitted light is described in FIG. 28. Chromaticity regions according to each standard and the chromaticity region of emitted light from the liquid crystal panel of the liquid crystal display device according to the Examples 5 to 16 and Comparative examples 3 to 8 are described in FIG. 29 to FIG. 34. Example 6 to 8 and Comparative examples 3 and 4 in which the half value width of a peak included in the light emission spectra of the green phosphor and the red phosphor of the LED is set to 40 nm are described in FIG. 21, FIG. 22, FIG. 29, and FIG. 30. Examples 9 to 11 and Comparative examples 5 and 6 in which the half value width of a peak included in the light emission spectra of the green phosphor and the red phosphor of the LED is set to 30 nm are described in FIG. 23, FIG. 24, FIG. 31, and FIG. 32. Examples 12 to 16 and Comparative examples 7 and 8 in which the half value width of a peak included in the light emission spectra of the green phosphor and the red phosphor of the LED is set to 20 nm are described in FIG. 25, FIG. 26, FIG. 33, and FIG. 34.

Figure 28:
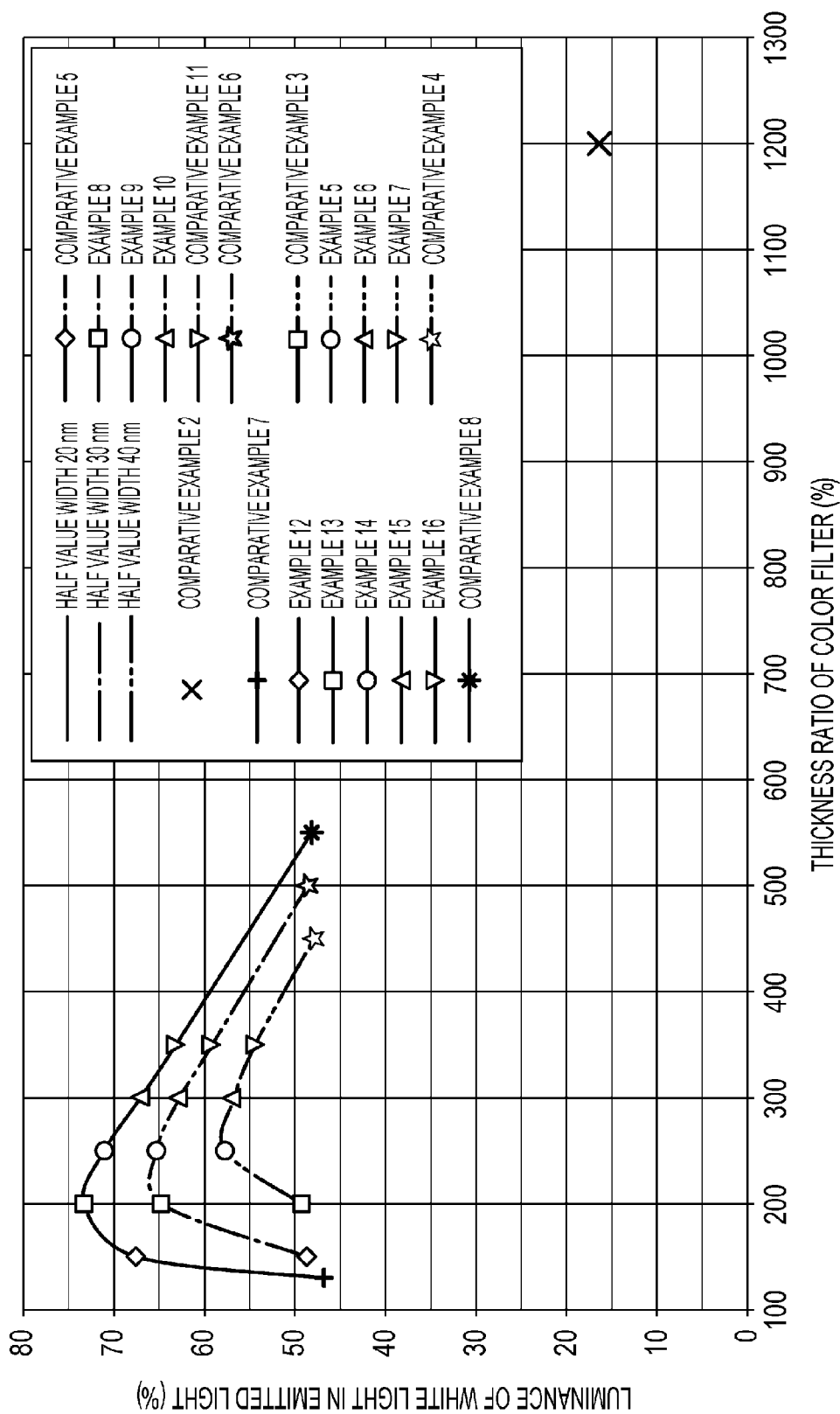
FIG. 28 is a graph representing a relationship between the thickness ratio of each coloring unit of a color filter of Comparative experiment 3 and the luminance ratio of white light in emitted light.
Figure 29:
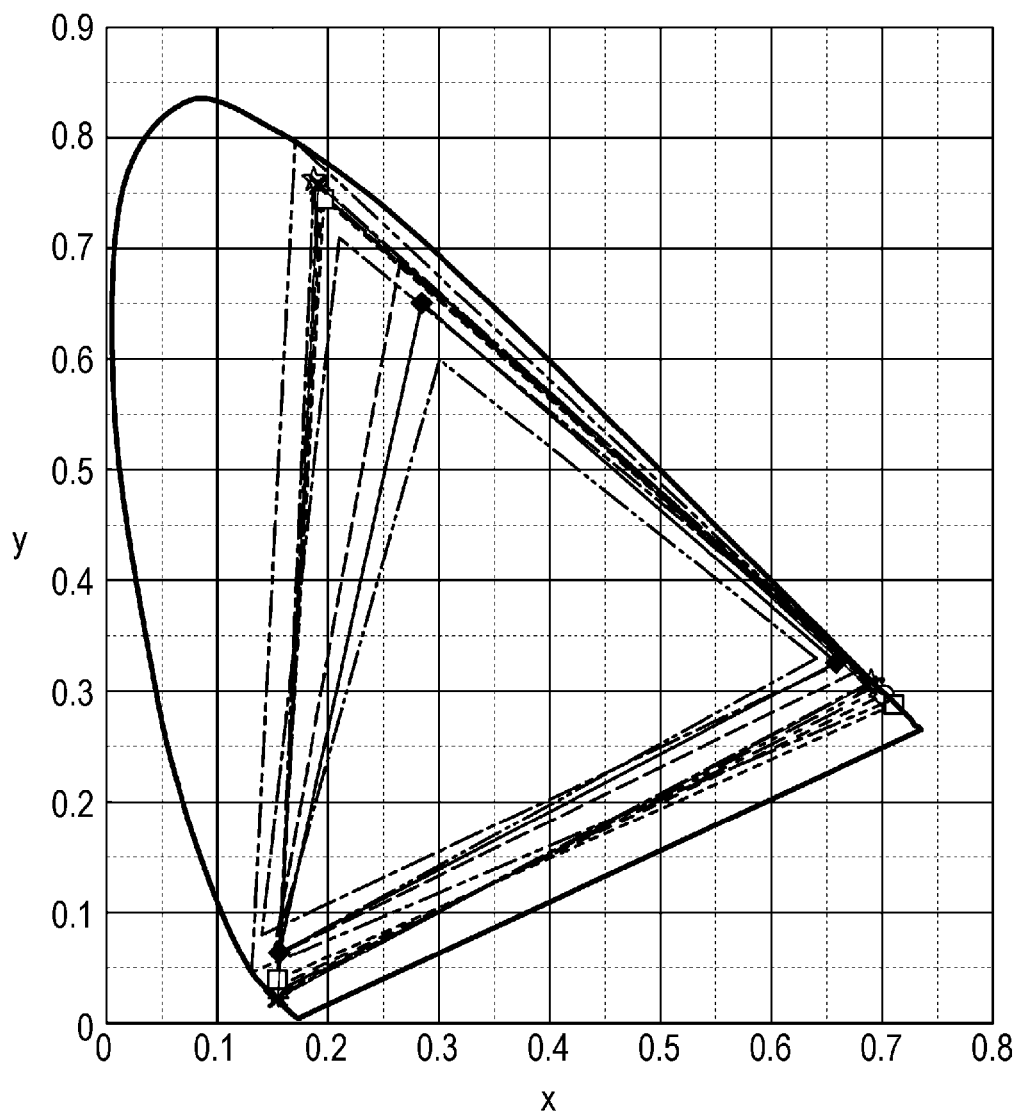
FIG. 29 is a CIE 1931 chromaticity diagram illustrating chromaticity regions in Examples 5 to 7 and Comparative examples 3 and 4 of Comparative experiment 3 and chromaticity regions of each standard (each chromaticity coordinate in the tables of FIG. 21 and FIG. 22).
Figure 30:
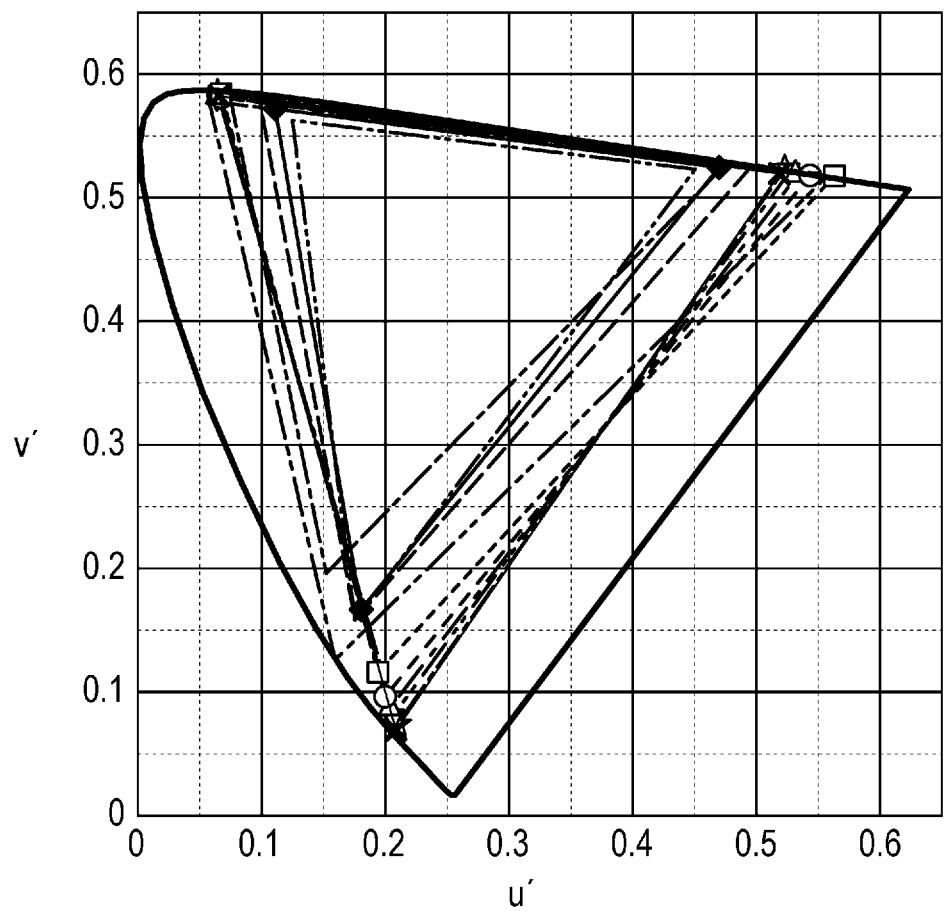
FIG. 30 is a CIE 1976 chromaticity diagram illustrating chromaticity regions in Examples 5 to 7 and Comparative examples 3 and 4 of Comparative experiment 3 and chromaticity regions of each standard (each chromaticity coordinate in the tables of FIG. 21 and FIG. 22).
Figure 31:
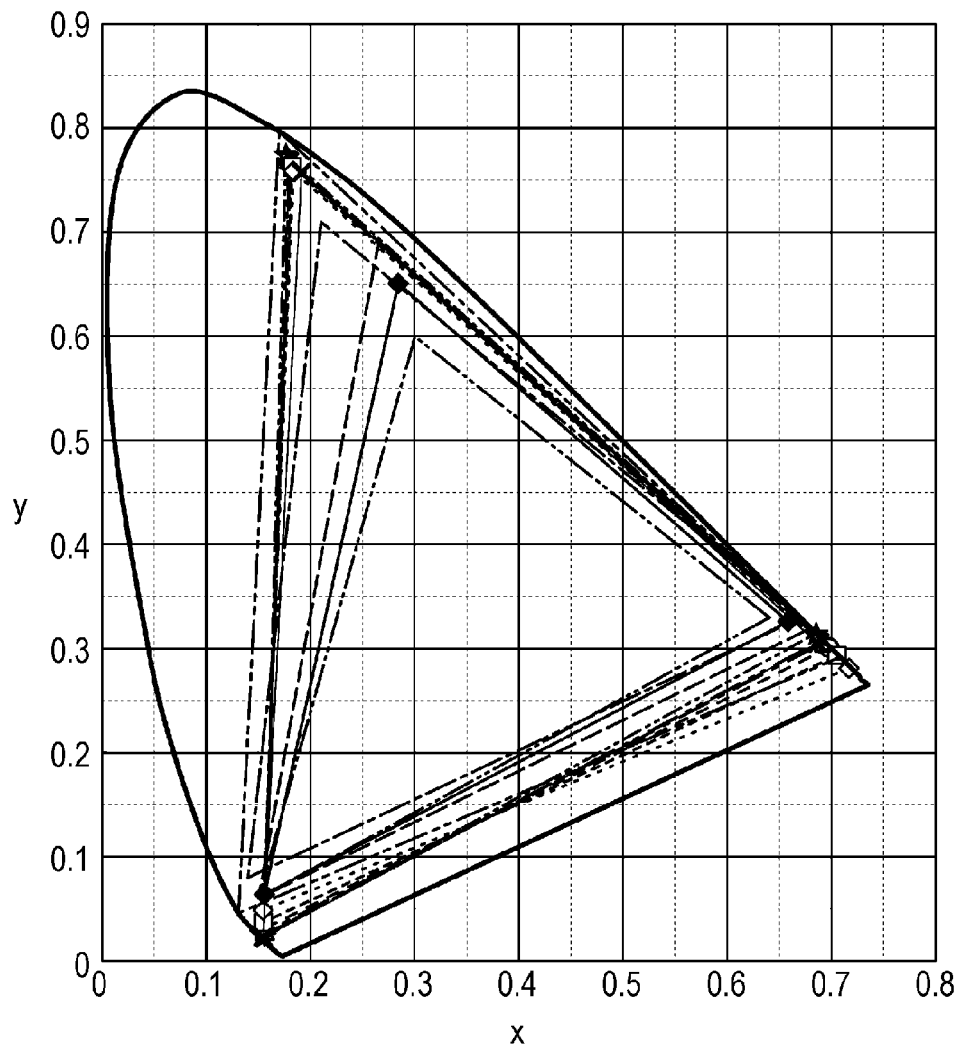
FIG. 31 is a CIE 1931 chromaticity diagram illustrating chromaticity regions in Examples 8 to 11 and Comparative examples 5 and 6 of Comparative experiment 3 and chromaticity regions of each standard (each chromaticity coordinate in the tables of FIG. 23 and FIG. 24).
Figure 32:
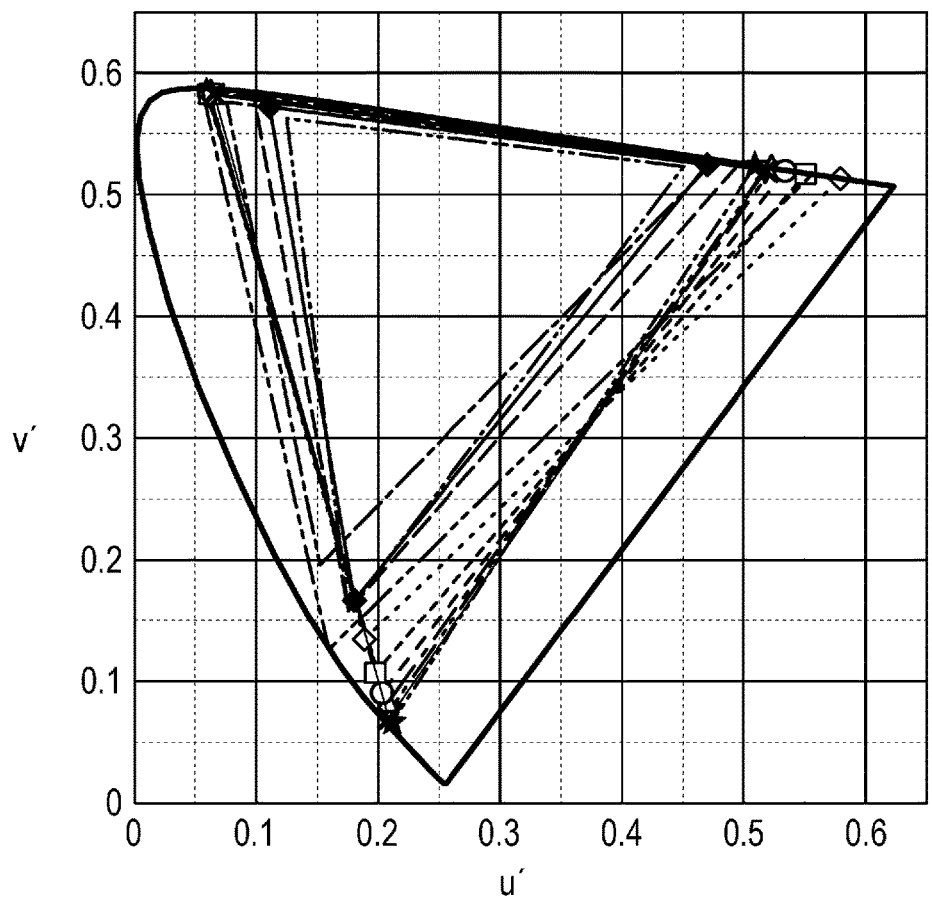
FIG. 32 is a CIE 1976 chromaticity diagram illustrating chromaticity regions in Examples 8 to 11 and Comparative examples 5 and 6 of Comparative experiment 3 and chromaticity regions of each standard (each chromaticity coordinate in the tables of FIG. 23 and FIG. 24).
Figure 33:
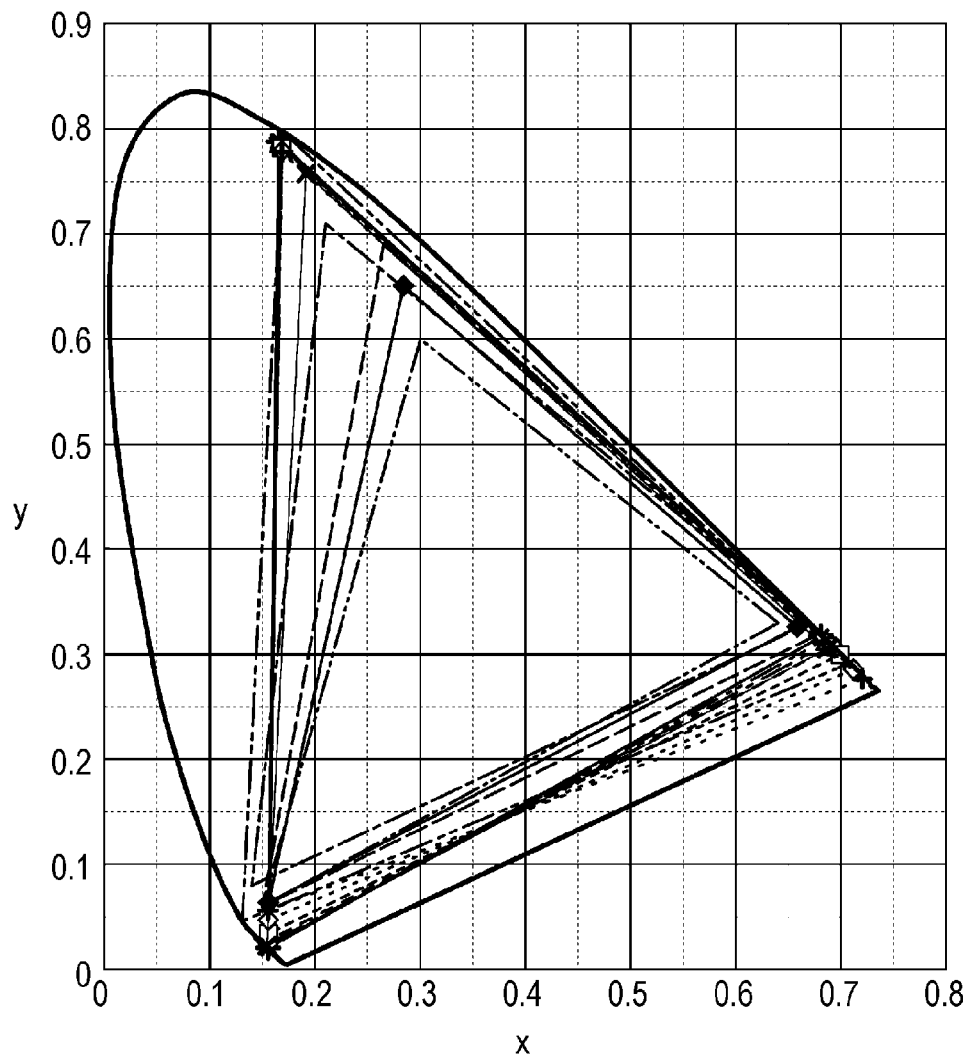
FIG. 33 is a CIE 1931 chromaticity diagram illustrating chromaticity regions in Examples 12 to 16 and Comparative examples 7 and 8 of Comparative experiment 3 and chromaticity regions of each standard (each chromaticity coordinate in the tables of FIG. 25 and FIG. 26).
Figure 34:
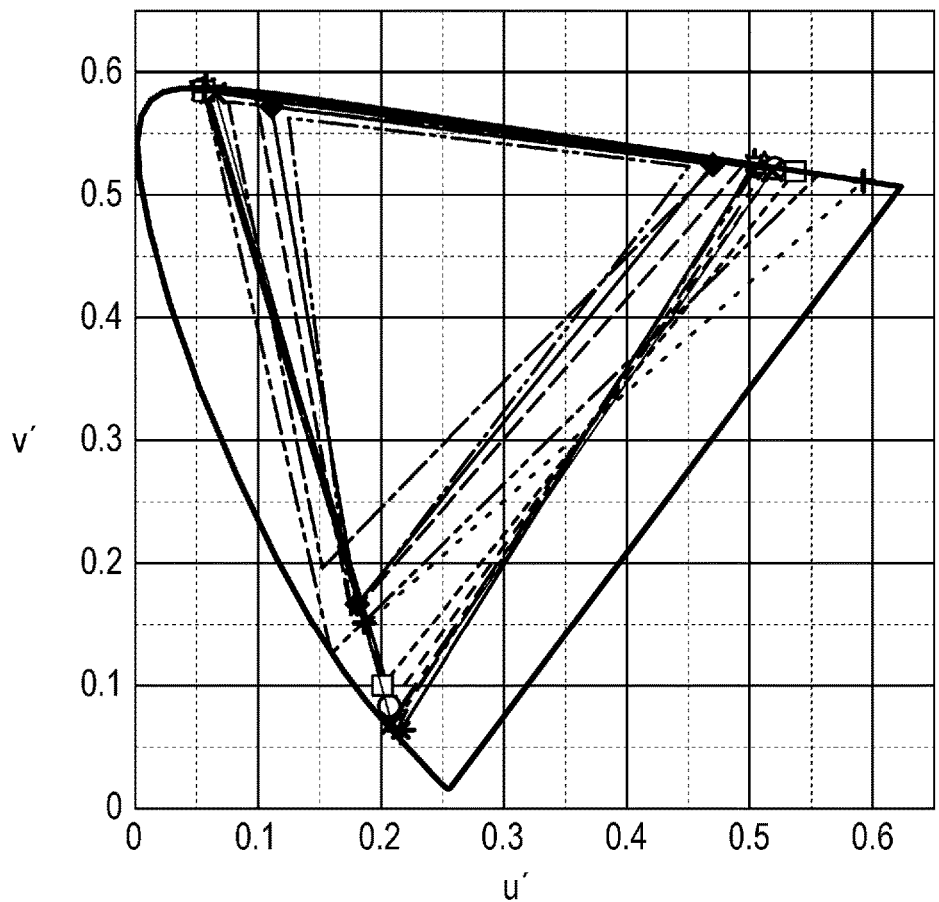
FIG. 34 is a CIE 1976 chromaticity diagram illustrating chromaticity regions in Examples 12 to 16 and Comparative examples 7 and 8 of Comparative experiment 3 and chromaticity regions of each standard (each chromaticity coordinate in the tables of FIG. 25 and FIG. 26).

Next, the experiment result of Comparative experiment 3 will be described. First, as the half value width of the peak is narrowed in the transmission spectrum of each coloring unit in each color filter according to Examples 5 to 16 and Comparative examples 3 to 8 by increasing the thickness of each coloring unit as illustrated in FIG. 21 to FIG. 28, the color purity of the emitted light is easily increased, but the transmittance of each coloring unit is decreased. Thus, the luminance of the emitted light tends to be easily decreased. As the half value width of the peak is widened in the transmission spectrum of each coloring unit by decreasing the thickness of each coloring unit, the transmittance of each coloring unit is improved, and thus the luminance of the emitted light is easily increased, but the color purity of the emitted light tends to be easily decreased. When the half value width of the peak of the transmission spectrum of the green coloring unit is widened by decreasing the thickness thereof, the transmission spectrum approaches the light emission spectrum of the red phosphor. Thus, the light emission spectrum of the red phosphor is changed in Examples 5 to 16 and Comparative examples 3 to 8 in such a manner that the peak wavelength of the peak thereof and the wavelength for the half value of the peak are shifted to the long wavelength side, and thereby the light emission spectrum of the red phosphor can be prevented from overlapping with the transmission spectrum of the green coloring unit, and a deterioration in color reproducibility is prevented (refer to FIG. 21 to FIG. 26). If the light emission spectrum of the red phosphor is shifted to the long wavelength side as described above, the color purity of the emitted red light is increased, and the red gamut is expanded. Thus, a decrease in color reproducibility accompanied by decreasing the thickness of each coloring unit of the color filter is more favorably reduced (refer to FIG. 29 to FIG. 34). Accordingly, 100% of color reproducibility as the BT.2020 percentage is secured in Examples 5 to 16 and Comparative examples 3 to 8. However, when the light emission spectrum of the red phosphor is shifted (wavelength shifting) to the long wavelength side as described above, the peak wavelength and the wavelength for the half value of the peak thereof are moved away from the peak visibility of 555 nm, and thus the luminance of the red light emitted from the red phosphor tends to be decreased. Thus, when the thickness of each coloring unit of the color filter is gradually decreased from the greatest thickness as illustrated in FIG. 28, the luminance ratio of the emitted light is predominantly increased along with an increase in the transmittance of each coloring unit until the thickness reaches a prescribed thickness, and the luminance ratio of the emitted light has the maximum value when the thickness reaches the prescribed thickness. However, when the thickness of each coloring unit is decreased beyond the prescribed thickness, the luminance ratio of the emitted light is predominantly decreased along with wavelength shifting of the red phosphor to the long wavelength side, and thus the luminance ratio of the emitted light tends to be gradually decreased. When the rate of increase in the luminance ratio of the emitted light accompanied by decreasing the thickness of each coloring unit until the luminance ratio of the emitted light has the maximum value is compared with the rate of decrease in the luminance ratio of the emitted light accompanied by decreasing the thickness of each coloring unit after the luminance ratio of the emitted light has the maximum value, the latter is greater than the former.

Conversely, in a case where the half value width of the peak of the transmission spectrum of the green coloring unit is narrowed by gradually increasing the thickness of the green coloring unit from the smallest thickness as illustrated in FIG. 21 to FIG. 28 in Examples 5 to 16 and Comparative examples 3 to 8, the transmission spectrum is shifted away from the light emission spectrum of the red phosphor (refer to FIG. 21 to FIG. 26). Therefore, the light emission spectrum of the red phosphor, in order not to overlap with the transmission spectrum of the green coloring unit, is changed in such a manner that the peak wavelength of the peak thereof and the wavelength for the half value of the peak are shifted (wavelength shifting) to the short wavelength side, and thus the light emission spectrum of the red phosphor can be caused to approach the peak visibility of 555 nm without a deterioration in color reproducibility. Accordingly, the luminance of the red light emitted from the red phosphor is improved, the luminance of the entirety of the emitted light of the LED is improved, and consequently the luminance ratio of the emitted light obtained after being transmitted through each coloring unit is increased. That is, as illustrated in FIG. 28, the luminance ratio of the emitted light is predominantly improved along with wavelength shifting of the red phosphor to the short wavelength side until the thickness of the green coloring unit reaches from the smallest state thereof to a prescribed thickness. When the thickness of the green coloring unit is increased beyond the prescribed thickness, now the luminance ratio of the emitted light is predominantly decreased along with a decrease in the transmittance of each coloring unit, and thus the luminance ratio of the emitted light tends to be gradually decreased. When the rate of increase in the luminance ratio of the emitted light accompanied by increasing the thickness of each coloring unit until the luminance ratio of the emitted light has the maximum value is compared with the rate of decrease in the luminance ratio of the emitted light accompanied by increasing the thickness of each coloring unit after the luminance ratio of the emitted light has the maximum value, the former is greater than the latter.

Next, Examples 5 to 7 and Comparative examples 3 and 4 in which the half value width of the light emission spectrum of each phosphor is set to 40 nm will be compared and reviewed. Comparative example 3 has the peak wavelength, the half value width, and the wavelength for the half value of the peak of the transmission spectrum related to each coloring unit of the color filter within each numerical value range described previously but has the peak wavelength of the light emission spectrum related to the red phosphor (655 nm±2 nm) residing above the upper limit value of the numerical value range described previously (620 nm±2 nm to 642 nm±2 nm) as illustrated in FIG. 21. That is, since the peak wavelength of the light emission spectrum of the red phosphor is greatly separated from the peak visibility, the luminance of the red light is significantly decreased, and accordingly the luminance related to the emitted light of the LED is insufficient. This is also apparent from the fact that the luminance ratio of the red light in the emitted light according to Comparative example 3 is "51%", while the luminance ratio of the red light in the emitted light according to Examples 5 to 7 is "62% to 63%". Thus, the luminance ratio of white light in the emitted light in Comparative example 3 is "49%" which is a lower numerical value less than or equal to 50%. Comparative example 4 has the peak wavelength of the light emission spectrum related to the red phosphor within the numerical value range described previously but has the half value width of the transmission spectrum related to the blue coloring unit and the green coloring unit of the color filter (the half value width of the transmission spectrum of the blue coloring unit is 53 nm, and the half value width of the transmission spectrum of the green coloring unit is 57 nm) residing below the lower limit value of each numerical value range described previously (the half value width of the transmission spectrum of the blue coloring unit is 61 nm to 99 nm, and the half value width of the transmission spectrum of the green coloring unit is 63 nm to 87 nm) and has the wavelength for the half value of the peak of the transmission spectrum related to the red coloring unit (598 nm) residing above the upper limit value of the numerical value range described previously (589 nm to 596 nm) as illustrated in FIG. 22. That is, since the thickness of each coloring unit is excessively increased in Comparative example 4, the transmittance of light in each coloring unit is excessively decreased, and the luminance of the emitted light is insufficient even if the peak wavelength of the light emission spectrum of the red phosphor is caused to approach the peak visibility by shifting the light emission spectrum thereof to the short wavelength side. This is also apparent from the fact that the luminance ratio of the blue light, the luminance ratio of the green light, and the luminance ratio of the red light in the emitted light according to Comparative example 4 are respectively "18%", "52%", and "56%", while the luminance ratio of the blue light, the luminance ratio of the green light, and the luminance ratio of the red light in the emitted light according to Examples 5 to 7 are respectively "22% to 29%", "59% to 62%", and "62% to 63%" and are relatively increased. Thus, the luminance ratio of white light in the emitted light in Comparative example 4 is "48%" which is a lower numerical value less than or equal to 50%.

Examples 5 to 7 have the peak wavelength, the half value width, and the wavelength for the half value of the peak of the transmission spectrum related to each coloring unit of the color filter, and the peak wavelength of the light emission spectrum related to the red phosphor within the numerical value ranges described previously as illustrated in FIG. 21 and FIG. 22, and thus the luminance ratio of white light in the emitted light has a sufficient numerical value of greater than or equal to 50% in Examples 5 to 7. The reason is that red light and green light having high luminance and high color purity are emitted by the red phosphor and the green phosphor of the LED according to Examples 5 to 7 and that the light is efficiently transmitted by each coloring unit of the color filter. When Examples 5 to 7 are compared, the luminance ratio of white light in the emitted light is decreased in the order of Example 5, Example 6, and Example 7. The reason is that the peak wavelength of the light emission spectrum of the red phosphor, the peak wavelength, the half value width, and the wavelength for the half value of the peak of the transmission spectrum of each coloring unit (thickness of each coloring unit) are balanced in the most excellent manner in Example 5 that has the maximum luminance ratio, while the transmittance of each coloring unit and the luminance ratio of the emitted light are decreased in Examples 6 and 7 since the half value width of the transmission spectrum of each coloring unit is narrowed and the wavelength for the half value of the peak is shifted to the long wavelength side in Examples 6 and 7 compared with Example 5.

Next, Examples 8 to 11 and Comparative examples 5 and 6 in which the half value width of the light emission spectrum of each phosphor is set to 30 nm will be compared and reviewed. Comparative example 5 has the peak wavelength, the half value width, and the wavelength for the half value of the peak of the transmission spectrum related to each coloring unit of the color filter within each numerical value range described previously but has the peak wavelength of the light emission spectrum related to the red phosphor (655 nm±2 nm) residing above the upper limit value of the numerical value range described previously (620 nm±2 nm to 642 nm±2 nm) as illustrated in FIG. 23. That is, since the peak wavelength of the light emission spectrum of the red phosphor is greatly separated from the peak visibility, the luminance of the red light is significantly decreased, and accordingly the luminance related to the emitted light of the LED is insufficient. This is also apparent from the fact that the luminance ratio of the red light in the emitted light according to Comparative example 5 is "51%", while the luminance ratio of the red light in the emitted light according to Examples 8 to 11 is "71% to 75%". Thus, the luminance ratio of white light in the emitted light in Comparative example 5 is "49%" which is a lower numerical value less than or equal to 50%. Comparative example 6 has the peak wavelength of the light emission spectrum related to the red phosphor within the numerical value range described previously but has the half value width of the transmission spectrum related to the blue coloring unit and the green coloring unit of the color filter (the half value width of the transmission spectrum of the blue coloring unit is 51 nm, and the half value width of the transmission spectrum of the green coloring unit is 54 nm) residing below the lower limit value of each numerical value range described previously (the half value width of the transmission spectrum of the blue coloring unit is 61 nm to 99 nm, and the half value width of the transmission spectrum of the green coloring unit is 63 nm to 87 nm) and has the wavelength for the half value of the peak of the transmission spectrum related to the red coloring unit (599 nm) residing above the upper limit value of the numerical value range described previously (589 nm to 596 nm) as illustrated in FIG. 24. That is, since the thickness of each coloring unit is excessively increased in Comparative example 6, the transmittance of light in each coloring unit is excessively decreased, and the luminance of the emitted light is insufficient even if the peak wavelength of the light emission spectrum of the red phosphor is caused to approach the peak visibility by shifting the light emission spectrum thereof to the short wavelength side. This is also apparent from the fact that the luminance ratio of the blue light, the luminance ratio of the green light, and the luminance ratio of the red light in the emitted light according to Comparative example 6 are respectively "16%", "53%", and "60%", while the luminance ratio of the blue light, the luminance ratio of the green light, and the luminance ratio of the red light in the emitted light according to Examples 8 to 11 are respectively "22% to 37%", "64% to 70%", and "71% to 75%" and are relatively increased. Thus, the luminance ratio of white light in the emitted light in Comparative example 6 is "49%" which is a lower numerical value less than or equal to 50%.

Examples 8 to 11 have the peak wavelength, the half value width, and the wavelength for the half value of the peak of the transmission spectrum related to each coloring unit of the color filter, and the peak wavelength of the light emission spectrum related to the red phosphor within the numerical value ranges described previously as illustrated in FIG. 23 and FIG. 24, and thus the luminance ratio of white light in the emitted light has a sufficient numerical value of greater than or equal to 50% in Examples 8 to 11. The reason is that red light and green light having high luminance and high color purity are emitted by the red phosphor and the green phosphor of the LED according to Examples 8 to 11 and that the light is efficiently transmitted by each coloring unit of the color filter. When Examples 8 to 11 are compared, the luminance ratio of white light in the emitted light has the same (59%) and maximum value in Examples 8 and 9, while the luminance ratio of white light in the emitted light is decreased in the order of Example 10 and Example 11. The reason is that the peak wavelength of the light emission spectrum of the red phosphor, the peak wavelength, the half value width, and the wavelength for the half value of the peak of the transmission spectrum of each coloring unit (thickness of each coloring unit) are balanced in the most excellent manner in Examples 8 and 9 that have the maximum luminance ratio, while the transmittance of each coloring unit and the luminance ratio of the emitted light are decreased in Examples 10 and 11 since the half value width of the transmission spectrum of each coloring unit is narrowed and the wavelength for the half value of the peak is shifted to the long wavelength side in Examples 10 and 11 compared with Examples 8 and 9. When Examples 8 to 11 and Comparative examples 5 and 6 are compared with Examples 5 to 7 and Comparative examples 3 and 4, it is understood that Examples 8 to 11 and Comparative examples 5 and 6 have a relatively higher luminance ratio for white light in the emitted light than Examples 5 to 7 and Comparative examples 3 and 4 as illustrated in FIG. 28 in a case where the thickness ratio of each coloring unit of the color filter is the same. The reason considered is that since the half value width of the light emission spectrum of each phosphor of the LED is narrower in Examples 8 to 11 and Comparative examples 5 and 6 than in Examples 5 to 7 and Comparative examples 3 and 4, the luminance related to the emitted light of the LED is relatively increased, and the luminance ratio of the emitted light is increased by the increase in the luminance.

Next, Examples 12 to 16 and Comparative examples 7 and 8 in which the half value width of the light emission spectrum of each phosphor is set to 20 nm will be compared and reviewed. Comparative example 7 has the peak wavelength of the light emission spectrum related to the red phosphor (655 nm±2 nm) residing above the upper limit value of the numerical value range described previously (620 nm±2 nm to 642 nm±2 nm) and, in addition, has the half value width of the transmission spectrum related to the blue coloring unit and the green coloring unit of the color filter (the half value width of the transmission spectrum of the blue coloring unit is 104 nm, and the half value width of the transmission spectrum of the green coloring unit is 91 nm) residing above the upper limit value of each numerical value range described previously (the half value width of the transmission spectrum of the blue coloring unit is 61 nm to 99 nm, and the half value width of the transmission spectrum of the green coloring unit is 63 nm to 87 nm) and has the wavelength for the half value of the peak of the transmission spectrum related to the red coloring unit (588 nm) residing below the lower limit value of the numerical value range described previously (589 nm to 596 nm) as illustrated in FIG. 25. Since the thickness of each coloring unit of the color filter is small in Comparative example 7 compared with Comparative examples 3 and 5, the light emission spectrum of the red phosphor is greatly shifted to the long wavelength side in order to guarantee color reproducibility. Thus, since the peak wavelength of the light emission spectrum of the red phosphor is more greatly separated from the peak visibility, the luminance of the red light is significantly decreased, and accordingly the luminance related to the emitted light of the LED is insufficient. This is also apparent from the fact that the luminance ratio of the red light in the emitted light according to Comparative example 7 is "48%", while the luminance ratio of the red light in the emitted light according to Examples 12 to 16 is "74% to 80%". Thus, the luminance ratio of white light in the emitted light in Comparative example 7 is "47%" which is a lower numerical value less than or equal to 50%. Comparative example 8 has the peak wavelength of the light emission spectrum related to the red phosphor (618 nm±2 nm) residing below the lower limit value of the numerical value range described previously (620 nm±2 nm to 642 nm±2 nm) and, in addition, has the half value width of the transmission spectrum related to the blue coloring unit and the green coloring unit of the color filter (the half value width of the transmission spectrum of the blue coloring unit is 49 nm, and the half value width of the transmission spectrum of the green coloring unit is 52 nm) residing below the lower limit value of each numerical value range described previously (the half value width of the transmission spectrum of the blue coloring unit is 61 nm to 99 nm, and the half value width of the transmission spectrum of the green coloring unit is 63 nm to 87 nm) and has the wavelength for the half value of the peak of the transmission spectrum related to the red coloring unit (600 nm) residing above the upper limit value of the numerical value range described previously (589 nm to 596 nm) as illustrated in FIG. 26. That is, since the thickness of each coloring unit is excessively increased in Comparative example 8, the transmittance of light in each coloring unit is excessively decreased, and the luminance of the emitted light is insufficient even if the peak wavelength of the light emission spectrum of the red phosphor is caused to approach the peak visibility by shifting the light emission spectrum thereof to the short wavelength side. This is also apparent from the fact that the luminance ratio of the blue light, the luminance ratio of the green light, and the luminance ratio of the red light in the emitted light according to Comparative example 8 are respectively "15%", "52%", and "62%", while the luminance ratio of the blue light, the luminance ratio of the green light, and the luminance ratio of the red light in the emitted light according to Examples 12 to 16 are respectively "22% to 50%", "67% to 77%", and "74% to 87%" and are relatively increased. Thus, the luminance ratio of white light in the emitted light in Comparative example 8 is "48%" which is a lower numerical value less than or equal to 50%.

Examples 12 to 16 have the peak wavelength, the half value width, and the wavelength for the half value of the peak of the transmission spectrum related to each coloring unit of the color filter, and the peak wavelength of the light emission spectrum related to the red phosphor within the numerical value ranges described previously as illustrated in FIG. 25 and FIG. 26, and thus the luminance ratio of white light in the emitted light has a very high numerical value of greater than or equal to 60% in Examples 12 to 16. The reason is that red light and green light having high luminance and high color purity are emitted by the red phosphor and the green phosphor of the LED according to Examples 12 to 16 and that the light is efficiently transmitted by each coloring unit of the color filter. When Examples 12 to 16 are compared, the luminance ratio of white light in the emitted light has the maximum value (73%) in Example 13, while the luminance ratio of white light in the emitted light is decreased in the order of Example 14, Example 12, Example 15, and Example 16. The reason is that the peak wavelength of the light emission spectrum of the red phosphor, the peak wavelength, the half value width, and the wavelength for the half value of the peak of the transmission spectrum of each coloring unit (thickness of each coloring unit) are balanced in the most excellent manner in Example 13 that has the maximum luminance ratio, while the transmittance of each coloring unit and the luminance ratio of the emitted light are decreased in Examples 14 to 16 since the half value width of the transmission spectrum of each coloring unit is narrowed and the wavelength for the half value of the peak is shifted to the long wavelength side in Examples 14 to 16 compared with Example 13. In addition, since the light emission spectrum of the red phosphor is greatly shifted to the long wavelength side in Example 12 compared with Example 13, the luminance of the red light of the LED is decreased, and the luminance ratio of the emitted light is decreased. When Examples 12 to 16 and Comparative examples 7 and 8 are compared with Examples 5 to 11 and Comparative examples 3 to 6, it is understood that Examples 12 to 16 and Comparative examples 7 and 8 have a relatively higher luminance ratio for white light in the emitted light than Examples 5 to 11 and Comparative examples 3 to 6 as illustrated in FIG. 28 in a case where the thickness ratio of each coloring unit of the color filter is the same. The reason considered is that since the half value width of the light emission spectrum of each phosphor of the LED is the narrowest in Examples 12 to 16 and Comparative examples 7 and 8, the luminance related to the emitted light of the LED is the highest, and the luminance ratio of the emitted light is increased by the increase in the luminance.

According to the present embodiment described heretofore, the LED emits green light having a light emission spectrum that includes a peak having a peak wavelength of 530 nm±2 nm and has a half value width of less than 20 nm for the peak, and red light having a light emission spectrum that includes a peak having a peak wavelength in a range of 620 nm±2 nm to 640 nm±2 nm and has a half value width of less than 20 nm for the peak. The blue coloring unit has a transmission spectrum that includes a peak having a peak wavelength in a range of 456.5 nm to 461.5 nm. The green coloring unit has a transmission spectrum that includes a peak having a peak wavelength in a range of 531.5 nm to 533.5 nm. The red coloring unit has a transmission spectrum that has a wavelength in a range of 589 nm to 596 nm for the half value of a peak. Accordingly, since the half value widths of the peaks of the light emission spectra of the green light and the red light emitted from the LED are less than 20 nm and very narrow, sufficient color reproducibility can be secured even if the half value width of the peak of the transmission spectrum of each coloring unit is widened, and luminance can be further increased. As described above, the half value widths related to the peaks of the light emission spectra of the green light and the red light are set to be less than 20 nm. Thus, when the half value width of the peak of the transmission spectrum of the green coloring unit is widened, the transmission spectrum of the green coloring unit overlapping with the light emission spectrum of the red light can be easily avoided without shifting the peak wavelength of the peak of the light emission spectrum of the red light of the LED to the long wavelength side too much. Accordingly, the visibility of the red light emitted from the LED is unlikely to be decreased, and thus the luminance related to the emitted light is more easily maintained at a certain level or higher.

The LED emits green light having a light emission spectrum that has a half value width in a range of 21 nm to 30 nm for a peak, and red light having a light emission spectrum that includes a peak having a peak wavelength in a range of 626 nm±2 nm to 639 nm±2 nm and has a half value width in a range of 21 nm to 30 nm for the peak. The blue coloring unit has a transmission spectrum that includes a peak having a peak wavelength in a range of 458.5 nm to 461.5 nm and has a half value width in a range of 61 nm to 85 nm for the peak. The green coloring unit has a transmission spectrum that includes a peak having a peak wavelength in a range of 531.5 nm to 532.5 nm and has a half value width in a range of 63 nm to 79 nm for the peak. The red coloring unit has a transmission spectrum that has a wavelength in a range of 591 nm to 596 nm for the half value of a peak. Accordingly, since the half value widths of the peaks of the light emission spectra of the green light and the red light emitted from the LED are in a range of 21 nm to 30 nm and sufficiently narrow, sufficient color reproducibility can be secured even if the half value width of the peak of the transmission spectrum of each coloring unit is widened, and luminance can be further increased. In addition, since members related to the LED can be easily supplied and the manufacturing cost related to the LED can be decreased, this is favorable compared with a case where the half value widths of the peaks of the light emission spectra of the green light and the red light emitted from the LED are set to be less than 20 nm.

The LED emits green light having a light emission spectrum that has a half value width in a range of 31 nm to 40 nm for a peak, and red light having a light emission spectrum that includes a peak having a peak wavelength in a range of 633 nm±2 nm to 642 nm±2 nm and has a half value width in a range of 31 nm to 40 nm for the peak. The blue coloring unit has a transmission spectrum that includes a peak having a peak wavelength in a range of 460 nm to 461.5 nm and has a half value width in a range of 61 nm to 74 nm for the peak. The green coloring unit has a transmission spectrum that includes a peak having a peak wavelength in a range of 531.5 nm to 532 nm and has a half value width in a range of 63 nm to 72 nm for the peak. The red coloring unit has a transmission spectrum that has a wavelength in a range of 593 nm to 596 nm for the half value of a peak. Accordingly, members related to the LED can be more easily supplied, and the manufacturing cost related to the LED can be further decreased, compared with a case where the half value widths of the peaks of the light emission spectra of the green light and the red light emitted from the LED are set to be less than 30 nm.

Embodiment 4

Embodiment 4 of the present invention will be described with FIG. 35 to FIG. 38. The light emission spectrum of each phosphor of an LED and the transmission spectrum of each coloring unit of a color filter that are changed from Embodiment 2 are illustrated in Embodiment 4. Duplicate descriptions of the same structures, actions, and effects as Embodiment 2 will not be provided.

An LED included in a backlight device according to the present embodiment has a peak wavelength in a range of 533 nm±2 nm to 540 nm±2 nm for a peak of the light emission spectrum of a green phosphor formed of an oxynitride phosphor (β-SiAlON in which europium is used as an activator) and a half value width of less than 25 nm for the peak, and has a peak wavelength of approximately 631 nm±2 nm for a peak of the light emission spectrum of a red phosphor formed of a complex fluoride phosphor (potassium silicofluoride in which manganese is used as an activator) and a half value width of less than 7 nm for the peak. A color filter included in a liquid crystal panel has a peak wavelength in a range of approximately 461 nm for a peak of the transmission spectrum of a blue coloring unit and a half value width in a range of 46 nm to 48 nm for the peak, has a peak wavelength of approximately 531 nm for a peak of the transmission spectrum of a green coloring unit and a half value width in a range of 50 nm to 52 nm for the peak, and has a wavelength in a range of 601 nm to 602 nm for the half value of a peak of the transmission spectrum of a red coloring unit. Particularly, it is preferable that the LED has a peak wavelength of approximately 528 nm±2 nm for a peak of the light emission spectrum of the green phosphor and a half value width of approximately 25 nm for the peak and has a peak wavelength of approximately 631 nm±2 nm for a peak of the light emission spectrum of the red phosphor and a half value width of approximately 7 nm for the peak, and that the color filter has a peak wavelength of approximately 461 nm for a peak of the transmission spectrum of the blue coloring unit and a half value width of approximately 48 nm for the peak, has a peak wavelength of approximately 531 nm for a peak of the transmission spectrum of the green coloring unit and a half value width of approximately 52 nm for the peak, and has a wavelength of approximately 601 nm for the half value of a peak of the transmission spectrum of the red coloring unit. A blue LED element included in the LED is the same as that of Embodiments 1 and 2. The materials of the green phosphor and the red phosphor are the same as those of Embodiment 2 except for the light emission spectra thereof. Numerical values such as the half value width and the peak wavelength related to each light emission spectrum of the green phosphor and the red phosphor and numerical values such as the half value width, the peak wavelength, and the wavelength for the half value of a peak related to each transmission spectrum of the coloring units are measured by using, for example, "spectroradiometer SR-3 manufactured by Topcon" in the present embodiment.

Next, Comparative experiment 4 below is performed in order to obtain information related to the luminance of emitted light and color reproducibility resulting from the above configurations of the LED and the color filter. In Comparative experiment 4, a liquid crystal display device that includes the backlight device including the LED described before the present paragraph and includes the liquid crystal panel including the color filter corresponds to Examples 17 and 18, and a liquid crystal display device in which the light emission spectrum related to the LED of the backlight device and the transmission spectrum related to the color filter of the liquid crystal panel of Examples 17 and 18 are changed corresponds to Comparative example 9. In addition, Comparative examples 1 and 2 described in Comparative experiment 1 of Embodiment 1 will be described together, and the configuration and the like thereof are the same as described previously. Numerical values such as the half value width and the peak wavelength related to each light emission spectrum of the blue LED element, the green phosphor, and the red phosphor and numerical values such as the half value width, the peak wavelength, and the wavelength for the half value of a peak related to each transmission spectrum of the coloring units are measured by using, for example, "spectroradiometer SR-3 manufactured by Topcon" in Comparative experiment 4. First, common points will be described. Examples 17 and 18 and Comparative example 9 use, as the green phosphor of the LED, β-SiAlON in which europium is used as an activator, and uses, as the red phosphor, potassium silicofluoride in which manganese is used as an activator. The peak wavelengths of all of the red phosphors are equally set to approximately 631 nm±2 nm, and the half value widths of the peaks thereof are set to approximately 7 nm. When the transmission spectrum related to the color filter is adjusted in Examples 17 and 18 and Comparative example 9, the material of each coloring unit is set to be the same as those of Comparative examples 1 and 2 (refer to FIG. 15 and FIG. 21), and the thickness thereof is changed. Relative values (in units of "%") with the thickness of each coloring unit of the color filter of Comparative example 1 used as 100% are described in each field of "R thickness ratio", "G thickness ratio", and "B thickness ratio" in FIG. 35. Therefore, in a case where the thickness ratio of the coloring units of each color of the color filter is the same in Examples 17 and 18 and Comparative example 9, the transmission spectrum thereof is the same. The blue LED element of the LED according to Examples 17 and 18 and Comparative example 9 has a peak wavelength of approximately 444 nm±2 nm for a peak and has a half value width of approximately 18 nm for the peak. Hereinafter, Examples 17 and 18 and Comparative example 9 will be described except for the common points.

The LED of the liquid crystal display device according to Comparative example 9 has a peak wavelength of 528 nm±2 nm for a peak of the light emission spectrum of the green phosphor, and the color filter thereof has a thickness ratio of approximately 520% (specifically 524%) for the coloring units of each color, has a peak wavelength of 461 nm for a peak of the transmission spectrum of the blue coloring unit and a half value width of 50 nm for the peak, has a peak wavelength of 531 nm for a peak of the transmission spectrum of the green coloring unit and a half value width of 54 nm for the peak, and has a wavelength of 600 nm for the half value of a peak of the transmission spectrum of the red coloring unit. The LED of the liquid crystal display device according to Example 17 has a peak wavelength of 533 nm±2 nm for a peak of the light emission spectrum of the green phosphor, and the color filter thereof has a thickness ratio of approximately 570% (specifically 571%) for the coloring units of each color, has a peak wavelength of 461 nm for a peak of the transmission spectrum of the blue coloring unit and a half value width of 48 nm for the peak, has a peak wavelength of 531 nm for a peak of the transmission spectrum of the green coloring unit and a half value width of 52 nm for the peak, and has a wavelength of 601 nm for the half value of a peak of the transmission spectrum of the red coloring unit. The LED of the liquid crystal display device according to Example 18 has a peak wavelength of 540 nm±2 nm for a peak of the light emission spectrum of the green phosphor, and the color filter thereof has a thickness ratio of approximately 620% (specifically 619%) for the coloring units of each color, has a peak wavelength of 461 nm for a peak of the transmission spectrum of the blue coloring unit and a half value width of 46 nm for the peak, has a peak wavelength of 531 nm for a peak of the transmission spectrum of the green coloring unit and a half value width of 50 nm for the peak, and has a wavelength of 602 nm for the half value of a peak of the transmission spectrum of the red coloring unit.

In Comparative experiment 4, the chromaticity of the LED, the luminance ratio of emitted light from the liquid crystal panel, and each chromaticity of the emitted light are measured for each liquid crystal display device according to Examples 17 and 18 and Comparative example 9 having the above configurations, and the NTSC percentage, the BT.709 percentage, the DCI percentage, and the BT.2020 percentage of the chromaticity region related to the emitted light are calculated. The results are illustrated in FIG. 35 to FIG. 38. A list of experiment results of Comparative experiment 4 is described in FIG. 35, and the content thereof is the same as those of FIG. 21 to FIG. 26 according to Embodiment 3. The luminance ratio of emitted light is a relative value (in units of "%") with the luminance of the emitted light of each color according to Comparative example 1 used as 100% (refer to FIG. 21). A graph representing a relationship between the thickness ratio of the color filter and the luminance ratio of the emitted light is described in FIG. 36. Chromaticity regions according to each standard and the chromaticity region of emitted light from the liquid crystal panel of the liquid crystal display device according to Examples 17 and 18 and Comparative example 9 are described in FIG. 37 and FIG. 38.

Figure 36:
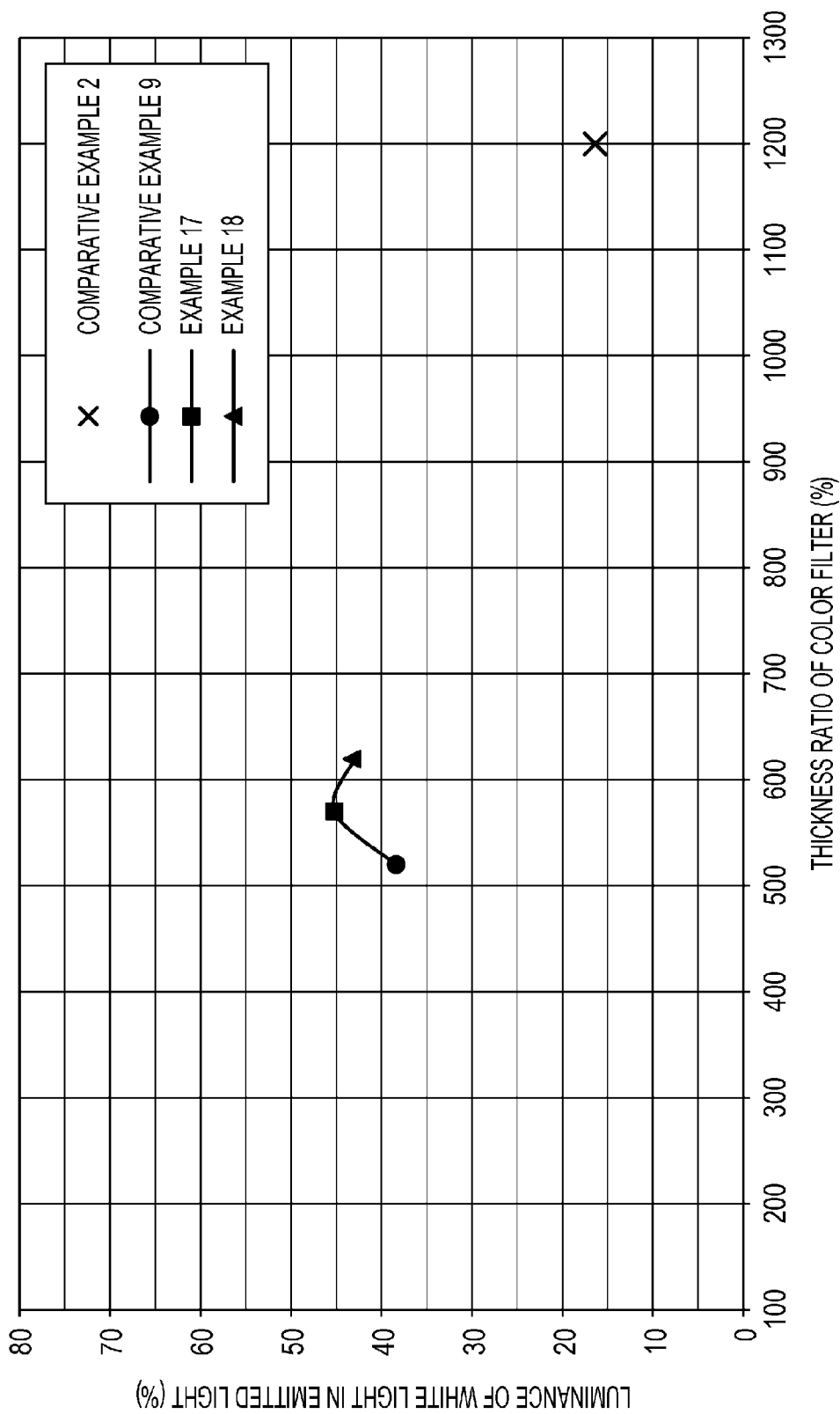
FIG. 36 is a graph representing a relationship between the thickness ratio of each coloring unit of a color filter of Comparative experiment 4 and the luminance ratio of white light in emitted light.
Figure 37:
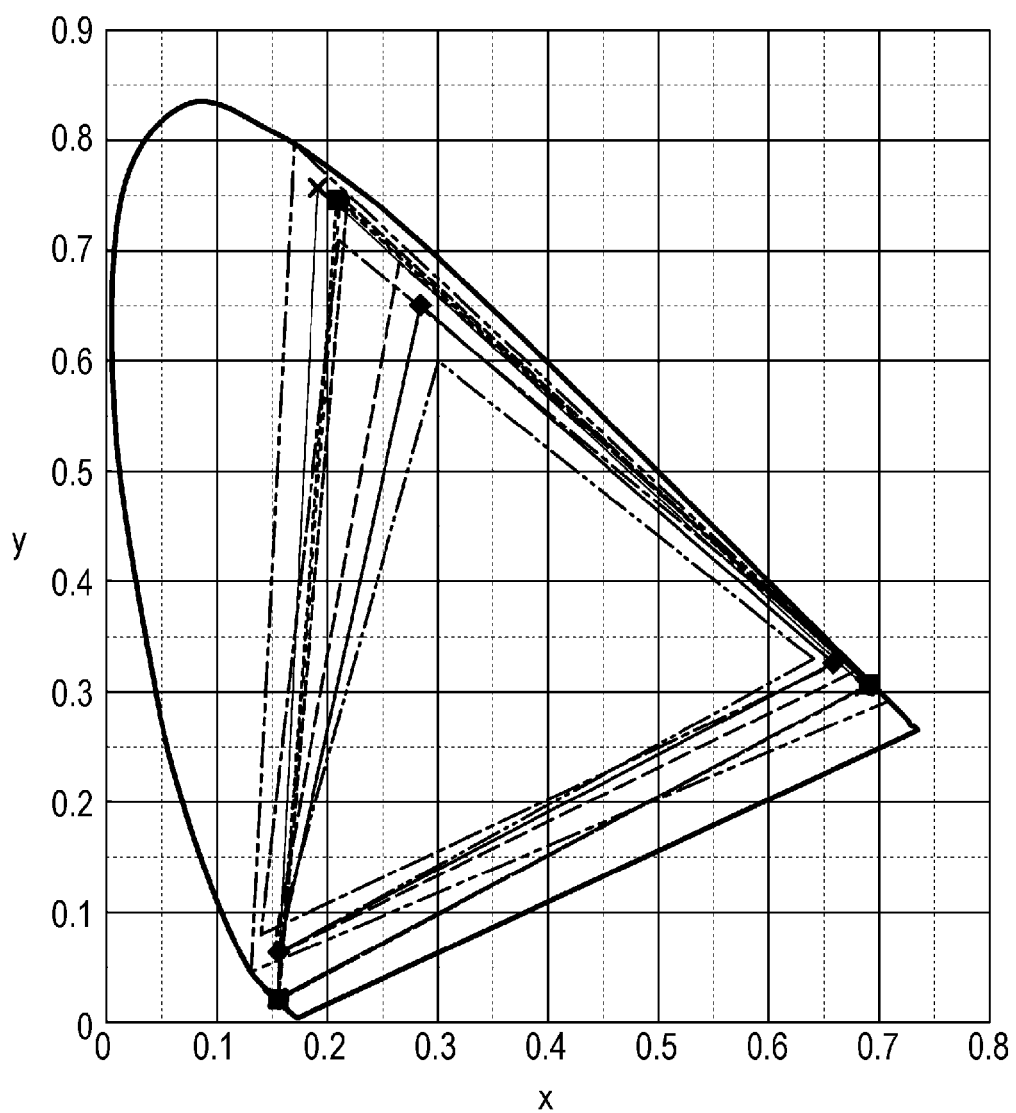
FIG. 37 is a CIE 1931 chromaticity diagram illustrating chromaticity regions in Examples 17 and 18 and Comparative example 9 of Comparative experiment 4 and chromaticity regions of each standard (each chromaticity coordinate in the table of FIG. 35).
Figure 38:
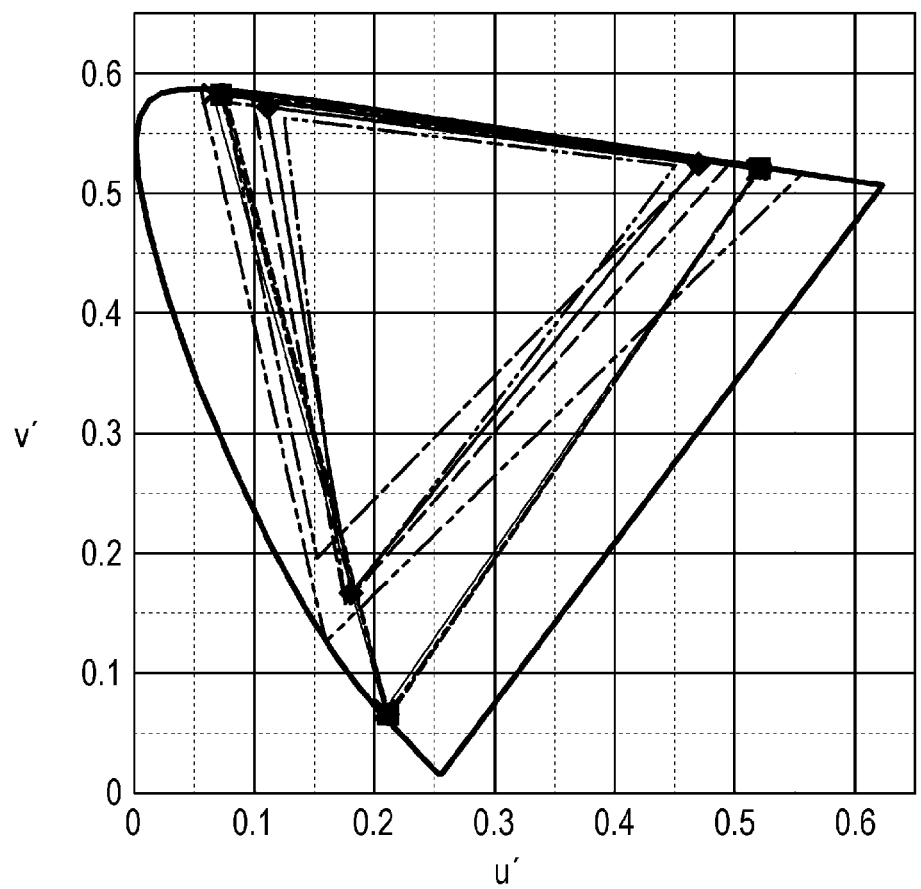
FIG. 38 is a CIE 1976 chromaticity diagram illustrating chromaticity regions in Examples 17 and 18 and Comparative example 9 of Comparative experiment 4 and chromaticity regions of each standard (each chromaticity coordinate in the table of FIG. 35).

Next, the experiment result of Comparative experiment 4 will be described. First, as the half value width of the peak is narrowed in the transmission spectrum of each coloring unit in each color filter according to Examples 17 and 18 and Comparative example 9 by increasing the thickness of each coloring unit as illustrated in FIG. 35, the color purity of the emitted light is easily increased, but the transmittance of each coloring unit is decreased. Thus, the luminance of the emitted light tends to be easily decreased. As the half value width of the peak is widened in the transmission spectrum of each coloring unit by decreasing the thickness of each coloring unit, the transmittance of each coloring unit is improved, and thus the luminance of the emitted light is easily increased, but the color purity of the emitted light tends to be easily decreased. When the half value width of the peak of the transmission spectrum of the green coloring unit is widened by decreasing the thickness of the green coloring unit, the light emission spectrum of the green phosphor is changed in Examples 17 and 18 and Comparative example 9 in such a manner that the peak wavelength of the peak thereof is shifted to the short wavelength side. Thus, the amount of overlap of the light emission spectrum of the green phosphor of the LED with the transmission spectrum of the green coloring unit is set to be greater than or equal to a certain amount, and sufficient color reproducibility can be secured. If the light emission spectrum of the green phosphor is shifted to the short wavelength side as described above, the color purity of the emitted green light is increased, and the green gamut is expanded. Thus, a decrease in color reproducibility accompanied by decreasing the thickness of each coloring unit of the color filter is more favorably reduced (refer to FIG. 37 and FIG. 38). Accordingly, 100% of color reproducibility as the BT.2020 percentage is secured in Examples 17 and 18 and Comparative example 9. However, when the light emission spectrum of the green phosphor is shifted (wavelength shifting) to the short wavelength side as described above, the peak wavelength thereof is moved away from the peak visibility of 555 nm, and thus the luminance of the green light emitted from the green phosphor tends to be decreased. Thus, when the thickness of each coloring unit of the color filter is gradually decreased from the greatest thickness as illustrated in FIG. 36, the luminance ratio of the emitted light is predominantly increased along with an increase in the transmittance of each coloring unit until the thickness reaches a prescribed thickness, and the luminance ratio of the emitted light has the maximum value when the thickness reaches the prescribed thickness. However, when the thickness of each coloring unit is decreased beyond the prescribed thickness, the luminance ratio of the emitted light is predominantly decreased along with wavelength shifting of the green phosphor to the short wavelength side, and thus the luminance ratio of the emitted light tends to be gradually decreased. When the rate of increase in the luminance ratio of the emitted light accompanied by decreasing the thickness of each coloring unit until the luminance ratio of the emitted light has the maximum value is compared with the rate of decrease in the luminance ratio of the emitted light accompanied by decreasing the thickness of each coloring unit after the luminance ratio of the emitted light has the maximum value, the latter is greater than the former.

Conversely, in a case where the half value width of the peak of the transmission spectrum of the green coloring unit is narrowed by gradually increasing the thickness of the green coloring unit from the smallest thickness as illustrated in FIG. 35 in Examples 17 and 18 and Comparative example 9, it is preferable that the peak wavelength of the peak the light emission spectrum of the green phosphor is shifted to the long wavelength side in order to reduce an accompanying decrease in luminance. That is, if the light emission spectrum of the green phosphor is shifted to the long wavelength side, the peak wavelength thereof approaches the peak visibility 555 nm. Thus, the luminance of the green light emitted from the green phosphor is improved, and the luminance of the entirety of the emitted light of the LED is improved. Accordingly, reduced is a decrease in luminance that is accompanied by narrowing the half value width of the peak of the transmission spectrum of the green coloring unit. That is, as illustrated in FIG. 36, the luminance ratio of the emitted light is predominantly improved along with wavelength shifting of the green phosphor to the long wavelength side until the thickness of the green coloring unit reaches from the smallest state thereof to a prescribed thickness.

When the thickness of the green coloring unit is increased beyond the prescribed thickness, now the luminance ratio of the emitted light is predominantly decreased along with a decrease in the transmittance of each coloring unit, and thus the luminance ratio of the emitted light tends to be gradually decreased. When the rate of increase in the luminance ratio of the emitted light accompanied by increasing the thickness of each coloring unit until the luminance ratio of the emitted light has the maximum value is compared with the rate of decrease in the luminance ratio of the emitted light accompanied by increasing the thickness of each coloring unit after the luminance ratio of the emitted light has the maximum value, the former is greater than the latter.

Next, Examples 17 and 18 and Comparative example 9 will be compared and reviewed in detail. Comparative example 9 has the peak wavelength of the light emission spectrum related to the green phosphor (528 nm±2 nm) residing below the lower limit value of the numerical value range described previously (533 nm±2 nm to 540 nm±2 nm) and, in addition, has the half value width of the transmission spectrum related to the blue coloring unit and the green coloring unit of the color filter (the half value width of the transmission spectrum of the blue coloring unit is 50 nm, and the half value width of the transmission spectrum of the green coloring unit is 54 nm) residing above the upper limit value of each numerical value range described previously (the half value width of the transmission spectrum of the blue coloring unit is 46 nm to 48 nm, and the half value width of the transmission spectrum of the green coloring unit is 50 nm to 52 nm) and has the wavelength for the half value of the peak of the transmission spectrum related to the red coloring unit (600 nm) residing below the lower limit value of the numerical value range described previously (601 nm to 602 nm) as illustrated in FIG. 35. Since the thickness of each coloring unit of the color filter is small in Comparative example 9 compared with Examples 17 and 18, the light emission spectrum of the green phosphor is greatly shifted to the short wavelength side in order to guarantee color reproducibility. Thus, since the peak wavelength of the light emission spectrum of the green phosphor is more greatly separated from the peak visibility, the luminance of the green light is greatly decreased, and accordingly the luminance related to the emitted light of the LED is insufficient. This is also apparent from the fact that the luminance ratio of the green light in the emitted light according to Comparative example 9 is "43%", while the luminance ratio of the green light in the emitted light according to Examples 17 and 18 is "48% to 50%". Thus, the luminance ratio of white light in the emitted light in Comparative example 9 is "38%" which is a lower numerical value less than or equal to 40%.

Examples 17 and 18 have the peak wavelength, the half value width, and the wavelength for the half value of the peak of the transmission spectrum related to each coloring unit of the color filter, and the peak wavelength of the light emission spectrum related to the green phosphor within the numerical value ranges described previously as illustrated in FIG. 35, and thus the luminance ratio of white light in the emitted light has a sufficiently high numerical value of greater than or equal to 40% in Examples 17 and 18. The reason is that red light and green light having high luminance and high color purity are emitted by the red phosphor and the green phosphor of the LED according to Examples 17 and 18 and that the light is efficiently transmitted by each coloring unit of the color filter. When Examples 17 and 18 are compared, the luminance ratio of white light in the emitted light has the maximum value (45%) in Example 17, and the luminance ratio in Example 18 is decreased from the luminance ratio of Example 17. The reason is that the peak wavelength of the light emission spectrum of the green phosphor, the peak wavelength, the half value width, and the wavelength for the half value of the peak of the transmission spectrum of each coloring unit (thickness of each coloring unit) are balanced in the most excellent manner in Example 17 that has the maximum luminance ratio, while the transmittance of each coloring unit and the luminance ratio of the emitted light are decreased in Example 18 since the half value width of the transmission spectrum of each coloring unit is narrowed and the wavelength for the half value of the peak is shifted to the long wavelength side in Example 18 compared with Example 17. When Examples 17 and 18 are compared with Examples 5 to 16 and Comparative examples 4 to 8 according to Comparative experiment 3 of Embodiment 3 (refer to FIG. 28), each coloring unit of the color filter has a greater thickness and lower luminance in Examples 17 and 18 as illustrated in FIG. 36. The reason considered is that the quantum dot phosphor used as the green phosphor and the red phosphor of the LED in Embodiment 3 has emitted light of high color purity compared with the oxynitride phosphor and the complex fluoride phosphor used as the green phosphor and the red phosphor according to the present embodiment, and thus high color reproducibility can be secured without increasing the thickness of each coloring unit of the color filter too much, and the luminance related to the emitted light is increased.

According to the present embodiment described heretofore, the LED emits green light having a light emission spectrum that includes a peak having a peak wavelength of 533 nm±2 nm to 540 nm±2 nm and has a half value width of less than 25 nm for the peak. The blue coloring unit has a transmission spectrum that includes a peak having a peak wavelength of 461 nm and has a half value width in a range of 46 nm to 48 nm for the peak. The green coloring unit has a transmission spectrum that includes a peak having a peak wavelength of 531 nm and has a half value width in a range of 50 nm to 52 nm for the peak. The red coloring unit has a transmission spectrum that has a wavelength in a range of 601 nm to 602 nm for the half value of a peak. Accordingly, since the half value width of the peak of the light emission spectrum of the green light emitted from the LED is less than 25 nm and sufficiently narrow, sufficient color reproducibility can be secured even if the half value width of the peak of the transmission spectrum of each coloring unit is widened, and sufficiently high luminance is obtained. As described above, the half value width related to the peak of the light emission spectrum of the green light is set to be less than 25 nm. Thus, when the half value width of the peak of the transmission spectrum of the green coloring unit is widened, the amount of overlap of the transmission spectrum of the green coloring unit with the light emission spectrum of the green light can be easily secured to a certain amount or larger without shifting the peak wavelength of the peak of the light emission spectrum of the green light of the LED to the short wavelength side too much. Accordingly, the visibility of the green light emitted from the LED is unlikely to be decreased, and thus the luminance related to the emitted light is more easily maintained at a certain level or higher.

Embodiment 5

Embodiment 5 of the present invention will be described with FIG. 39. A configuration of an LED 417 that is changed from Embodiments 1 and 3 is illustrated in Embodiment 5.

Duplicate descriptions of the same structures, actions, and effects as Embodiments 1 and 3 will not be provided.

Figure 39:
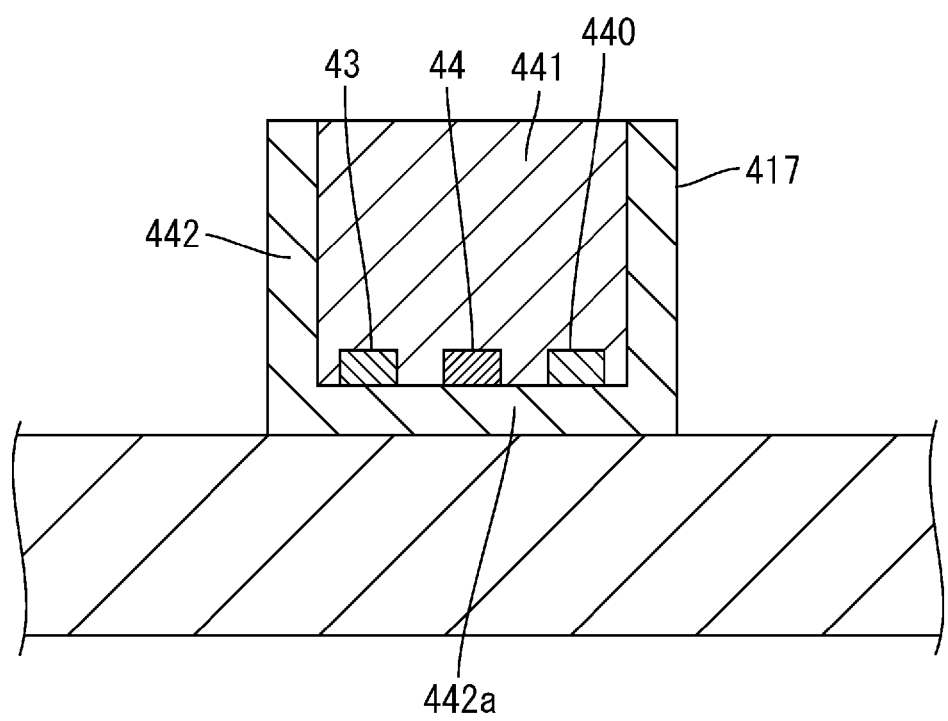
FIG. 39 is a sectional view of an LED and an LED substrate according to Embodiment 5 of the present invention.

The LED 417 according to the present embodiment includes a blue LED element 440 that emits blue light, a green LED element 43 that emits green light, and a red LED element 44 that emits red light as illustrated in FIG. 39, and the emitted light of the LED elements 43, 44, and 440 of three colors as a whole is emitted as approximately white light. That is, the LED 417 can emit white light without using phosphor as in Embodiments 1 and 3. The LED elements 43, 44, and 440 of three colors are linearly arranged at prescribed intervals along a bottom wall portion 442a in a case 442 and are sealed by a sealant 441. The sealant 441 does not include phosphor. The light emission spectrum of the blue light emitted from the blue LED element 440, the light emission spectrum of the green light emitted from the green LED element 43, and the light emission spectrum of the red light emitted from the red LED element 44 are approximately the same as those of Embodiments 1 and 3. That is, the LED elements 43, 44, and 440 of three colors have a steep peak in the light emission spectrum of the emitted light of each color and thus has a narrow half value width for the peak in the same manner as the quantum dot phosphor. Thus, the color purity of the emitted light of each color is very high in the same manner as the quantum dot phosphor, and the gamut of the emitted light is wide. Accordingly, high color reproducibility can be achieved with reduction of a decrease in luminance in the same manner as Embodiments 1 and 3. The light emission spectrum of the LED 417 according to the present embodiment is the same as those of Embodiments 1 and 3 (Examples 1, 2, and 5 to 16 according to Comparative experiments 1 and 3).

According to the present embodiment described heretofore, the LED 417 includes at least the blue LED element (blue light emitting element) 440 that emits blue light, the green LED element (green light emitting element) 43 that emits green light, and the red LED element (red light emitting element) 44 that emits red light. Accordingly, the LED 417 emits light that includes the blue light emitted from the blue LED element 440, the green light emitted from the green LED element 43, and the red light emitted from the red LED element 44 and as a whole exhibits approximate white. Since each color light of blue, green, and red is emitted from the LED elements (light emitting elements) 43, 44, and 440 that are individually prepared for each color, the color purity related to each color light is high, and accordingly sufficient color reproducibility can be secured even if the half value width of the peak of the transmission spectrum of each coloring unit of the color filter is widened, and this is favorable for improving luminance.

Embodiment 6

Embodiment 6 of the present invention will be described with FIG. 40 to FIG. 43. A backlight device 512 of a downlight type that is changed from Embodiment 1 is illustrated in Embodiment 6. Duplicate descriptions of the same structures, actions, and effects as Embodiment 1 will not be provided.

Figure 40:
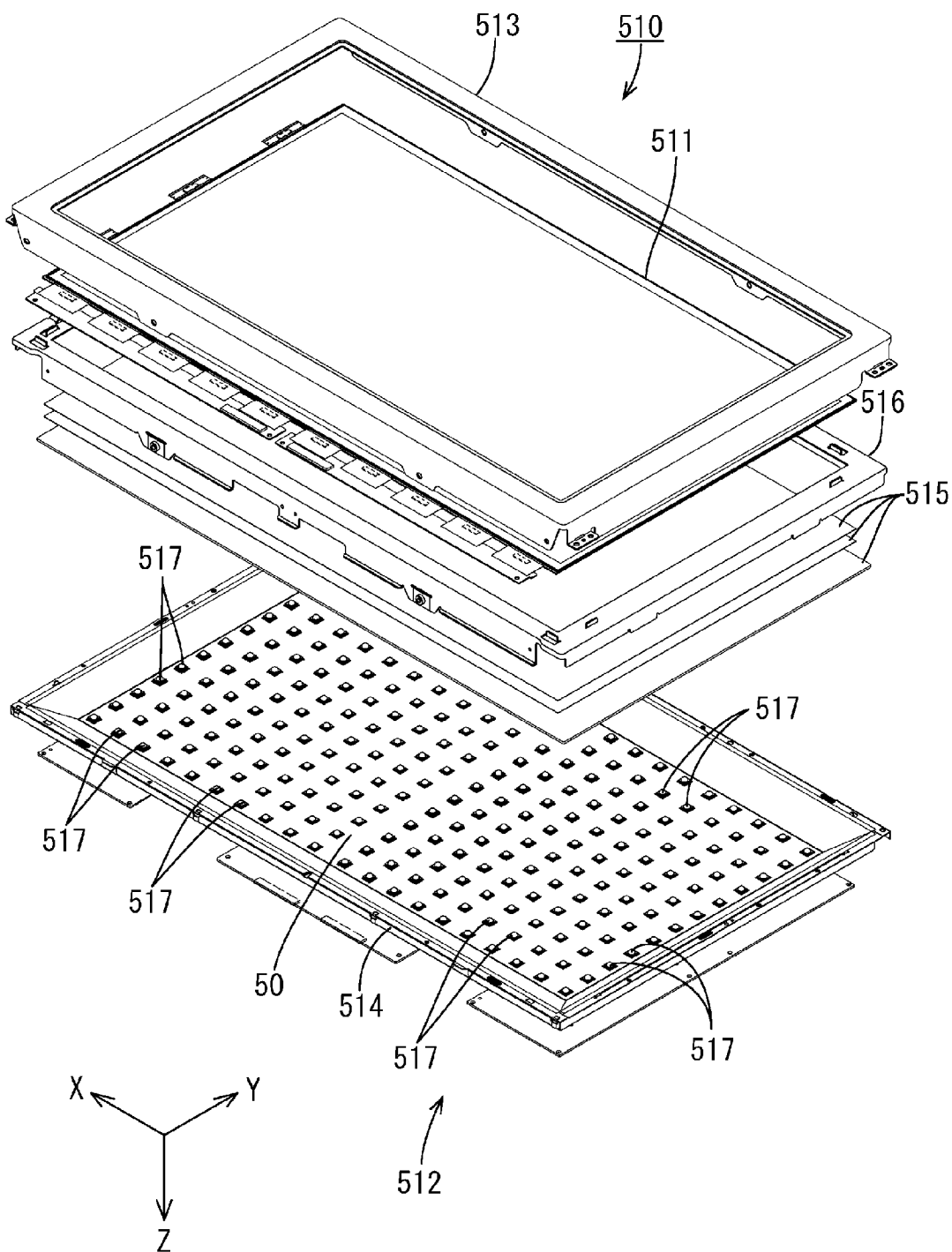
FIG. 40 is an exploded perspective view illustrating a schematic configuration of a liquid crystal display device according to Embodiment 6 of the present invention.

A liquid crystal display device 510 according to the present embodiment is formed in such a manner that a liquid crystal panel 511 and the backlight device 512 of a downlight type are integrated by a bezel 513 and the like as illustrated in FIG. 40. A configuration of the liquid crystal panel 511 is the same as that of Embodiment 1, and thus a duplicate description thereof will not be provided. Hereinafter, a configuration of the backlight device 512 of a downlight type will be described.

Figure 41:
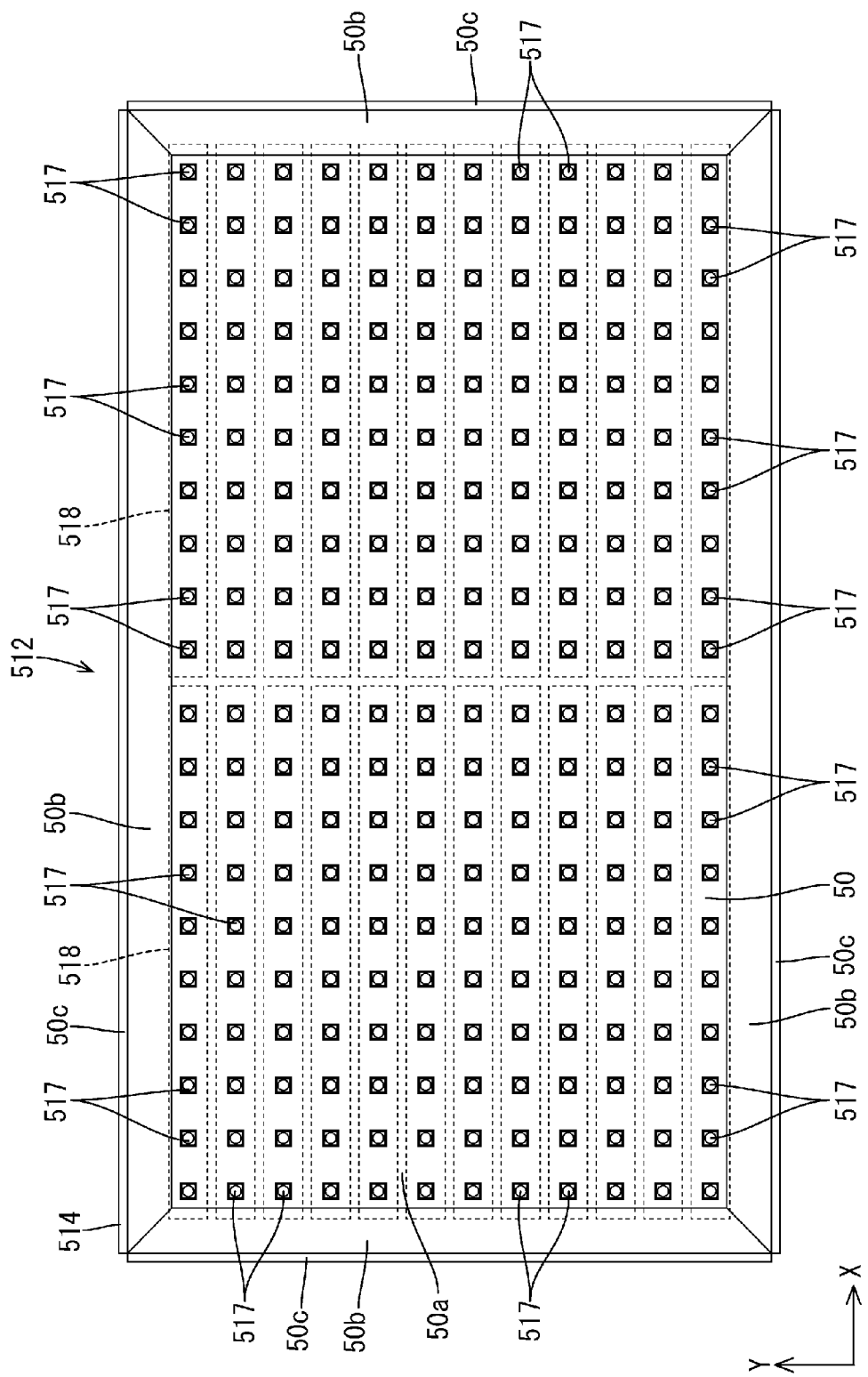
FIG. 41 is a plan view of a backlight device.

The backlight device 512 includes, as illustrated in FIG. 41, a chassis 514 that has an approximate box shape having an opening portion on the light emission side (liquid crystal panel 511 side), an optical member 515 that is arranged to cover the opening portion of the chassis 514, and a frame 516 that is arranged along the peripheral portion of the chassis 514 and is held between the peripheral portion of the optical member 515 and the chassis 514. Furthermore, an LED 517 that is arranged to face the optical member 515 (liquid crystal panel 511) in a position immediately below the optical member 515 and an LED substrate 518 on which the LED 517 is mounted are included in the chassis 514. In addition, a reflective sheet 50 that reflects light in the chassis 514 to the optical member 515 side is included in the chassis 514. The backlight device 512 according to the present embodiment is a downlight type and thus does not include the light guide plate 19 that is used in the backlight device 12 of an edge light type illustrated in Embodiment 1. The optical member 515 includes a diffusion plate that has a relatively great thickness and is arranged on the rearmost side, and an optical sheet that has a relatively small thickness and is arranged to be stacked on the front side of the diffusion plate. A configuration of the frame 516 is the same as that of Embodiment 1 except that the frame 516 does not include the frame side reflective sheet 16R, and thus a description thereof will not be provided. Next, each constituent component of the backlight device 512 will be described in detail.

Figure 42:
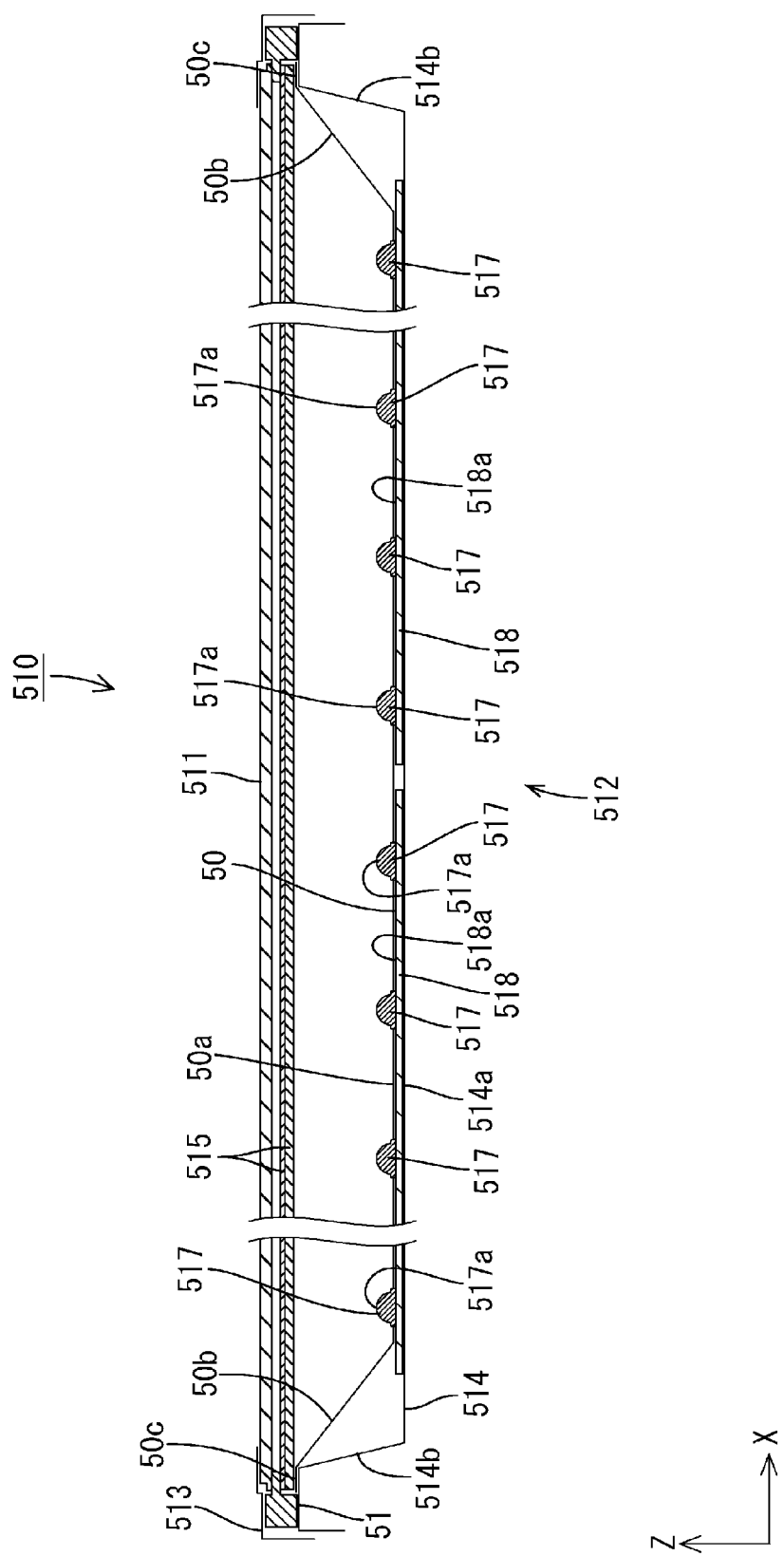
FIG. 42 is a sectional view illustrating a sectional configuration obtained by cutting the liquid crystal display device in the direction of a long edge thereof.
Figure 43:
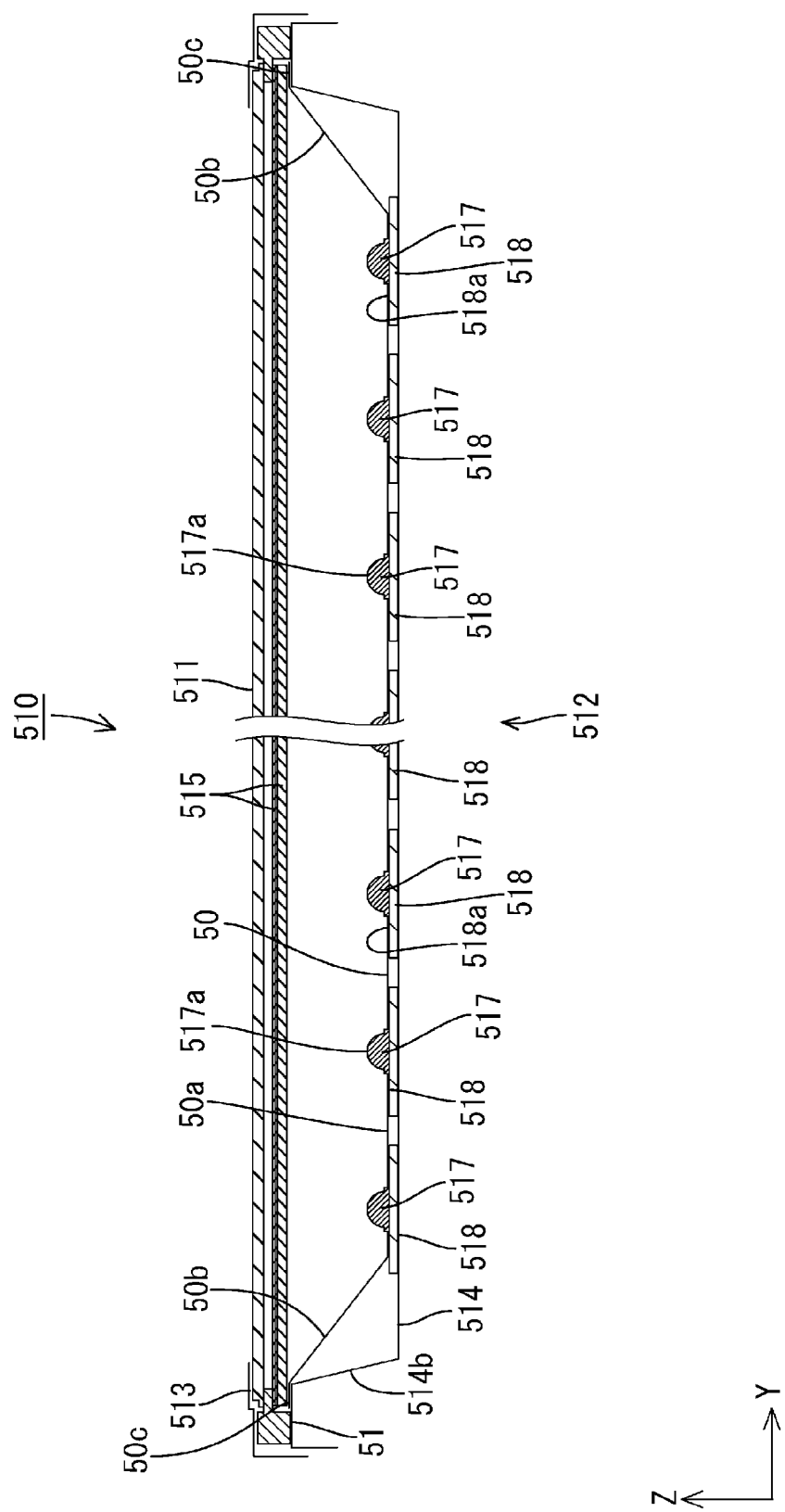
FIG. 43 is a sectional view illustrating a sectional configuration obtained by cutting the liquid crystal display device in the direction of a short edge thereof.

The chassis 514 is made of metal, is formed of a bottom plate 514a that has a horizontally long square-like shape like the liquid crystal panel 511, a side plate 514b that stands from the end of each edge of the bottom plate 514a to the front side (light emission side), and a receiving plate 51 that extends outwards from the standing end of each side plate 514b, and as a whole has an approximately shallow box shape that is opened to the front side as illustrated in FIG. 41 to FIG. 43. The direction of the long edge of the chassis 514 matches the direction of the X axis (horizontal direction), and the direction of the short edge thereof matches the direction of the Y axis (vertical direction). The frame 516 and the optical member 515 described later can be mounted on each receiving plate 51 in the chassis 514 from the front side. The frame 516 is screwed to each receiving plate 51.

Next, the LED substrate 518 on which the LED 517 is mounted will be described. The LED substrate 518, as illustrated in FIG. 41 to FIG. 43, includes a base material that has a horizontally long square-like shape (strip shape) when viewed in plan view, and extends along the bottom plate 514a and is accommodated in the chassis 514 in a state where the direction of the long edge thereof matches the direction of the X axis and the direction of the short edge matches the direction of the Y axis. Two LED substrates 518 in the direction of the X axis (direction of a row) and nine LED substrates 518 in the direction of the Y axis (direction of a column), total 18 LED substrates 518, are parallelly arranged in a matrix shape (array shape) in the chassis 514. The LED 517 is surface-mounted on the surface of the plate surfaces of the base material of the LED substrate 518 directed to the front side (the surface directed to the optical member 515 side), and this surface is a mount surface 518a. The LED substrate 518 is held with respect to the bottom plate 514a of the chassis 514 by a substrate holding member not illustrated.

A plurality of the LEDs 517 is linearly and intermittently arranged in a row in the direction of the long edge of the LED substrate 518 (the direction of the X axis) on the mount surface 518a as illustrated in FIG. 41. The plurality of LEDs 517 is disposed on each of the plurality of LED substrates 518 that is linearly arranged in a matrix shape along the bottom plate 514a of the chassis 514 as described above, and thus, as a whole, the plurality of LEDs 517 is arranged in a planar manner in a matrix shape in the direction of the X axis and the direction of the Y axis in the chassis 514. The LED 517 mounted on each LED substrate 518 includes a light emitting surface 517a facing the optical member 515 and the liquid crystal panel 511 and has an optical axis matching the direction of the Z axis, that is, the direction that is orthogonal with respect to a display surface of the liquid crystal panel 511.

The reflective sheet 50, as illustrated in FIG. 41 to FIG. 43, has a size that covers almost the entirety of the inner surface of the chassis 514, that is, a size that covers, at the same time, all of the LED substrates 518 which are arranged in a planar manner along the bottom plate 514a. The reflective sheet 50 allows light in the chassis 514 to be reflected to the optical member 515 side. The reflective sheet 50 is formed of a bottom portion 50a that has a size extending along the bottom plate 514a of the chassis 514 and covering the most part of the bottom plate 514a, four standing portions 50b that stand from each end of the bottom portion 50a to the front side and are inclined with respect to the bottom portion 50a, and an extending portion 50c that extends outwards from the end of each standing portion 50b and is disposed on the receiving plate 51 of the chassis 514. The bottom portion 50a of the reflective sheet 50 is arranged to overlap with the front side surface of each LED substrate 518, that is, the mount surface 518a of the LED 517, on the front side.

According to the present embodiment described heretofore, the LED 517 includes the light emitting surface 517a emitting light, and the light emitting surface 517a thereof is arranged to face the plate surface of the liquid crystal panel 511. Accordingly, the plate surface of the liquid crystal panel 511 that is arranged to face the light emitting surface 517a is irradiated with light that is emitted from the light emitting surface 517a of the LED 517. According to the backlight device 512 of a downlight type, light from the LED 517 is supplied to the liquid crystal panel 511 without passing through a member such as a light guide plate used in an edge light type, and thus the efficiency in use of light becomes further excellent.

Embodiment 7

Embodiment 7 of the present invention will be described with FIG. 44 to FIG. 47. A diffusion lens 52 that is, for example, attached to an LED substrate 618 in Embodiment 6 is illustrated in Embodiment 7. Duplicate descriptions of the same structures, actions, and effects as Embodiment 6 will not be provided.

A backlight device 612 included in a liquid crystal display device 610 according to the present embodiment includes the diffusion lens 52 that is attached to a position corresponding to an LED 617 in the LED substrate 618, and a substrate holding member 53 for holding the LED substrate 618 in a state where the LED substrate 618 is attached to the chassis 614 as illustrated in FIG. 44.

Figure 45:
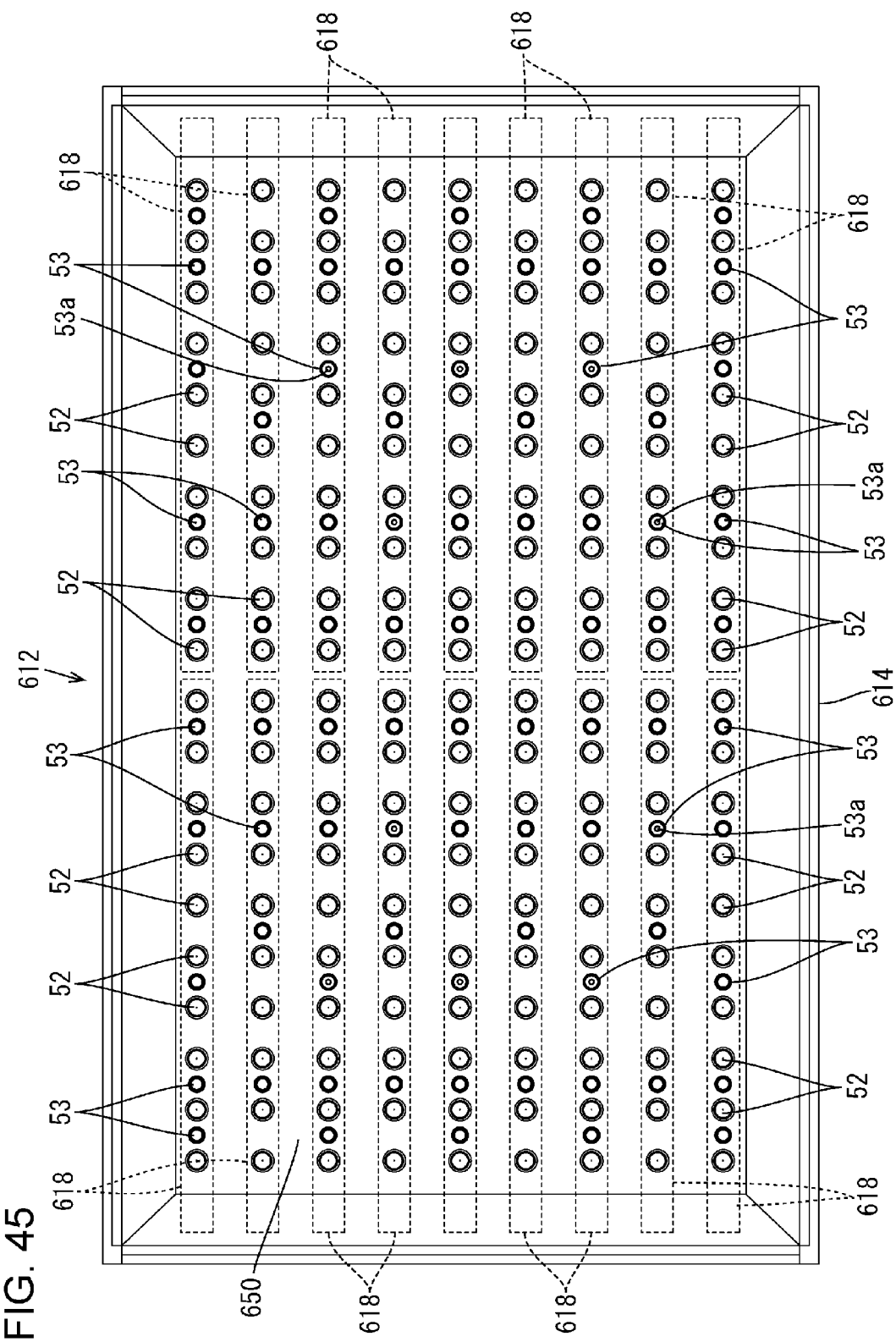
FIG. 45 is a plan view of a backlight device.
Figure 46:
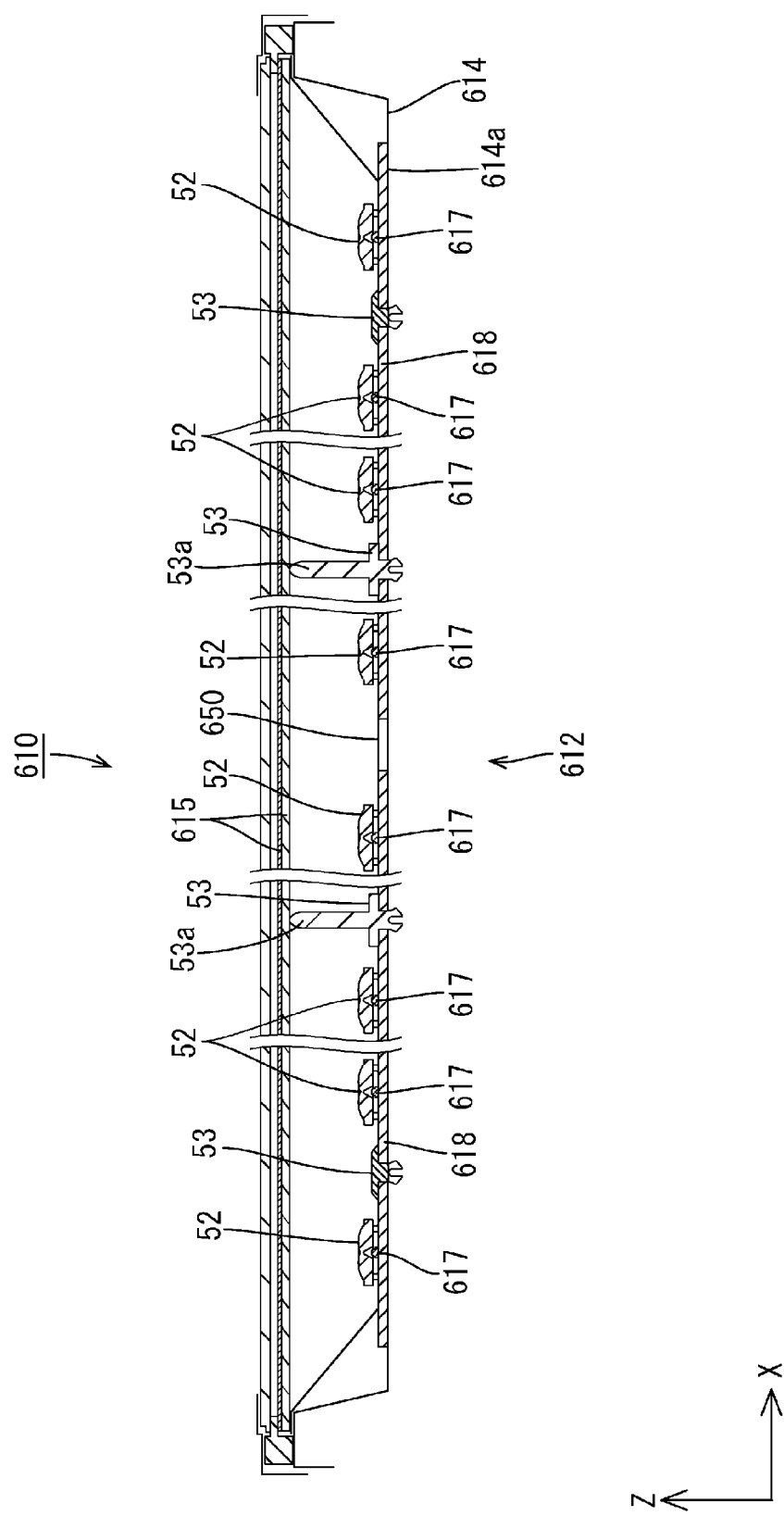
FIG. 46 is a sectional view illustrating a sectional configuration obtained by cutting the liquid crystal display device in the direction of a long edge thereof.
Figure 47:
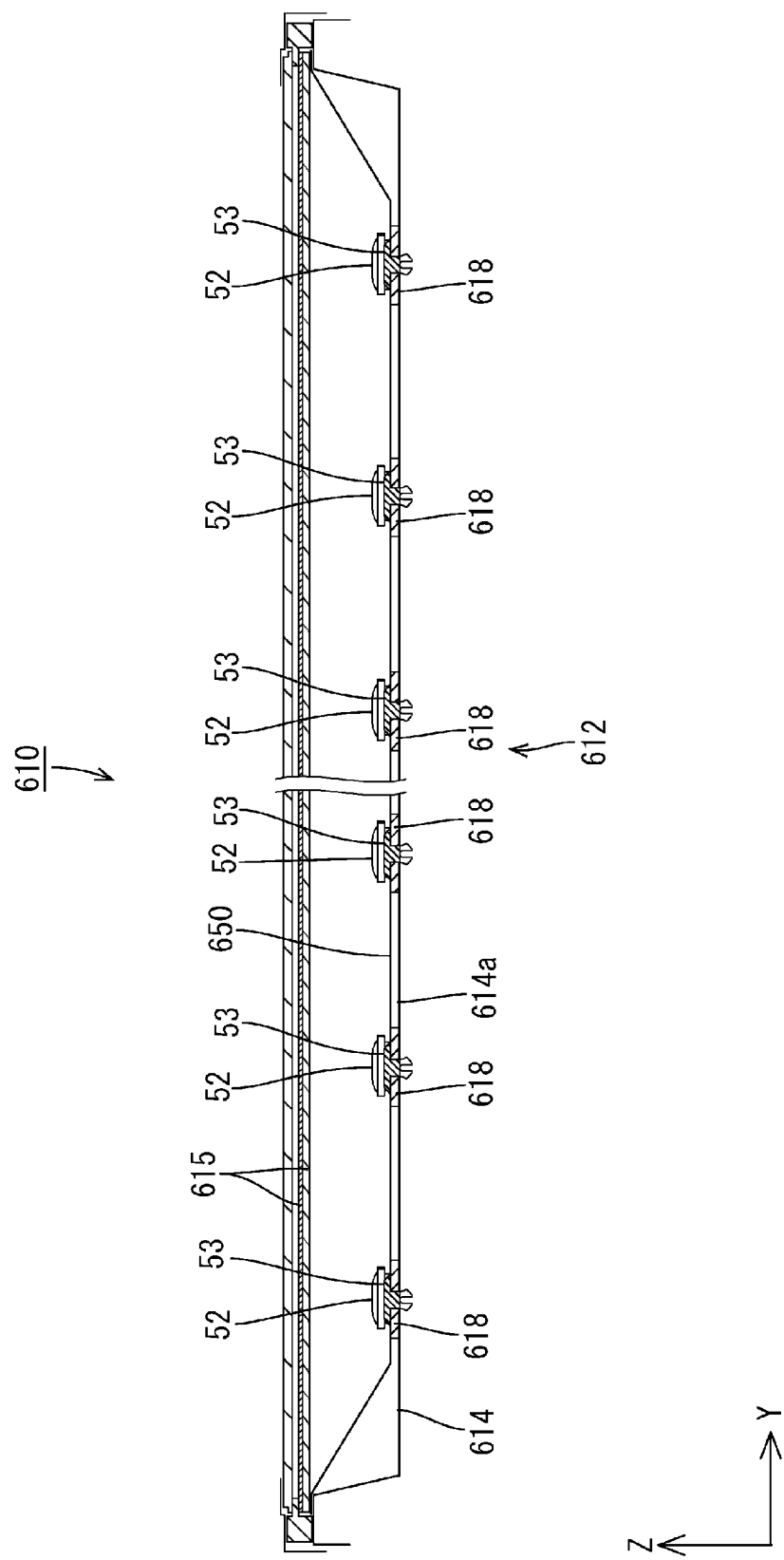
FIG. 47 is a sectional view illustrating a sectional configuration obtained by cutting the liquid crystal display device in the direction of a short edge thereof.

The diffusion lens 52 is formed of a synthetic resin material (for example, polycarbonate or acryl) that is almost transparent (has high light transmissivity) and has a higher refractive index than air. The diffusion lens 52, as illustrated in FIG. 45 to FIG. 47, has a prescribed thickness, is formed in an approximately circular shape when viewed in plan view, and is attached to the LED substrate 618 to individually cover each LED 617 from the front side (light emission side), that is, to overlie each LED 617 when viewed in plan view. The diffusion lens 52 can diffuse and emit light of strong directivity emitted from the LED 617. That is, the directivity of the light emitted from the LED 617 is decreased by passing through the diffusion lens 52, and thus even if an interval between the adjacent LEDs 617 is widened, the region therebetween is unlikely to be visually recognized as a dark portion. Accordingly, the number of installed LEDs 617 can be decreased with prevention of unevenness in luminance. The diffusion lens 52 is arranged in a position that is almost concentric with the LED 617 when viewed in plan view.

The substrate holding member 53 is made of a synthetic resin such as polycarbonate and has a front surface exhibiting white that is excellent in light reflectivity. The substrate holding member 53 includes, as illustrated in FIG. 46 and FIG. 47, a main body portion along the plate surface of the LED substrate 618 and a fixed portion that protrudes from the main body portion to the rear side, that is, the bottom plate 614a side of the chassis 614, and is fixed to the bottom plate 614a. The substrate holding member 53 is attached in a plurality of numbers to each LED substrate 618 and is arranged adjacent to the LED 617 in the direction of the X axis. The plurality of substrate holding members 53 includes some substrate holding member 53 that includes a support portion 53a which protrudes from the main body portion to the front side and supports the optical member 615 from the rear side. A hole that passes through each diffusion lens 52 and a hole that passes through each substrate holding member 53 are opened in a corresponding position and are formed in the reflective sheet 650.

Embodiment 8

Embodiment 8 of the present invention will be described with FIG. 48. The arrangement of a green phosphor and a red phosphor that is changed from Embodiment 1 is illustrated in Embodiment 8. Duplicate descriptions of the same structures, actions, and effects as Embodiment 1 will not be provided.

Figure 48:
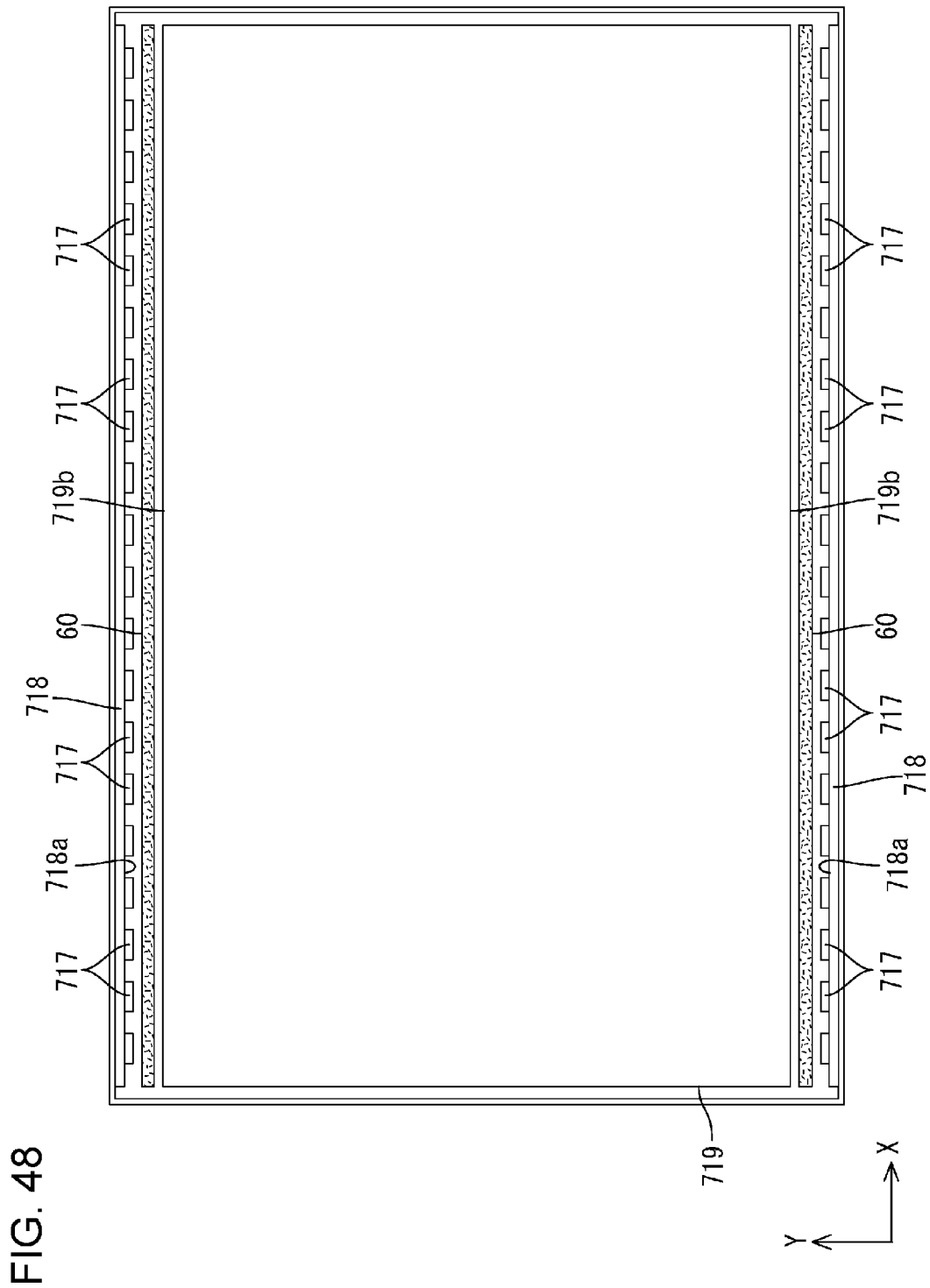
FIG. 48 is a plan view of a backlight device included in a liquid crystal display device according to Embodiment 8 of the present invention.

As illustrated in FIG. 48, a green phosphor and a red phosphor according to the present embodiment are included in a wavelength converting optical member (optical member) 60 that is arranged in a position separated from the light emission side of an LED 717 which includes a blue LED element (not illustrated). According to this configuration, when the wavelength converting optical member 60 arranged in a position separated from the light emission side of the LED 717 is irradiated with blue light emitted from the blue LED element of the LED 717, the green phosphor and the red phosphor included in the wavelength converting optical member 60 are excited by the blue light and respectively emit green light and red light. That is, the wavelength converting optical member 60 can convert the wavelength of a part of blue light that is incident light into those of green light and red light and emit the green light and the red light. Therefore, the emitted light from the wavelength converting optical member 60 includes blue light, green light, and red light and is approximately white light as a whole.

The LED 717 is formed by removing a green phosphor and a red phosphor from the LED 17 (refer to FIG. 8) described in Embodiment 1 (configured not to include a green phosphor and a red phosphor in the sealant 41) and, except for this point, has the same configuration as the LED 17 described in Embodiment 1. That is, a plurality of the LEDs 717 is linearly and intermittently arranged in the direction of the X axis (the longitudinal direction of a light incident surface 719b) on a mount surface 718a of the LED substrate 718. The wavelength converting optical member 60 is formed by sealing a green phosphor and a red phosphor, both formed of quantum dot phosphors, in a tubular container made of glass or the like and accordingly can prevent degradation of the green phosphor and the red phosphor caused by moisture or oxygen included in the atmosphere. The green phosphor and the red phosphor are arranged to be equally distributed in the tubular container. The wavelength converting optical member 60 has a horizontally long rod shape (pole shape) extending in the direction of the X axis (the direction in which the LEDs 717 are lined up) and has a length dimension equal to the length dimension of the LED substrate 718 and the dimension of the long edge of a light guide plate 719. The wavelength converting optical member 60 is arranged to be interposed between the LED 717 and the light incident surface 719b of the light guide plate 719. Since the wavelength converting optical member 60 is arranged to horizontally pass through all of the plurality of LEDs 717 lined up in the direction of the X axis, the wavelength converting optical member 60 can efficiently obtain the blue light emitted from the LED 717 and can convert the wavelength of a part of the obtained blue light with the green phosphor and the red phosphor and emit white light having less color unevenness to the light incident surface 719b of the light guide plate 719. Since the wavelength converting optical member 60 is arranged to be separated from the LED 717, the green phosphor and the red phosphor are prevented from being degraded by heat that is accompanied by light emission and emitted from the LED 717, and unevenness is unlikely to occur in the tone and the like of the green light and the red light that are supplied to the light guide plate 719 and a liquid crystal panel (not illustrated) through the wavelength converting optical member 60.

According to the present embodiment described heretofore, the LED 717 includes at least the blue LED element that emits blue light, the green phosphor that is excited by the blue light from the blue LED element and emits green light, and the red phosphor that is excited by the blue light from the blue LED element and emits red light, and the wavelength converting optical member (optical member) 60 that is arranged to be separated from the light emission side of the blue LED element and includes the green phosphor and the red phosphor is included. Accordingly, when the wavelength converting optical member 60 that is arranged to be separated from the light emission side of the blue LED element is irradiated with the blue light emitted from the blue LED element, the green phosphor and the red phosphor included in the wavelength converting optical member 60 are excited by the blue light and thereby emit green light and red light respectively. Accordingly, light that exhibits approximate white as a whole is obtained. The green phosphor and the red phosphor are included in the wavelength converting optical member 60 that is arranged to be separated from the blue LED element, and thus the green phosphor and the red phosphor are prevented from being degraded by heat emitted from the blue LED element, and unevenness is unlikely to occur in the tone and the like of green light and red light that are supplied to the liquid crystal panel 11 through the wavelength converting optical member 60.

Embodiment 9

Embodiment 9 of the present invention will be described with FIG. 49. The arrangement of a green phosphor and a red phosphor that is changed from Embodiment 1 in a different manner from Embodiment 8 is illustrated in Embodiment 9. Duplicate descriptions of the same structures, actions, and effects as Embodiments 1 and 8 will not be provided.

Figure 49:
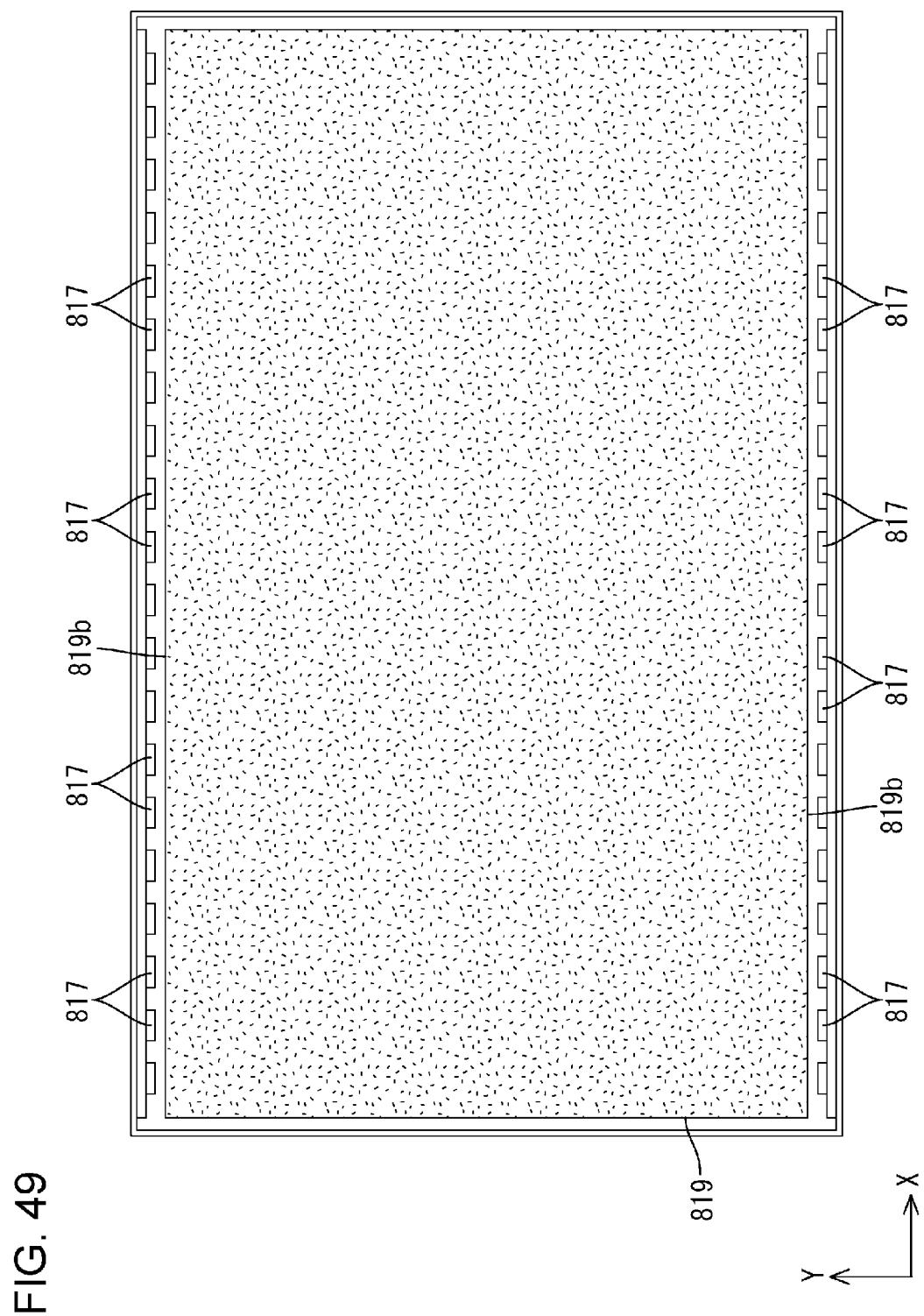
FIG. 49 is a plan view of a backlight device included in a liquid crystal display device according to Embodiment 9 of the present invention.

As illustrated in FIG. 49, a green phosphor and a red phosphor according to the present embodiment are included in a light guide plate (optical member) 819 that is arranged in a position separated from the light emission side of an LED 817 which includes a blue LED element (not illustrated). The green phosphor and the red phosphor are blended by dispersion in an equal amount in a light transmitting resin material constituting the light guide plate 819. According to this configuration, when blue light emitted from the blue LED element of the LED 817 is incident on a light incident surface 819b of the light guide plate 819 that is arranged to be separated from the light emission side of the LED 817, the green phosphor and the red phosphor included in the light guide plate 819 are excited by the blue light and respectively emit green light and red light. That is, the light guide plate 819 can convert the wavelength of a part of blue light that is incident light into those of green light and red light and emit the green light and the red light. Therefore, the emitted light from the light guide plate 819 includes blue light, green light, and red light and is approximately white light as a whole. The configuration in which the green phosphor and the red phosphor are included in the light guide plate 819 separated from the LED 817 prevents the green phosphor and the red phosphor from being degraded by heat that is accompanied by light emission and emitted from the LED 817, in the same manner as Embodiment 8, and unevenness is unlikely to occur in the tone and the like of the green light and the red light that are supplied to a liquid crystal panel (not illustrated) through the light guide plate 819.

Embodiment 10

Embodiment 10 of the present invention will be described with FIG. 50. The arrangement of a green phosphor and a red phosphor that is changed from Embodiment 6 is illustrated in Embodiment 10. Duplicate descriptions of the same structures, actions, and effects as Embodiment 6 will not be provided.

Figure 50:
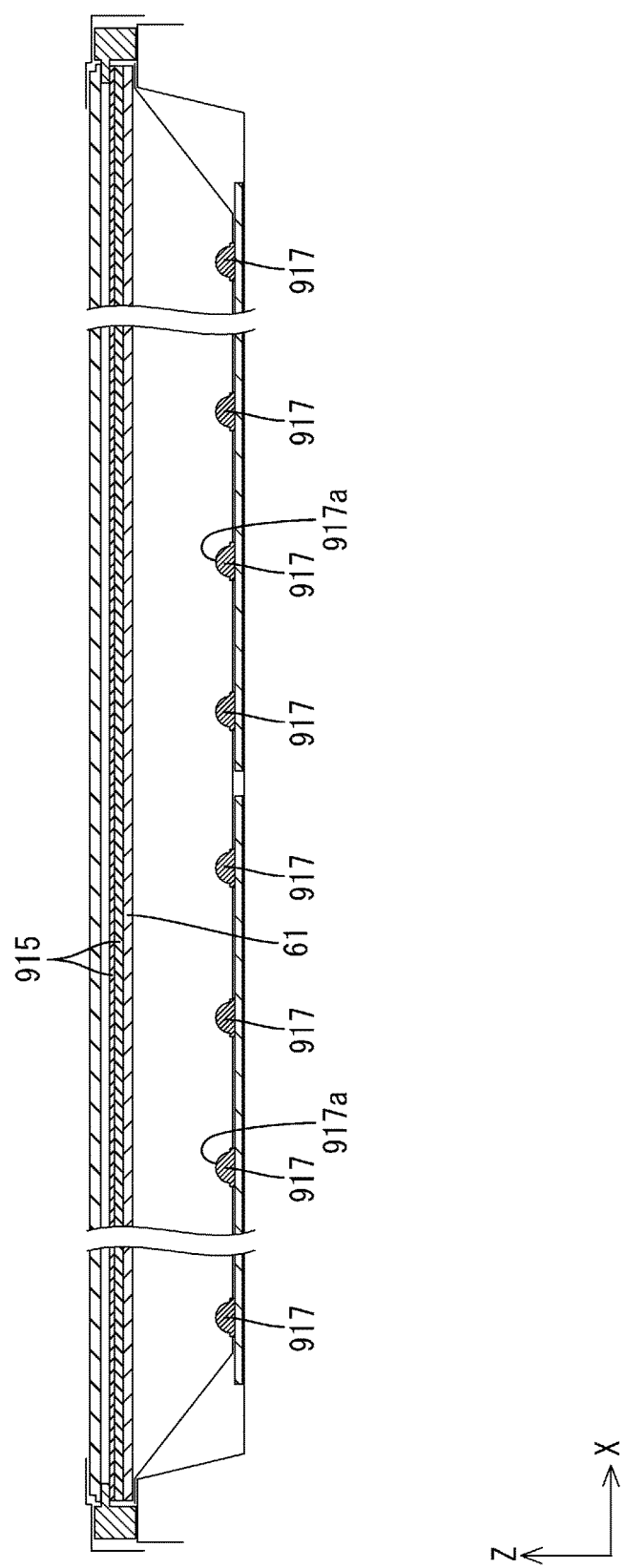
FIG. 50 is a sectional view of a backlight device included in a liquid crystal display device according to Embodiment 10 of the present invention.

As illustrated in FIG. 50, a green phosphor and a red phosphor according to the present embodiment are included in a plate-shaped wavelength converting optical member (optical member) 61 that is arranged in a position separated from the light emission side of an LED 917 which includes a blue LED element (not illustrated). The plate-shaped wavelength converting optical member 61 is arranged to overlap with the rear side (the side close to the LED 917) of a diffusion plate included in an optical member 915. That is, the plate-shaped wavelength converting optical member 61 is arranged to be separated from the light emission side of the LED 917 and to face a light emitting surface 917a of the LED 917. The plate-shaped wavelength converting optical member 61 is formed by blending equal amounts of a green phosphor and a red phosphor in a light transmitting resin material in the same manner as the light guide plate 819 (refer to FIG. 49) described in Embodiment 9. According to this configuration, when blue light emitted from the blue LED element of the LED 917 is incident on the rear side plate surface of the plate-shaped wavelength converting optical member 61 that is arranged to be separated from the light emission side of the LED 917, the green phosphor and the red phosphor included in the plate-shaped wavelength converting optical member 61 are excited by the blue light and respectively emit green light and red light. That is, the plate-shaped wavelength converting optical member 61 can convert the wavelength of a part of blue light that is incident light into those of green light and red light and emit the green light and the red light. Therefore, the emitted light from the front side plate surface of the plate-shaped wavelength converting optical member 61 includes blue light, green light, and red light and is approximately white light as a whole. The configuration in which the green phosphor and the red phosphor are included in the plate-shaped wavelength converting optical member 61 that is separated from the LED 917 prevents the green phosphor and the red phosphor from being degraded by heat that is accompanied by light emission and emitted from the LED 917, in the same manner as Embodiments 8 and 9, and unevenness is unlikely to occur in the tone and the like of the green light and the red light that are supplied to a liquid crystal panel (not illustrated) through the plate-shaped wavelength converting optical member 61.

Other Embodiments

The present invention is not limited to the above embodiments described with the drawings, and the following embodiments, for example, are included in the technical scope of the present invention.

(1) While Embodiment 1 illustrates the green phosphor, which is included in the LED and formed of a quantum dot phosphor, as having a light emission spectrum that includes a peak having a peak wavelength of 530 nm±2 nm and has a half value width of approximately 30 nm or 36 nm for the peak, a green phosphor having a light emission spectrum in which the specific numerical values of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the light emission spectrum of the green phosphor (a light emission spectrum that includes a peak having a peak wavelength in a range of 525 nm±2 nm to 540 nm±2 nm and has a half value width of less than 52 nm for the peak, or more preferably a light emission spectrum that includes a peak having a peak wavelength of 530 nm±2 nm and has a half value width of less than 40 nm for the peak). The light emission spectrum of the green LED element described in Embodiment 5 can be changed in the same manner as described above.

(2) While Embodiment 3 illustrates the green phosphor, which is included in the LED and formed of a quantum dot phosphor, as having a light emission spectrum that includes a peak having a peak wavelength of 530 nm±2 nm and has a half value width of approximately 20 nm, 30 nm, or 40 nm for the peak, a green phosphor having a light emission spectrum in which the specific numerical value of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the light emission spectrum of the green phosphor (a light emission spectrum that includes a peak having a peak wavelength in a range of 525 nm±2 nm to 540 nm±2 nm and has a half value width of less than 52 nm for the peak, or more preferably a light emission spectrum that includes a peak having a peak wavelength of 530 nm±2 nm and has a half value width of less than 40 nm for the peak). The light emission spectrum of the green LED element described in Embodiment 5 can be changed in the same manner as described above.

(3) While Embodiment 1 illustrates the red phosphor, which is included in the LED and formed of a quantum dot phosphor, as having a light emission spectrum that includes a peak having a peak wavelength of 635 nm±2 nm or 645 nm±2 nm and has a half value width of approximately 30 nm or 36 nm for the peak, a red phosphor having a light emission spectrum in which the specific numerical values of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the light emission spectrum of the red phosphor (a light emission spectrum that includes a peak having a peak wavelength in a range of 620 nm±2 nm to 645 nm±2 nm and has a half value width of less than 40 nm for the peak, or more preferably a light emission spectrum that includes a peak having a peak wavelength in a range of 620 nm±2 nm to 640 nm±2 nm and has a half value width of less than 40 nm for the peak). The light emission spectrum of the red LED element described in Embodiment 5 can be changed in the same manner as described above.

(4) While Embodiment 3 illustrates the red phosphor, which is included in the LED and formed of a quantum dot phosphor, as having a light emission spectrum that includes a peak having a peak wavelength in a range of 620 nm±2 nm to 640 nm±2 nm and has a half value width of approximately 20 nm, 30 nm, or 40 nm for the peak, a red phosphor having a light emission spectrum in which the specific numerical value of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the light emission spectrum of the red phosphor (a light emission spectrum that includes a peak having a peak wavelength in a range of 620 nm±2 nm to 645 nm±2 nm and has a half value width of less than 40 nm for the peak, or more preferably a light emission spectrum that includes a peak having a peak wavelength in a range of 620 nm±2 nm to 640 nm±2 nm and has a half value width of less than 40 nm for the peak). The light emission spectrum of the red LED element described in Embodiment 5 can be changed in the same manner as described above.

(5) While Embodiment 2 illustrates the green phosphor, which is included in the LED and formed of β-SiAlON, as having a light emission spectrum that includes a peak having a peak wavelength of 528 nm±2 nm or 533 nm±2 nm and has a half value width of approximately 49 nm or 52 nm for the peak, a green phosphor having a light emission spectrum in which the specific numerical values of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the light emission spectrum of the green phosphor (a light emission spectrum that includes a peak having a peak wavelength in a range of 525 nm±2 nm to 540 nm±2 nm and has a half value width of less than 52 nm for the peak, or more preferably a light emission spectrum that includes a peak having a peak wavelength of 528 nm±2 nm to 540 nm±2 nm and has a half value width of less than 52 nm for the peak).

(6) While Embodiment 4 illustrates the green phosphor, which is included in the LED and formed of β-SiAlON, as having a light emission spectrum that includes a peak having a peak wavelength of 533 nm±2 nm or 540 nm±2 nm and has a half value width of approximately 25 nm for the peak, a green phosphor having a light emission spectrum in which the specific numerical values of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the light emission spectrum of the green phosphor (a light emission spectrum that includes a peak having a peak wavelength in a range of 525 nm±2 nm to 540 nm±2 nm and has a half value width of less than 52 nm for the peak, or more preferably a light emission spectrum that includes a peak having a peak wavelength of 533 nm±2 nm to 540 nm±2 nm and has a half value width of less than 25 nm for the peak).

(7) While Embodiments 2 and 4 illustrate the red phosphor, which is included in the LED and formed of potassium silicofluoride, as having a light emission spectrum that includes a main peak having a peak wavelength of 631 nm±2 nm and has a half value width of approximately 7 nm for the main peak, a red phosphor having a light emission spectrum in which the specific numerical values of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the light emission spectrum of the red phosphor (a light emission spectrum that includes a peak having a peak wavelength in a range of 620 nm±2 nm to 645 nm±2 nm and has a half value width of less than 40 nm for the peak, or more preferably a light emission spectrum that includes a peak having a peak wavelength of 631 nm±2 nm and has a half value width of less than 7 nm for the peak). The specific numerical values of the peak wavelength of the first subpeak and the peak wavelength of the second subpeak in the light emission spectrum of the red phosphor formed of potassium silicofluoride can also be appropriately changed to the extent satisfying the requirement of the light emission spectrum of the red phosphor (a light emission spectrum that includes a first subpeak having a peak wavelength in a range of 607 nm±2 nm to 614 nm±2 nm and includes a second subpeak having a peak wavelength in a range of 645 nm±2 nm to 648 nm±2 nm).

(8) While Embodiment 1 illustrates the blue coloring unit included in the color filter as having a transmission spectrum that includes a peak having a peak wavelength of 451 nm and has a half value width in a range of 91 nm to 92 nm for the peak, a blue coloring unit having a transmission spectrum in which the specific numerical value of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the transmission spectrum of the blue coloring unit (a transmission spectrum that includes a peak having a peak wavelength in a range of 440 nm to 461.5 nm and has a half value width of less than 100 nm for the peak, or more preferably a light transmission spectrum that includes a peak having a peak wavelength in a range of 451 nm to 461.5 nm and has a half value width in a range of 61 nm to 99 nm for the peak).

(9) While Embodiment 1 illustrates the green coloring unit included in the color filter as having a transmission spectrum that includes a peak having a peak wavelength of 521 nm and has a half value width of approximately 85 nm for the peak, a green coloring unit having a transmission spectrum in which the specific numerical value of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the transmission spectrum of the green coloring unit (a transmission spectrum that includes a peak having a peak wavelength in a range of 510 nm to 533.5 nm and has a half value width of less than 90 nm for the peak, or more preferably a light transmission spectrum that includes a peak having a peak wavelength in a range of 521 nm to 533.5 nm and has a half value width in a range of 63 nm to 87 nm for the peak).

(10) While Embodiment 1 illustrates the red coloring unit included in the color filter as having a transmission spectrum that has a wavelength of approximately 588 nm for the half value of a peak, a red coloring unit having a light emission spectrum in which the specific numerical value of the wavelength for the half value of a peak is slightly different can also be used. That is, the specific numerical value of the position in which the peak rises can be appropriately changed to the extent satisfying the requirement of the transmission spectrum of the red coloring unit (a transmission spectrum that has a wavelength of greater than or equal to 580 nm for the half value of a peak, or more preferably a transmission spectrum that has a wavelength in a range of 588 nm to 604 nm for the half value of a peak).

(11) While Embodiment 2 illustrates the blue coloring unit included in the color filter as having a transmission spectrum that includes a peak having a peak wavelength in a range of 451 nm to 453 nm and has a half value width in a range of 74 nm to 78 nm for the peak, a blue coloring unit having a transmission spectrum in which the specific numerical value of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the transmission spectrum of the blue coloring unit (a transmission spectrum that includes a peak having a peak wavelength in a range of 440 nm to 461.5 nm and has a half value width of less than 100 nm for the peak, or more preferably a light transmission spectrum that includes a peak having a peak wavelength in a range of 451 nm to 461 nm and has a half value width in a range of 46 nm to 78 nm for the peak).

(12) While Embodiment 2 illustrates the green coloring unit included in the color filter as having a transmission spectrum that includes a peak having a peak wavelength in a range of 521 nm to 524 nm and has a half value width of approximately 71 nm to 74 nm for the peak, a green coloring unit having a transmission spectrum in which the specific numerical value of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the transmission spectrum of the green coloring unit (a transmission spectrum that includes a peak having a peak wavelength in a range of 510 nm to 533.5 nm and has a half value width of less than 90 nm for the peak, or more preferably a light transmission spectrum that includes a peak having a peak wavelength in a range of 521 nm to 531 nm and has a half value width in a range of 50 nm to 74 nm for the peak).

(13) While Embodiment 2 illustrates the red coloring unit included in the color filter as having a transmission spectrum that has a wavelength of approximately 604 nm for the half value of a peak, a red coloring unit having a light emission spectrum in which the specific numerical value of the wavelength for the half value of a peak is slightly different can also be used. That is, the specific numerical value of the position in which the peak rises can be appropriately changed to the extent satisfying the requirement of the transmission spectrum of the red coloring unit (a transmission spectrum that has a wavelength of greater than or equal to 580 nm for the half value of a peak, or more preferably a transmission spectrum that has a wavelength in a range of 601 nm to 604 nm for the half value of a peak).

(14) While Embodiment 3 illustrates the blue coloring unit included in the color filter as having a transmission spectrum that includes a peak having a peak wavelength in a range of 456.5 nm to 461.5 nm and has a half value width of 61 nm to 99 nm for the peak, a blue coloring unit having a transmission spectrum in which the specific numerical value of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the transmission spectrum of the blue coloring unit (a transmission spectrum that includes a peak having a peak wavelength in a range of 440 nm to 461.5 nm and has a half value width of less than 100 nm for the peak, or more preferably a light transmission spectrum that includes a peak having a peak wavelength in a range of 451 nm to 461 nm and has a half value width in a range of 46 nm to 78 nm for the peak).

(15) While Embodiment 3 illustrates the green coloring unit included in the color filter as having a transmission spectrum that includes a peak having a peak wavelength in a range of 531.5 nm to 533.5 nm and has a half value width in a range of approximately 63 nm to 87 nm for the peak, a green coloring unit having a transmission spectrum in which the specific numerical value of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the transmission spectrum of the green coloring unit (a transmission spectrum that includes a peak having a peak wavelength in a range of 510 nm to 533.5 nm and has a half value width of less than 90 nm for the peak, or more preferably a light transmission spectrum that includes a peak having a peak wavelength in a range of 521 nm to 533.5 nm and has a half value width in a range of 63 nm to 87 nm for the peak).

(16) While Embodiment 3 illustrates the red coloring unit included in the color filter as having a transmission spectrum that has a wavelength in a range of 589 nm to 596 nm for the half value of a peak, a red coloring unit having a light emission spectrum in which the specific numerical value of the wavelength for the half value of a peak is slightly different can also be used. That is, the specific numerical value of the position in which the peak rises can be appropriately changed to the extent satisfying the requirement of the transmission spectrum of the red coloring unit (a transmission spectrum that has a wavelength of greater than or equal to 580 nm for the half value of a peak, or more preferably a transmission spectrum that has a wavelength in a range of 588 nm to 604 nm for the half value of a peak).

(17) While Embodiment 4 illustrates the blue coloring unit included in the color filter as having a transmission spectrum that includes a peak having a peak wavelength of 461 nm and has a half value width of 46 nm to 48 nm for the peak, a blue coloring unit having a transmission spectrum in which the specific numerical value of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the transmission spectrum of the blue coloring unit (a transmission spectrum that includes a peak having a peak wavelength in a range of 440 nm to 461.5 nm and has a half value width of less than 100 nm for the peak, or more preferably a light transmission spectrum that includes a peak having a peak wavelength in a range of 451 nm to 461 nm and has a half value width in a range of 46 nm to 78 nm for the peak).

(18) While Embodiment 4 illustrates the green coloring unit included in the color filter as having a transmission spectrum that includes a peak having a peak wavelength of 531 nm and has a half value width in a range of 52 nm to 56 nm for the peak, a green coloring unit having a transmission spectrum in which the specific numerical value of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the transmission spectrum of the green coloring unit (a transmission spectrum that includes a peak having a peak wavelength in a range of 510 nm to 533.5 nm and has a half value width of less than 90 nm for the peak, or more preferably a light transmission spectrum that includes a peak having a peak wavelength in a range of 521 nm to 531 nm and has a half value width in a range of 50 nm to 74 nm for the peak).

(19) While Embodiment 4 illustrates the red coloring unit included in the color filter as having a transmission spectrum that has a wavelength in a range of 601 nm to 602 nm for the half value of a peak, a red coloring unit having a light emission spectrum in which the specific numerical value of the wavelength for the half value of a peak is slightly different can also be used. That is, the specific numerical value of the position in which the peak rises can be appropriately changed to the extent satisfying the requirement of the transmission spectrum of the red coloring unit (a transmission spectrum that has a wavelength of greater than or equal to 580 nm for the half value of a peak, or more preferably a transmission spectrum that has a wavelength in a range of 601 nm to 604 nm for the half value of a peak).

(20) In (8) to (19), a specific technique for changing the transmission spectrum of each coloring unit of the color filter can employ, for example, a technique that changes the thickness of each coloring unit. In this case, if the thickness of each coloring unit is increased, the half value width of the transmission spectrum is narrowed. Conversely, if the thickness of each low light reflectivity is decreased, the half value width of the transmission spectrum is widened. Besides, a technique, for example, that changes the content or the concentration of a pigment or a dye included in each coloring unit can also be employed. In this case, if the content of a pigment or a dye in each coloring unit is increased or the concentration thereof is increased, the half value width of the transmission spectrum is narrowed. Conversely, if the content of a pigment or a dye in each coloring unit is decreased or the concentration thereof is decreased, the half value width of the transmission spectrum is widened.

(21) While each embodiment (except for Embodiments 2 and 4) illustrates a case where the material of the quantum dot phosphor used as the green phosphor and the red phosphor is CdSe, quantum dot phosphors of other materials can also be used. For example, a material obtained by combining Zn, Cd, Hg, Pb, or the like that becomes a divalent cation with O, S, Se, Te, or the like that becomes a divalent anion (zinc sulphide (ZnS) or the like), a material obtained by combining Ga, In, or the like that becomes a trivalent cation with P, As, Sb, or the like that becomes a trivalent anion (indium phosphide (InP), gallium arsenide (GaAs), or the like), and furthermore a chalcopyrite compound (CuInSe2 or the like) and the like can be used.

(22) While Embodiments 2 and 4 illustrate a case where europium-activated β-SiAlON that is a oxynitride phosphor and one type of a sialon-based phosphor is used as the green phosphor included in the LED, β-SiAlON in which an activator other than europium (for example, a rare earth element such as Tb, Y, or Ce or Ag) is used can also be used. Furthermore, if the requirement of the light emission spectrum of the green phosphor (a light emission spectrum that includes a peak having a peak wavelength in a range of 525 nm to 540 nm and has a half value width of less than 52 nm for the peak) is satisfied, a sialon-based phosphor other than β-SiAlON can be used. In addition, if the requirement of the light emission spectrum of the green phosphor is satisfied, an oxynitride phosphor other than a sialon-based phosphor can be used. In addition, if the requirement of the light emission spectrum of the green phosphor is satisfied, a phosphor other than an oxynitride phosphor (for example, a BOSE-based phosphor or a YAG-based phosphor that is one type of an oxide phosphor) can be used.

(23) While Embodiments 2 and 4 illustrate a case where manganese-activated potassium silicofluoride ($K_2SiF_6$) that is one type of a complex fluoride phosphor is used as the red phosphor included in the LED, potassium silicofluoride in which an activator other than manganese is used can also be used. Furthermore, if the requirement of the light emission spectrum of the red phosphor (a light emission spectrum that includes a main peak having a peak wavelength in a range of 620 nm to 645 nm and has a half value width of less than 40 nm for the main peak and, furthermore, includes a first subpeak having a peak wavelength in a range of 607 nm to 614 nm and a second subpeak having a peak wavelength in a range of 645 nm to 648 nm) is satisfied, a complex fluoride phosphor other than potassium silicofluoride can be used. In addition, if the requirement of the light emission spectrum of the red phosphor is satisfied, a phosphor other than a complex fluoride phosphor can be used.

(24) A specific example of "a complex fluoride phosphor other than potassium silicofluoride" described in (23) can be exemplified by a complex fluoride phosphor having a configuration in which any of titanium (Ti), zirconium (Zr), hafnium (Hf), germanium (Ge), and tin (Sn) is used instead of silicon (Si) of potassium silicofluoride. Besides, a specific example can be exemplified by a complex fluoride phosphor in which any of lithium (Li), sodium (Na), rubidium (Rb), and cesium (Cs) is used instead of potassium (K) of potassium silicofluoride. Furthermore, a specific example can be exemplified by a complex fluoride phosphor in which a plurality of elements is selected from silicon, titanium, zirconium, hafnium, germanium, and tin and is used instead of silicon of potassium silicofluoride.

(25) While Embodiments 2 and 4 illustrate a case where the red phosphor included in the LED has a light emission spectrum in which a first subpeak on the short wavelength side is relatively high with respect to a main peak and a second subpeak on the long wavelength side is relatively low with respect to the main peak, a red phosphor having a light emission spectrum in which the relationship between the heights of the first subpeak and the second subpeak is inverted can also be used.

(26) While each embodiment illustrates a case where only one type of green phosphor included in the LED is used, a plurality of types of green phosphors can be used together. In this case, it is preferable that the plurality of types of green phosphors is formed to have a light emission spectrum that includes peaks having different peak wavelengths or a light emission spectrum that includes peaks having different half value widths.

(27) While each embodiment illustrates a case where only one type of red phosphor included in the LED is used, a plurality of types of red phosphors can be used together. In this case, it is preferable that the plurality of types of green phosphors is formed to have a light emission spectrum that includes peaks having different peak wavelengths or a light emission spectrum that includes peaks having different half value widths.

(28) While each embodiment illustrates the LED as being formed to include the green phosphor and the red phosphor, the present invention can be applied to an LED that includes a yellow phosphor emitting yellow light in addition to the green phosphor and the red phosphor. α-SiAlON, for example, that is one type of sialon-based phosphor can be used as one example of the yellow phosphor.

(29) While each embodiment illustrates the blue LED element included in the LED as having a light emission spectrum that includes a peak having a peak wavelength of 444 nm±2 nm and has a half value width of approximately 18 nm for the peak, a blue LED element having a light emission spectrum in which the specific numerical values of the peak wavelength of the peak, the specific numerical value of the half value width of the peak, and the like are slightly different can also be used. That is, the specific numerical value of the peak wavelength of the peak or the half value width of the peak can be appropriately changed to the extent satisfying the requirement of the light emission spectrum of the blue LED element (a light emission spectrum that includes a peak having a peak wavelength in a range of 440 nm to 450 nm and has a half value width of less than 25 nm for the peak).

(30) While each embodiment illustrates a case where InGaN is used as the material of the LED element constituting the LED, other materials such as GaN, AlGaN, GaP, ZnSe, ZnO, and AlGaInP can also be used for the LED elements.

(31) While each embodiment illustrates a case where the LED of a top surface light emission type is used, an LED of a side surface light emission type in which a side surface adjacent to the mount surface of the LED substrate is the light emitting surface can also be used.

(32) The mechanical structure (the shape of the case, the shape of the lead frame, and the like) of the LED can be appropriately changed in addition to each embodiment.

(33) While each embodiment illustrates the coloring units of the color filter included in the liquid crystal panel as being formed of three colors, coloring units can also be formed of four or more colors. Yellow is the most preferable as a color added to the coloring unit in addition to red, green, and blue, and cyan is also preferable. In addition, a non-coloring unit that does not have wavelength selectivity can be added.

(34) While Embodiment 1 illustrates the LED substrate (LED) as being arranged as a pair in both long edge side end portions of the chassis (light guide plate) in the backlight device of an edge light type, the present invention also includes, for example, arranging the LED substrate (LED) as a pair in both short edge side end portions of the chassis (light guide plate).

(35) In addition to (34), the present invention also includes arranging the LED substrate (LED) as a pair in each end portion on both long edges and both short edges of the chassis (light guide plate) and, conversely, arranging one LED substrate (LED) in one long edge end portion or one short edge end portion of the chassis (light guide plate).

(36) The configurations described in Embodiments 6 and 7 can be apparently combined with the configurations described in Embodiments 2 to 5.

(37) The number or the arrangement pitches of installed LEDS in the LED substrate, the number of installed LED substrates in the chassis, the size of the LED substrate, and the like can be appropriately changed in the backlight device of a downlight type described in Embodiment 6.

(38) While Embodiment 7 illustrates the diffusion lens as being individually attached to all LEDs in the backlight device of a downlight type, the diffusion lens may be attached to only a part of the LEDs. In addition, the number or the arrangement pitches of installed LEDs in the LED substrate, the number of installed LED substrates in the chassis, the size of the LED substrate, and the like can be appropriately changed.

(39) While Embodiment 10 illustrates a case where the plate-shaped wavelength converting optical member is installed separately from the diffusion plate, the diffusion plate can be used as the plate-shaped wavelength converting optical plate by including the green phosphor and the red phosphor in the diffusion plate. Accordingly, the number of components of the backlight device can be decreased.

(40) While each embodiment illustrates using an LED as the illuminant, other illuminants such as organic EL can also be used.

(41) While each embodiment illustrates the liquid crystal panel and the chassis as being in a vertically placed state in which the directions of the short edges thereof match the vertical direction, the present invention also includes a liquid crystal panel and a chassis that are in a vertically placed state in which the directions of the long edges thereof match the vertical direction.

(42) While each embodiment uses a TFT as the switching element of the liquid crystal display device, the present invention can be applied to a liquid crystal display device that uses a switching element other than a TFT (for example, a thin film diode (TFD)) and can also be applied to a liquid crystal display device that performs display in black and white, in addition to the liquid crystal display device that performs display in color.

(43) While each embodiment illustrates a liquid crystal display device in which a liquid crystal panel is used as a display panel, the present invention can also be applied to a display device in which other types of display panels are used.

(44) While each embodiment illustrates a television reception device that includes a tuner, the present invention can also be applied to a display device that does not include a tuner. Specifically, the present invention can be applied to a liquid crystal display device that is used as an electronic signboard (digital signage) or an electronic blackboard.

REFERENCE SIGNS LIST 10, 510, 610 LIQUID CRYSTAL DISPLAY DEVICE (DISPLAY DEVICE)
10T TUNER (RECEPTION UNIT)
10TV TELEVISION RECEPTION DEVICE
11, 511 LIQUID CRYSTAL PANEL (DISPLAY PANEL)
12, 512, 612 BACKLIGHT DEVICE (ILLUMINATION DEVICE)
17, 417, 517, 617, 717, 817, 917 LED (ILLUMINANT)
19, 719 LIGHT GUIDE PLATE
19a LIGHT EMITTING SURFACE
19b, 719b, 819b LIGHT INCIDENT SURFACE
29 COLOR FILTER
29B BLUE COLORING UNIT (COLORING UNIT EXHIBITING BLUE)
29G GREEN COLORING UNIT (COLORING UNIT EXHIBITING GREEN)
29R RED COLORING UNIT (COLORING UNIT EXHIBITING RED)
40, 440 BLUE LED ELEMENT (BLUE LIGHT EMITTING ELEMENT)
43 GREEN LED ELEMENT
44 RED LED ELEMENT
60 WAVELENGTH CONVERTING OPTICAL MEMBER
61 PLATE-SHAPED WAVELENGTH CONVERTING OPTICAL MEMBER
819 LIGHT GUIDE PLATE (OPTICAL MEMBER)

The invention claimed is:

1. A display device comprising:
an illumination device that includes an illuminant emitting blue light having a light emission spectrum which includes a peak having a peak wavelength in a range of 440 nm±2 nm to 450 nm±2 nm and has a half value width of less than 25 nm for the peak, green light having a light emission spectrum which includes a peak having a peak wavelength in a range of 525 nm±2 nm to 540 nm±2 nm and has a half value width of less than 52 nm for the peak, and red light having a light emission spectrum which includes a peak having a peak wavelength in a range of 620 nm±2 nm to 645 nm±2 nm and has a half value width of less than 40 nm for the peak; and
a display panel that includes a color filter and performs display by using light from the illumination device, the color filter including at least a blue coloring unit that exhibits blue and has a transmission spectrum which includes a peak having a peak wavelength in a range of 440 nm to 461.5 nm and has a half value width of less than 100 nm for the peak, a green coloring unit that exhibits green and has a transmission spectrum which includes a peak having a peak wavelength in a range of 510 nm to 533.5 nm and has a half value width of less than 90 nm for the peak, and a red coloring unit that exhibits red and has a transmission spectrum which has a wavelength of greater than or equal to 580 nm for the half value of a peak, wherein the illuminant includes at least a blue light emitting element that emits the blue light, a green phosphor that is excited by the blue light from the blue light emitting element and emits green light, and a red phosphor that is excited by the blue light from the blue light emitting element and emits red light.

2. The display device according to claim 1, wherein the illuminant emits the green light having a light emission spectrum that includes a peak having a peak wavelength of 530 nm±2 nm and has a half value width of less than 40 nm for the peak, and the blue coloring unit has a transmission spectrum that includes a peak having a peak wavelength in a range of 451 nm to 461.5 nm and has a half value width in a range of 61 nm to 99 nm for the peak, the green coloring unit has a transmission spectrum that includes a peak having a peak wavelength in a range of 521 nm to 533.5 nm and has a half value width in a range of 63 nm to 87 nm for the peak, and the red coloring unit has a transmission spectrum that has a wavelength in a range of 588 nm to 604 nm for the half value of a peak.

3. The display device according to claim 2, wherein the illuminant emits the green light having a light emission spectrum that has a half value width of less than 20 nm for a peak, and the red light having a light emission spectrum that includes a peak having a peak wavelength in a range of 620 nm±2 nm to 640 nm±2 nm and has a half value width of less than 20 nm for the peak, and the blue coloring unit has a transmission spectrum that includes a peak having a peak wavelength in a range of 456.5 nm to 461.5 nm, the green coloring unit has a transmission spectrum that includes a peak having a peak wavelength in a range of 531.5 nm to 533.5 nm, and the red coloring unit has a transmission spectrum that has a wavelength in a range of 589 nm to 596 nm for the half value of a peak.

4. The display device according to claim 2, wherein the illuminant emits the green light having a light emission spectrum that has a half value width in a range of 21 nm to 30 nm for a peak, and the red light having a light emission spectrum that includes a peak having a peak wavelength in a range of 626 nm±2 nm to 639 nm±2 nm and has a half value width in a range of 21 nm to 30 nm for the peak, and the blue coloring unit has a transmission spectrum that includes a peak having a peak wavelength in a range of 458.5 nm to 461.5 nm and has a half value width in a range of 61 nm to 85 nm for the peak, the green coloring unit has a transmission spectrum that includes a peak having a peak wavelength in a range of 531.5 nm to 532.5 nm and has a half value width in a range of 63 nm to 79 nm for the peak, and the red coloring unit has a transmission spectrum that has a wavelength in a range of 591 nm to 596 nm for the half value of a peak.

5. The display device according to claim 2, wherein the illuminant emits the green light having a light emission spectrum that has a half value width in a range of 31 nm to 40 nm for a peak, and the red light having a light emission spectrum that includes a peak having a peak wavelength in a range of 633 nm±2 nm to 642 nm±2 nm and has a half value width in a range of 31 nm to 40 nm for the peak, and the blue coloring unit has a transmission spectrum that includes a peak having a peak wavelength in a range of 460 nm to 461.5 nm and has a half value width in a range of 61 nm to 74 nm for the peak, the green coloring unit has a transmission spectrum that includes a peak having a peak wavelength in a range of 531.5 nm to 532 nm and has a half value width in a range of 63 nm to 72 nm for the peak, and the red coloring unit has a transmission spectrum that has a wavelength in a range of 593 nm to 596 nm for the half value of a peak.

6. The display device according to claim 2, wherein the illuminant emits the green light having a light emission spectrum that has a half value width in a range of 30 nm to 36 nm for a peak, and the red light having a light emission spectrum that includes a peak having a peak wavelength in a range of 635 nm±2 nm to 645 nm±2 nm and has a half value width in a range of 30 nm to 36 nm for the peak, and the blue coloring unit has a transmission spectrum that includes a peak having a peak wavelength of 451 nm and has a half value width in a range of 91 nm to 92 nm for the peak, the green coloring unit has a transmission spectrum that includes a peak having a peak wavelength of 521 nm and has a half value width of 85 nm for the peak, and the red coloring unit has a transmission spectrum that has a wavelength of 588 nm for the half value of a peak.

7. The display device according to claim 2, wherein the green phosphor and the red phosphor are formed of quantum dot phosphors.

8. The display device according to claim 1, wherein the illuminant emits the green light having a light emission spectrum that includes a peak having a peak wavelength in a range of 528 nm±2 nm to 540 nm±2 nm and has a half value width of less than 52 nm for the peak, and the red light having a light emission spectrum that includes a main peak having a peak wavelength of 631 nm±2 nm and has a half value width of less than 7 nm for the main peak and, furthermore, includes a first subpeak having a peak wavelength in a range of 607 nm to 614 nm and includes a second subpeak having a peak wavelength in a range of 645 nm to 648 nm, and the blue coloring unit has a transmission spectrum that includes a peak having a peak wavelength in a range of 451 nm to 461 nm and has a half value width in a range of 46 nm to 78 nm for the peak, the green coloring unit has a transmission spectrum that includes a peak having a peak wavelength of 521 nm to 531 nm and has a half value width in a range of 50 nm to 74 nm for the peak, and the red coloring unit has a transmission spectrum that has a wavelength in a range of 601 nm to 604 nm for the half value of a peak.

9. The display device according to claim 8, wherein the illuminant emits the green light having a light emission spectrum that includes a peak having a peak wavelength of 533 nm±2 nm to 540 nm±2 nm and has a half value width of less than 25 nm for the peak, and the blue coloring unit has a transmission spectrum that includes a peak having a peak wavelength of 461 nm and has a half value width in a range of 46 nm to 48 nm for the peak, the green coloring unit has a transmission spectrum that includes a peak having a peak wavelength of 531 nm and has a half value width in a range of 50 nm to 52 nm for the peak, and the red coloring unit has a transmission spectrum that has a wavelength in a range of 601 nm to 602 nm for the half value of a peak.

10. The display device according to claim 8, wherein the illuminant emits the green light having a light emission spectrum that includes a peak having a peak wavelength of 528 nm±2 nm to 533 nm±2 nm, and the blue coloring unit has a transmission spectrum that includes a peak having a peak wavelength in a range of 451 nm to 453 nm and has a half value width in a range of 74 nm to 78 nm for the peak, the green coloring unit has a transmission spectrum that includes a peak having a peak wavelength of 521 nm to 524 nm and has a half value width in a range of 71 nm to 74 nm for the peak, and the red coloring unit has a transmission spectrum that has a wavelength of 604 nm for the half value of a peak.

11. The display device according to claim 8, wherein the green phosphor is formed of a sialon-based phosphor, and the red phosphor is formed of a complex fluoride phosphor.

12. The display device according to claim 1, wherein the display device includes an optical member that is arranged to be separated from a light emission side of the blue light emitting element and includes the green phosphor and the red phosphor.

13. The display device according to claim 1, wherein the illumination device includes a light guide plate that includes a light incident surface on an end surface thereof and includes a light emitting surface on a plate surface thereof, the light incident surface being arranged to face the illuminant and on which light from the illuminant is incident, and the light emitting surface being arranged to face a plate surface of the display panel and emitting light to the display panel.

14. A television reception device comprising:

the display device according to claim 1; and a reception unit through which a television signal is receivable.

\* \* \* \* \*